Oct. 6, 1953          J. O'D. SHEPHERD          2,654,807
            MARKER FOR ALLOTTING A LINK AND A SENDER
Original Filed May 5, 1943                      53 Sheets-Sheet 5
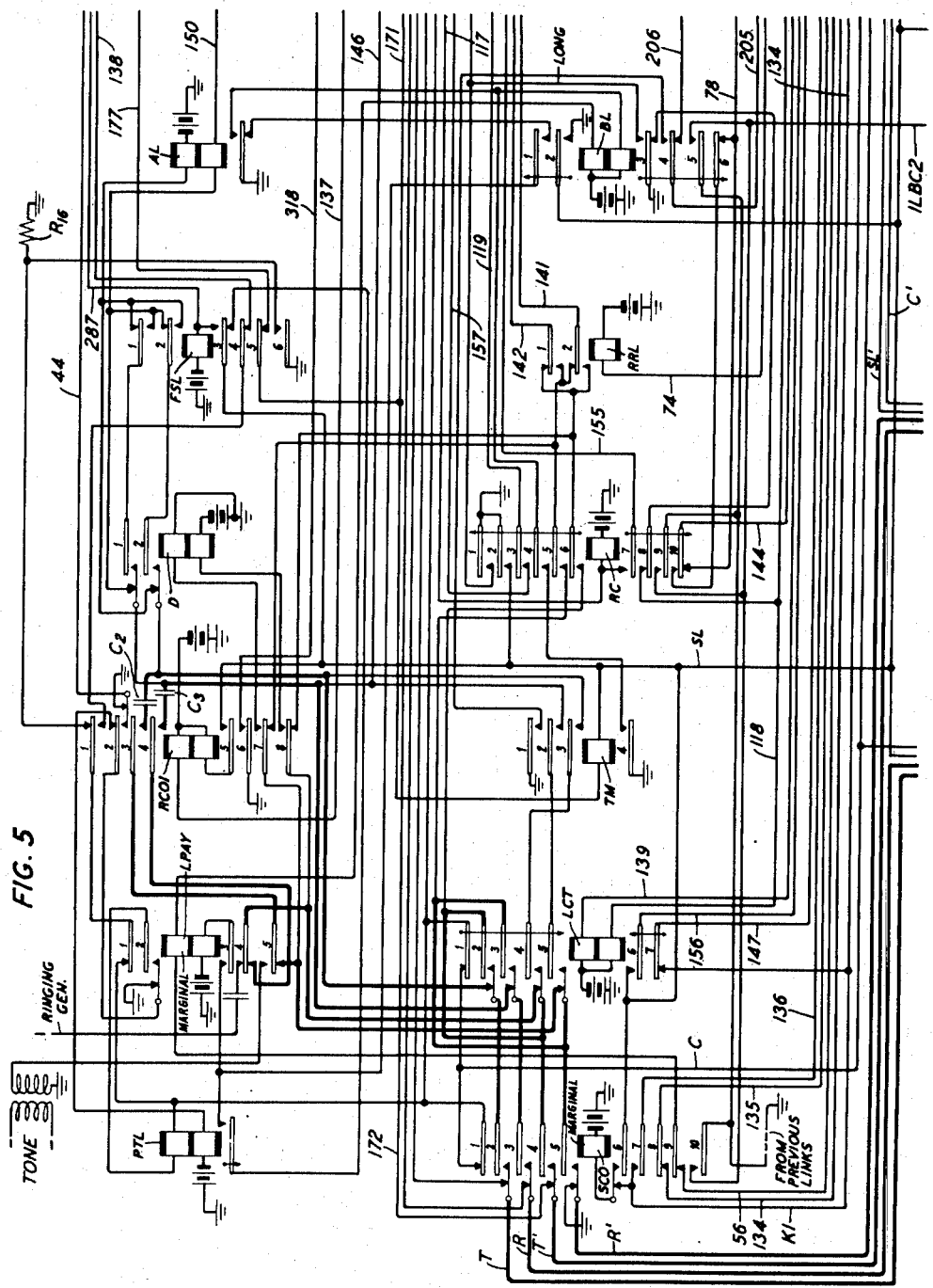
FIG. 5
INVENTOR
J. O'D. SHEPHERD
BY
ATTORNEY

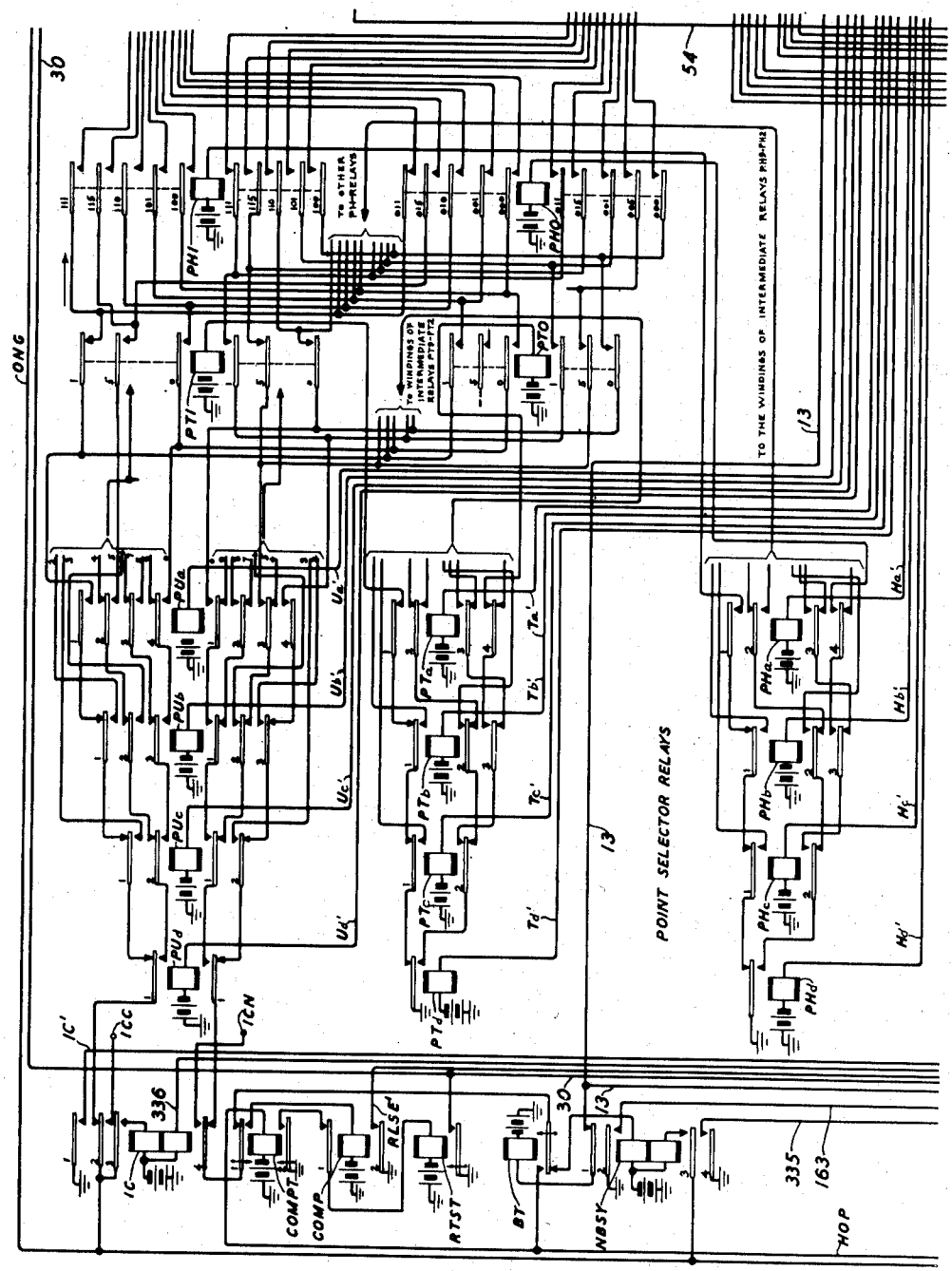
FIG. 7
INVENTOR
J. O'D. SHEPHERD
BY 
ATTORNEY

Oct. 6, 1953    J. O'D. SHEPHERD    2,654,807
MARKER FOR ALLOTTING A LINK AND A SENDER
Original Filed May 5, 1943    53 Sheets-Sheet 11

INVENTOR
J. O'D. SHEPHERD
BY
ATTORNEY

Oct. 6, 1953          J. O'D. SHEPHERD          2,654,807
            MARKER FOR ALLOTTING A LINK AND A SENDER
Original Filed May 5, 1943                    53 Sheets-Sheet 12
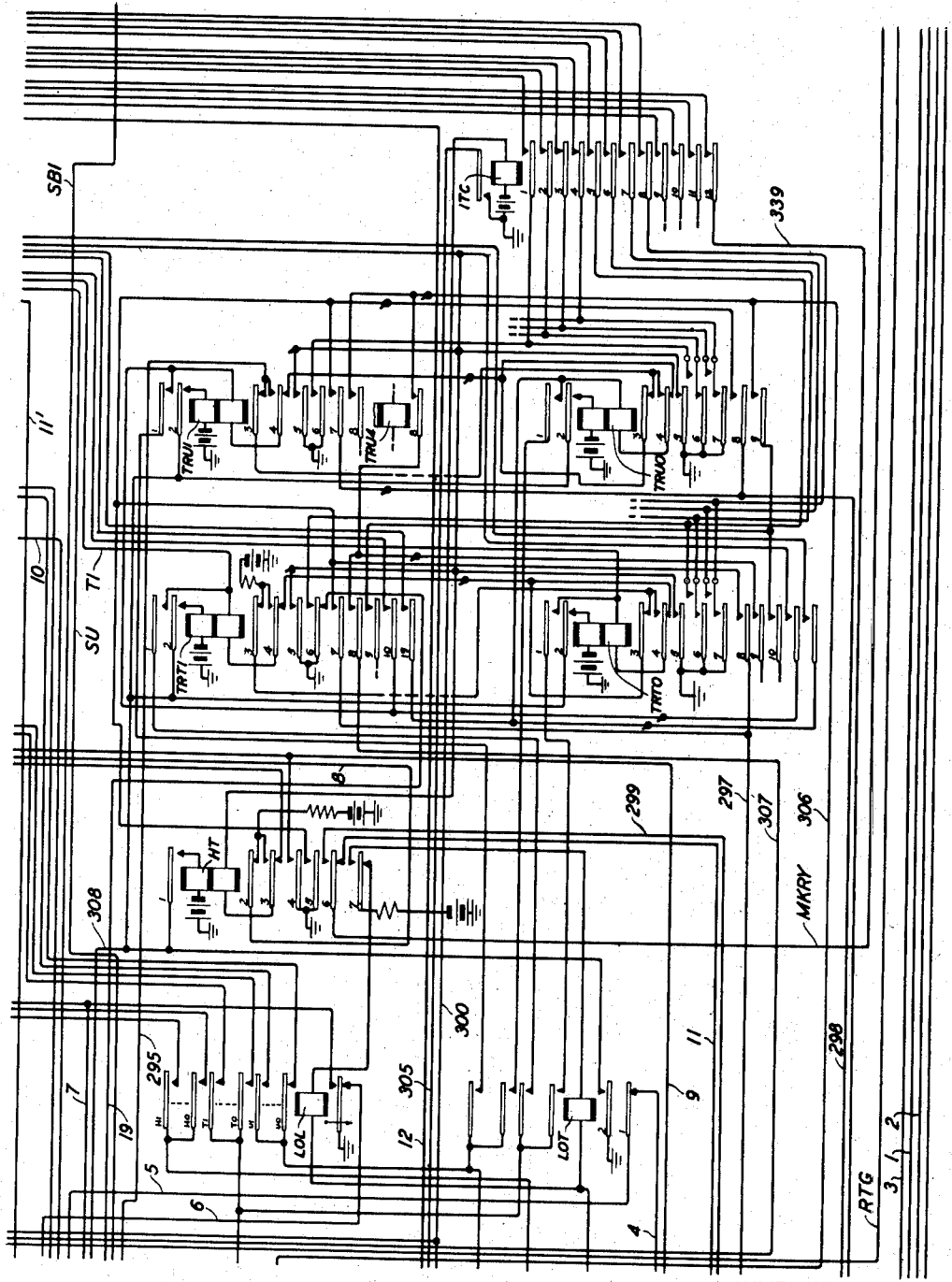
FIG. 12
INVENTOR
J. O'D. SHEPHERD
BY 
ATTORNEY

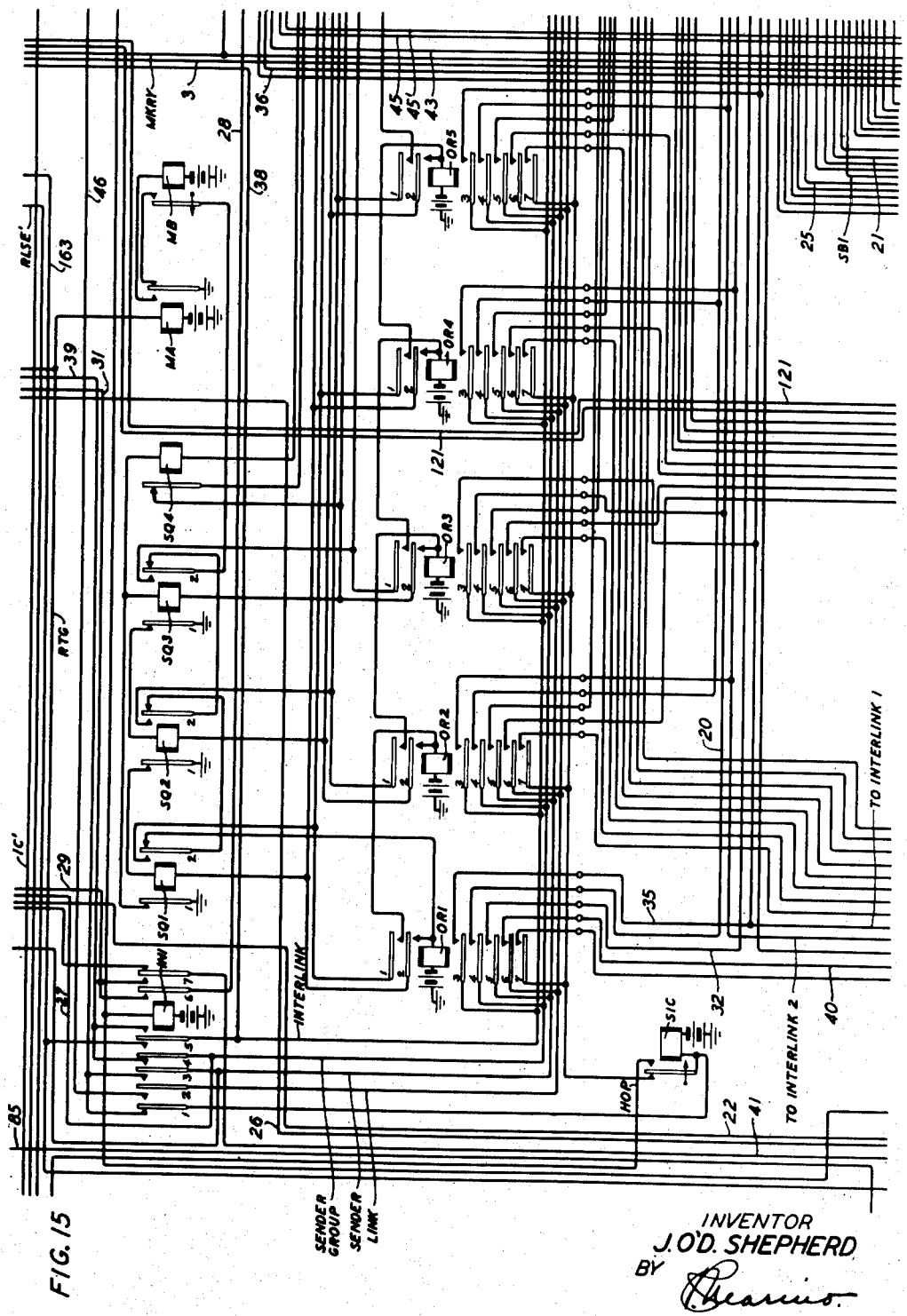
FIG. 15
INVENTOR
J. O'D. SHEPHERD
BY 
ATTORNEY

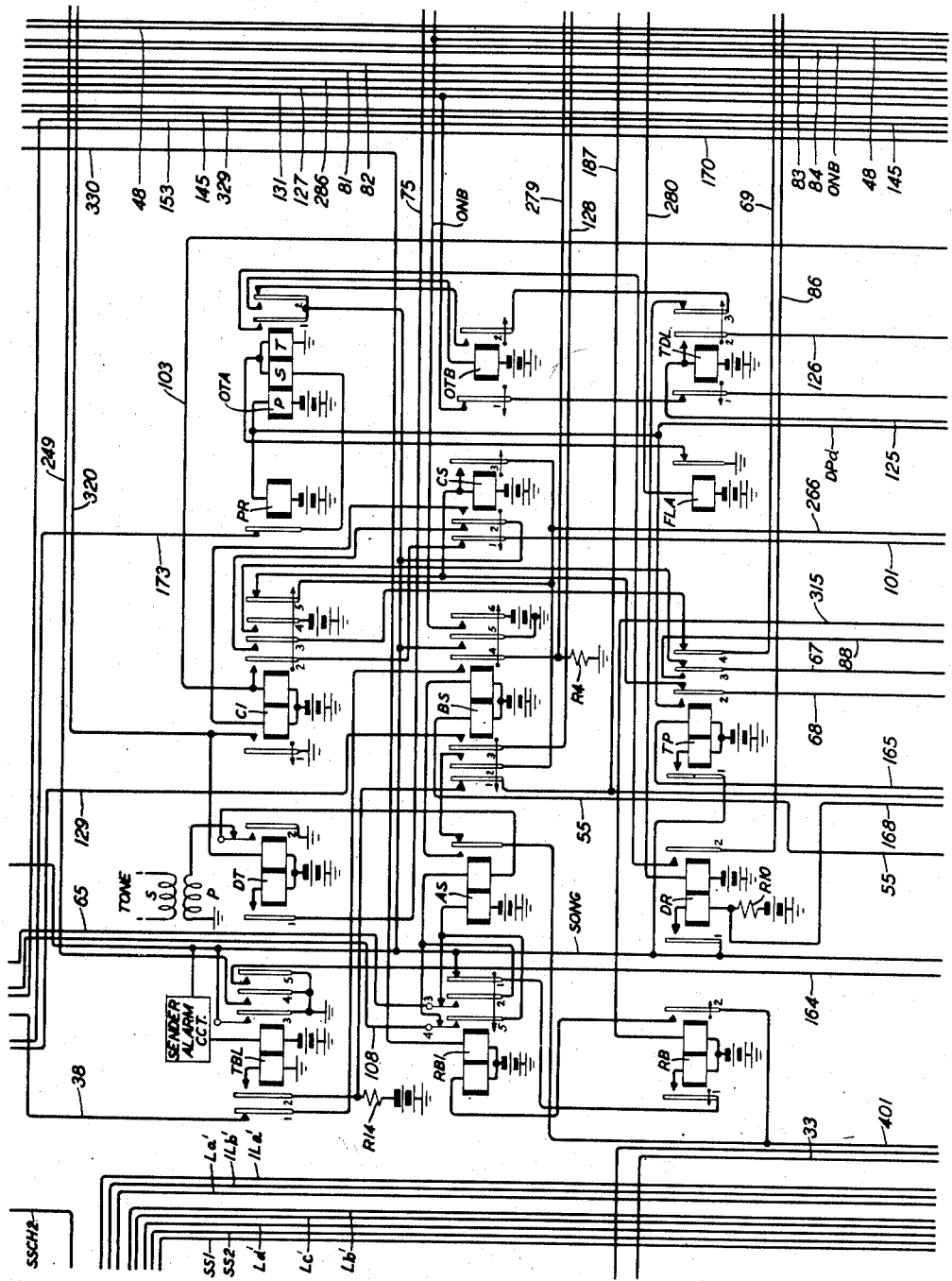
FIG. 22
INVENTOR
J. O'D. SHEPHERD
BY
ATTORNEY

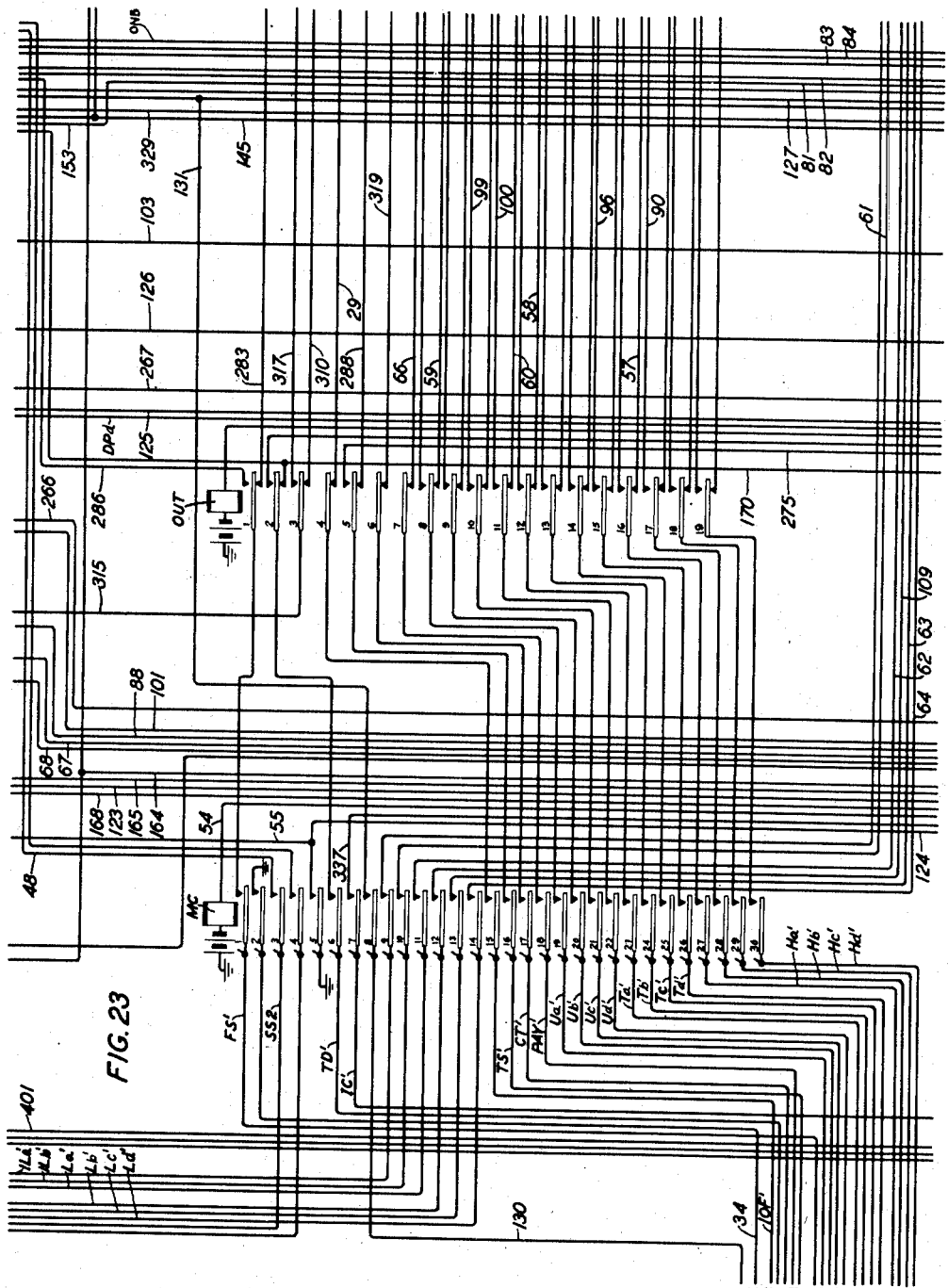

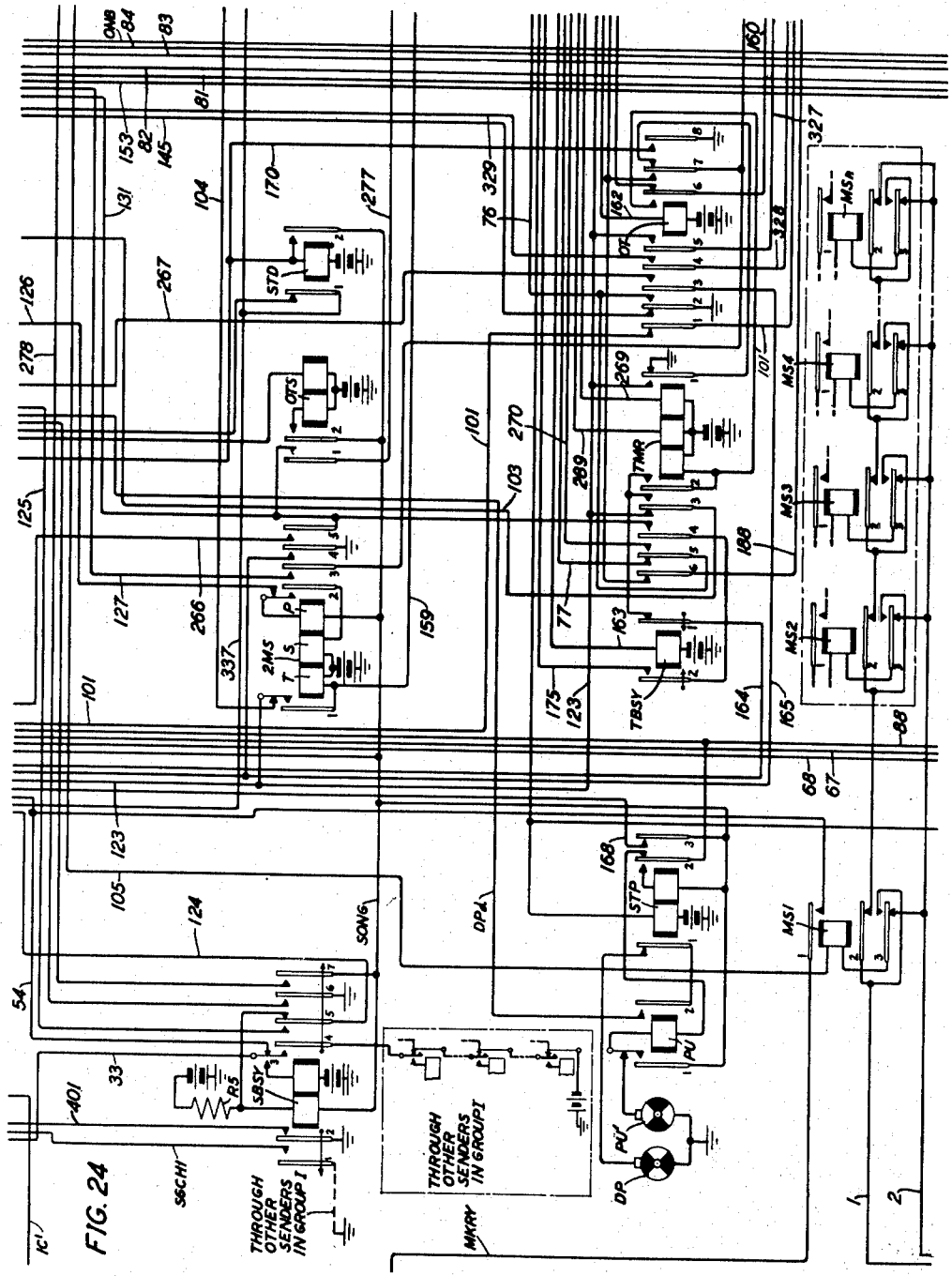

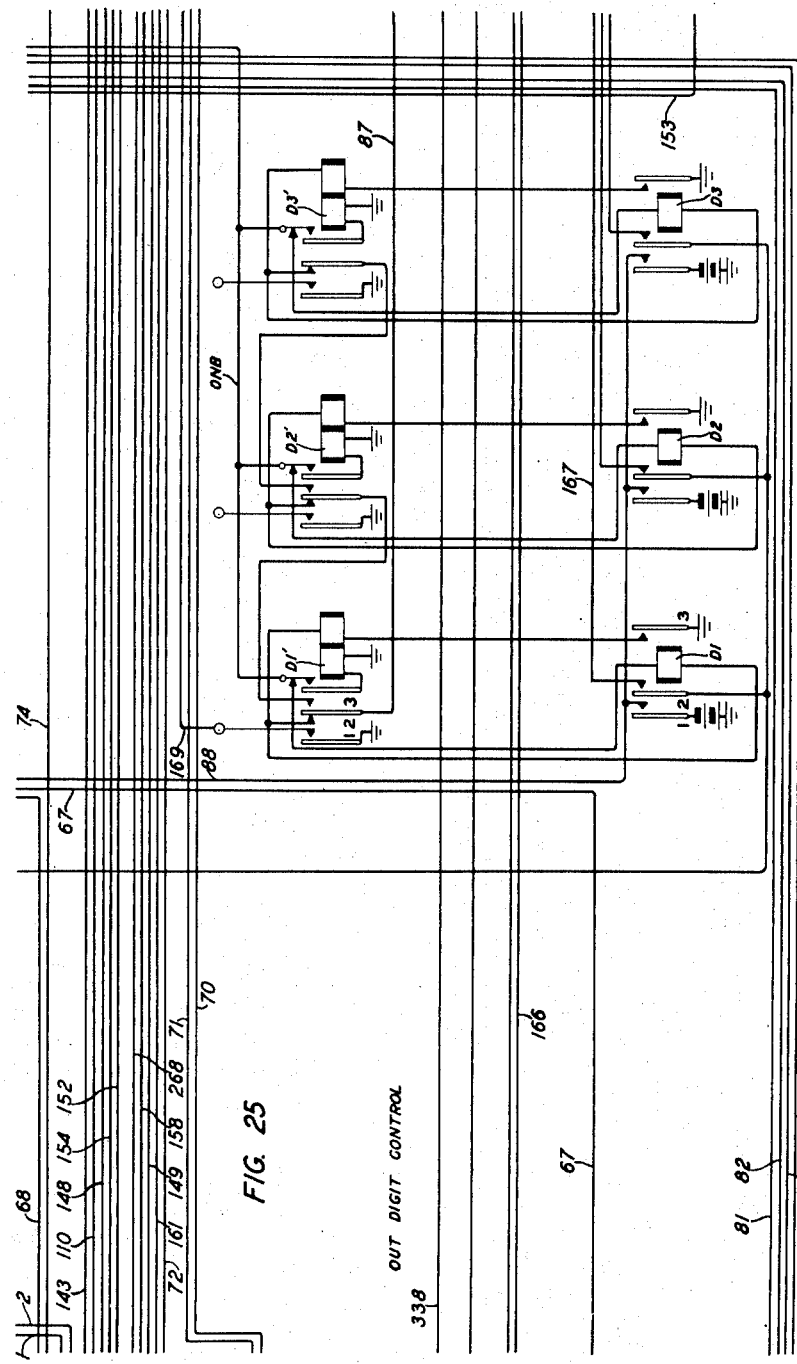

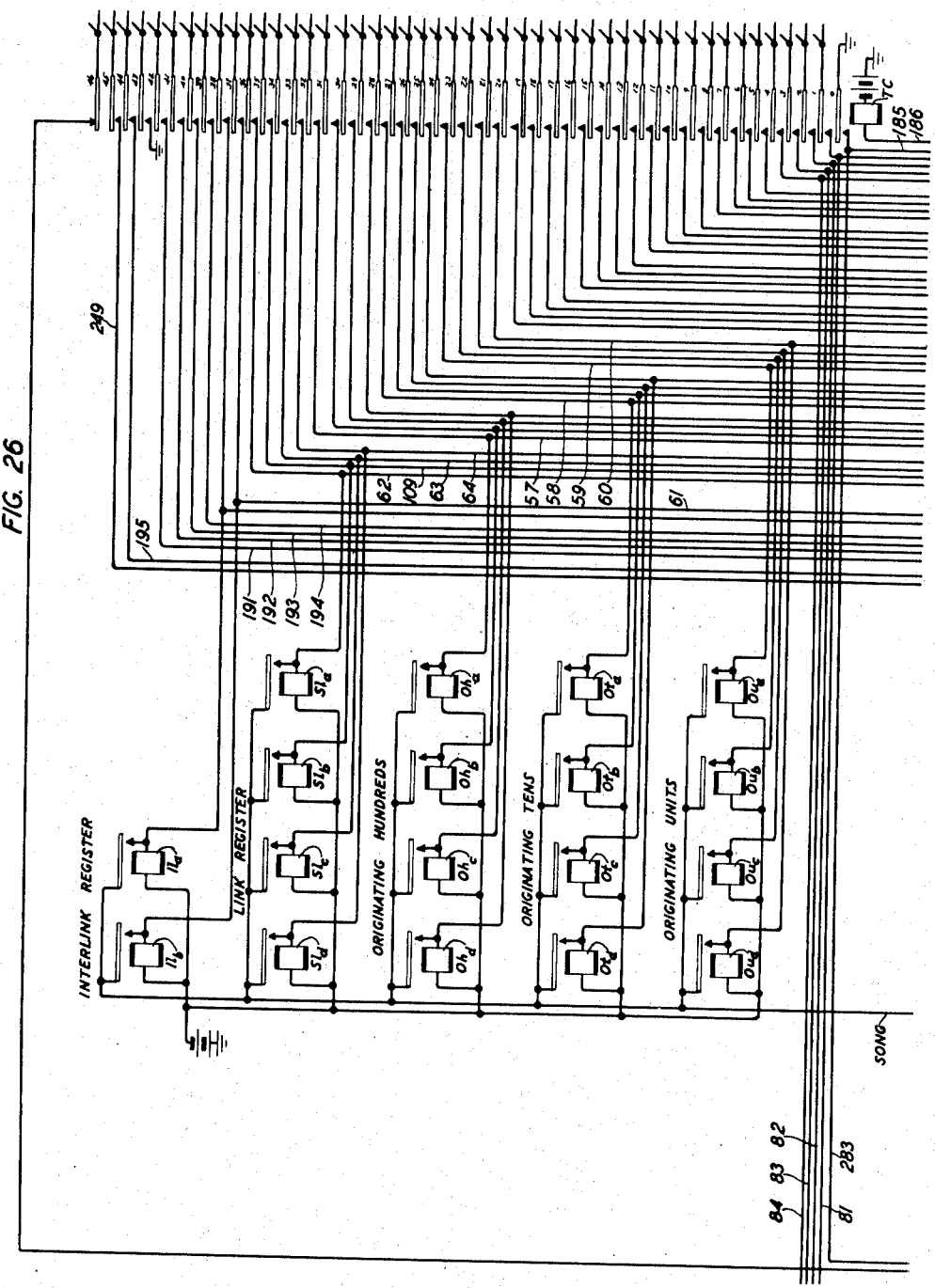

Oct. 6, 1953                J. O'D. SHEPHERD                2,654,807
            MARKER FOR ALLOTTING A LINK AND A SENDER
Original Filed May 5, 1943                          53 Sheets-Sheet 27
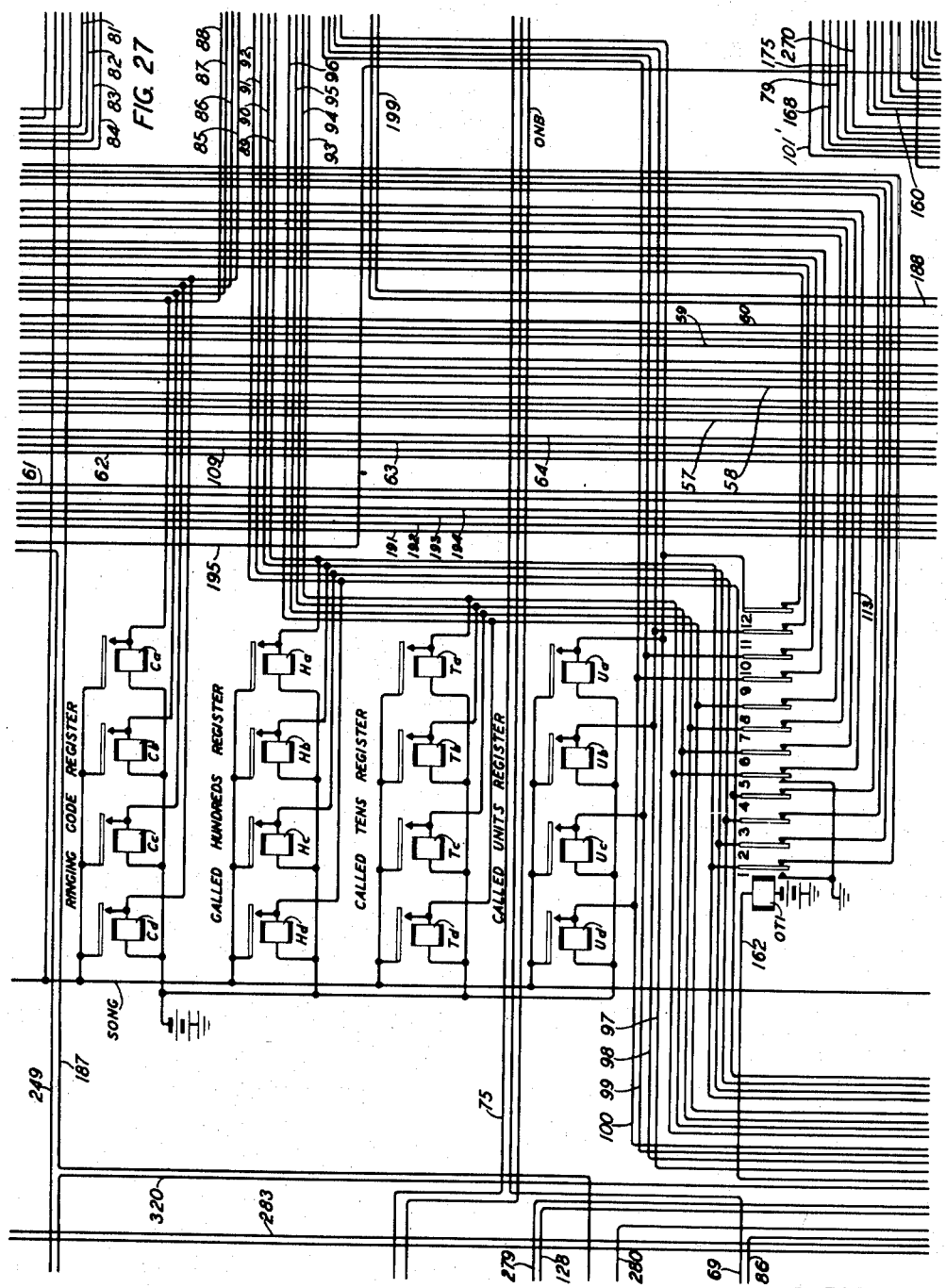
INVENTOR
J. O'D. SHEPHERD
BY
ATTORNEY

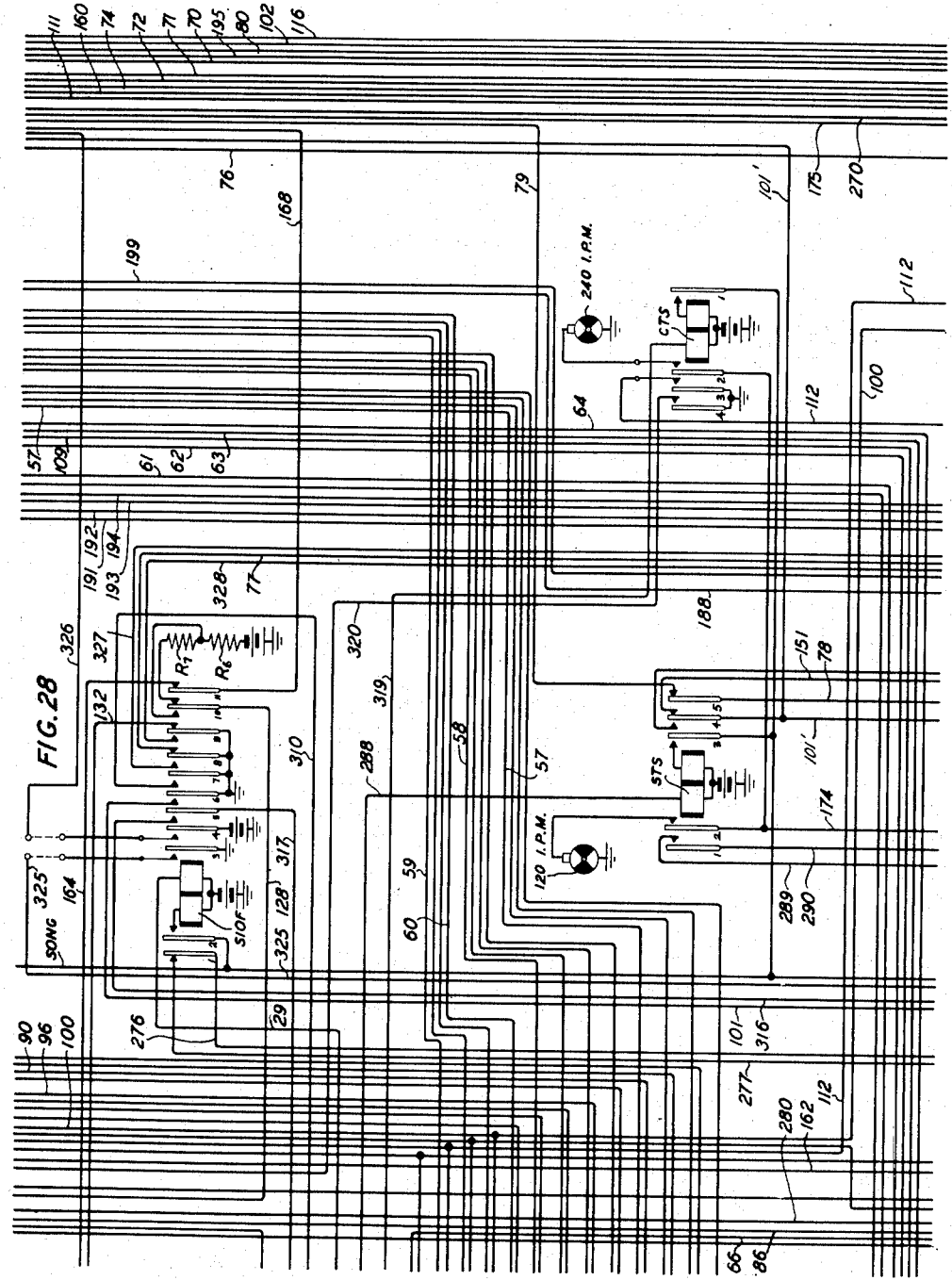

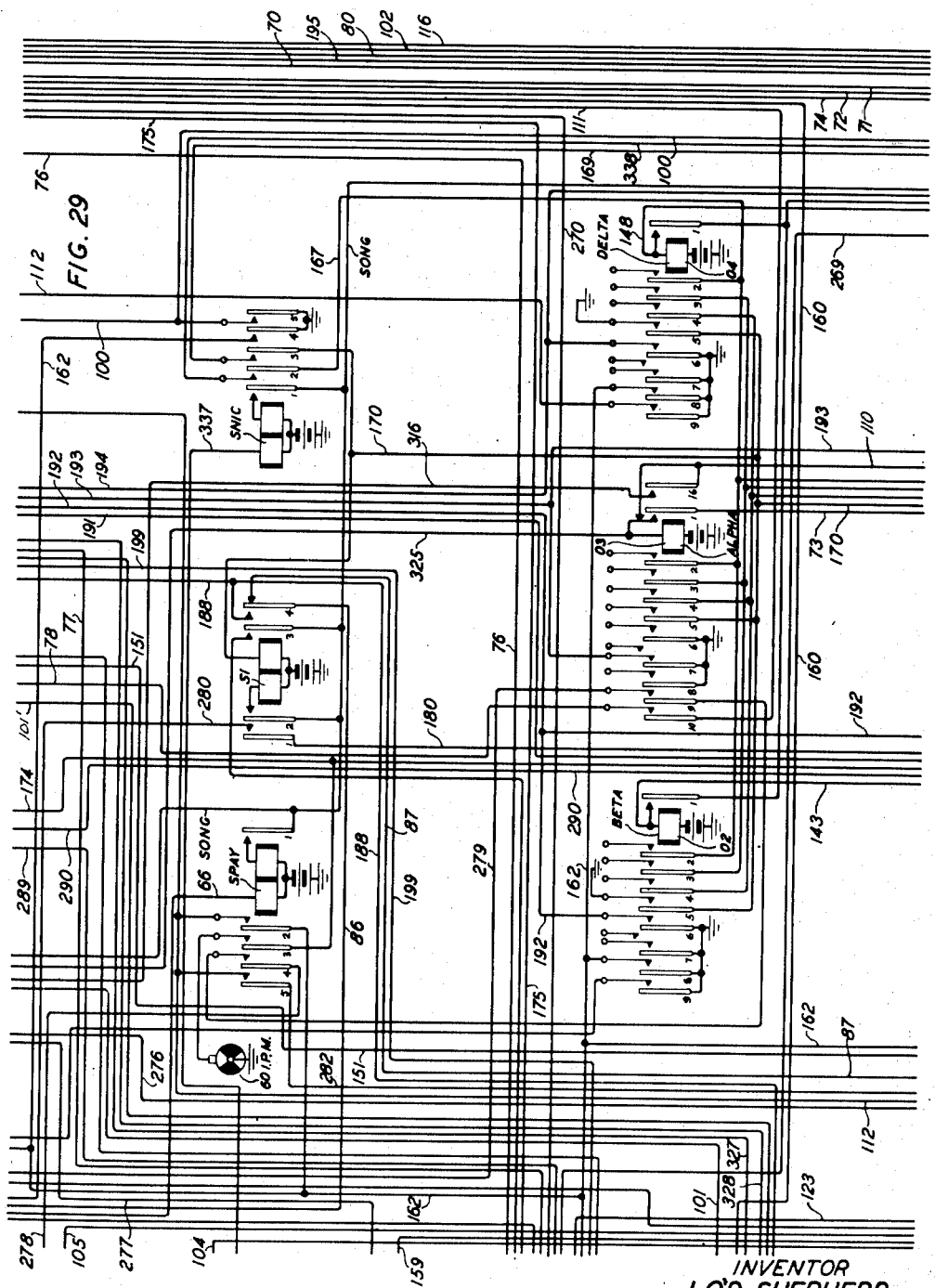

Oct. 6, 1953         J. O'D. SHEPHERD         2,654,807
MARKER FOR ALLOTTING A LINK AND A SENDER
Original Filed May 5, 1943         53 Sheets-Sheet 36
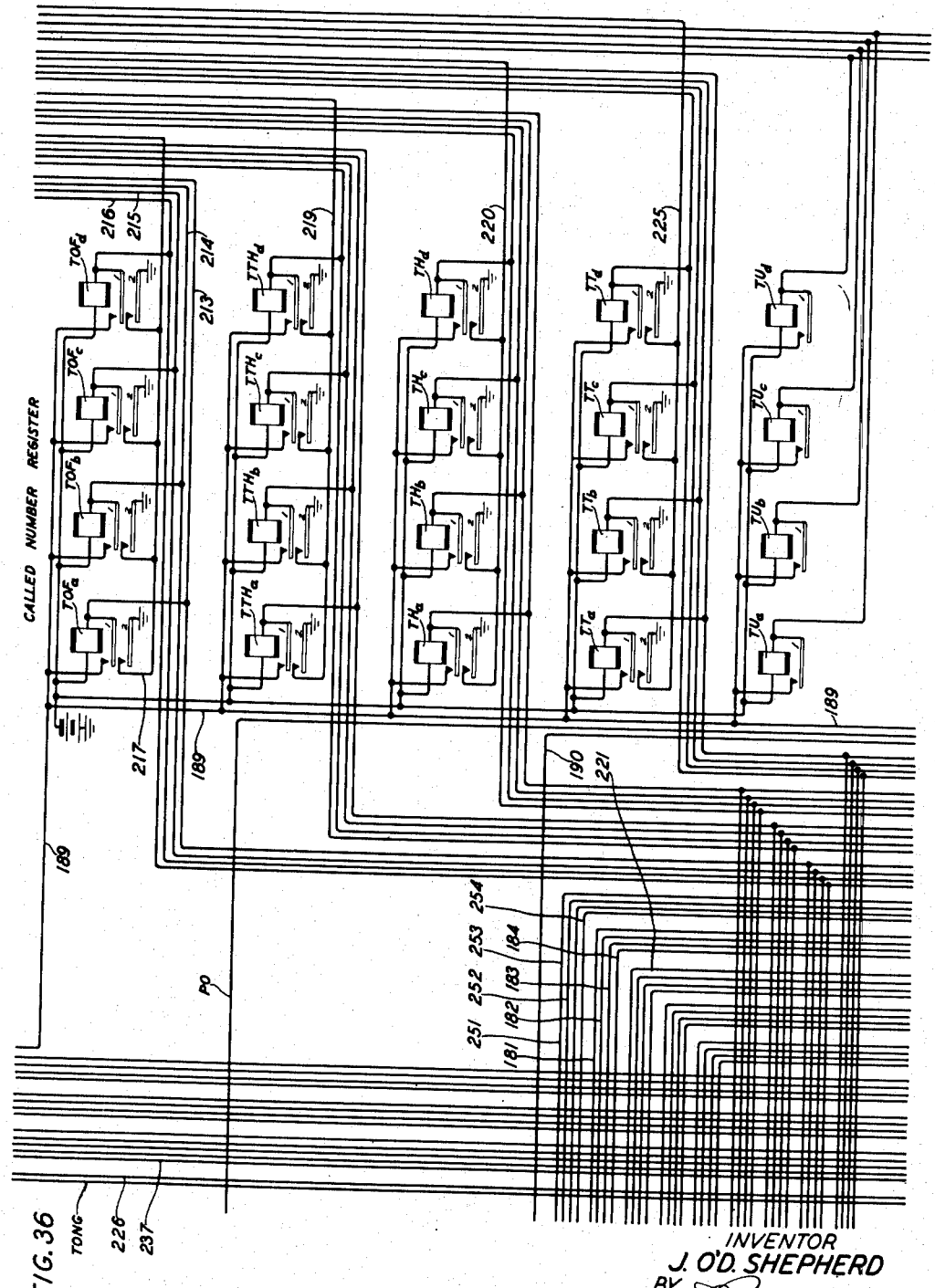
FIG.36
INVENTOR
J. O'D. SHEPHERD
BY
ATTORNEY Oct. 6, 1953        J. O'D. SHEPHERD        2,654,807
MARKER FOR ALLOTTING A LINK AND A SENDER
Original Filed May 5, 1943        53 Sheets-Sheet 41

INVENTOR
J. O'D. SHEPHERD
BY
ATTORNEY

Oct. 6, 1953　　　　　J. O'D. SHEPHERD　　　　　2,654,807
MARKER FOR ALLOTTING A LINK AND A SENDER
Original Filed May 5, 1943　　　　　　　　　　　53 Sheets-Sheet 47

FIG. 47.

INVENTOR
J. O'D. SHEPHERD
BY

ATTORNEY

Oct. 6, 1953 J. O'D. SHEPHERD 2,654,807
MARKER FOR ALLOTTING A LINK AND A SENDER
Original Filed May 5, 1943 53 Sheets-Sheet 50
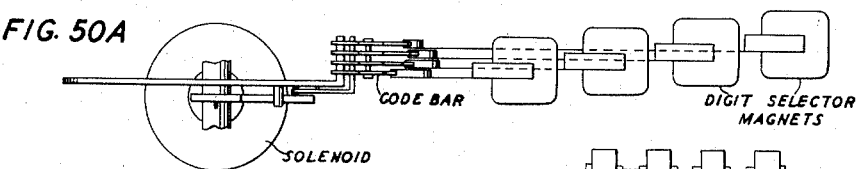
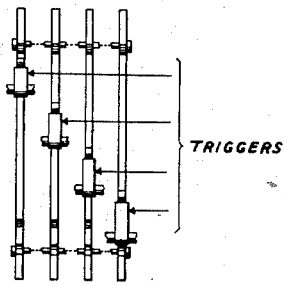
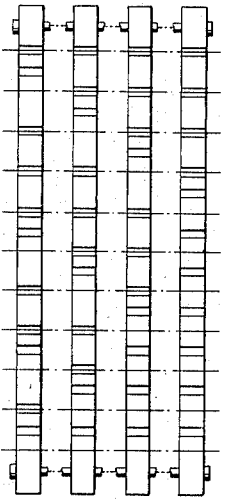
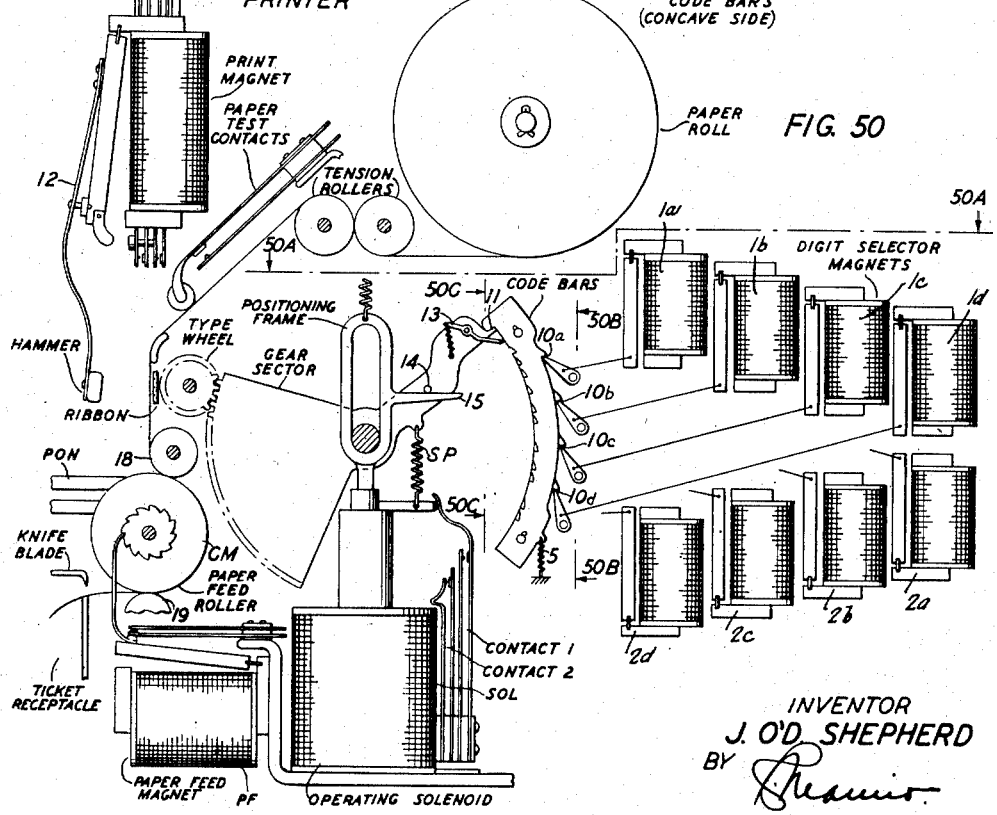
INVENTOR
J. O'D. SHEPHERD
BY
ATTORNEY Oct. 6, 1953          J. O'D. SHEPHERD          2,654,807
MARKER FOR ALLOTTING A LINK AND A SENDER
Original Filed May 5, 1943          53 Sheets-Sheet 51

SAMPLE TICKETS

FIG. 51A
CALL TO ANOTHER COMMUNITY DIAL OFFICE

| | |
|---|---|
| 3 0 1 5 4 | a — — CALLING NUMBER — — → a |
| 5 5 6 7 8 | b — — CALLED NUMBER — — → b |
| 6 3 | c — — ELAPSED TIME — — → c |
| 1 | d — — TIMER NUMBER — — → d |
| 1 1 0 5 1 | e — — CHRONOLOGICAL TIME — → e |
| 1 0   1 5 | f — — — — DATE — — — → f |
| 5 4 3 2   1 | g — — MESSAGE NUMBER & → g |
| | PRINTER NUMBER |

FIG. 51D
CALL FROM A TOLL STATION 3 9 8 7 6
3 1 2 3 4
6 3
1
1 1 0 5 1
1 0   1 5
5 4 3 5   1

FIG. 51B
CALL TO A MULTI-OFFICE EXCHANGE IN NETWORK

| | |
|---|---|
| 3 0 1 5 4 | a — — CALLING NUMBER — — → a |
| 9 8 1 2 3 4 | b — — CALLED NUMBER — — → b |
| 6 3 | c — — ELAPSED TIME — — → c |
| 1 | d — — TIMER NUMBER — — → d |
| 1 1 0 5 1 | e — CHRONOLOGICAL TIME — → e |
| 1 0   1 5 | f — — — — DATE — — — → f |
| 5 4 3 3   1 | g — — MESSAGE NUMBER & → g |
| | PRINTER NUMBER |

FIG. 51E
REVERTING TOLL STATION CALL 3 9 8 7 6
8      5
6 3
1
1 1 0 5 1
1 0   1 5
5 4 3 6   1

FIG. 51C
CALL TO A TOLL STATION

| | |
|---|---|
| 3 0 1 5 4 | a — — CALLING NUMBER — — → a |
| 7 9 8 7 5 | b — — CALLED NUMBER — — → b |
| 6 3 | c — — ELAPSED TIME — — → c |
| 1 | d — — TIMER NUMBER — — → d |
| 1 1 0 5 1 | e — — CHRONOLOGICAL TIME — → e |
| 1 0   1 5 | f — — — — DATE — — — → f |
| 5 4 3 4   1 | g — — MESSAGE NUMBER & → g |
| | TIMER NUMBER |

FIG. 51F
TROUBLE TICKET 3 0 1 5
0
6 3
1
1 1 0 5 1
1 0   1 5
5 4 3 7   1

INVENTOR
J. O'D. SHEPHERD
BY
ATTORNEY

FIG. 52

Patented Oct. 6, 1953

2,654,807

UNITED STATES PATENT OFFICE 2,654,807

MARKER FOR ALLOTTING A LINK AND A SENDER

Judson O'D. Shepherd, Atlanta, Ga., assignor to American Telephone and Telegraph Company, a corporation of New York Original application May 5, 1943, Serial No. 485,690. Divided and this application November 30, 1949, Serial No. 130,105

8 Claims. (Cl. 179—18)

This invention relates to telephone systems and more particularly to a system of the kind shown and described in my application Serial No. 485,690, filed May 5, 1943, now Patent No. 2,522,000, dated September 12, 1950, of which the present application is a division.

In marker-controlled telephone systems such as those, for example, which utilize the cross bar switch as the line extending medium, it is desirable that traffic be distributed as evenly as possible among all the control and line extending facilities of the system. In cross-bar offices, however, preference lockout circuits are generally the control elements by which such line extending and control facilities are assigned to different connections, with the result that, unless provision is made to rotate the order of selectivity, apparatus first in the order of preference will get more use and wear than those more remotely located in the order of preference. This is particularly true in a system such as the one shown and described in the above-mentioned copending application, in which the marker has access to different link and sender groups from which, when seized, it obtains an idle link and an idle sender. It is obvious that if the order of selection is not changed, the marker would, particularly when traffic is light, obtain a sender and a link always from the first preferred groups, thereby resulting in excessive wear and tear on said groups.

One of the features of the present invention is, therefore, a rotational circuit which functions after every operation of the marker to advance its cyclic order of selectivity among the groups of senders and links to which it has access, whereby, on the succeeding operation of the marker, it will obtain access to a succeeding link group and sender group.

Another feature of the invention is the provision of means in the marker that will enable it to select another sender group in the event that the group selected does not contain a selectable sender.

Still another feature of the invention is the provision of means in the marker for measuring a predetermined time interval within which the marker may assign a link and sender from selected groups thereof, but in the event that either a link or sender or both are unavailable from the selected groups, the predetermined time interval is extended to enable the marker to make one or more attempts at selection from other available groups.

These and other features of the invention will be more clearly understood from the following description, appended claims and attached drawings, in which:

Figs. 1 and 2, inclusive, show typical line and trunk circuits located on cross bar switching facilities;

Figs. 5 and 6 show the link circuit;

Figure 20:
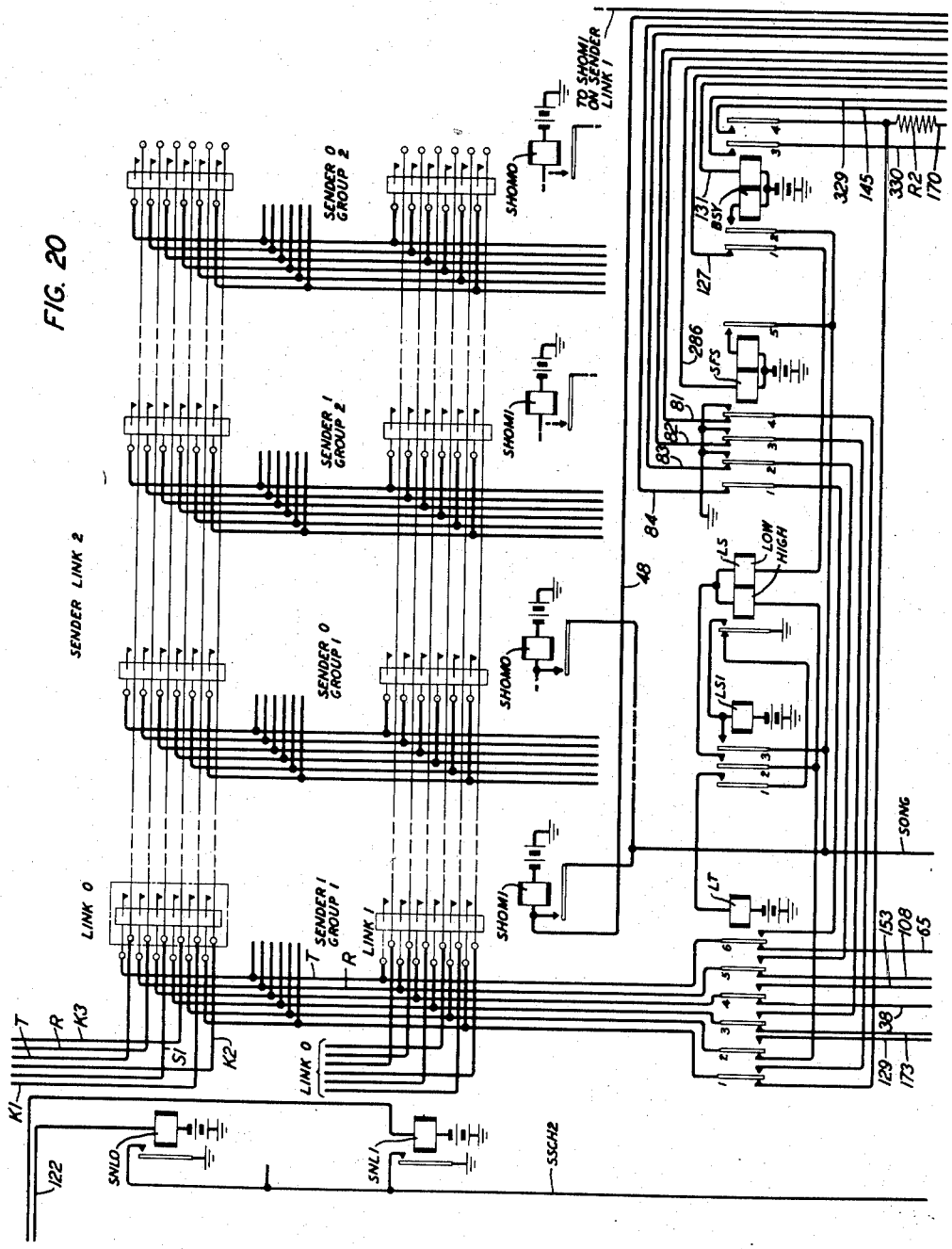
Figure 21:
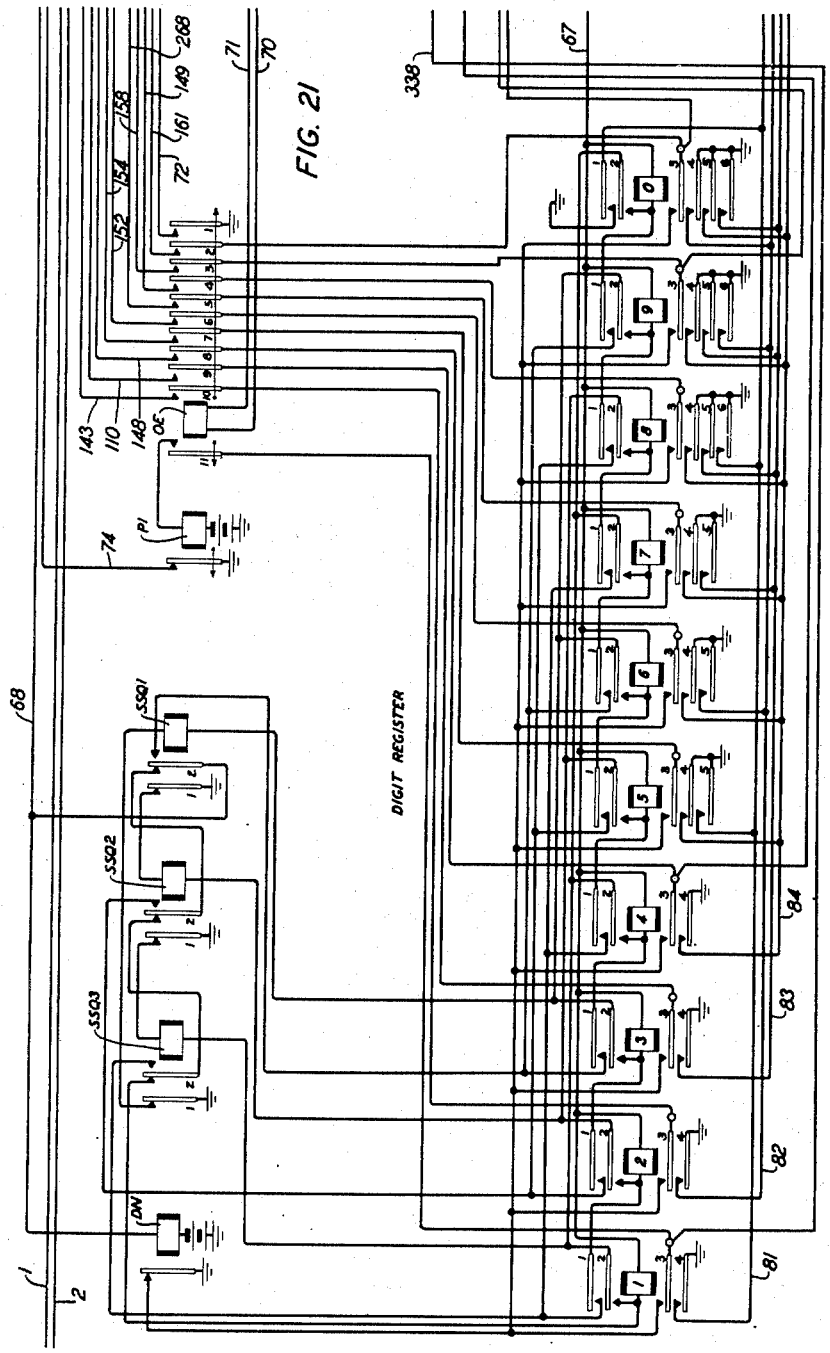
Figure 30:
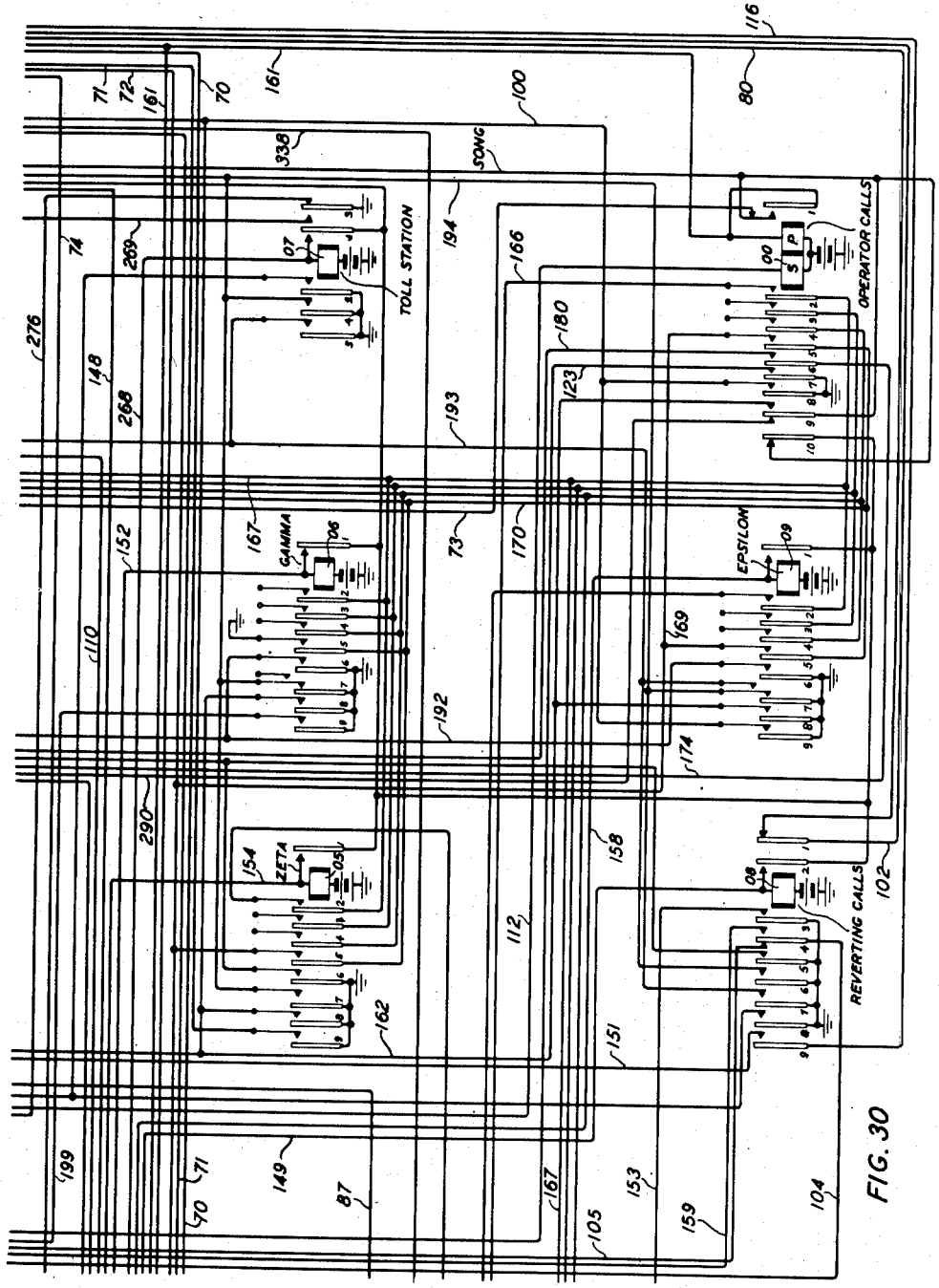
Figure 31:
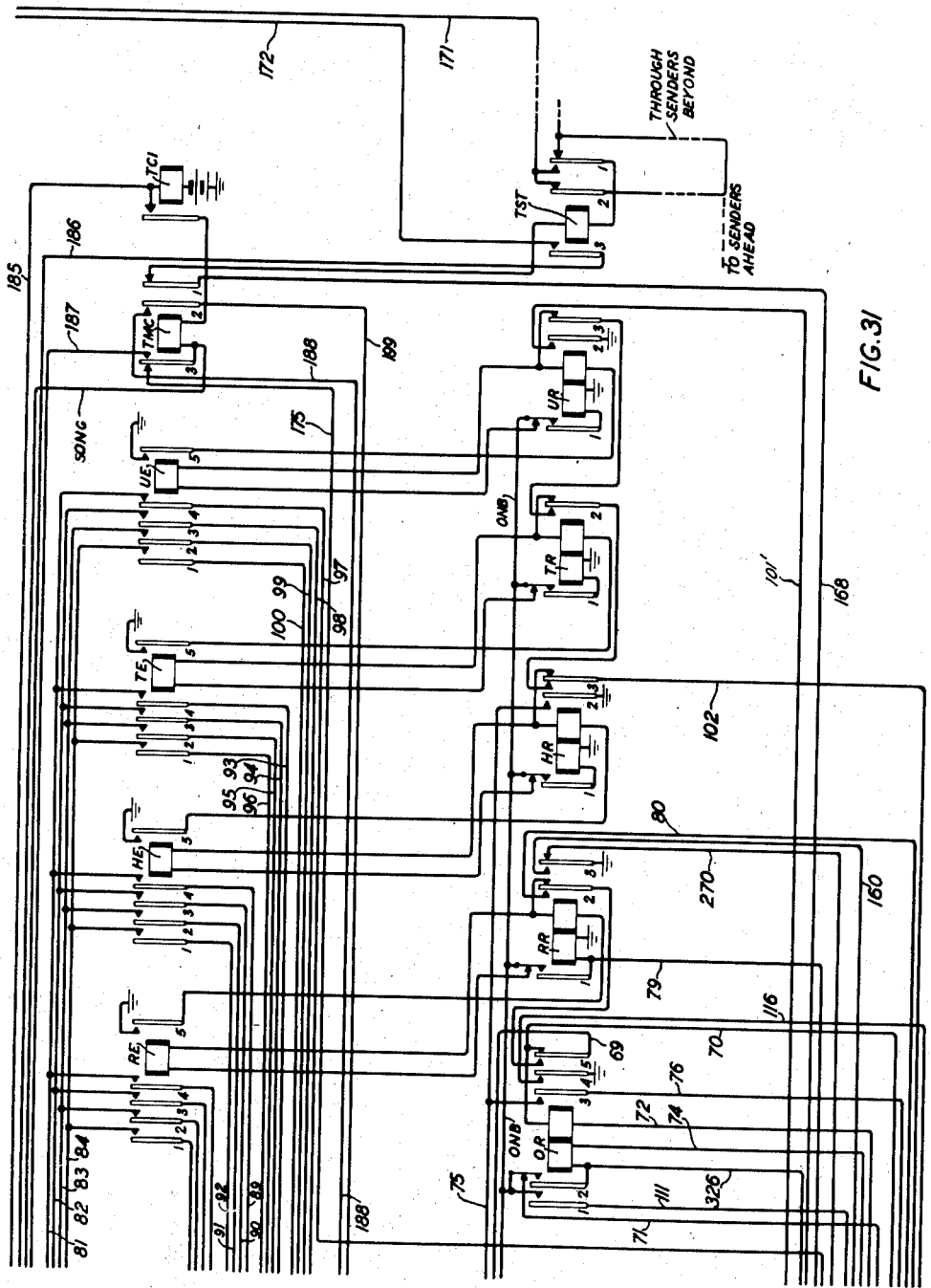
Figure 32:
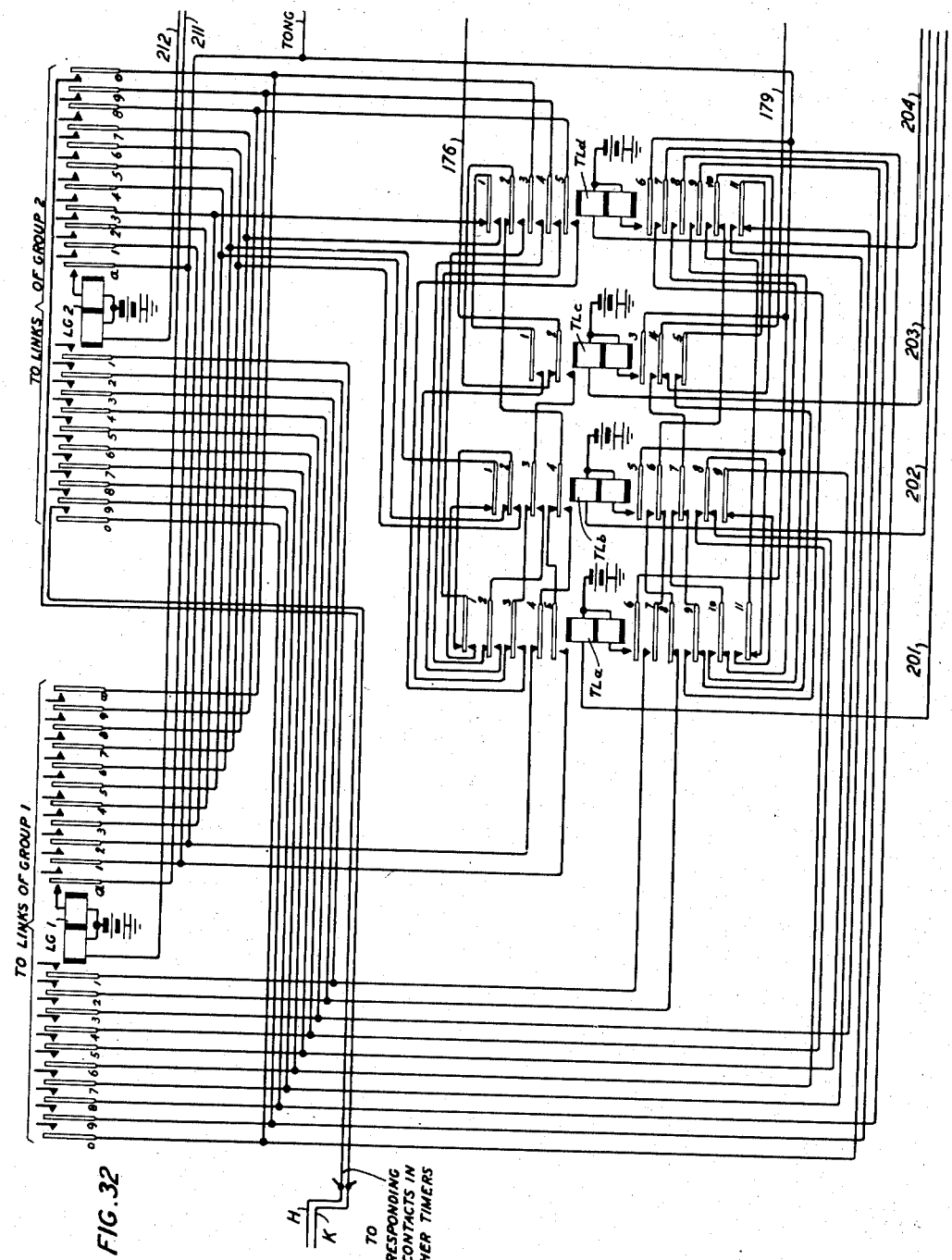
Figure 46:
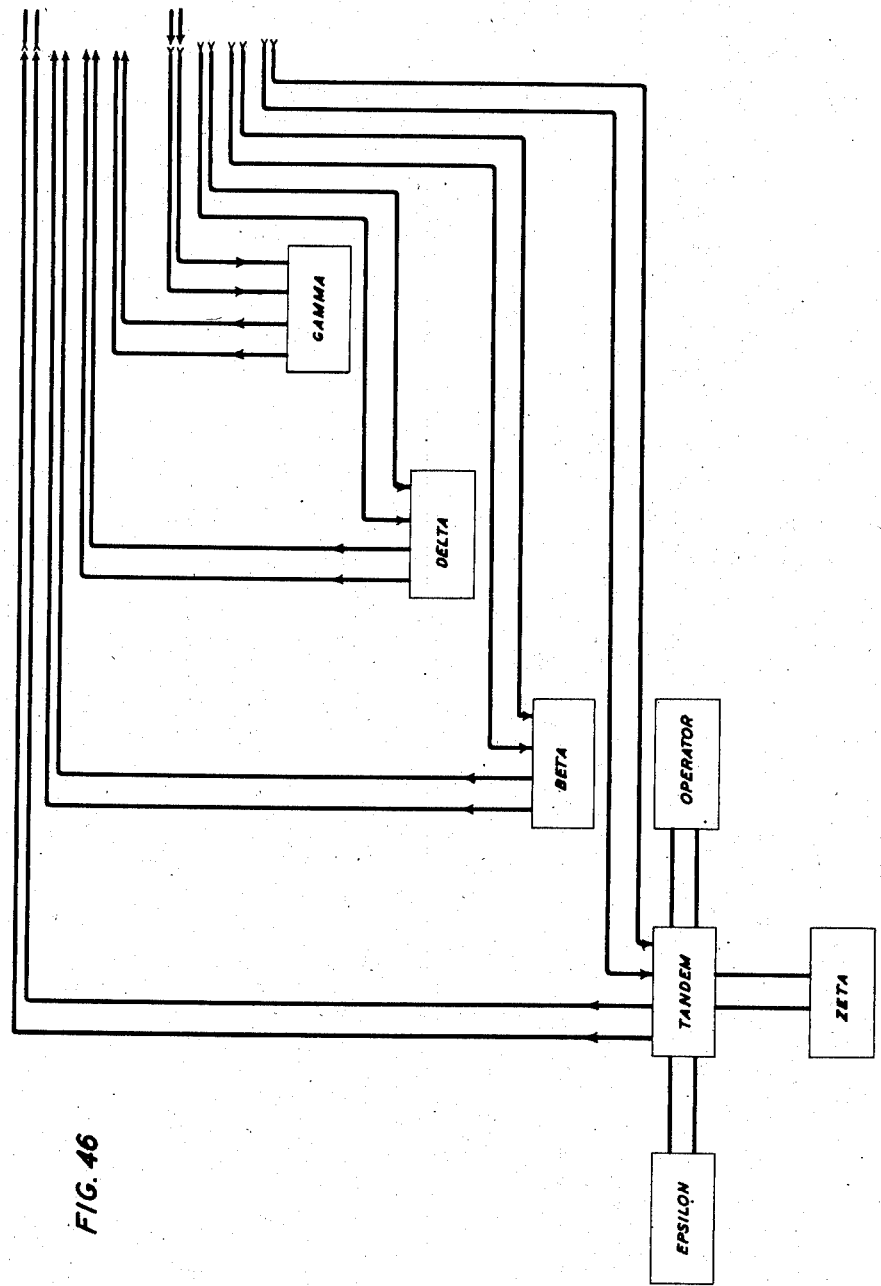
Figure 48:
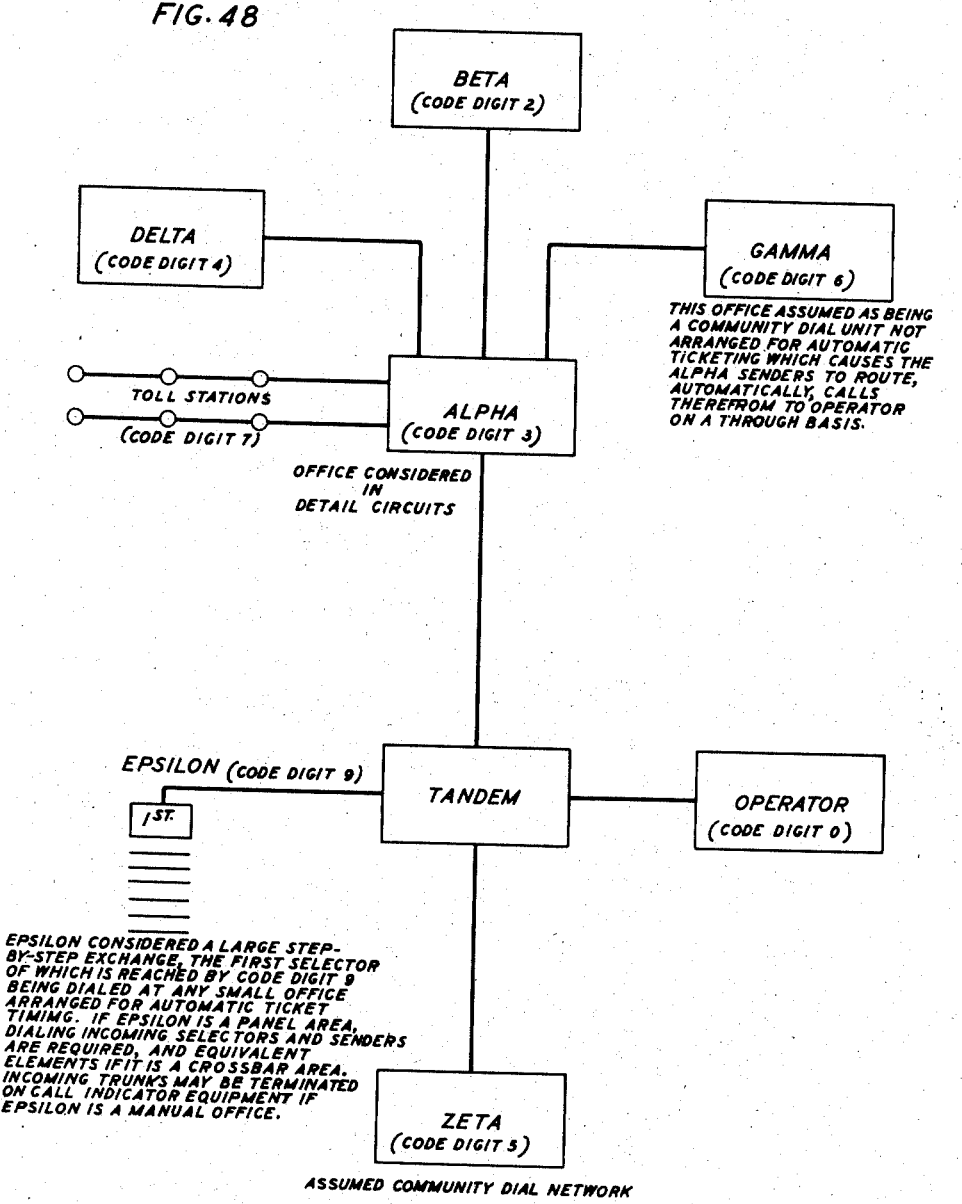
Figure 49:
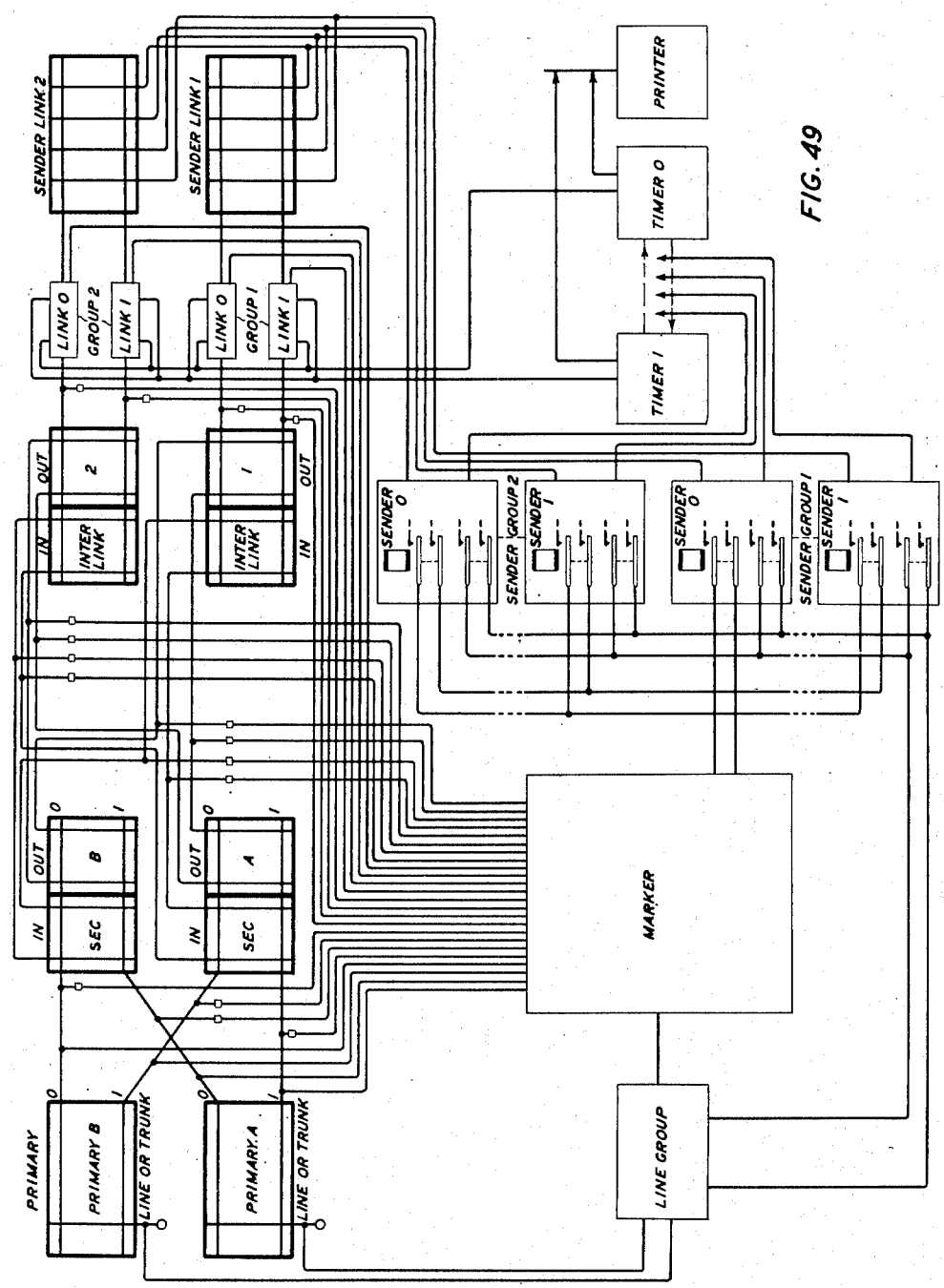
Figures 53, 53A:
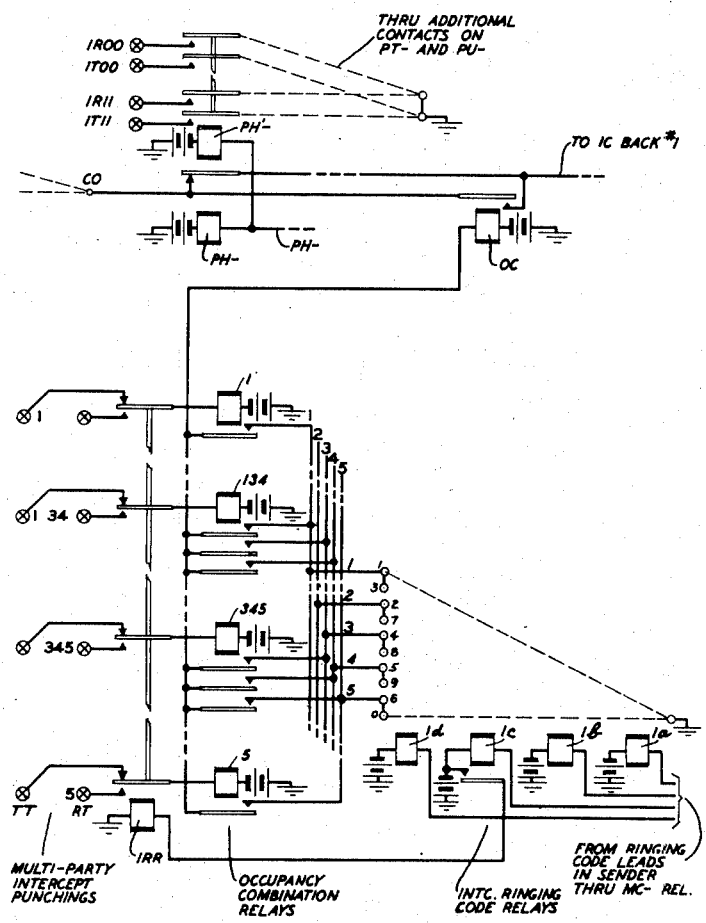

Figs. 7 to 12, inclusive, show the line group circuit;

Figs. 13 to 19, inclusive, show the marker circuit;

Fig. 20 shows the sender link circuit;

Figs. 21 to 31, inclusive, show the sender circuit;

Figs. 32 to 38, inclusive, show the timer circuit;

Figs. 39 to 45, inclusive, show the printer circuit;

Fig. 46 shows schematically the entire inter-office network adapted for interconnection with the circuits of the office used to illustrate the invention;

Fig. 47 shows the manner in which Figs. 1 to 46, inclusive, should be arranged relative to each other in order to disclose the invention;

Fig. 48 shows an assumed office network illustrating the basic principles of the invention;

Fig. 49 shows the basic principles of the trunking layout;

Fig. 50 shows schematically a printer adapted for use with the present invention;

Figs. 50A to 50C, inclusive, show certain of the detail mechanical elements of the printer of Fig. 50;

Figs. 51A to 51F, inclusive, show representative types of tickets made for the various types of connections possible with my invention;

Figure 52:
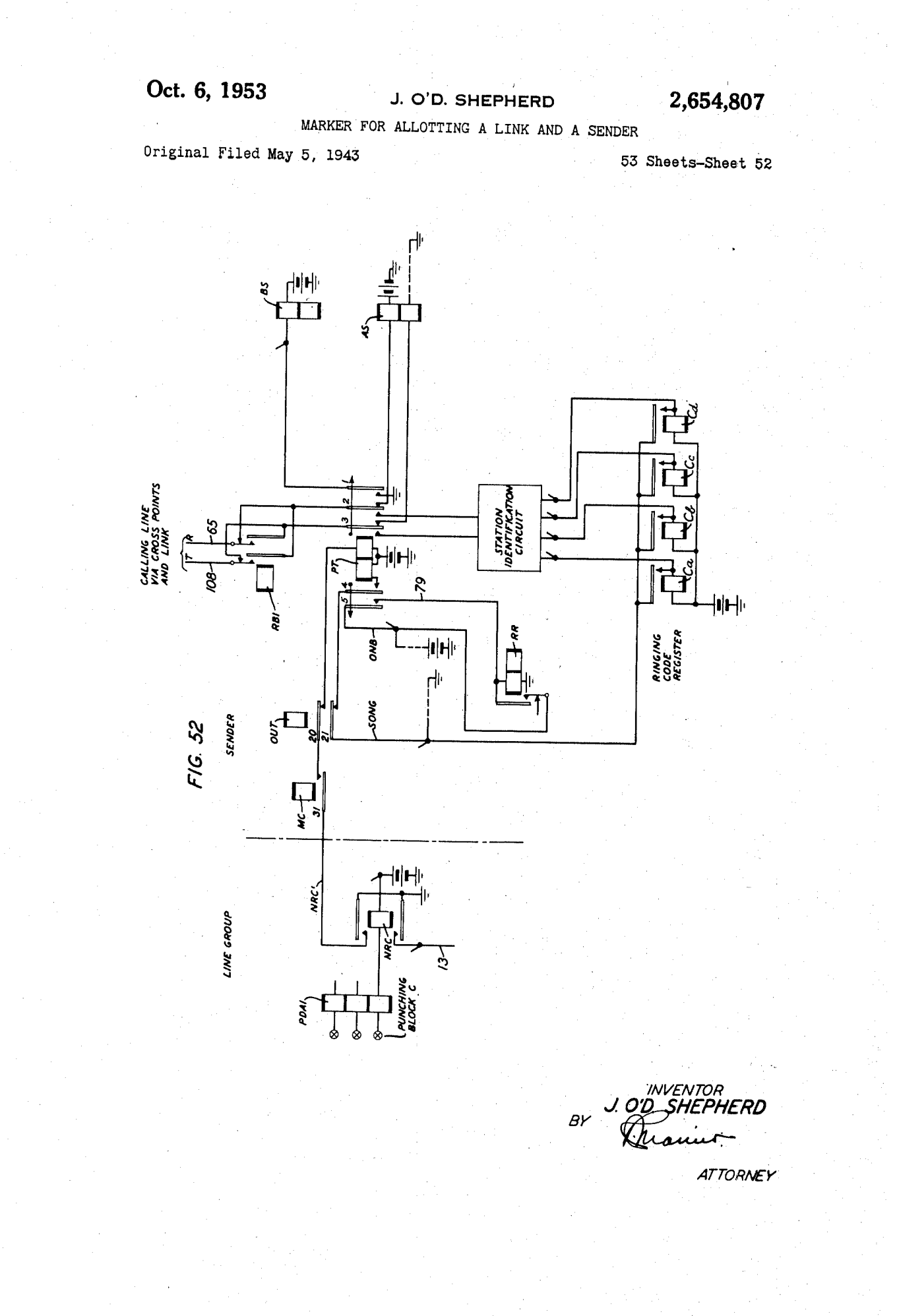

Fig. 52 shows a modification of this invention to automatically identify the calling station on 2- and 4-party lines;

Figs. 53 and 53A show a modification of this invention to provide intercept service on multi-party lines.

The office network assumed for illustrating the basic principles of the invention is shown in Fig. 48, it being understood that various other networks may be employed. Office Alpha (3) is taken as the one for detail consideration in connection with which the circuits should be considered. Alpha (3) has trunks to three other offices, namely, Beta (2) and Delta (4), with timing facilities thereat, and to a step-by-step dial office Gamma (6) without timing facilities, and also to toll stations. It also has a group of trunks to a central tandem, said tandem being arranged to route calls to the "0" or toll operator, or to the switch train of the local multi-office exchange, Epsilon (9), or to distant office Zeta (5). It is understood that the digit in parenthesis following the office name is the office digit individual to that office. It is also to be understood that the tandem may comprise switching elements in one of the offices of the network as, for example, Epsilon.

This relatively complete network and the particular office Alpha (3) herein considered in detail have been selected to illustrate the adaptability of the arrangement to substantially all conditions which might reasonably be anticipated. The routing of calls and other information indicated on this figure are for the purpose of facilitating the understanding of the detail sender circuit in office Alpha (3), as explained hereinafter.

The practicability of the telephone system of my invention, as is practically the case with any telephone system, rests largely upon the cooperation of the subscriber in operating, in the appropriate manner, the equipment provided. Each exchange would have its own directory, or section thereof, and each would contain certain special instructions which the subscribers would be expected to follow in setting up connections. If the numbering system, for example, is a five-digit system, the directory, for example, could carry the four-digit codes of the subscribers' numbers, the toll station numbers being preceded or followed by the designation TS, for instance, or other suitable identifying designation.

In considering this problem, it may be helpful to set out sample instructions which might be included in a directory. The ones which follow, with appropriate wording, might be suitable, for example, for the Alpha (3) exchange.

SECTION I

1. *Suggested instructions for telephone directory*

For Long Distance—dial "0."

For Assistance, reporting telephone out of order, or information—dial "0."

For calls to numbers in the Alpha (3) exchange not designated "TS" dial a "3" and the listed number.

For calls to the exchanges listed below:
  1st—dial the code of that exchange, as follows:
  Beta    2
  Gamma   6
  Delta   4
  Epsilon 9
  Zeta    5
  2nd—dial the last digit of your own number. That is, if your number is 1234 dial a "4" as the second step.
  3rd—wait until you again hear dial tone and then dial the number of the telephone you want as listed in the directory.

For example, if your number is 1234 and you wish to call someone in the Zeta exchange whose number is 3678, you dial a "5," the code for the Zeta exchange, and your own last digit, which is a "4" in the example given. You then wait until you hear dial tone again, and upon hearing it you dial 3678, which is the called number.

The toll stations are designated by the notation TS appearing in front of the number. Those in the Alpha (3) exchange must be called exactly as though they were in another office, the code of which would be "7," but which in fact, is only the code of the toll stations in the Alpha (3) exchange. Thus if you are calling TS 2469, you will dial a "7" and the last digit of your own number. When you receive dial tone again, you dial 2469. On the other hand, if you are calling from a toll station and desire connection with another toll station on your line it is necessary to dial slightly differently. In this case you dial an "8," then the last digit of your own number and then the last digit of the called number. For example, if you are calling from toll station TS 2469 and desire toll station TS 2465, you will dial "8," then "9" which is your own last digit and then a "5" which is the last digit of the number you are calling.

On calls to toll stations in other exchanges, however, you disregard the TS listing and dial it exactly as you would any other number in that exchange.

If you are calling from a toll station and desire an Alpha number, or a number in any of the other of the exchanges listed above, you must in every case dial the office code desired, followed by your own last digit. Upon hearing dial tone again you then dial the listed number.

If you are calling another party on your own line it is necessary for you to dial an "8" and the last digit of the called number. If, for example, your number is 1234 and you wish to call 1236, you will recognize that the first three digits of the called number are the same as your own, a fact which indicates that the party you wish to call is on your line. Since the last digit of the called number is "6" you dial an "8" and then a "6."

2. *General equipment arrangement*

The equipment and circuits covered in detail comprise ten principal items exclusive of the line relays and the interoffice trunks, and the general layout of the system as a whole is diagrammatically indicated in Fig. 49.

Referring, now, to said figure, there is shown by way of example, two primary switches A and B and two secondary switches A and B. Each primary switch is a crossbar unit to the vertical elements of which are connected the lines and trunks, while the horizontal elements of the unit are extended to the horizontal elements of the secondary switches preferably by even distribution from each primary to both secondary switches in order to provide for equal wear of the equipment. As many vertical elements can be provided on each primary switch as the traffic thereof can be served by the ten horizontal paths between each primary and the secondary switches connected thereto, it being understood that both "In" and "Out" connections are established through the primary switches. The designations "In" and "Out" will hereinafter be used, respectively, to indicate incoming connections from and outgoing connections to lines and trunks, and the equipment and circuit elements pertaining particularly thereto. In order to facilitate the even loading of the equipment, lines and trunks may be cross-connected to any vertical on any primary switch irrespective of the line number.

Each primary switch provides for extending four conductors from the line or trunk circuit to a secondary line switch, which is also a crossbar unit, the horizontal paths from a primary switch extending, as said before, to the horizontal elements of secondary switches. The latter are also 4-point switches, are provided with as many verticals as required for the traffic to be handled, and are divided into two halves, the In portion for service on calls offered the office including incoming trunk calls presented to the office, to extend the line or trunk to a link by way of the interlink frame, and the Out portion for completing the call from the link to the wanted line or trunk.

Trunking arrangements distribute the paths as evenly as possible between the several primary and secondary switches of which only two of each are disclosed in Fig. 49 and used as the basis of circuit operations presently to be described, although it is obvious that no limitation on switching equipment exists or is intended. Ten primary and ten corresponding secondary switches, for instance, may comprise a group that will serve in the order of 500 lines and, in a full group, the paths from each primary will extend to each secondary.

Figure 4:
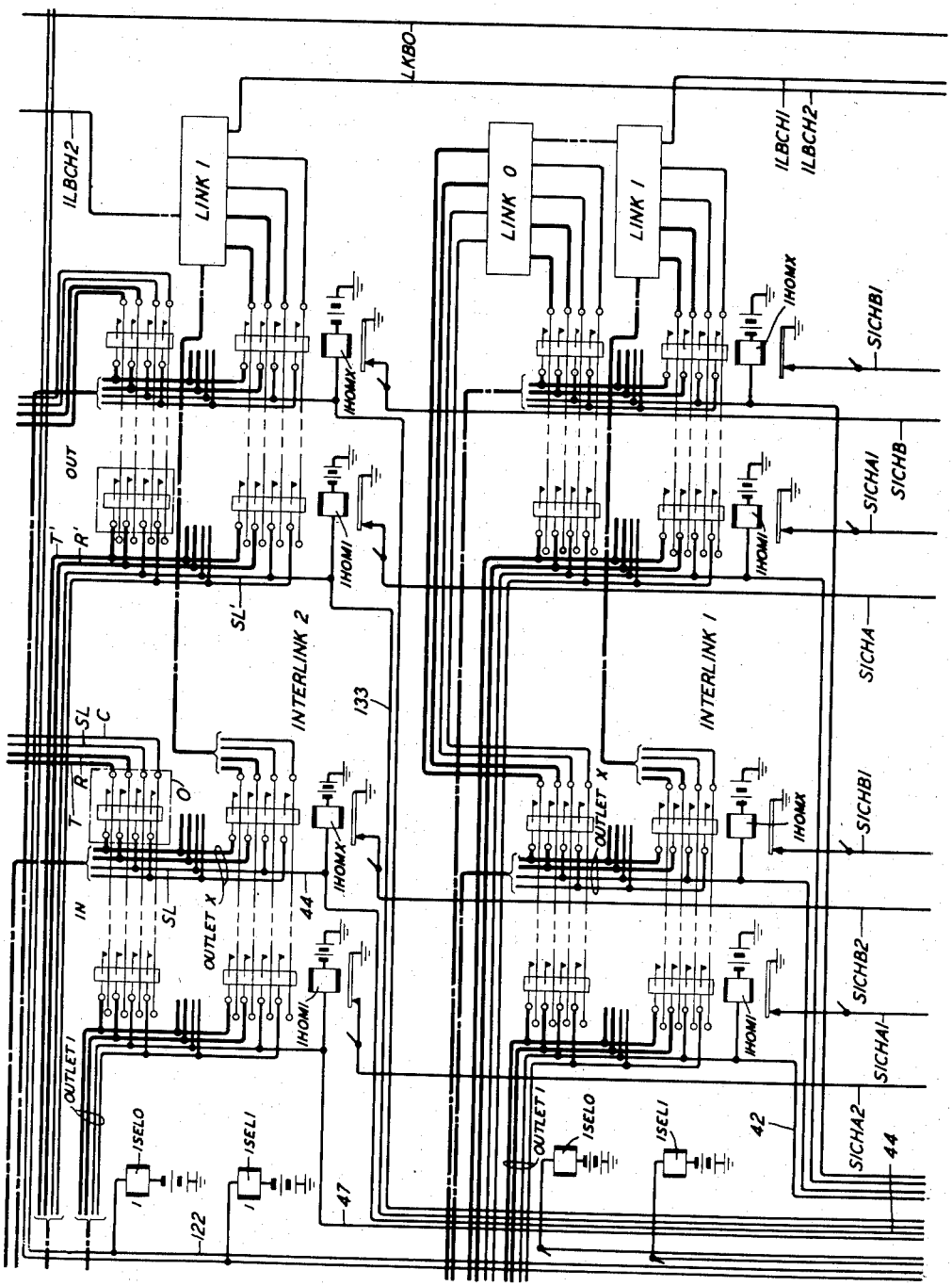

The interlink switch, the designation of which arises from its function of interconnecting, or interlinking, the in and out paths, is a cross-bar switch having its verticals divided into In and Out groups and its horizontals connected to links, said horizontals being divided and each part wired separately to the In and Out parts of the link (see Fig. 4). This enables one select magnet of the interlink to be employed twice, once for the In portion of the call and once again for the Out portion. The vertical elements of the In portion of the secondary switches are distributed among the verticals of the corresponding In portions of the interlinks and, conversely, the verticals of the Out portion of the interlinks are distributed among the corresponding Out portions of the secondary switches. It is necessary that each interlink be interconnected both inwardly and outwardly with each group of secondary switches in the office.

The link circuit (see also Figs. 5 and 6) comprises a group of relays intermediate an In and Out half of an interlink horizontal outlet and is for the purpose of furnishing talking battery to both parties on local calls, ringing current, pay station control, and supervision on local calls. A link is held during all calls except reverting calls which are not timed. Being connected to a horizontal of an interlink, ten such links would be required for each fully equipped interlink switch frame, and a group of ten links located on one interlink frame is herein understood to constitute a link group, there being two such groups (and, therefore, two interlink frames) shown for illustrating the operation of the invention.

The sender link (see also Fig. 20) associates the sender circuit assigned to a call with the link similarly assigned. The sender link switch is a 6-point crossbar unit with the senders appearing on the vertical elements of the switch and the links on the horizontal elements, the sender vertical elements being multipled to corresponding elements in each of the sender link switches so that, by this means, any link can be cross-connected to any sender. It will be noted that the two sender link switches and two sender groups of ten senders to the group are shown in Fig. 49. These are thought to be ample to illustrate the general arrangement as well as the operation of the invention.

In small offices where one group of senders will serve the ultimate requirements, it probably would be economical to reverse the location of the senders and links on the sender link. The circuits of this invention may readily be modified to provide this arrangement.

Having given a brief indication of the switching elements of the invention and the manner in which they connect with each other, a similar brief description of the functions of the various circuits will now be given, followed by a general description of the equipment as a whole, after which the operation of the circuits will be described in detail.

The line group circuit, shown in Figs. 7 to 12, inclusive, comprises a group of relays the operation of which is concerned, on In calls, with registering the calling line number, classing the call, advising the marker of the primary line switch on which the calling line is located and extending to the marker an operating circuit for the hold magnet thereof. On Out calls it finds the line from the number thereof furnished by the sender, tests it, classes it, extends the hold magnet lead thereof to the marker and advises the marker of the primary switch location of the line. If the line is vacant, it informs the sender of the fact and the latter routes the call to an intercepting position, if this service is provided. It is probable that one line group circuit will be sufficient for an office having a maximum of 1000 lines.

The marker circuit, shown in Figs. 13 to 19, inclusive, functions on both In (originating) and Out (terminating) calls, and one will probably be sufficient for an office of upward to 1000 lines. On an In call, it is seized by the line group circuit which informs it of the primary line switch upon which the calling line is located and extends to it the hold magnet circuit thereof. The marker then tests routes from the primary line switch indicated to an idle sender, determines upon one and operates the select and hold magnets along the chosen route to extend the call to the sender. If it fails to establish this connection it makes a limited number of subsequent attempts. On Out calls the line group circuit furnishes the marker with the location of the called line or trunk and, by the sender, with the link which is being employed by the connection. It tests and establishes a route between these, retesting if it fails.

The sender circuit, shown in Figs. 20 to 31, inclusive, is a relay circuit that performs the general functions implied by its name. On In calls, it is associated with the calling line by assignment from the marker, and is connected through the sender link to the link to be used. It receives the calling line number from the line group circuit, supplies dial tone to the calling line and, in local connections, registers the number of the called subscriber. It informs the line group of the called number and furnishes information to the marker for establishing the Out or terminating connection. On In trunk calls it registers the four digits of the called number; on Out trunk calls it selects the route and controls the establishment of the connection through tandems, if any, until it reaches the terminating office, at which time it dismisses itself and cuts the subscriber through to the trunk circuit. On timed calls, it seizes a timing circuit and furnishes it with the full calling line number and the called office code, and connects said timing circuit with the link. It sets ringing selections in the link on local and trunk calls to be completed within the office. It switches through the tandem office calls in response either to pulses received from a distant sender or operator, or automatically if from a "cut-through" or intermediate office.

The timing circuit, shown in Figs. 32 to 38 inclusive comprises a group of relays for registering the calling and called numbers, selecting relays operated by the sender for connecting it with the link handling the call and, through the latter, to the trunk on timed interoffice or intraoffice calls as, for example, involving toll station calls and a time register for accumulating the elapsed time.

The printer circuit shown in Figs. 39 to 45 inclusive receives the calling and called line numbers from the timing circuit together with the elapsed time upon completion of the call and prints the same. It further adds the chronological time, the date, its own number, etc.

3. General operation of the equipment a. ORIGINATING CALLS

The general operation of the equipment briefly is as follows:

The initiation of a call over a subscriber's line or over a trunk, causes the operation of the associated line relay (L) which causes the line to be extended to the line group circuit and particularly to three circuits therein which correspond to the hundreds, tens and units digits of the calling line number. These circuits operate corresponding relays and, in the event of simultaneous calls, the lowest one in the hundreds, tens and/or units is served first. These operated relays control circuits the operation of which results in the seizure of the marker and the setting up, on leads extending to the senders and by means of a uniform number transfer code employed throughout the invention, of the calling line number in a sender selected for use. The leads also serve to operate a combination of relays in the line group circuit to select the calling line. This selection results in the circuit to the hold magnet thereof being extended to the marker and two relays in the line groups being operated in series, the first of which indicates the primary line switch upon which the calling line appears and the second is common to all lines of the same class on the various primary switches. Cross-connecting facilities enable any line or trunk to appear on any primary line switch irrespective of its number, permitting thereby an even distribution of load and a proper classification of the lines irrespective of their physical disposition on the primary switches. The operation of the first of the two relays furnishes the marker with information as to the primary switch upon which the line is to be found and this is sufficient for it to serve the call. When the call is served, the line group circuit is released. Should the number of the calling line be mutilated, preventing its proper service, the line group circuit immediately causes the line to be locked out of service by operating the relay LO thereof, all lines being so equipped.

When the marker receives the designation of the primary line switch upon which the calling line appears, it tests for idle routes to an idle sender, the test being almost instantaneous since it is based upon interblocking of routes where there is a group of busy elements therein preventing their use. This selection, through the marker, of a route between the primary line switch and an idle sender hinges around the selection of an idle interlink having, on the one hand, an idle path, or paths, through a secondary line switch to the particular primary line switch upon which the line appears and, on the other, an idle path, or paths, to a link and sender. As soon as this test is made, a particular path of those available is chosen. In order to spread the traffic more or less evenly through the equipment, a set of "order" relays is provided in the marker by which the first choice of paths is shifted with each call. When the path is chosen, the marker operates the select and then the hold magnets along the selected route to extend the connection to the chosen sender. As a last step, the marker tests the line hold magnet circuit through the line group circuit to assure that the path is complete through the cross points as indicated by sleeve ground from the link appearing on the hold magnet. If the path is not complete, the marker advances the order relays to give a fresh choice of paths and attempts again to serve the call. This test can be repeated again, if thought desirable. Likewise if, in making a selection of routes, the marker selects an unavailable path the busy condition of which should have been disclosed in the route test, it immediately calls for a retest and starts over. If this is repeated, it indicates a probable marker trouble which can be made to effect the substitution of a spare marker. The marker furnishes the sender, by the number transfer code, the number of the link with which it is connected, which the sender must know in order to effect the Out connection and to associate a timing circuit therewith on a timed call.

The sender furnishes dial tone to the calling subscriber, who dials, for a local number, the five digits of the called number. The effect of the dialing is to operate repeatedly a counting relay chain in the sender. The first digit operates, through the counting chain, an office relay, the next three digits a combination of relays in three groups corresponding to the hundreds, tens and units relays of the called line, while the last digit merely causes the counting relays to remain locked up with the ringing code on them. The sender then seizes the marker and line group circuit, if idle, and furnishes the former with the link number and the latter with the called line number, which results in the called line being tested, and, if idle, the primary designation relay being operated. The marker, in a similar manner to an In call except that it omits the selection of a sender link and interlink, picks a path, if one is available, from the particular link being used to the called line or trunk and operates the hold magnets along the selected path. If no path is available, the call cannot be served and the sender is so advised.

When the marker completes this function, the sender transfers information to the link in two steps the first being to advise the link that the call is a local non-coin call rather than a coin one, or a trunked call or a reverting one, etc. and the second causing a group of four ringing code relays to be set up in the link. The sender then detaches itself from the connection and becomes available for reassignment.

If the called line or the equipment paths are busy, the sender is so advised. It then sets the link for busy and disconnects itself.

When the subscriber dials "8" for a reverting call, followed by the last digit of the called number, the sender immediately sets the link for this condition with the appropriate ringing code relays operated, and disconnects itself. The marker is not required on such calls to establish an Out connection since the call is served over the In path. When the called party answers, the link transfers the connection to the lock out relay of the line circuit, and then releases itself together with all other equipment. Talking battery is supplied by the line relay.

The line group circuit has a group of relays which tests simultaneously the lines in a rotary, private branch exchange or out trunk group, in groups of 10 or 20, depending on the size of the office and value placed upon marker holding time. The lines in each group other than the first do not have call numbers and may be located individually on any primary line switch. That is, they need not be placed in sequence and may be spread over the primary line switches to spread the traffic.

If "0" is dialed, indicating thereby a call to operator, the corresponding relay in the sender office group is operated. By cross-connections, the sender determines the trunk route extending to the operator's position. It seizes the marker and causes the connection to be extended to an available outgoing trunk in the group. If the operator is reached through a tandem center, the sender at tandem returns a "ready" signal comprising a brief impulse of reversed battery, upon receipt of which the originating sender provides a routing digit. This is repeated if the connection is to be extended through an additional center until the operator switchboard is reached. The sender knows by appropriate cross-connections when the call reaches the switchboard and furnishes appropriate flashing signals to class the calling line as coin, toll station, etc. When the operator answers, an impulse of reversed battery causes the sender to transfer the call to the link on a cut-through basis whereby the link, for transmission reasons, clears the tip and ring conductors of all bridged and series apparatus and permits the connection to be held by ground on the sleeve supplied by the outgoing trunk circuit.

On a call to another office requiring timing operations, the operation of the appropriate office relay in the sender at the originating office designates the route and the number of digits and the pulses thereof required to reach the sender at the terminating office. The local sender upon receiving the next digit, which is the last one of the calling party's number, immediately seizes a timing circuit and informs it of the link being used, which results in the timing circuit associating itself therewith over two conductors. The timing circuit is also furnished with the calling number and the distant office code. Following this, the originating sender seizes the marker and causes the Out connection to be extended to the appropriate outgoing trunk. It then proceeds to transmit appropriate pulses over the trunk for necessary tandem switching until the terminating sender is reached at an outer office or the office code is furnished to an intermediate one, at which time it operates the link on a cut-through basis. The distant sender returns dial tone and the subscriber dials the digits of the number, said digits being passed back by the out trunk circuit through the fourth lead of the connection, the link and to the timing circuit which registers them.

When the called party answers as indicated by reversal of battery over the trunk, the timing circuit accumulates the elapsed time on a train of wheels driven by clockwork or other appropriate means. When the call is completed, the time accumulation stops and the timing circuit seizes the printer if idle and, if not, awaits its turn until it can seize it. The timing circuit then operates the printer to record on an appropriate ticket or tape the calling number, the called number and the elapsed time, the printer supplying the chronological time, the date and its own number. A sequence ticket number also can be furnished.

b. INCOMING CALLS

Incoming calls; that is, calls originating outside of an office for completion within or through the office, are classed as such to the sender by the line group circuit. If the sender is in an office which also serves as a tandem point, as the Alpha office in the assumed network, it momentarily reverses the trunk to indicate its readiness to the originating office and receives the called office code from the sender thereat before the latter cuts through. If the office does not also serve as a tandem, then on an incoming call from an outlying office, the sender automatically skips the office code and takes the four digits of the called number from the subscriber's dial. It then causes the marker to establish the call and sets the link for the ringing code. It also informs the link that an incoming trunk call is being handled, which causes it to cut through when the called party answers, leaving the connection held by the trunk circuit.

An incoming call to a toll station is handled as any other number, toll stations being assigned numbers in a distinguishable group for information of the master office operator. The equipment precludes fraudulent routings from local stations to toll station numbers without timing.

When a toll station subscriber originates a call, its class as such is transmitted to the sender. Unless "0" is dialed indicating an "Operator" call, the subscriber must next dial his own last digit. If the call is for a local subscriber, the sender registers the latter's number and passes it to the timing circuit together with the calling subscriber's number. The timing circuit is associated with the link and the sender proceeds to establish the connection. Upon the termination of the connection the printer is connected to the timer and the details of the call are printed.

A toll station call to a distant office is handled in the same manner as though it were a local station calling.

A call to Operator (by dialing "0") causes the sender to remain connected until the operator answers, thereby enabling it to flash the trunk lamp to indicate the class of the call to the operator. When the call is answered, the sender transfers the call to the link on a cut-through basis.

When a reverting toll station call is made, the sender, upon receiving the reverting code digit followed by the subscribers' own last digit and the last digit of the called number, seizes a timing circuit and furnishes it with the calling number, the ringing code of the called number and an "8" to indicate a reverting call. The timing circuit is also associated with the link and the link is advised of the class of call before the sender is dismissed. The link furnishes reverting ringing and when the called party answers, instead of disconnecting itself as with a local reverting call, remains to control the timing circuit.

A "cut-through" office which, for example, may be Gamma of Fig. 48 and which is not provided with automatic ticketing facilities, is classed as such to the sender, and results in the automatic operation of the "0" relay therein. The sender then proceeds as though "0" had been dialed, except that it furnishes flashing lamp indication that a cut-through office is placing the call.

SECTION II.—DETAILED OPERATION— LOCAL CALLS

1. *Local non-coin call*

Figure 1:
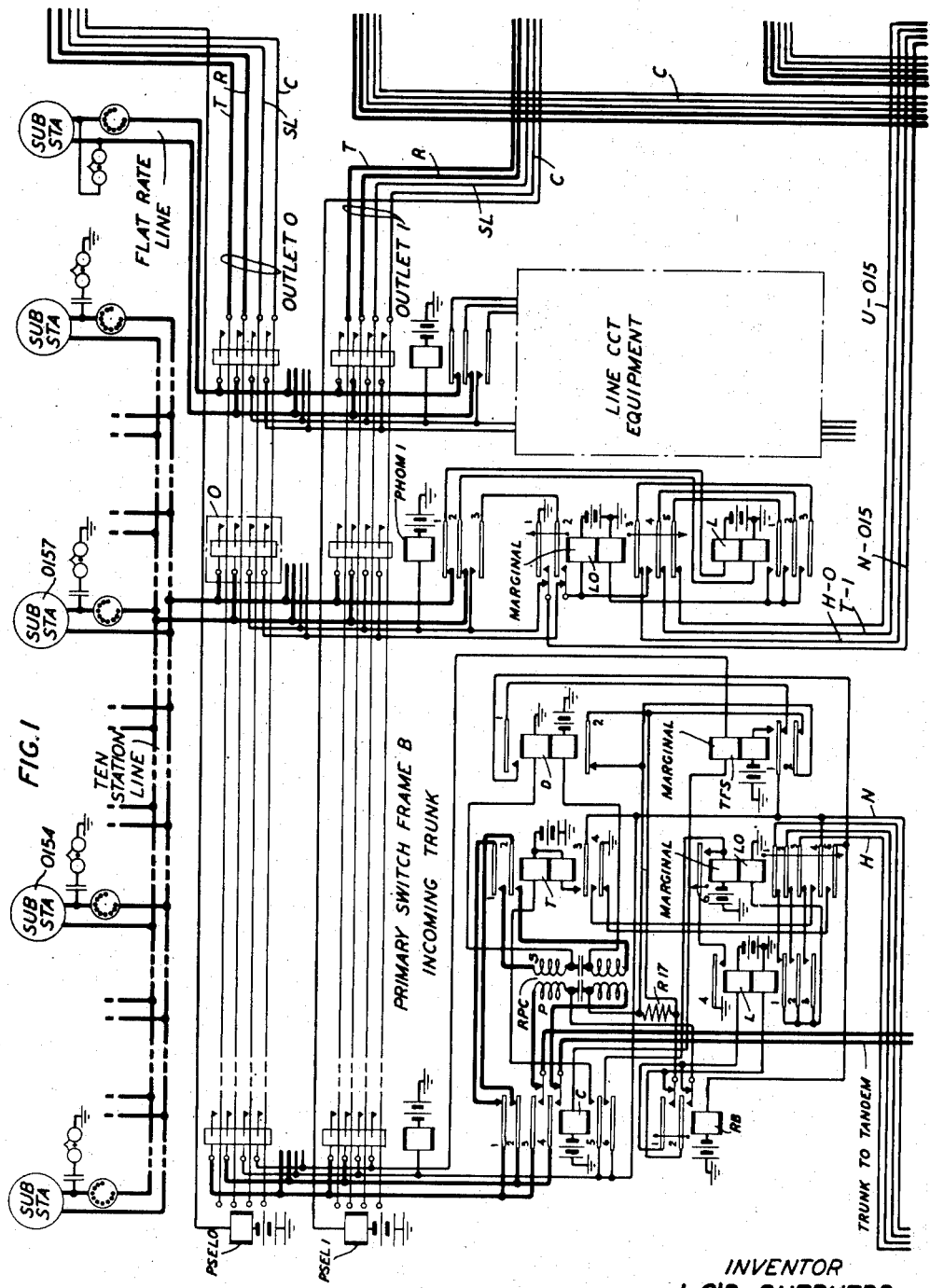
Figure 2:
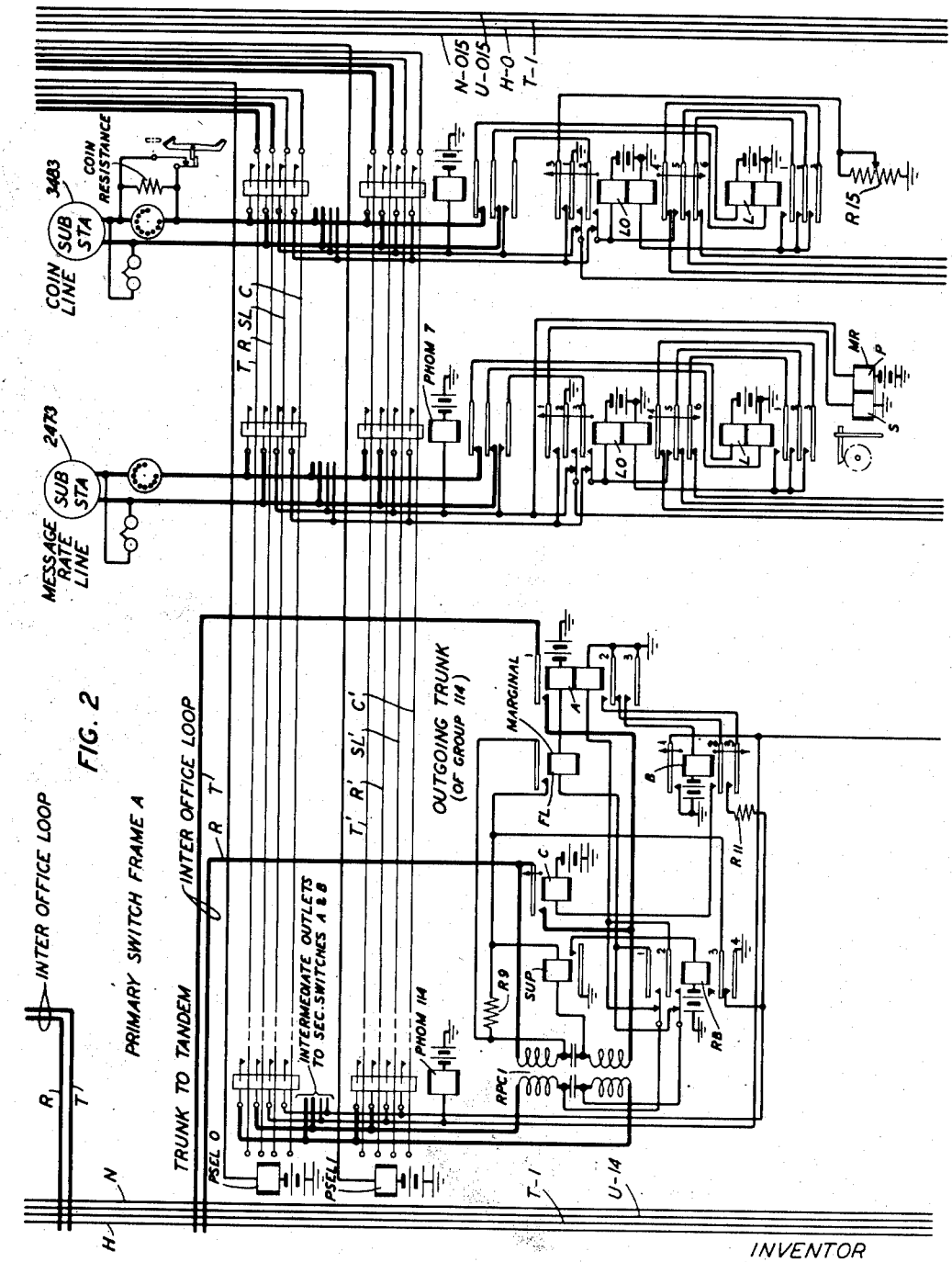
Figure 3:
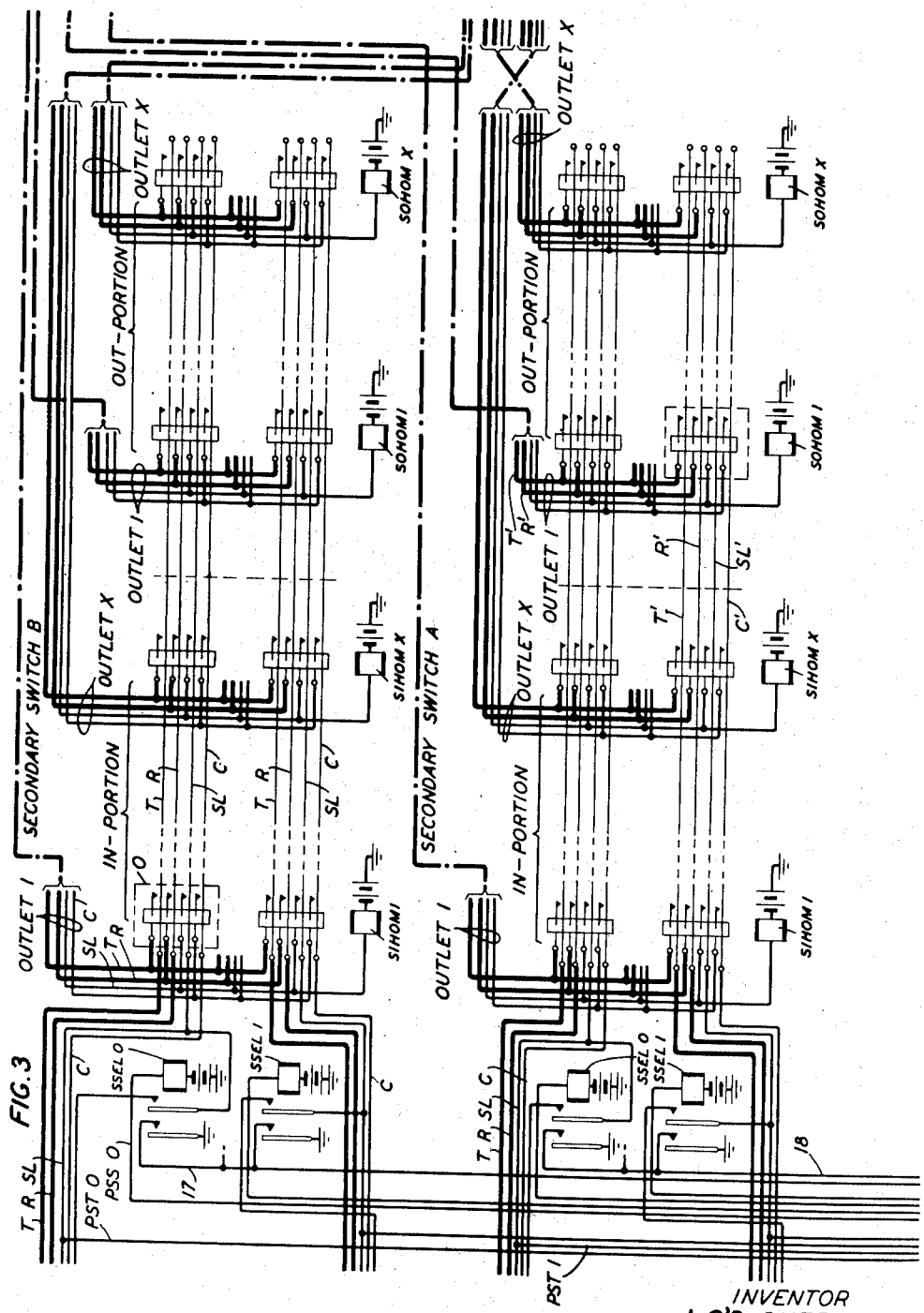
Figs. 3 and 4 show the secondary and inter-link cross bar switches over which originating and terminating connections are completed.

Proceeding, now, with a detailed description of my invention, having due regard to the arrangement of the various figures of the drawings as indicated in Fig. 47, Fig. 1 shows two representative subscriber line circuits; namely a ten station line and a flat rate line (the circuit thereof being emitted since it is identical with that of the ten station line) and, also, a representative incoming trunk, all disposed upon the primary switch B. Fig. 2 shows two other representative subscriber line circuits; namely, a message rate line and a coin line and, also, a representative outgoing trunk, all disposed upon the primary switch A. It will be observed that the arrangement and designation of the primary switches, in relation to secondary switches A and B shown in Fig. 3 are identical with those indicated on the trunking plan of the invention shown in Fig. 49.

Thus lines and trunks may be indiscriminately disposed upon the primary switch frames to suit conveniences of installation and spacing requirements, the identity of each of the separate circuits, as will be shown, being cared for by suitable cross-connections to the line group circuit and by operational conditions incident to the setting up of the various connections. It may now be supposed that a call is initiated at station 0154, of the ten station party line shown in Fig. 1, the last digit (4) of the line number being the ringing code of the station. Upon the closure of the line loop, a circuit is completed for the line relay L which may be traced from battery through the upper winding of said relay, No. 1 contacts on the hold magnet PHOM1, the line loop, No. 2 contacts of said hold magnet, lower winding of relay L to ground. Relay L operates and applies ground through the lower winding of relay L0 through the Nos. 1, 2, and 3 contacts of relay L, Nos. 5, 4 and 3 back contacts, respectively, of relay L0 to conductors "H-0," "T-1" and "U-015."

All types of lines and trunks except Out interoffice trunks, have four conductors which are cross-connected to the line group circuit. Three of these, designated "H-," "T-" and "U-" corresponding to the hundreds, tens and units designation of the call number assigned to the line, are for the purpose of identifying the number of the line and terminate on the punchings shown in Fig. 8, from which they are cross-connected to the "Line identification punching block" referred to below as identification punching block in accordance with the digital terminal numbering of the line. The fourth conductor "N-" which is for the purpose of operating the line hold magnet, is also extended to the punchings but instead of being cross-connected to a punching on the identification punching block is cross-connected to the one of the N- punchings on the punching block which is individual to the line, there being one such punching for each line and trunk in the office.

The embodiment of the invention herein described by way of illustration is assumed to provide for a maximum of 1,000 lines, including trunk groups. The line group circuit, therefore, is provided with suitable equipment which, responding to the grounded condition of the three numerical conductors "H-," "T-" and "U-" of a calling line, sets up circuits by means of which the hundreds, tens and units designation of the said line may be indicated. This equipment, in the line group circuit, includes a group of ten relays (H1-H0) for the identification of the hundreds digit, a group of ten other relays (T1-T0) for the identification of the tens digit, and a group of ten other relays (U1-U0) for the identification of the units digit. The lower winding of each relay in the hundreds group of relays H1-H0 is connected to a punching in the identification punching block bearing the same digital designation as the relay and, depending upon the hundreds designation of a line number, conductor "H-" of the line circuit thereof is cross-connected from its terminal punching to whichever punching H1-H0 in the identification punching block that extends to the lower winding of the relay in the hundreds group of relays H1-H0 which bears the line hundreds digital designation. Thus, for example, if the hundreds digit of the line number is "0" as assumed, conductor H-0 of the line circuit would be cross-connected to the punching H0 which is connected to the lower winding of relay H0, and the ground above traced through the lower winding of relay L0 would then extend via conductor H-0, conductor 40, winding of relay H0, the No. 4 and No. 3 back contacts of said relay, serially through the No. 3 back contacts of the intervening relays H9-H2 (not shown), No. 3 back contacts of relay H1, conductor 8, No. 2 back contacts of relay HT to resistance battery. Relay H0 operates in this circuit, makes its No. 4 front contact before breaking its No. 3 back contact, transferring thereby the winding of the relay directly to conductor 8, and breaking the series path above traced to prevent the operation of any other relay in the hundreds group of relays H1-H0 in the event that another line initiates a call while a preceding call is being served. Relay H0, upon operating, further locks over its upper winding and No. 2 contacts, conductor 7, No. 1 contacts of relay NRH to ground, said last-mentioned relay being operated at this time, as will be shown.

In the same manner, the hundreds numerical conductor "H-" of each line in the primary switches is cross-connected to whichever punching H1-H0 on the identification punching block which bears the same hundreds digital designation as the line, and when a call is initiated over a line, the operation of the line relay L causes a circuit to be completed through the lower winding of the associated relay L0 and the lower winding of the relay H- to which connection is made through the identification punching block. The operation and locking of said relay H- then identifies the hundreds digital designation of the calling line.

Each relay H1-H0 has a companion relay LHC1-LHC0, and when a relay in the H1-H0 group operates in response to the initiation of a call, a circuit is closed for the companion relay LHC-. Thus when relay H0 operates as above described in response to the initiation of the call on station 0154, relay LHC0 operates over a circuit which is completed from ground on the No. 8 contact of relay H0. In operating, relay LCH0 (or any other relay in the group LHC1-LHC0 operating in its stead) extends through its ten pairs of contacts 1-0, the lower windings of the ten "tens" relays T1-T0 to ten correspondingly designated punchings in the identification punching block. Now, as with the case of the hundreds digit of the calling line designation, the tens numerical conductor "T–" of each of the lines on the primary switch frames is cross-connected to whichever one of the ten punchings that extends (through the contacts of a relay LHC–) to the lower winding of the relay in the group of ten relays T1–T0 that bears the same digital designation as the tens digit of the line. Thus, for example, it has been assumed that the number of the calling line is 0154. Its tens digit, therefore, is "1" and conductor "T–1" of the line is cross-connected to the punching T1 connected to the armatures of the No. 1 contact sets of relays LHC1–LHC0 whereupon, with relay LHC0 operated, a circuit is completed for relay T1 that extends from ground through the lower winding of relay L0 as traced to conductor "T–1," punching T1 on the identification punching block, conductor T1, No. 1 contacts of relay LHC0, lower winding of relay T1, No. 4 back contacts of said relay, No. 3 contacts of relay T0, serially through the No. 3 contacts of relays T9–T2 (not shown), No. 3 contacts of relay T1 to resistance battery. Relay T1 operates, makes its No. 4 front contact before breaking its No. 3 back contacts, transferring thereby the operating circuit of the relay directly to the above-traced resistance battery and, by breaking its No. 4 back contacts, breaks the operating path to the other relays in the group of relays T1–T0 in order to prevent the operation of any other of said relays in the event that another line initiates a call during the interval in which the line group circuit is serving a previously started call. Relay T1 locks over its upper winding and No. 2 contacts to previously traced ground via conductor 7 on the No. 1 contacts of relay NRH.

In the same manner, the tens numerical conductor "T–" of each line on the primary switches is cross-connected on the identification punching block to the lower winding of whichever relay in the group T1–T0 (via a set of contacts on the relays LHC1–LHC0) bears the same tens digital designation as the line, and when a call is initiated over a line, the operation of the line relay L causes a circuit to be completed through the lower winding of the associated relay L0 and the lower winding of the relay T– to which connection is made through the identification punching block via the contacts of an operated relay LHC–. The operation and locking of said relay T– then identifies the tens digital designation of the calling line or trunk.

Figure 8:
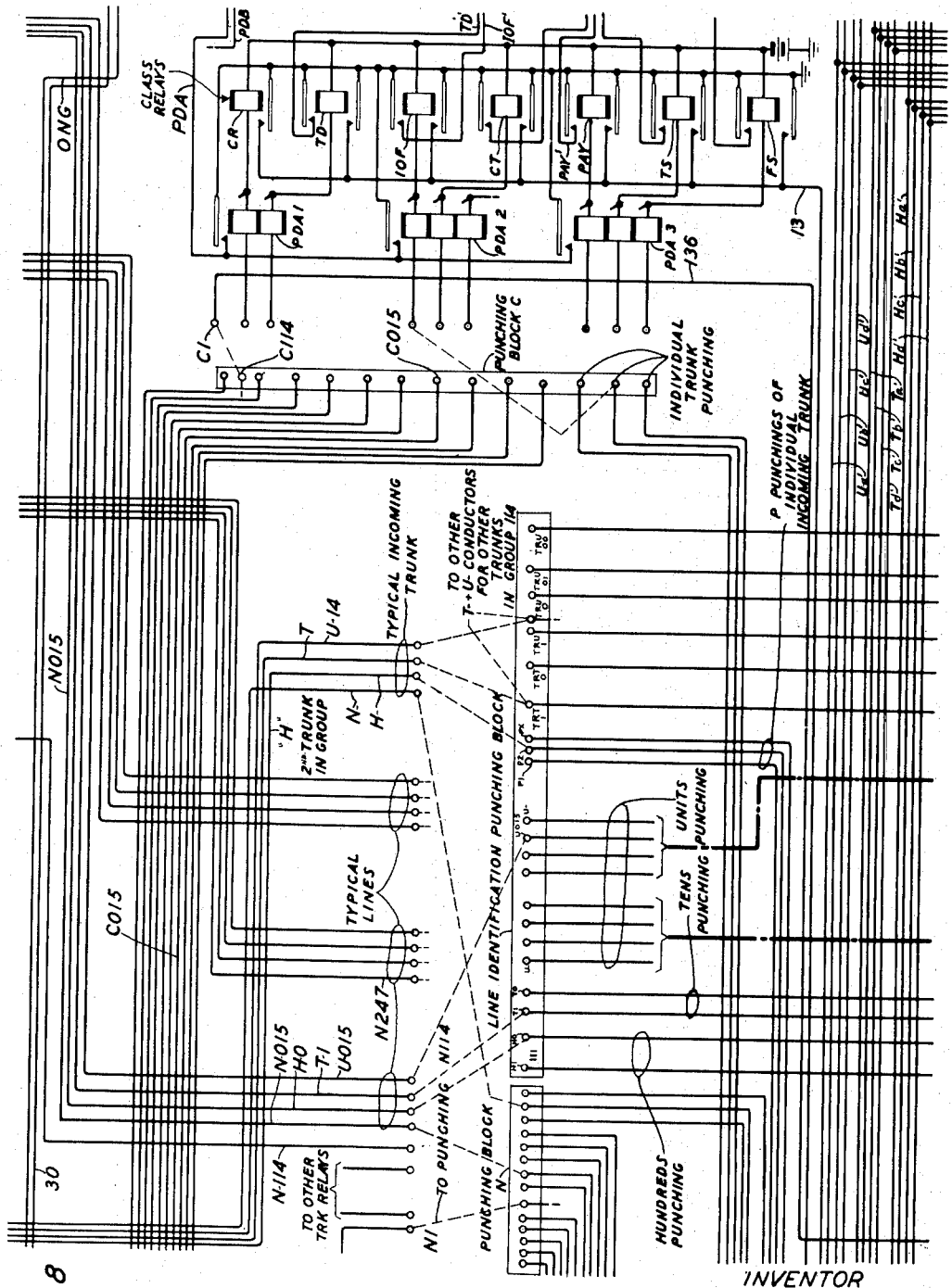
Figure 9:
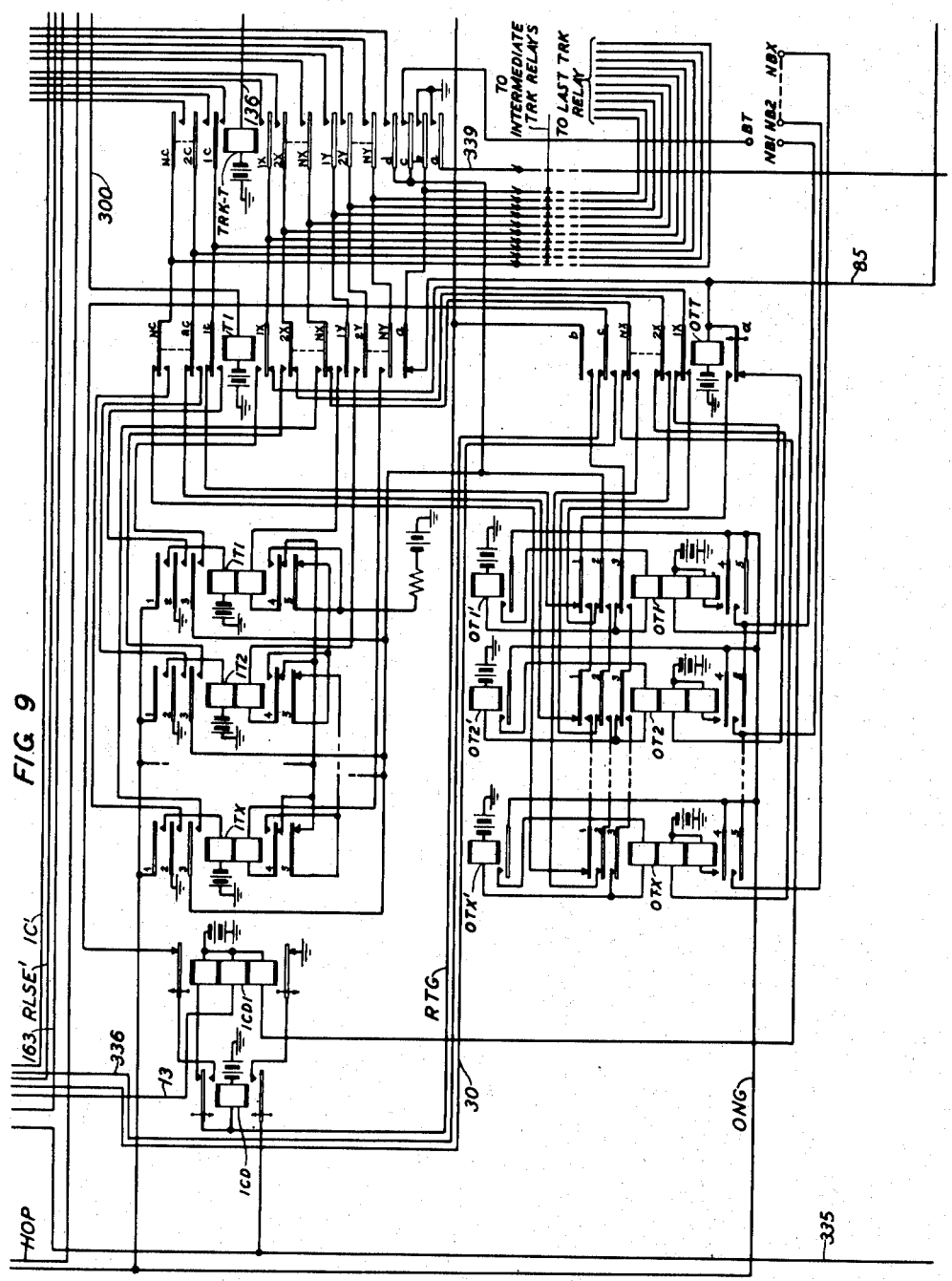
Figure 10:
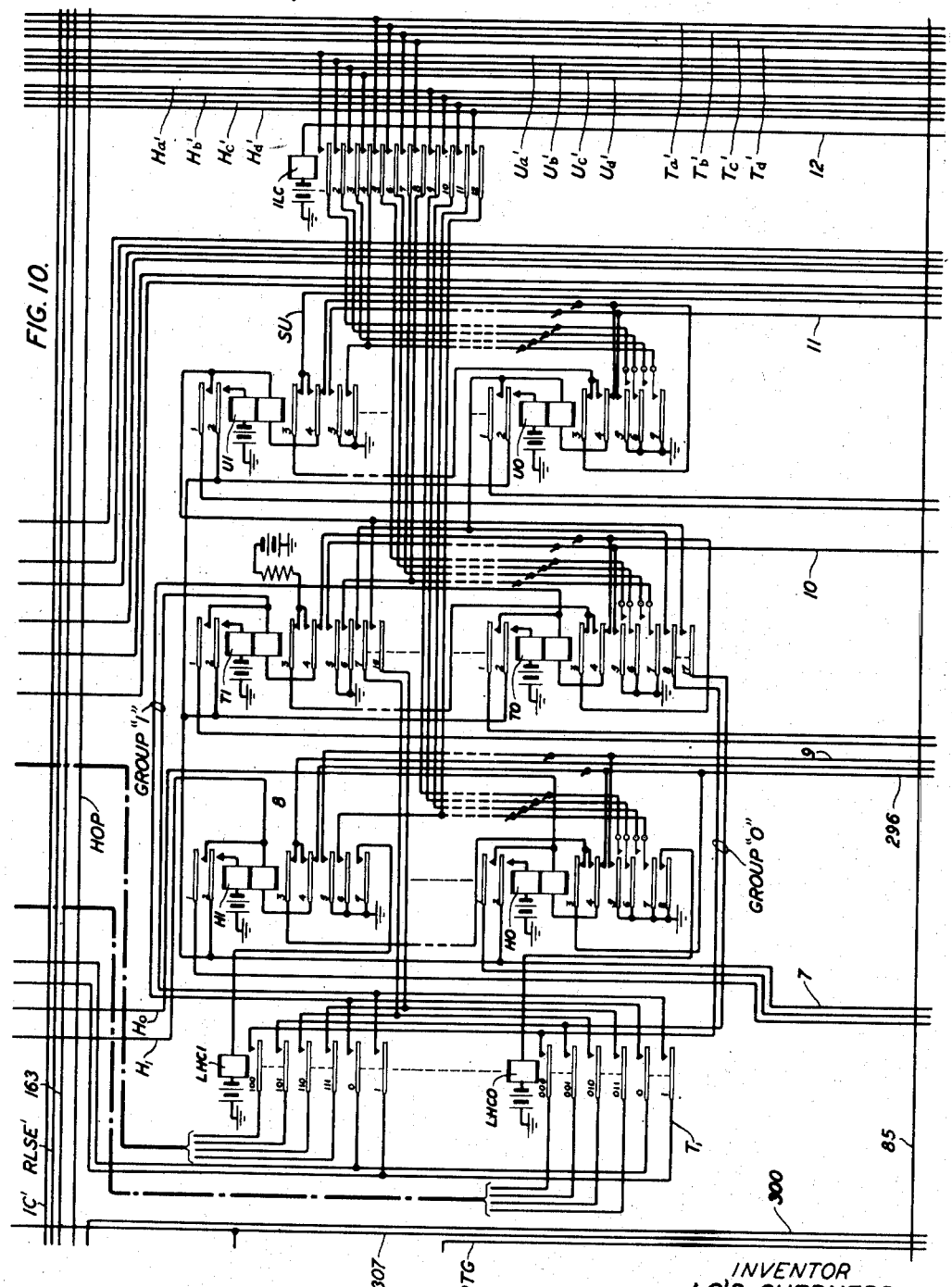
Figure 11:
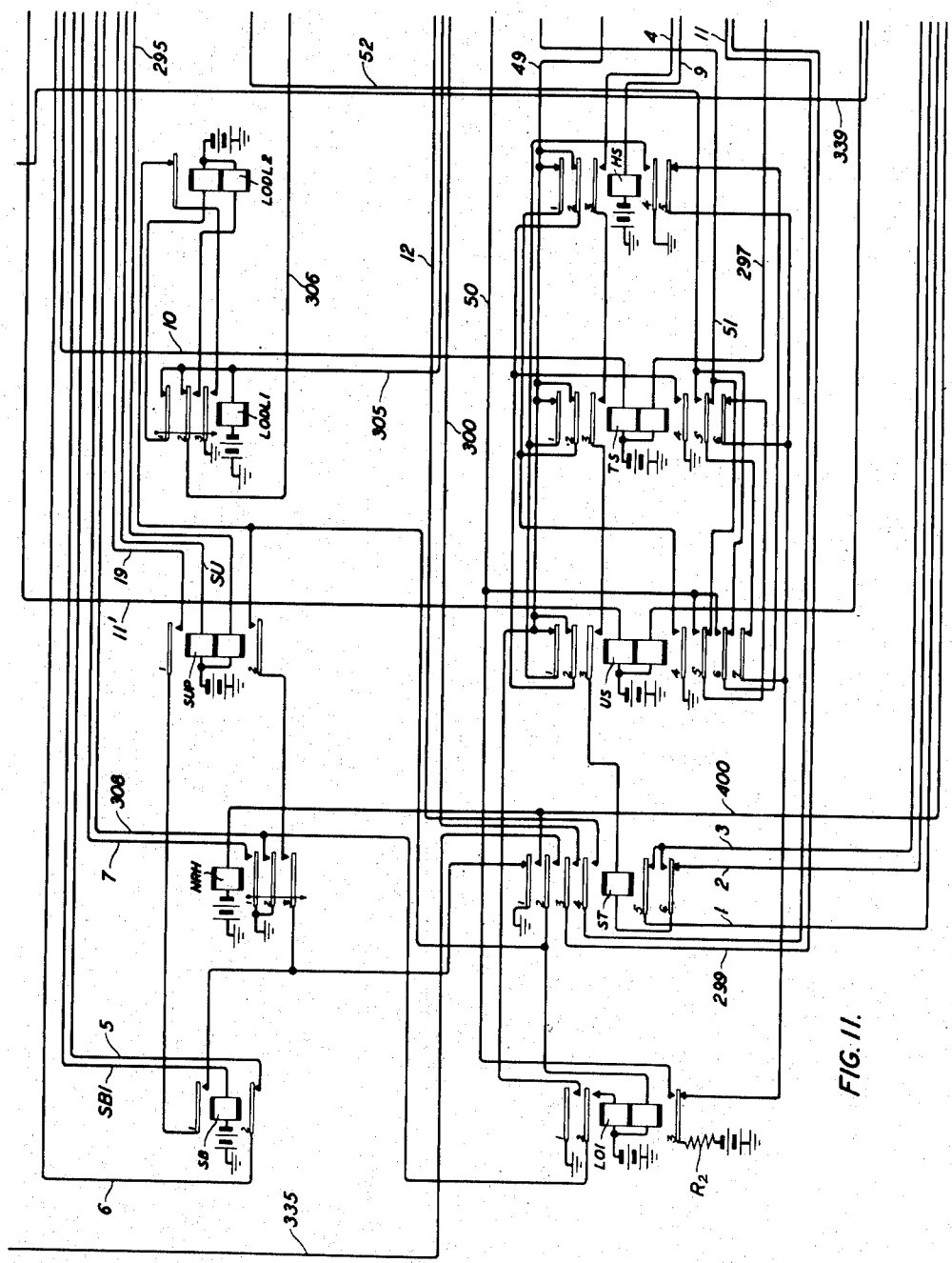
Figure 13:
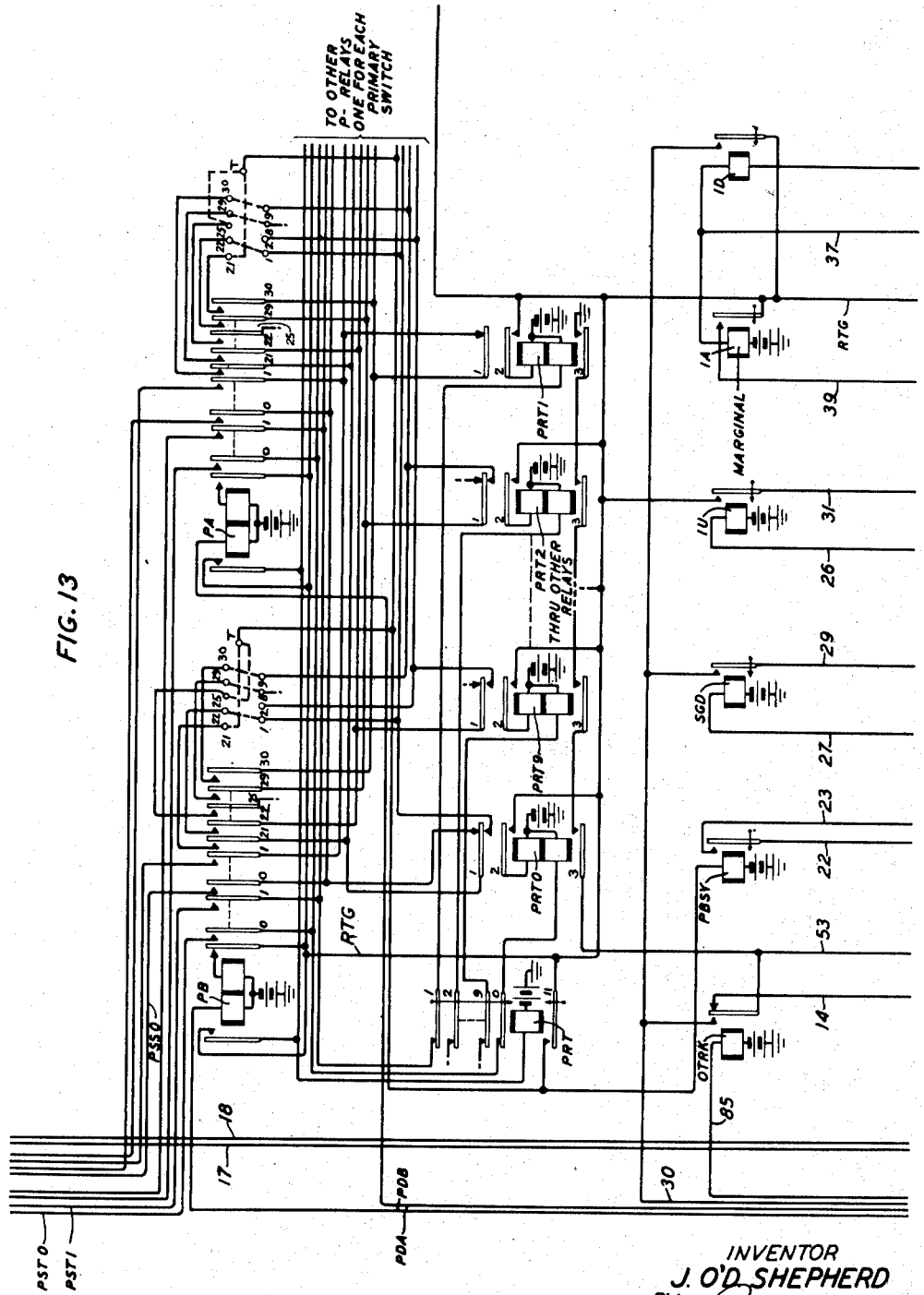
Figure 14:
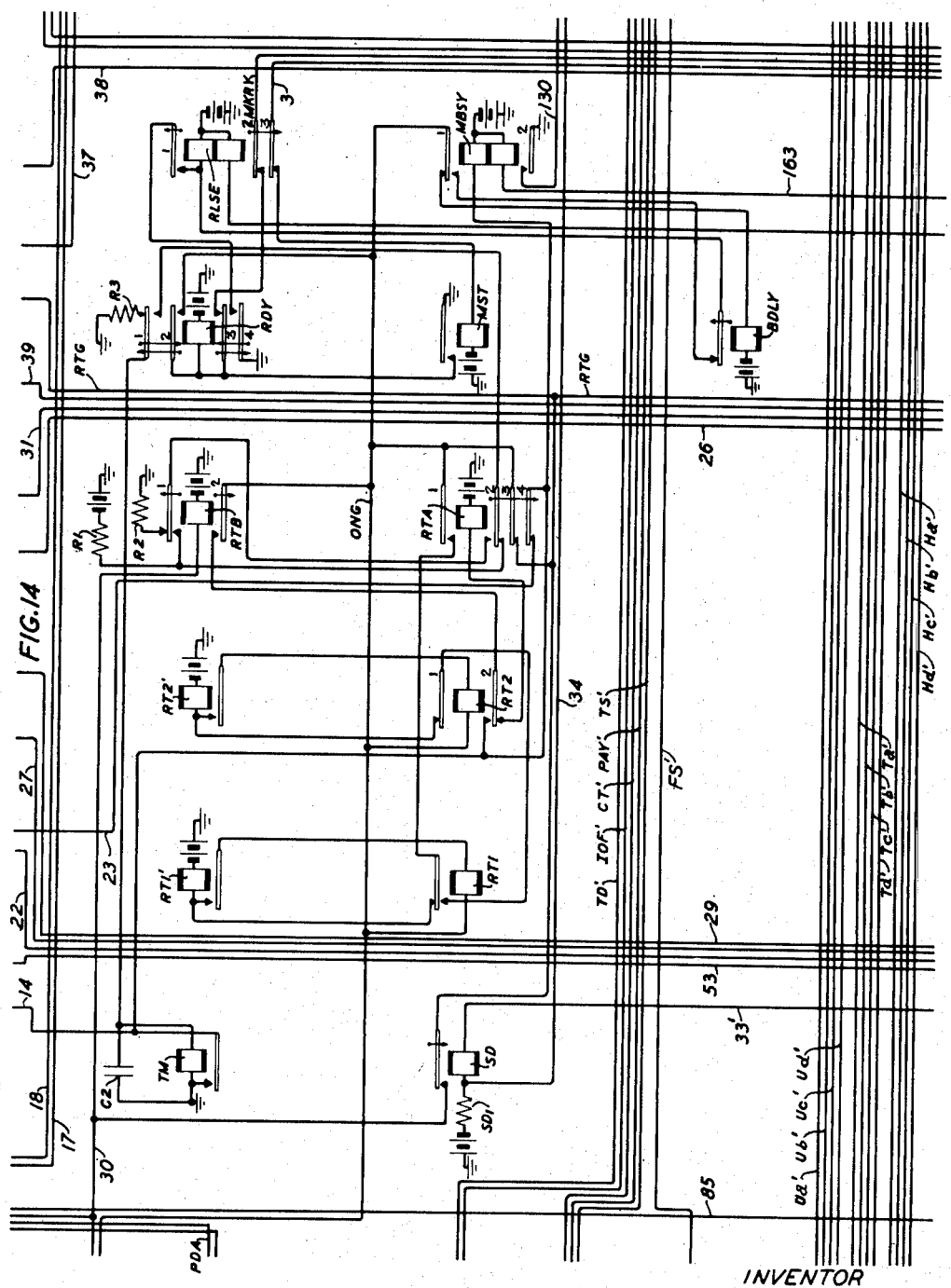
Figure 16:
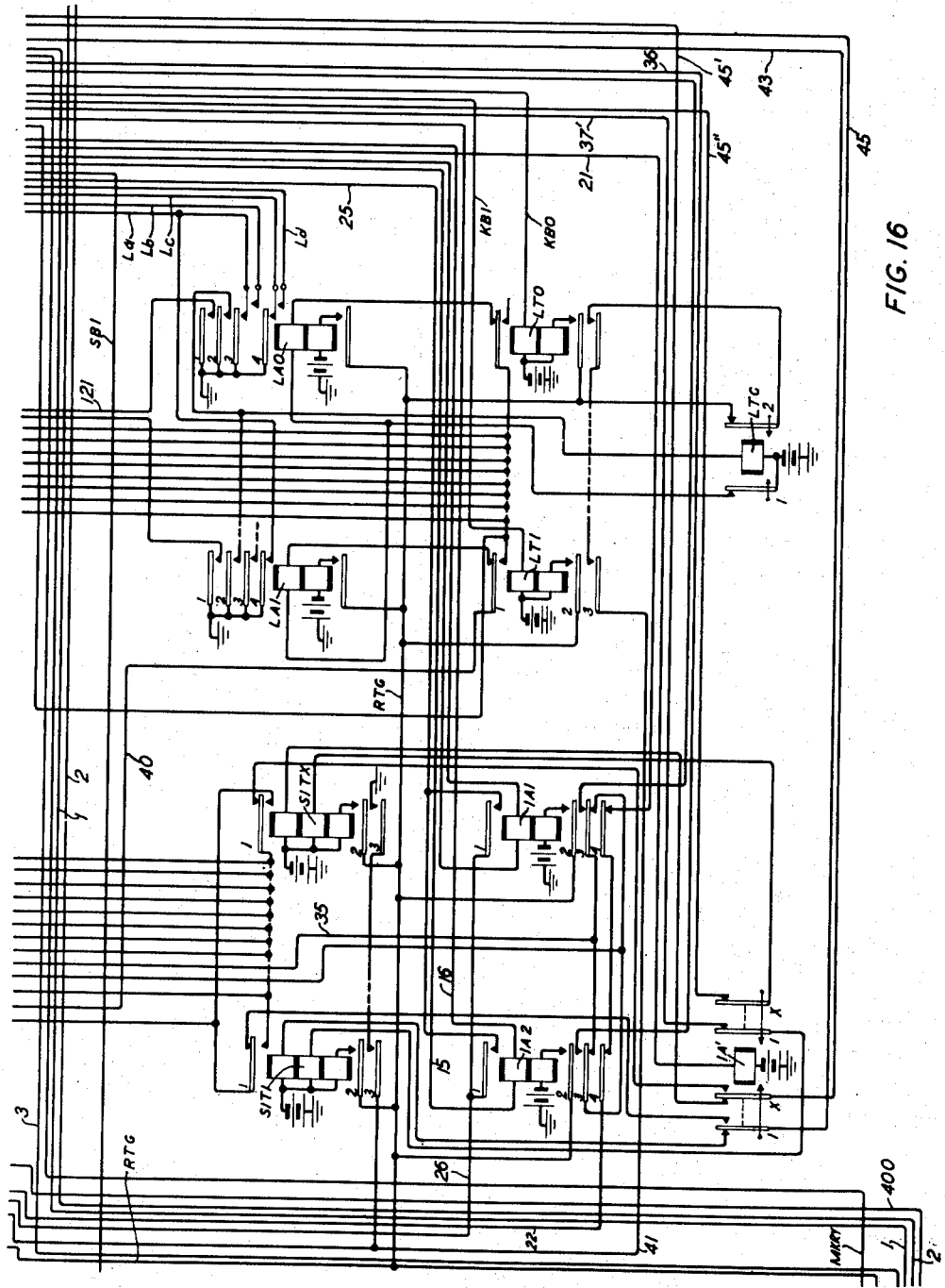
Figure 17:
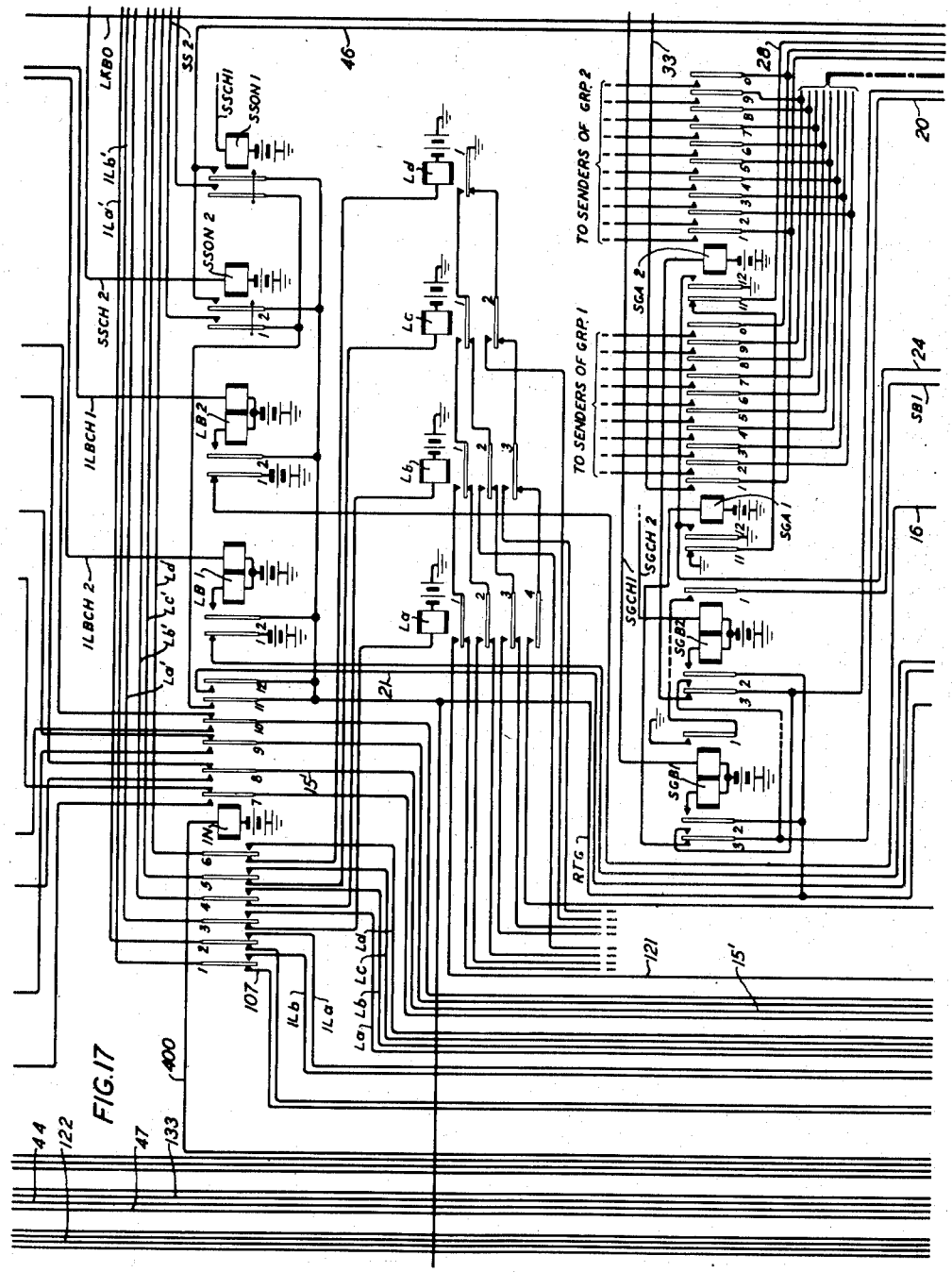

The identification of units digit of the calling line is provided for in a similar manner. Each relay LHC–, besides being provided with the ten pairs of contacts 1–0 reserved for extending the lower windings of the relays T1–T0 to the identification punching block, is further provided with the one hundred pairs of other contacts. As illustrated in Figs. 8 and 10, the one hundred armatures of these other contact pairs on each of the relays LHC1–LHC0 are extended to punchings on the identification punching block, and since the embodiment of the invention is restricted to an office of 1,000 lines and/or trunks, there will be, of course, one thousand such punchings or ten groups of one hundred punchings each, with each group of one hundred correlated to a particular relay in the group of relays LHC1–LHC0. The stationary contacts that make with the one hundred armatures in each of these relays are multiplied so as to provide a common group of one hundred conductors divided into groups of ten, with each group extending to ten armatures on one of the "tens" relays T1–T0 according to the correlation of the "tens" relay digital designation with the digital designation of the group of ten conductors. Thus, the conductors of the "0" group of conductors which, in relay LHC1, are connected to the stationary contacts making with armatures 100–101 and to the stationary contacts making with corresponding armatures in each of the remaining relays LHC2–LHC0, are extended to the lowermost group of ten armatures 8–17 of relay T0; those in the "1" group are connected to the stationary contacts making with the armatures 110–111 and to the stationary contacts making with corresponding armatures in each of the remaining relays LHC2–LHC0, are extended to the lowermost group of ten armatures 7–16 of relay T1. The remaining eight groups of conductors 2–9 intermediate those mentioned are similarly and correspondingly extended to separate groups of stationary contacts of the intermediate relays T2–T9 (not shown).

The stationary contacts making with the ten lowermost armatures in each of the tens relays T1–T0 are multiplied together and extended each to the operating (lower) winding of one of the ten "units" relays U1–U0 in the appropriate order; that is, in the order indicated by the numerical identity of the units relay and the units digit of the armature designation of the one hundred contact pairs in each of the relays LHC–. Thus the lower winding of relay U0 is extended to the stationary contact of the No. 7 (or No. 8 of relay T0) armature of relays T1–T0 and thence to the stationary contact of the XX0 contact pair of all the relays LHC–, the "XX" designation indicating the particular hundreds and tens designation of the calling line number, while the lower winding of relay U1 is extended to the stationary contact of the No. 16 (or No. 17 of relay T0) contact pair of relays T1–T0 and thence to the stationary contact of the XX1 contact pair of all the relays LHC1–LHC0; intermediate relays U2–U9 being extended in an identical manner to the stationary contacts of the intermediate contact pairs on relays T1–T0 for further connection to the stationary contacts of corresponding contact pairs on all the relays LHC1–LHC0.

Thus understanding the interconnection of the "units" identification relays U1–U0 of the line group circuit with the "hundreds" and "tens" identification relays of said circuit, their operation to identify the units digit of a calling line may be easily followed. Remembering that ground upon the hundred numerical conductor "H–" causes the operation of one of the relays in the hundreds group H1–H0, followed by its companion line hundred connect relay LHC–, the latter extends the tens numerical conductors "T–" to the lower windings of the tens relays T1–T0, one of which operates depending upon the tens digit of the calling line number. LHC– also extends the 100 units leads to armatures of the tens relays. The tens relay T–, upon operating extends ten units numerical conductors "U–" of the lines to relays of the units group of relays U1–U0, causing one of said relays to operate through a circuit to be described for a particular example, which is completed between its operating winding and the winding of the relay L0 of the particular line circuit originating the call.

Thus the number of the line from which a call was initiated is assumed to be 015, and we have already seen that the hundreds digit "0" has resulted in the operation of relay H0 followed by the companion relay LHC0 and that the tens digit "1" has resulted in the operation of relay T1. Now when relay T1 operates, it extends the numerical units conductors from the armatures of relay LHC1 to the lower windings of the units relays U1-U0. Since the units numerical conductor "U-015" is cross-connected to punching U015 in the identification punching block, a circuit is then completed from ground extended to said punching through the lower winding of relay L0, No. 015 contacts (not shown) of relay LHC0, No. 12 contacts (not shown) of relay T1, winding of relay U5 (not shown), No. 4 back contacts of said relay, serially through the No. 3 back contacts of the other relays in the units chain of relays, conductor SU, upper winding of relay SUP to battery. Relay U5 operates over this circuit and locks over its upper winding and No. 2 contacts to ground on the No. 1 contacts of relay NRH via conductor 7. Relay SUP also operates in the circuit of relay U5 to perform functions noted hereinafter, while relay L0, which is marginal and in parallel with the operating windings of relays H0, T1 and U5, respectively, does not operate at this time. The identification of the calling line number, assuming it to be 015, is thus accomplished through the operation of relays H0, T1, and U5. Other line numbers are similarly identified through the operation of a relay in each of the groups of ten relays H1-H0, T1-T0 and U1-U0 which are cross-connected to the appropriate punchings in the identification punching block and thence to the numerical conductors of the various lines.

Thus it is seen from the above that the cross-connecting facilities provided by the identification punching block permits full flexibility in assignment. Any line or P. B. X trunk (and the several individual trunks comprising a group as will be shown) can appear on any primary line switch since sequence, from the standpoint of physical location, has no significance, and any number can be assigned to any line or trunk as provided by the number-leads cross-connections. Interoffice trunks have substantially the same flexibility, as will also be shown.

When relay H0 operates, it completes a circuit for relay HS which extends from ground over its No. 5 contacts, conductor 9, winding of relay HS to battery. When relay T1 operates, it completes a circuit for relay TS, which extends from ground through its No. 5 contacts, conductor 10, upper winding of relay TS to battery, and when relay U5 (not shown) operates, it completes a circuit for relay US which extends from ground through No. 5 contacts on relay U5, conductor 11, upper winding of relay US to battery. Relays HS, TS and US operate and, over their respective No. 3 contacts, close a chain path which completes a circuit between start relay ST of the line group circuit and relay ST of the marker, if the marker is not in use with a sender as explained below.

It is necessary, however, to lock-out a calling line which, for some reason, cannot be served. For if the line group circuit cannot disconnect itself from a line or trunk it cannot serve, its service function would be paralyzed. Provisions, therefore, are made for protection against such occurrence.

It will be observed that the numerical conductors of the line which operate a relay in each of the groups of relays H1-H0, T1-T0, U1-U0 in response to the initiation of a call over said line, are extended over the No. 1 contacts of each of the operated relays in said group of relays to contacts on the lock-out relay LOL. Now in the event of an open circuit from one of the contacts of the line relay L, one or more of the relays HS, TS, and US will not operate. For example, if the unit numerical conductor is open, the appropriate relay in the unit group of relays U1-U0 will not operate, the circuit for relay US will not be closed and said relay therefore will not operate. Under these circumstances, a circuit is closed for relay LOL which extends from resistance battery through the No. 7 back contacts of relay HT, winding of relay LOL, conductor 49, No. 2 contact of relay US, No. 4 contacts of relay TS to ground, operating said relay. On the other hand, should either relay TS or HS not operate in place of relay US, which may then be assumed to operate, the circuit of relay LOL would be completed over the No. 2 contacts of relay HS (not operating) to ground on the No. 4 contacts of relay TS; or if relay HS operates and relay TS does not, then the circuit of relay LOL would be completed over the No. 2 contacts of relay TS to ground on the No. 4 contacts of relay US. Now depending upon which of the relays HS, TS, and US is not operated, low resistance battery is applied to the appropriate one of the numerical conductors as extended to the contacts of the operated relay LOL. Thus, continuing with the assumption that relay US has not operated, low resistance battery may be traced from the No. 3 back contacts of relay L01 and resistance R2, No. 7 back contacts of relay US, No. 5 front contact of relay TS, assumed to be operated, conductor 52, to the intermediate group of ten contact pairs T1-T0 of relay LOL. On the other hand, if relay TS does not operate but relay US does, said resistance battery may be traced over the No. 6 back contacts of relay TS, No. 5 front contacts of relay NS, conductor 50, to the lowest group of ten contact pairs U1-U0 of relay LOL. If relay HS does not operate but relay US does, said resistance battery may be traced over the No. 5 back contacts of relay HS, No. 6 front contacts of relay US, conductor 50, to the lowermost group of ten contact pairs U1-U0 of relay LOL.

The above troubles have been assumed to be single ones, that is, only one of the numerical leads being open. It may be that a combination of such leads will be open. Let it be assumed, as an example, that relays US and TS both fail to operate. A circuit may then be traced from said resistance battery R2, No. 7 back contacts of relay US, No. 5 back contacts of relay TS, conductor 51 to the uppermost group of contact pairs H1-H0 of relay LOL. If relays US and HS fail to operate, the aforesaid resistance battery circuit may be traced through the No. 5 back contacts of relay HS, No. 6 back contacts of relay US, conductor 52 to contact pairs T1-T0 of relay LOL. If relay TS and HS fail to operate, the previously traced circuit effective when relay TS alone fails to operate will again prevail to extend said resistance battery to contact pairs U1-U0 of relay LOL. It will be seen that in the event of an open number lead, resistance battery is extended to the lowest group in the order of number leads appearing on contacts of relay LOL which has a number lead closed in it. The employment of the closed number lead in the lowest available group in the order will tend to restrict the lockout to the particular line involved in the trouble in the event of simultaneous calls by more than one line.

The above resistance battery is now applied over the appropriate numerical conductor to the lower winding of the relay L0 of the line circuit over a path already traced to the No. 1 contacts of relay U1 (for example) arising from failure of either relay TS or HS, or both, to operate, causing said relay L0 to operate since the current through low resistance battery at the back contact of relay L01 will be sufficient. Relay L0, in operating, makes its No. 4 front contact before breaking its No. 3 back contact and locks itself with both windings in series over a path which may be traced from battery through its upper winding, No. 4 front contacts, No. 2 contacts of relay L, lower winding of relay L0 to ground. Since relay L is held over the line loop, then, so long as the calling station maintains the calling condition, relay L0 remains locked over the contacts of relay L and relay L remains operated over the line loop. Since relay L0 is operated, the line circuit is disconnected from the numerical leads while ground is applied over the No. 1 front contacts of said relay to conductor N-015, the effect of which is to cause the line to test busy as will be shown hereinafter.

It will be observed that during the time that resistance battery is applied to the numerical leads from the No. 3 back contacts of relay L01, resistance battery for the numerical register relays is shunted out of circuit. This, however, will not cause the numerical register relay or relays H-, T-, U-, which have operated in response to the initiation of the call to release because, as will be shown below, if the marker is connected to the line group circuit at this time, relay NRH will be operated and locking ground will be supplied to said relays from the No. 1 contacts of relay NRH over conductor 7, which is connected to the No. 1 locking contacts of each of said relays. If the line group circuit is not connected to the marker, relay NRH will not be operated, but since relay LOL operates, the latter will supply ground to the locking conductor 7 over its No. 1 front contacts, thereby preventing the numerical register relays from releasing.

Referring to Fig. 24, one of the figures of the sender, it will be observed that conductor 1 from the armature of the No. 5 contacts of relay ST of the line group circuit extends to the No. 2 contacts of relay MS1 in the first sender. There is an identical relay MS- (MS1-MSn) in each of the senders and the conductor is extended serially through the No. 2 contacts of each of the relays MS- up to and including relay MSn of the last sender, whence it extends back over conductor 2 to the back contact of the No. 6 contact set of relay ST of the line group circuit, the armature of which is connected to the winding of said relay. Conductor 3 is connected to the No. 5 back contacts of relay ST and to the No. 6 front contacts thereof and the contacts of the relay are so adjusted that when it operates, the armature of the No. 6 contacts will make with its associated front contact before the No. 5 contacts are opened. Conductor 3 further extends to the No. 3 contacts of the marker release relay RLSE (Fig. 14) and thence to the winding of the marker start relay MST. Conductor 2, however, is grounded via the winding of relay ST through the chain path extending over the No. 3 contacts of relays US, TS and HS, respectively, conductor 4, No. 1 contacts of relay LOT, conductor 5, No. 2 contacts of relay SB, conductor 6, No. 1 back contacts of relay LOL to ground. Consequently, if relay MS- of every sender is normal, which means that no sender is using the marker for establishing the terminating part of a connection, a circuit is completed between relays ST and MST extending from ground to conductor 2 as traced, No. 2 contacts of relays MS1-MSn, conductor 1, No. 5 contacts of relay ST, conductor 3, No. 3 contacts of relay RLSE, winding of relay MST to battery, causing both of said relays to operate, relay ST locking to relay MST over the No. 6 front contacts. On the other hand, if the marker is tied up with a sender, relay MS- of the sender so connected with the marker will be operated in series with relay MST and relay ST will be locked out. In fact, relay ST is a part of the chain lock-out circuit which includes relays MS1-MSn, and any one relay in the chain obtaining operating battery through the winding of relay MST locks out all the others. Hence when ground is applied to the winding of relay ST, the circuit thereof will be completed in series with relay MST provided no relay MS- is operated, which is to say, if the marker is not then occupied with a sender in completing a terminating connection. If the marker is so occupied, the line group circuit will wait until the marker is through, at which time the circuit between relays MST and MS- is opened, the chain is reestablished and the circuit between relays ST and MST then completed as above described.

On an originating call, the marker will become connected with the line group circuit provided a sender is available for connection with the marker. The marker is used twice on every call, the first time for extending the calling line to a link and a sender under the direction of the line group circuit, and the second time for extending the link to the called line under the direction of or from information supplied by the sender. The function of the chain circuit above described relates primarily to the second use of the marker and not to the first one with which we are now concerned, and it is obvious that, with respect to the latter, no function is served in causing the line group circuit to seize the marker unless a sender is available. In the event, therefore, that no sender is available for connection with the marker, the latter is made aware of this fact by the operation of the sender group busy relays SGB- therein of which one is provided in the marker for each group of senders in the office, each of which groups, when busy, causes the operation of its associated relay SGB-. Referring to Fig. 49, it will be noted that two groups of senders are provided by way of illustration; namely sender group 1 and sender group 2. Hence the marker is provided with relays SGB-1 and SGB-2, the first relay being connected to conductor SGCH1 which has ground applied to it when all the senders of group 1 are busy and the second is connected to conductor SGCH2 which has ground applied to it when all the senders of group 2 are busy. Whence it follows that if the senders in both groups are busy, relays SGB-1 and SGB-2 will be operated, and a circuit will then be completed for relay SB of the line group circuit, which circuit may be traced from ground on the No. 1 contacts of relay SGB-1, No. 1 contacts of relay SGB-2, conductor SB1, winding of relay SB to battery. Relay SB operates and, at its No. 2 contacts, opens the circuit of relay ST thereby preventing said circuit from making an attempt to seize the marker. A circuit is also closed for relay L01 which extends from ground on the No. 6 back contacts of relay TRT1, conductor 19, No. 1 contacts of relay SUP, which is now operated, No. 1 contacts of relay SB, No. 3 contacts of relay NRH, also now operated, No. 2 contacts of relay SUP, lower winding of relay L01 to battery. Relay L01 operates and closes a circuit for relay LOL which extends from resistance battery through the No. 7 back contact of relay HT, winding of relay LOL, conductor 49, No. 1 contacts of relay L01 to ground. At its No. 3 front contacts, relay L01 transfers resistance battery to conductor 50 and, thereover, to the units contacts U1–U0 of relay LOL, one pair of which traces back (as already described) to the lower winding of relay L0 to operate the same and lock out the calling line as already described.

Assuming, however, that the marker is normal, that a sender is available and that the above-traced series circuit between relay ST of the line group circuit and relay MST of the marker is closed, then, when relay MST operates, an obvious circuit is closed for relay RDY, which is both slow-operate and slow-release, and when this relay operates, it extends ground from the contacts of relay MST over its own No. 2 contacts to the off-normal ground conductor ONG, and completes a charging circuit for condenser C2 which extends from battery through resistance R1, No. 2 back contact of relay RTA, No. 1 front contact of relay RDY, condenser C2, to ground. Relay TM which is bridged across condenser C2 is for the purpose of timing out the marker and will operate after the charge in the condenser has reached a value predetermined by its capacity and the ohmic value of resistor R1 in the charging path. Relay RDY further applies ground to conductor MKRY over the contacts of relay MST, No. 3 contacts of relay RDY, No. 2 contacts of relay RLSE, conductor MKRY, thence over the No. 6 back contacts of relay HT, conductor 11', the No. 4 contacts of relay ST, conductor 12, winding of relay ILC to battery thereby operating the latter relay. Relay ST, over its No. 1 front contacts, applies ground to conductor 400, which being in parallel with the winding of relay NRH causes the latter to operate and complete, over its No. 1 contacts and conductor 7, the locking circuit for relays H0, T1 and U5, respectively, as above described. If, therefore, connection is effected between the line group circuit and the marker, the identification of the numerical digits it has been seized for establishing an In or originating call.

It will be observed that when relay H0 operates it connects ground over its Nos. 6 and 7 contacts to the Nos. 9–12 armatures of relay ILC; that when relay T1 operates it connects ground over its No. 6 contacts to the No. 8 armature of relay ILC and that when relay U5 (not shown) operates it applies ground to the No. 1 and No. 4 contacts of relay ILC. It will be further observed that relay ILC has 12 pairs of contacts, armatures 1–4 of which are selectively paralleled singly or in combination to the contact group 5 (or 5 and 6) of relays U1–U0, which are grounded when the corresponding relay in this group is operated to indicate, by the code given below, the units digit of the calling line number; armatures 5–8 are selectively paralleled singly or in combination to the contact group 6 (or 6 and 7) of relays T1–T0 which are grounded when the corresponding relay in this group is operated to indicate, by the code given below, the tens digit of the calling line number, while armatures 9–12 are selectively paralleled singly or in combination to the contact group 6 (or 6 and 7) of relays H1–H0 which are grounded when the corresponding relay in this group is operated to indicate, by the code given below, the hundreds digit of the calling line number. Now when relay ILC operates the ground applied to one or more of the armatures 1–4 by the operated relay U– is applied to one or more of four conductors $Ua'-Ud'$, the ground applied to the armatures 5–8 is applied to one or more of the four conductors $Ta'-Td'$, while the ground applied to armatures 9–12 is applied to one or more of four conductors $Ha'-Hd'$, in each case in accordance with the digit represented by each of the operated relays in the groups of relays U1–U0, T1–T0 and H1–H0. Since one of ten different indications is to be transmitted for each one of the hundreds, tens and units digits of a line number, the above groups of conductors are grounded according to a four point code by each of the relays in the groups of relays H0–H1, T0–T1 and U0–U1 to designate different values of the hundreds, tens and units digits, respectively, as follows:

| Relay | Hundreds Digit | Conductors Grounded | Relay | Tens Digit | Conductors Grounded | Relay | Units Digit | Conductors Grounded |
|---|---|---|---|---|---|---|---|---|
| H1 | 1 | $Ha'$ | T1 | 1 | $Ta'$ | U1 | 1 | $Ua'$ |
| H2 | 2 | $Hb'$ | T2 | 2 | $Tb'$ | U2 | 2 | $Ub'$ |
| H3 | 3 | $Hc'$ | T3 | 3 | $Tc'$ | U3 | 3 | $Uc'$ |
| H4 | 4 | $Hd'$ | T4 | 4 | $Td'$ | U4 | 4 | $Ud'$ |
| H5 | 5 | $Ha'+Hd'$ | T5 | 5 | $Ta'+Td'$ | U5 | 5 | $Ua'+Ud'$ |
| H6 | 6 | $Hb'+Hd'$ | T6 | 6 | $Tb'+Td'$ | U6 | 6 | $Ub'+Ud'$ |
| H7 | 7 | $Hc'+Hd'$ | T7 | 7 | $Tc'+Td'$ | U7 | 7 | $Uc'+Ud'$ |
| H8 | 8 | $Ha'+Hc'+Hd'$ | T8 | 8 | $Ta'+Tc'+Td'$ | U8 | 8 | $Ua'+Uc'+Ud'$ |
| H9 | 9 | $Hb'+Hc'+Hd'$ | T9 | 9 | $Tb'+Tc'+Td'$ | U9 | 9 | $Ub'+Uc'+Ud'$ |
| H0 | 0 | $Ha'+Hb'+Hc'+Hd'$ | T0 | 0 | $Ta'+Tb'+Tc'+Td'$ | U0 | 0 | $Ua'+Ub'+Uc'+Ud'$ | of the calling line number 015 as registered by the operation of relay H0, T1 and U5 is held locked for future functions. On the other hand, if relay NRH does not operate because of the failure to operate relay ST due to a sender being unavailable, locking ground for these relays is supplied only by the lockout relay LOL during the time that it is operated to complete a circuit to operate relay L0 of the line circuit, after which the line-identifying relays H0, T1 and U5 release.

The ground on conductor 400 further completes a circuit for relays IN and IN1 of the marker and their operation indicates to the marker that To each conductor of the three groups of calling line code conductors $Ha'-Hd'$, $Ta'-Td'$ and $Ua'-Ud'$ is connected a "point" relay as shown in Fig. 7. In the hundreds group of conductors $Ha'-Hd'$, relay PHa is connected to conductor $Ha'$, relay PHb is connected to conductor $Hb'$, relay PHc is connected to conductor $Hc'$ and relay PHd to conductor $Hd'$. In a similar manner, the four relays PTa–PTd are connected to the four tens conductors $Ta'-Td'$, respectively, and the four relays PUa–PUd are connected to the four units conductors $Ua'-Ud'$. Consequently when relay ILC operates, the code conductors are not only selectively grounded for transmitting the code of the calling line number to the sender as described hereinafter, but the point relay (or relays) connected to the grounded conductors will be operated over obvious circuits. Thus we have assumed that the calling line number is 015. Consequently upon the operation of relay ILC, conductors Ha', Hb', Hc', Hd', Ta', Ua' and Ud' are grounded and obvious circuits are completed for relays PHa, PHb, PHc, PHd, PTa, PUa and PUd over said conductors. These relays operate and, depending upon the hundreds and tens digit, respectively, of the calling line number, the operated relay (or relays) in the hundreds group of relays PHa–PHd will complete a circuit to a relay in a group of ten relays PH1–PH0 while the operated relay (or relays) in the tens group of relays PTa–PTd will complete a circuit to a relay in a group of ten relays PT1–PT0. Since for the assumed line number 015, relays PHa–PHd were all operated for the hundreds digit and relay PTa was operated for the tens digit, the former relays complete a circuit path for relay PH1 which extends from ground on the front contacts of relay PHd, No. 2 front contacts of relay PHc, No. 3 front contacts of relay PHb, No. 4 front contacts of relay PHa, winding of relay PH0 to battery; the latter relay PTa completes a circuit path for relay PT1 which extends from ground on the back contacts of relay PTd, No. 1 back contacts of relay PTc, No. 1 back contacts of relay PTb, No. 1 contacts of relay PTa, winding of relay PT1 to battery. Both of these relays operate.

The relay (or relays) of the units digit group of ten relays PUa–PUd which operates in response to the grounding of the appropriate one (or ones) of units code conductors Ua'–Ud' completes two paths through the upper and lower contacts sets of the entire relay group and through the particular relay PH– and the particular relay PT– which have been operated by the hundred group relays PHa–PHd and the tens group relays PTa–PTd, respectively. The path closed through the upper contact sets of the units relays PUa–PUd (and through an upper set of contacts on operated relays PH– and PT–) indicates the class of service to which the calling line is entitled while the path closed through the lower contact sets of said units relays (and through a lower set of contacts in the operated relays PH– and PT–) indicates the hold magnet of the calling line on the primary line switch. For a 1000 line office, each of the relays in the group of ten relays PH1–PH0 is provided with a hundred pairs of upper contacts and a hundred pairs of lower contacts (when the contact load cannot be carried by one relay, then as many additional relays can be provided in parallel as will be necessary to supply the required contact pairs). Both upper and lower pairs of contacts on each of the relays PH1–PH0 are each divided into ten groups of ten contact pairs each and the corresponding armatures on each relay are similarly connected together to form ten groups of ten conductors each. These groups of conductors are, in turn, connected to stationary contacts on one of the relays PT1–PT0 in the proper numerical order, the conductors in the group connected to the upper armatures of relays PH1–PH0 being connected to the stationary contacts of the upper ten contact pairs of relays PT1–PT0 and the conductors in the group connected to the lower armatures of the relays PH1–PH0 being connected to the lower ten contact pairs of relays PT1–PT0. Thus the No. 111 armatures of the outermost upper group of ten contact pairs on relays PH1–PH0 are connected to the stationary contact of contact pair No. 1 of the upper group of the ten contact pair 1–0 of relay PT1, and the No. 112 armatures (not shown) of said upper group of ten contact pairs on relay PH1 being connected to the stationary contact of contact pair No. 2 (not shown) of said upper group of ten contact pairs 1–0 of relay PT1. All other armatures 113–119 of said outermost group of ten contact pairs 111–110 of relays PH1–PH0 are then connected to stationary contacts 3–9, respectively, of the upper group of contact pairs 1–0 of relay PT1. In the same way, the armatures 101–100 of the lowest group of ten armatures on the upper side of relays PH1–PH0 are similarly connected in the same order as above to the stationary contacts of the upper group of ten contact pairs of relay PT0, while the armatures of the other eight intermediate groups of ten contact pairs on the upper side of relays PH2–PH9 (not shown) are connected, respectively, to the stationary contacts of the upper groups of ten contact pairs on each of the intermediate relays PT2–PT9, which also are not shown.

The one hundred upper stationary contacts on each of the relays PH1–PH0 are individually extended by conductors to the punching block C in Fig. 8, making one thousand conductors in all, one individual to each line in the office, and each of these conductors is then cross connected to the winding of a relay which designates the primary switch upon which the line appears and another relay in series with said relay that designates the class of service to which the line is entitled. Depending, now, upon which of the unit relay or relays PUa–PUd operated, upon which relay in the group of relays PT1–PT0 was operated by the tens group relays PTa–PTb and upon which relay in the group of relays PH1–PH0 was operated by the hundreds group of relays PHa–PHd, one of the thousand conductors extending from the upper stationary contacts of relays PH1–PH0 will be grounded and a primary designation relay and the "class" relay connected in series therewith will be caused to operate. Thus for the assumed calling line 015, relays PUa and PUd, PT1 and PH0 have been operated. Consequently a ground path is completed which extends from ground on conductor ONG applied thereto by the operation of relay RDY of the marker, No. 2 back contacts of relay IC, upper No. 1 front contacts of relay PUd, upper No. 2 back contacts of relay PUc, upper No. 2 back contacts of relay PUc, upper No. 2 front contacts of relay PUd, upper No. 5 contacts of relay PT1 No. 5 contacts of the uppermost group of ten contact pairs 1–0 of relay PH1, to conductor CO15 extending to the punching block C.

The lower group of ten contact pairs on each of the ten relays PT1–PT0 and the lower group of one hundred contact pairs on each of the ten relays PH1–PH0 are interwired in exactly the same way as the upper groups except for the fact that the armatures of the relays PT1–PT0 are connected to the lower stationary contacts of relay PUa while the hundred stationary conductors in each of the relays PH1–PH0 are extended by conductors to the punching block N. The thousand conductors thus connected to this punching block, like the thousand conductors connected to the punching block C, are individual to the thousand lines of the office, and each of them is cross connected, via conductor "N"– individual to the line on the other side of the punching block N, to the winding of the hold magnet PHOM of said line. Consequently, when the appropriate relays in the groups of relays PT1–PT0 and PH1–PH0 have operated for a calling line as above described, not only is one conductor individual to the line extending to punching block C grounded over the upper sets of contacts of relays PUa–PUd and an operated relay in each of the groups of relays PT1–PT0 and PH1–PH0, but the companion conductor, also individual to the line and extending to punching block N, is completed to battery (as will be described) over the lower sets of contacts of relays PUa–PUd and the operated relay in each of the groups of relays PT1–PT0 and PH1–PH0. For the calling line 015, this path is completed from battery through the upper winding of relay NBSY, back contacts of relay BT, No. 1 back contacts of relay COMPT, No. 4 back contacts of relay IC, lower No. 1 front contacts of relay PUd, lower No. 1 back contacts of relay PUc, lower No. 1 back contacts of relay PUc, lower No. 2 back contacts of relay PUb, lower No. 3 front contacts of relay PUa, lower No. 5 contacts of relay PT1, No. 015 contacts in the lower group of contact pairs on relay PH0, to the terminal on the punching block N, whence cross connection is made to conductor "N–015."

Thus each line is provided with an individual terminal on punching block N and another individual terminal on punching block C, there being 1000 terminals in each block to accommodate all the lines and trunks in the office. A terminal in each block corresponding to the line calling is activated when said line calls, the terminal on punching block N being cross connected to the hold magnet PHOM of the calling line, the terminal on the punching block C being cross connected to one of a plurality of primary designation relays PDA1, PDA2, PDA3 a set of three of which is provided for each primary switch and through said relays to a relay that indicates the class of service to which the line is entitled as will be presently described.

In the present embodiment of the invention provision is made for seven classes of service, each being represented by a relay. Thus code ringing lines are represented by relay CR: (2) test desk service lines are represented by relay TD; (3) interoffice trunks are represented by relay IOF'; (4) cut-through office trunks are represented by relay CT; (5) coin lines are represented by relay PAY; (6) toll stations are represented by relay TS and (7) official or free service trunks or lines are represented by relay FS. Each of these relays is in series with one of the windings of the primary designation relays PDA1–PDA3 for switch A, PDB1–PDB3 for switch B, etc., so that, on each call, a primary designation relay is operated to furnish the marker with information as to the primary switch upon which the line appears and, also, a class relay in series therewith is operated to furnish information to the sender over conductors TD', IOF', etc., as to the class of the originating call except that code ringing lines need not so classify themselves. And since ground is applied to the conductor individual to the line at the class terminal punching C, the cross connection of said conductor to the appropriate winding of one of the primary designation relays PDA1 or PDA2 or PDA3 (if the calling line is located on switch A) or relays PDB1 or PDB2 or PDB3 (not shown if the calling line is located on switch B), results in the completion of a circuit therethrough and through the winding of one of the class relays serially connected therewith to battery. Thus if the calling line 0154 is a code ringing line (as assumed), its conductor CO15 on punching block C is cross connected to the upper winding of relay PDB1 which is in series with relay CR and battery. Relays PDB1 and CR will both operate, the former applying a ground to conductor PDB and the latter applying ground via conductor 13, the middle winding of relay ICDI to battery and, in parallel therewith over the No. 1 contacts of relay NBSY, the winding of relay BT to battery.

Relay BT, which is slightly slow to operate to insure the operation of relay NBSY if a busy line is encountered on an outgoing call as explained hereinafter, operates over the circuit established from the contacts of relay CR or the lower contacts of any other of the class relays which may have been operated, and extends the individual line conductor from punching block N, previously traced to the armature of relay BT, over the front contacts of said relay, conductor HOP to the front contact of relay SIC of the marker. As will be shown subsequently, when the marker has set a path to the selected sender, relay SIC will be operated to extend ground to conductor HOP whereby the hold magnet of the calling line will be operated.

On the other hand, if the calling line had been a coin line, its conductor on punching block C would be cross connected to the upper winding of relay PDB3 (or relay PDA3) which is in series with relay PAY and battery. Relays PDB3 and PAY would then operate, the former applying ground to conductor PDB and the latter to the windings of relay ICDI and BT (as described for relay CR) and to conductor PAY' which extends into the sender to inform the latter that the call is a coin call. Note that in the case of code ringing lines, as evidenced by the operation of relay CR, no signal is transmitted to the sender, the latter circuit being so arranged that, in the absence of a signal, it will be understand the call to be a code ringing call. For all the other six classes of service, however, the sender must be notified and, accordingly, a conductor, grounded by the operation of the involved class of service relay, extends into the sender to supply the necessary information. However, even in the case of code ringing lines, relay CR, if it is desired, may also be made to actuate a class conductor extending to a corresponding relay in the sender to assure classification of the call, and the failure of one of the class relays (in the sender) to operate can then be made to lock out the line as explained hereinafter.

Ground on conductor PDB (or conductor PDA) serves to furnish the marker with information as to the primary switch upon which the calling line appears. There is a relay in the marker for each of the primary switches, relay PA for primary switch A, relay PB for primary switch PB, etc., and conductor PDA is connected to the left winding of relay PA while conductor PDB is connected to the left winding of relay PB, etc. Calling line 015 is shown located on primary switch B; its class conductor CO15 on punching block C is connected to the upper winding of relay PDB1 (not shown) in consequence of which this relay as well as the series class relay CR operates, the former applying ground to conductor PDB and completing thereby the circuit to the left winding of relay PB causing the operation thereof and its locking over its right winding and right innermost contacts, conductor RTG, No. 3 contacts of relay RTA, to ground on conductor ONG. If the primary designation relay operated had been relay PDAI instead of relay PDBI and ground had been applied to conductor PDA, indicating thereby that the calling line was located on a primary switch A instead of primary switch B, then relay PA would have been operated by ground on conductor PDA over an obvious path and then locked over its right winding and right innermost contacts to ground on conductor RTG.

Thus on each call, a primary designation relay in the marker is operated to furnish the marker with information as to the primary switch upon which the calling line appears and, also (unless a local code ringing line), a class relay is operated to furnish information to the sender over conductors TD', IOF', etc., as to the class of the originating call.

In the meanwhile, the operation of relay PB, indicating that the calling line is located in primary switch B, closes an obvious circuit for relay PRT which, being slow to operate, comes up after an interval to close an obvious circuit for relay PBSY which operates to prepare a path to dismiss the marker in the event that an interlink is not available as explained hereinafter. Relay PB further extends, through a first group of ten contacts designated 1-0 immediately to the right of the locking contact, the sleeve conductors of the ten horizontal paths out of the primary switch B, via the corresponding conductors PST1-PST0, to a group of primary-secondary test relays PRT1-PRT0 through the back contacts of relay PRT before this latter relay has had time to operate. Since all busy outlets from the primary switch B will have ground applied to their respective sleeves by virtue of the fact that the corresponding hold magnets are operated thereover, those test relays PRT- which are connected to busy sleeve circuits operate over their respective lower windings and lock over their respective upper windings and No. 2 contacts to ground on conductor TRG. Thus, for example, if outlet I on the primary switch B is busy, ground will be connected to its sleeve conductor SL (as shown hereinafter) and a circuit will be completed for relay PRT1 over a path which extends from ground on said sleeve conductor SL, conductor PST1, No. 1 contacts of the first group of ten contact sets adjacent the locking contact of relay PB, No. 1 contacts of relay PRT, lower winding of relay PRT1 to battery. Relay PRT1 operates in this circuit and then locks over its upper winding and No. 2 contacts to ground on conductor RTG. Similarly with all other busy outlets from primary switch B, each operating a corresponding relay PRT- over a circuit identical to that of relay PRT1 and easily traceable over a corresponding path to the required relay PRT-.

As already stated, the operation of relay PB completes an obvious circuit for relay PRT which, being slow-to-operate, opens the above test circuits after an interval which is sufficient to permit the operation of whatever relays PRT-PRT0 are connected to busy outlets from primary switch B. If all the relays PRT-PRT0 operate, it indicates that all outlets from the primary switch B are busy and, therefore, that the call cannot be served. Under the circumstances of an all busy outlet condition from primary switch B, a chain circuit is completed which extends from ground, serially through the No. 3 contacts of all the relays PRT1-PRT0, back contacts of relay OTRK, conductor 14, upper winding of relay MBSY to battery. Relay MBSY operates and completes a circuit for relay RLSE which extends from ground on conductor ONG, No. 1 front contacts of relay MBSY, contacts of relay BDLY, upper winding of relay RLSE to battery. Relay RLSE operates, locks up to ground on the No. 4 contacts of relay RDY and its own No. 1 contacts, opens conductor MKRY to the line group circuit and opens the circuit of relay MST which releases, disconnects ground from conductor ONG to cause thereby the release of all relays locked thereto, and opens the circuit of relay RDY which releases after an interval to open the locking circuit of relay RLSE which releases, and to complete over its No. 1 back contacts a discharge path for condenser C2 via grounded resistor R3 in order to drain off the charge from said condenser which had been accumulating thereon to permit the operation of relay TM after a predetermined interval sufficient to allow complete operation and dismissal of the marker as previously mentioned. The interval resulting from the slow release of relay RLSE assures that all relays locked to conductor ONG and RTG will reach normal before the marker is made available for another call.

The operation of relay RLSE further opens the circuit of relay ST in the line group circuit which releases, in consequence of which relays NRH and ILC therein release also, the former permitting the locked up line number relays H0, T1 and U5 to release, and the latter releasing the point relays. Note, however, that relay NRH is slow release and that, at the time relay ST releases, relay NRH is up. Consequently, in the interval before relay NRH releases, a circuit is closed for relay L0I which extends from ground on the No. 1 back contacts of relay ST, No. 3 contacts of relay NRH, No. 2 contacts of relay SUP, lower winding of relay L0I to battery. This relay operates and completes a previously described circuit for relay LOL, the operation of which then causes low resistance battery to be applied to the "U-" conductor of the calling line, causing relay L0 thereof to operate and lock out the line and further dismiss the line group circuit.

After the test of the outlets out of the primary, as many relays PRT1-PRT0 will be down as there are free outlets therefrom. The windings of the ten select magnets on each of the secondary switches A and B which control the extension of horizontal outlets 1-0 from primary switches A and B extending thereto, are carried to the ten contact sets 1-0 of relays PA and PB, respectively, which are immediately to the right of the ten contact sets 1-0 on said relays reserved to the sleeve conductors of said outlets, as before described, and the armatures of said former contact sets are carried to the No. 1 back contacts of the correspondingly designated test relays PRT1-PRT0. The armatures of the contact pairs designated 21-30 on relays PA and PB are connected, respectively, to the No. 1 armatures of the test relays PRT1-PRT0 so that with, say, relay PB operated and the connections as shown, ground is extended from conductor RTG, No. 11 contacts of relay PRT, terminal punching T for relay PB, No. 21 contacts of relay PB (or relay PA if the call originates on a line located on primary switch frame A) to the armature of the No. 1 contacts on relay PRT0. If relay PRT0 is not operated, indicating thereby that outlet O from primary switch B is available, said ground is further extended over the No. 1 back contacts of relay PRT0, No. 0 contacts (middle group) of relay PB, conductor PSS0, to the winding of select magnet SSEL0 on secondary switch B of outlet No. 0 of primary switch B. Should relay PRT0 be operated to indicate thereby that horizontal outlet 0 between primary switch B and secondary switch B is busy, then the above circuit is extended via the No. 1 front contacts of relay PRT0, terminals 1 and 22 of the punching T (for relay PB No. 22 contacts of relay PB, to the No. 1 armature of relay PRT9 which, if normal, to indicate the availability of outlet No. 9 between primary switch B and secondary switch B, completes the circuit to the winding of select magnet SSEL9 (not shown) for secondary switch B.

If there are two secondary switches, as shown, the paths from each primary switch will be divided into two groups, five paths to secondary switch B and five to secondary switch A. The aforementioned circuit arrangement will effect the operation of the first idle select magnet of the five in secondary switch B for paths from primary switch B, said selection and operation being under the control of relays PRT6 to PRT0, inclusive, in connection with the cross connection in the punching block T. Relays PRT1 to PRT5 simultaneously control the selection and operation of a select magnet on secondary switch A for a path from primary switch B. To effect this, ground from punching T is cross connected to punching 25, whence it extends through closed contacts of relay PB, back contacts of relay PRT5 (not shown), contacts of relay PB to actuate the corresponding select magnet of secondary switch A. If this path is busy, a circuit will be extended through a front contact of relay PRT5 through a chain circuit similar to that described with respect to the operation of a select magnet in secondary switch B, a back contact of relay PRT4 to operate the corresponding select magnet. If that path is also busy, the operating circuit will be extended to contacts in the first unoperated relay in the group of relays PRT5 to PRT1 and thence to the corresponding select magnet. That is, the ten outlets from primary switch B are "fanned out" between secondary switches B and A while the ten outlets from primary switch A are similarly fanned out between said two secondary switches. (See Fig. 49.) If the first relay PRT— is operated for each secondary switch, indicating that the correlated primary outlet is busy, then the circuit is extended on to the first idle relay in the test relay groups PRT— and thence to the winding of the appropriate secondary select magnet SSEL— on both secondary switches B and A of the correlated available outlet on primary switch B. If, however, there is no idle path from primary switch B to one of the secondaries, a select magnet will be operated on only the other secondary switch.

It will be seen, therefore, that by appropriate cross connections at the punching block T of relay PA and relay PB, one and only one select magnet on each secondary switch will be operated on each call except, of course, where there are no paths from the particular primary switch to one or the other of the secondary switches. This will permit any desired distribution of paths between the primary and the secondary switches, which is necessary in small offices where the number of secondary outlets is not evenly divisible into the ten paths out of the primary switch. It is also to be recognized that cross-connections obviously may be provided to ground conductors PST— for corresponding unequipped paths.

When the select magnet SEL— of a secondary outlet has been operated in the manner above described, said magnet closes a circuit to relay SAA or SAB via conductor 18 or 17, respectively, depending upon whether the selected primary outlet appears on the secondary switch A or secondary switch B, respectively, and indicates to the marker in a manner to be described, that a path is available from the calling primary switch to the secondary switch designated by the relay SAA or SAB whichever is operated, or both.

Having thus selected one or more outlets from the primary to the secondary switch or switches, the next extensions of the connection is to one of a plurality of vertical outlets extending between the selected secondary switch and an interlink switch or frame.

The marker is provided with facilities to distribute traffic as evenly as possible through the interlinks, the links and sender groups in order to prevent any particular unit from being overworked. The facilities provided comprise ten numerical order relays OR1–OR0, the four sequence companion relays SQ1–SQ4 arranged in a counting chain, and relays MA and MB which function both the numerical relays OR1–OR0 and the sequence relays SQ1–SQ4. Each time ground is applied to conductor RTG, indicating a call to be served or a retest on the part of the marker, an obvious circuit is closed for relay MA which, upon operating, completes an obvious circuit for relay MB which is slow-release. When ground is removed from conductor RTG upon the completion of the marker functions either as a call service or as a retest, relay MA releases and since relay MB is slow to release, an impulse circuit is completed for relay OR1 which extends from ground on the back contacts of relay MA, contacts of relay MB, No. 2 back contacts of relay SQ3, serially through the No. 2 back contacts of relays SQ2 and SQ1, respectively, winding of relay OR1 to battery. Relay OR1 operates and closes its No. 2 contacts over which it locks through the winding of relay SQ1 to ground at the No. 1 contacts of relay SQ2. Relay SQ1, however, being short-circuited by operating ground so long as relay MB remains operated, does not operate until after the latter relay releases, whereupon relay SQ1 operates, and remains locked in series with relay OR1 to ground on the No. 1 contacts of relay SQ2. Relay OR1, upon operating, closes its lower sets of contacts and thereby establishes operating paths from relay IN1, which has operated in the meanwhile, as above described to circuits concerned with the selection of a link, interlink switch, sender group and sender therein determined by relay OR1 as described hereinafter.

On the second seizure of the marker (for a second call service or retest), relays MA and MB are again operated as described, but since relays OR1 and SQ1 are locked from the previous use of the marker, a path is now established to the winding of relay OR2 which extends from ground on the back contacts of relay MA and the front contacts of relay MB, No. 2 back contacts of relay SQ3, No. 2 back contacts of relay SQ2, No. 2 front contacts of relay SQ1, No. 1 contacts of relay OR1, winding of relay OR2 to battery. Relay OR2 operates, locks over its No. 2 contacts in series with the winding of relay SQ2 to the No. 1 contacts of relay SQ3, relay SQ2 being short-circuited by operating ground. After relay MB releases, relay SQ2 operates, and unlocks relays SQ1 and OR1, the latter opening the paths for the link, interlink etc. accessible over its lower sets of contacts, while relay OR2 closes similar paths over its own lower set of contacts for another link, another interlink, another sender group and/or another sender accessible thereover.

On the third seizure or retest of the marker, the impulse circuit is closed through to relay OR3 over a path extending from ground on the contacts of relay MB, No. 2 back contacts of relay SQ3, No. 2 front contacts of relay SQ2, No. 1 contacts of relay OR2, winding of relay OR3 to battery, operating said relay OR3 and causing it to lock over its No. 2 contacts serially with the winding of relay SQ3 to ground on the No. 1 contacts of relay SQ1 which is now released. The operation of relay SQ3 (upon the release of relay MB) unlocks relays SQ2 and OR2 causing them both to release. Relay OR3 closes the various starting paths to the link, interlink etc. controlled over its own lower contact sets.

On the fourth seizure or retest of the marker, the impulse circuit is closed to relay OR4 through the No. 2 front contacts of relay SQ3, No. 1 contacts of relay OR3 to the winding of relay OR4, causing said latter relay to operate and then lock over its No. 2 front contacts serially with the winding of relay SQ1 to ground on the No. 1 contacts of relay SQ2, the operation of relay SQ1 on the termination of the impulse unlocking relays SQ3 and OR3. Relay OR4 then connects the marker to the link, interlink etc. accessible over its contacts.

On the fifth seizure or retest of the marker, the impulse circuit is completed to relay OR5 over the No. 2 back contacts of relays SQ3 and SQ2, No. 2 front contacts of relay SQ1, No. 1 contacts of relay OR4, winding of relay OR5 to battery. Relay OR5 operates and locks over its No. 2 contacts serially with the winding of relay SQ2 to ground on the No. 1 contacts of relay SQ3, and connects the marker with the link, interlink, etc. accessible over its lower contacts, relays OR4 and SQ1 releasing in consequence of the operation of relay SQ2.

In the same way, relays OR6, OR7, OR8, OR9 and OR0 operate on each successive reengagement of the marker whereby it becomes connected, in succession, to the equipment accessible over the several lower contact sets of each of said relays, thus distributing the traffic cyclically over said equipment. When, on the tenth engagement of the marker, relay OR0 operates, said relay locks over its No. 1 contacts, winding of relay SQ4 to ground on the No. 1 contacts of relay SQ1. On the previous ninth engagement, however, relay OR9 was locked in series with relay SQ3 over the contacts of relay SQ4 so that when, on the tenth engagement, relay SQ4 operates, the locking circuit of relays SQ3 and OR9 is opened at the contacts of relay SQ4, causing said relays to release. It is evident that, on the eleventh engagement of the marker, relays OR1 and SQ1 are again operated to repeat the cycle while relays SQ4 and OR0 are released by the operation of relay SQ1.

Now each order relay OR1–OR0 has five make contact pairs 3–7 the corresponding armatures of which are all multipled. The armatures of contact pairs 3–6 are connected to the armatures of the four contact pairs 2–5 of relay IN1 while the armature of contact pair 7 is connected to the back contact of relay SIC. The stationary contacts of each of the five contact pairs are brought out to punchings from which they are cross-connected in a circular chain to the respective selecting and operating circuits to which the marker must have access to service the call, and the progressive operation of the order relays each time the marker is taken into use or makes a retest has the effect of causing the marker to become connected to a different entry point in the chain for connection therethrough to the selecting and operating circuits accessible through said entry point.

For the marker to successfully service an originating call, it must have access to (1) an interlink the In verticals of which have appearances as In verticals on the secondary switch for which an idle secondary path has already been determined as available; (2) to a link in the available interlink frame; (3) to a sender group having an idle sender therein the connection of which is assured by the fact that the marker has been taken into use; and (4) to the secondary outlets of the chosen interlink.

The paths for accessibility to each of the above circuits (or groups of circuits) is controlled through the contact pairs 1–5 of relay IN1, but the particular circuit (or group of circuits) to which connection is extended whenever the marker is taken into use depends upon the order relay OR– which happens to be operated at that time since all of the above circuits (or group of circuits) are connectible to the marker in the order in which the same are distributed for connection thereto through the contact pairs 3–7 of each of the order relays.

The conductor designated "Interlink" extending between the No. 5 armature of relay IN1 and the No. 3 armatures of all the order relays is extended via the separate stationary contacts of said order relays to armatures of interlink available relays IA– individual to the interlink. If there are but two interlinks in the office (as assumed in the present embodiment of the invention) then there are but two interlink available relays IA1 and IA2 and armatures thereof these are alternately connected to each of the order relays (as shown) so that the interlinks may be alternately selected upon each seizure of the marker on originating calls.

The conductor designated "Sender group" which extends between the No. 4 armature of relay IN1 and the No. 4 armatures of all the order relays is further extended, via the stationary contacts to armatures of a sender group busy relay SGB–. There are but two sender groups used in the present embodiment of the invention so that two sender group relays are provided, namely, SGB1 and SGB2. Like the two interlinks above considered, the No. 4 stationary contacts of the order relays are wired in alternation to armatures of the two sender group busy relays, order relays OR1, OR3, OR5, OR7, and OR9 giving first choice accessibility to sender group 1 being connected to relay SGB1, while the order relays OR2, OR4, OR6, OR8 and OR0 giving first choice accessibility to sender group 2 are connected to relay SGB2. If the first choice sender group has no free senders therein, indicated by the operation of relay SGB– in a manner shortly to be described, then selection is automatically shifted to the next sender group.

Where more than two groups of senders are provided, an additional sender group busy relay is necessary for each additional group, and the order of choice may be distributed as evenly as possible among the order relays. Should the number of sender groups exceed the number of order relays, additional order relays may be provided and the circuit slightly modified to include the circular operation of the added relays.

Each group of senders preferably contains ten senders and first choice accessibility to a sender in the group determined by an operated order relay is controlled through the stationary contacts of the No. 5 contact set of that relay. First choice accessibility to sender 1 in either of the two groups, for instance, is had through order relay OR1, to sender 2 through order relay OR2, etc., so that the operation of a particular order relay not only determines the first choice of group but also the first choice of a sender in that group. Should the first choice sender be busy, indicated in a manner shortly to be described, selection is automatically shifted to the first available sender in the assigned group.

Here again the distribution of sender choices among the order relays depends upon the number of senders in a group and the number of order relays. Where there are less senders in the various groups than there are order relays, choices are repeated amongst the order relays, and where there are more senders than order relays, additional order relays may be required. In this latter case, if the number of groups is less than the number of order relays, choices are repeated among the order relays.

In the same manner, the assignment of a link in a chosen interlink depends upon the number of links which are located upon the interlink. It is assumed that each interlink has a maximum capacity of ten links. Since two interlinks are indicated, there will be twenty links, ten links to the group, and the order of choice accessibility to the individual links of the group of links on the assigned interlink depends upon the order relay which assigns said interlink. As in the case of the senders, the ten link choices are controlled by the ten order relays, a link choice being given to each order relay and controlled through the No. 6 contacts thereof. The No. 6 armatures of the order relays are multipled and connected to the conductor labeled "Link," while each of the stationary contacts of these No. 6 contact sets is connected to the armature of the No. 1 contacts on each of a group of link test relays LT1-LT0, the choice for link 1 being connected to the armature of relay LT1, that of link 2 to the armature of relay LT2, etc. Should the link groups constitute less than ten links, a corresponding number of link test relays may be omitted, and the link choices amongst the various order relays may then be repeated so as to equalize link selection upon every operation of the marker for an originating call.

As already stated, it is appreciated that there may not always be ten units in a group to be ordered. When there are a number of units not divisible into ten, they will be ordered as uniformly as possible, with some necessarily getting more and some less of their normal share of the traffic.

The various circuits accessible to the marker through the order relays and the operations controlled thereby to extend the connection will now be described.

As already mentioned, the senders in the present embodiment of the invention are divided into two groups of ten senders to the group, and in the marker each sender group is designated by a sender group busy relay SGB-. There is also provided, for each sender group, a sender group assignment relay SGA- and since there are two groups of senders there will be a relay SGA1 for sender group 1 and a relay SGA2 for sender group 2. The sender group busy relay SGB- is operated by a series chain circuit through all the senders in the associated group, when busy, and results in the application of ground on conductor SGCH1 (for sender group 1) whereby the sender group busy relay SGB1 will operate to indicate to the marker that all senders in that particular group are busy, the same indication being given for sender group 2 by the operation of relay SGB2 through the serial chain completed by all the senders in the associated group and the grounding of conductor SGCH2. Both relays SGB1 and SGB2 lock over their respective left windings and No. 2 contacts to ground on conductor RTG in order to prevent their release in the event that a sender becomes free while the marker is handling a call. Should both sender groups be busy, relays SGB1 and SGB2 will both be operated and a previously described circuit is completed for relay SB in the line group circuit to prevent the seizure of the marker and to lock out the calling line.

Assuming, now, that both sender groups have free senders in them at the time the marker is seized, then relays SGB1 and SGB2 will both be normal and the operation of relay IN1 as above described causes ground on conductor RTG to be applied over the No. 4 contacts of said relay, through the No. 4 contacts of whichever order relay OR1-OR0 happens to be operated at the time (assume that relay OR1 is operated), conductor 20, No. 3 back contacts of relay SGB1, winding of relay SGA1 to battery. Relay SGA1 operates to assign sender group 1 and prepares a path from conductor 31, No. 3 contacts of relay IN1, No. 5 contacts of relay OR1, conductor 32, No. 1 contacts of relay SGA1, conductor 33, No. 3 normally made contacts of relay SBSY of sender 1 in group 1, conductor 54, winding of relay MC to battery. Should sender 1 be busy, relay SBSY will be operated as will be shown hereinafter, and conductor 33 will be advanced to the No. 3 normally made contacts of relay SBSY of sender 2 (if idle) in the group or (if busy) through its No. 4 contacts and those of other operated relays SBSY in other busy senders of the group, to the No. 3 contacts of relay SBSY of the first free sender in the group. Note that if order relay OR2 had been operated and relay SGA1 were operated for the assignment of sender group 1, the above path would have been completed through the No. 2 contacts of relay SGA1 to the conductor in sender 2 of group 1 which corresponds to conductor 33 of sender 1 in the group since sender 2 is made first choice at order relay OR2 by the connection to its No. 5 stationary contact of the armature of contact pair 2 of relay SGA1 to the stationary contact of which is connected a conductor similar to conductor 33 but extending to sender 2, there being a similar contact pair for each of the ten senders in the group, the armatures of said contact pairs, on both relays SGA1 and SGA2, being correspondingly multipled and wired in the numerically desired preferential order among the stationary contacts of the No. 5 contact pairs of the ten order relays OR1-OR0, the stationary contacts of the contact pairs 1-0 in each of the relays SGA1 and SGA2 extending as separate starting conductors 33 to correspondingly numbered senders in each of the two sender groups.

Had sender group 1 been busy and relay SGB1 operated in consequence thereof at the time the marker is seized, the ground path on conductor 20 would have been completed over the the No. 3 front contacts of relay SGB1, No. 3 back contacts of relay SGB2, winding of relay SGA2 to battery, and the operation of the latter relay would then have caused the assignment of sender group 2 and the consequent closure of the above traced partial path over conductor 32 (with order relay OR1 operated), the No. 1 contacts of relay SGA2 to start conductor similar to conductor 33 of sender 1 in group 2 or (with order relay OR2 operated) the No. 2 contacts of relay SGA2 to start conductor similar to conductor 33 of sender 2 of group 2. Assuming, however, that sender group 1 is assigned and that the path to conductor 33 of the first sender therein is completed as above described, this path is not made electrically effective until the marker has determined on an interlink route as explained below.

Before describing the operations necessary to cause the marker to determine upon an interlink route, it may be noted that the marker, through the existence of a trouble, may pick a route or sender group which subsequent test of individual paths and circuits may prove to be unavailable. When this conduition occurs, the marker cancels its test, abandons routes partially selected and makes another attempt, usually with a different set of first choice paths due to the advance of the order relays by one count.

Thus the marker may receive a false indication that no sender group is available (by the failure, say, to operate a sender group assignment relay SGA-) when, in fact, if this were actually the case, it would not have been seized in the first instance since the line group circuit would have prevented the seizure on signal to relay SB that all senders are busy. The fact that the marker was seized is evidence that a sender is available in some group, and the fact that the marker fails to operate a sender group assignment relay indicates that a trouble condition is present which prevents a correct sender group test. Hence, at the time a circuit is completed for the sender group assignment relay SGA1 as above described, and said circuit does not result in the operation of said relay, a chain circuit is completed which extends from ground on the No. 11 contacts of relay SGA1, the No. 11 contacts of relay SGA2, conductor 28, No. 6 contacts of relay IN1, conductor 29, contacts of relay SGD (now operated as will be described), conductor 30, winding of relay RTB to battery. Relay RTB operates and completes a circuit for relay RTA which extends from ground on conductor ONG, No. 2 contacts of relay RTB, No. 2 back contacts of relay RT2, winding of relay RTA to battery. Relay RTA, upon operating, disconnects off-normal ground on conductor ONG from the retest ground conductor RTG at its No. 3 contacts, permitting thereby the release of all relays locked thereto, including relay RTB, since the circuit of the latter is controlled through the contacts of relay SGD which is held by ground on said conductor RTG. Relay RTB, however, is slow-release and its restoration will open the circuit of relay RTA which is also slow, and the release of the latter will reclose retest ground on conductor RTG and cause the marker to make another attempt.

Relay SGD is energized by a branch of the same circuit which energizes relay SGA- said circuit being traceable from ground on armature No. 4 of relay IN1, conductor 27, winding of relay SGD to battery. Relay SGD is slow to operate to permit the operation of one of relays SGA- to open the described chain circuit including conductor 28 before it operates so that the described operating circuit for relay RTB will be completed only in the event of a trouble condition.

It is desirable to limit the number of retests the marker can make. This is accomplished by the provision of a retest counting chain. When relay RTA operates, it completes a circuit for relay RT1' which may be traced from ground on conductor ONG, No. 1 contacts of relay RTA, back contacts of relay RT1, winding of relay RT1' to battery. Relay RT1' operates and locks in series with the winding of relay RT1 to ground on conductor ONG, relay RT1 remaining short-circuited until relay RTA releases. The operation of relay RT1 now transfers the counting circuit of relays RT2' and RT2 which will operate in a similar manner to relay RT1' and RT1 on the second retest of the marker. On the third retest, with relays RT2' and RT2 operated, a circuit is completed for relay MBSY extending from ground on conductor ONG, No. 2 contacts of relay RTB, upper winding of relay MBSY to battery. Relay MBSY now operates to dismiss the marker in the manner described. Any number of retests could, of course, be provided by expanding the counting chain to the number of retests desired.

When the marker runs into a retest condition, it will require a longer holding time than if the call is served on the first attempt. If the timing out arrangement is adjusted close to the normal holding time, it would probably operate during a retest. This is obviated by having the charging circuit of condenser C2 transferred at the No. 2 front contacts of relay RTA to the No. 1 front contacts of relay RTB which, being operated, continues to charge the condenser to battery through resistor R1. When relay RTB releases, the condenser is discharged via the No. 1 back contacts of this relay to ground via resistor R2 for the interval required for relay RTA to release. This gives a new start for charging the timing out condenser C2 for each retest. However, should relay RTB get locked up, condenser C2 will become fully charged, relay TM will operate in consequence thereof and an obvious circuit is completed for relay MBSY which, upon operating, dismisses the marker.

The same retest guard is provided in the event that a sender group is falsely assigned as a result, say, of a trouble condition which prevents the operation of one or more of the sender group busy relays SGB- and yet there may be, in reality, no available sender in the group falsely indicated as available. Under these conditions a relay SGA- is, of course, operated if relay SGB- fails to operate in response to ground on the corresponding conductor SGCH-, and the marker continues thereafter with its tests to assign a sender in the falsely assigned group. It will be remembered that sender assignment is made by applying ground to start conductor 33 of the first choice sender determined by the operated order relay, from conductor RTG via the contacts of relay IU (when this relay is operated on interlink assignment as will be shortly described), conductor 31, No. 3 contacts of relay IN1 and thence as previously traced to conductor 33 of the first choice sender. This ground, however, traces back by way of conductor 33' to the winding of slow operate relay SD to cause its operation. Now it will be shown that if an idle sender is in the group assigned, the application of ground to conductor 33 will cause the operation of relay MC therein in consequence of which the assigned sender is connected to the marker and ground is returned thereto from the No. 2 contacts of relay MC over conductor 34 to resistor SD1, thereby shunting relay SD. If conductor 34 is not grounded, relay SD will be operated and a circuit for relay RTB will become effective from ground on conductor RTG, contacts of relay SD, conductor 30, winding of relay RTB to battery, to cause the marker to make a retest with another group of senders as determined by the next count of the order relays.

When the marker receives the call, there is a sender available since, as said before, the line group circuit will lock out calls on signal to relay SB which operates when all senders are busy. Since, as shown in Fig. 49, all the senders in the two sender groups appear on verticals of the two sender link frames, and the links (and, therefore, the horizontals of the interlinks) appear on horizontals of their associated sender links only, access to an idle horizontal on the interlink assures a path to an idle sender. The marker's problem, therefore, is to find an idle path from the primary to an interlink with an idle horizontal and, consequently, an idle link thereon since the links are connected to the horizontals on the interlinks.

The first test that the marker makes is to determine if any interlink is all-busy; that is, if all its links are used. Since the links are divided into as many groups as there are interlinks to which they are connected, it follows that the marker must be provided with means that will respond to an all link busy condition for each interlink.

As shown in Fig. 49, there are two interlinks in this embodiment of the invention, namely interlinks 1 and 2, with each interlink having a capacity for ten links wired to the horizontals thereof and to the horizontals of the similarly designated sender link. Each link is provided with a relay SC0 (see Fig. 5) which operates when the link is seized, as will be described, and the No. 10 contacts of each of these relays are serially connected together with ground on one of the contacts on the relay of the first link in the group and conductor ILBCH– on a contact of the relay of the last link in the group so that when all links in a group are busy, the corresponding group test conductor ILBCH– will be grounded. Hence, when the links on an interlink frame are all busy, the corresponding group test conductor ILBCH– becomes grounded. The marker is provided with a link group busy relay LB– for each link group, and the group test conductor ILBCH– is connected thereto, there being, in the marker under consideration, a relay LB1 for link group 1 to which conductor ILBCH1 is connected, and a relay LB2 for link group 2 to which ILBCH2 is connected, it being understood that the links in group 1 are connected to the ten horizontals of interlink 1 while the links in group 2 are connected to the ten horizontals of interlink 2. Hence if all the links in group 1 or group 2 are busy, the corresponding relay LB1 or LB2 operates and locks over its left winding and No. 2 contacts to ground on conductor RTG and, in doing so, removes battery at its No. 1 contact from one side of the upper winding of its corresponding interlink available relay IA1 or IA2 (Fig. 16), thereby blocking the use of the interlink containing the busy link group. This, of course, leaves the choice of a link from that interlink whose relay IA– has not had battery removed from one side of its upper winding by the operation of the associated link group busy relay LB–.

However, this does not means that a link necessarily can be chosen from the group that does not test busy. For, having determined that one or more horizontals (and, therefore, associated links) are available on a particular interlink, such horizontals cannot be used unless one of them at least has one available path back to a secondary switch to which the calling line can be extended. However, the secondary switch or switches to which the line may be extended are already determined by the fact that the select magnets which have been operated thereon are off-normal and have closed a multiple chain circuit which has resulted in the operation of relay SAA or SAB, or both, as already described. The operation of one of these relays indicates the calling line has been extended. Hence, with the operation of relay SAA or SAB and the non-operation of relay LA or LB or both, the marker knows over which secondary the line can be extended and to which interlink switch it can be extended. However, it has not yet been determined that idle paths exist between a marked secondary and interlink switches which tests, so far, have indicated are available.

An interlink, therefore, is not available for the call unless it has a path to the secondary switch to which the calling line can be extended. The test for this avaliable path is based upon a group of secondary interlink chain circuits which are individual to each group of paths between each interlink and each secondary. These chains are of the multiple type and if all the hold magnets to which they are correlated are operated, the path is open. Referring more particularly to Fig. 3 wherein the two secondary switches A and B are shown and to Fig. 4 wherein the two interlink switches 1 and 2 are shown, it will be observed that the distribution of vertical outlets between the two secondary switches and the two interlink switches is made so as to provide as nearly as possible an even division of outlets between each of the two secondaries and each of the two interlinks. For example, the first or outlet 1 from secondary switch A on the In portion thereof appears as the first or outlet 1 on the In portion of interlink 2, while the last or outlet X in the In portion of secondary switch A appears as the outlet 1 on the In portion of interlink 1, the intermediate outlets on the In portion of secondary switch A being distributed as evenly as possible between the In portion of interlinks 1 and 2. Similarly, the outlets (generally five) from the In portion of secondary switch B are distributed more or less equally between the In outlets of interlinks 1 and 2. Hence the hold magnets IHOM– of the In portion of one particular interlink control available outlets to the two secondary switches A and B, and in order to test whether or not a particular interlink has an outlet, or outlets, to the selected secondary switch as determined by the operated relay SA–, such a test must determine the operated or unoperated condition of the hold magnets of the available interlink or interlinks. This test is made by a group of chain circuits over conductors SICHA– and SICHB–. Each hold magnet on the interlinks is provided with a normally made set of contacts the respective armatures of which are grounded while the associated make contacts are strapped to corresponding contacts of other hold magnets which control outlets to the same secondary switch, and all of them are connected together to a conductor SICHA- or SICHB- depending upon whether the hold magnets connected to the conductor belong to outlets to secondary switch A or secondary switch B, respectively. Thus, considering interlink 2 in Fig 4, the outlet 1 controlled by hold magnet IHOM1 extends back as outlet 1 on secondary switch A. There are, of course, other hold magnets on the In side of this interlink belonging to outlets which likewise extend back to the secondary switch A, and the stationary contacts of all these other hold magnets are strapped to conductor SICHA2. Similarly, the last outlet or outlet 5 on the In side of interlink 2 extends back as outlet 1 on secondary switch B there being, of course, other hold magnets on the In side of this interlink which also extend back as verticals on the In side of secondary switch B. The stationary contacts of their associated hold magnets, therefore, are strapped together and connected to conductor SICHB2. Hence it is clear that, so long as any hold magnet on the In portion of interlink 2 controlling an outlet extending to the In portion of secondary A is down, ground will appear on conductor SICHA2, which ground the marker utilizes as a signal that there is at least one available outlet between interlink 2 and secondary A. Similarly, a ground on conductor SICHB2 from interlink 2 likewise informs the marker that there is at least one available outlet between the In portion of interlink 2 and In portion of secondary B. On the other hand, if no ground appears on the conductor marking the outlets back to a secondary to which the calling line can be extended, the marker knows that no outlet is available from the In portion of the available interlink to that secondary.

The chain conductors SICHA1 and SICHA2 extend through the Nos. 9 and 7 front contacts, respectively, of relay IN to stationary springs of the Nos. 1 and 2 contacts, respectively, of the secondary available relay SAA, while the chain conductors SICHB1 and SICHB2 extend through the Nos. 10 and 8 front contacts, respectively, of relay IN to the stationary spring of the Nos. 1 and 2 contacts, respectively, of relay SAB. The armatures of the No. 1 contact set of relays SAA and SAB are connected together and to one side of the upper winding of the interlink available relay IA1 for interlink 1, while the armatures of the No. 2 contact set of relays SAA and SAB are connected together and to one side of the upper winding of interlink available relay IA2 for interlink 2. Now it will be recalled that the other side of the upper winding of relay IA1 is supplied with battery over the No. 1 back contacts of relay LB1 and that the other side of the upper winding of relay IA1 is supplied with battery over the No. 1 back contacts of relay LB2. Hence, if relay SAA has been operated to inform the marker that the calling line can be extended to an outlet on secondary A and there are available outlets between interlink 1 and said secondary A as evidenced by the presence of ground on conductor SICHA1, and if there are available links on interlink 1 as evidenced by the normal condition of relay LB1, then a circuit will be closed for operating relay IA2 which tells the marker that interlink 1 has both a free link and a free outlet extending back to secondary A. Similarly, if relay SAB has been operated to inform the marker that the calling line can be extended to an outlet on secondary B and an available outlet exists between interlink 1 and secondary switch B as evidenced by the presence of ground on conductors SICHB1, and an available link is also available on interlink 1 as evidenced by the normal condition of relay LB1, relay IA1 is likewise operated. On the other hand, if it is interlink 2 which has both an available outlet, evidenced by the presence of ground on the appropriate conductor SICHA2 or SICHB2 depending upon which secondary frame the calling line can be extended, and an available link as evidenced by the normal condition of relay LB2, then a circuit will be closed for operating relay IA2 which tells the marker that interlink 2 has both a free link and one or more free outlets extending back to secondary A or B, whichever it may be. However, since the operating paths for relays IA1 and IA2 are both controlled through relays SAA and SAB and either of the latter is operated to inform the marker of the secondary to which the calling line can be extended, it follows that when either relay SAA or SAB operates, a circuit will be completed to a vertical select magnet on the available interlink that has an outlet extending back to the secondary switch as will be explained hereinafter.

Thus, for example, assume that the calling line 0154 on primary switch B can be extended over horizontal outlet O to secondary switch B only, and that select magnet SSEL0 on said secondary switch B has been operated in consequence thereof. Immediately the marker is notified that the line can be extended to secondary switch B by the operation of relay SAB over a circuit completed from ground on the outer contact of SSEL0, conductor 17, winding of relay SAB to battery. Now let it be further supposed that interlink 2 has the only available link in the office. Under these circumstances relay LB2 will be normal while relay LB1 will be operated over a circuit previously described, thereby disconnecting battery from the upper winding of IA1 relay, preventing the latter from operating and preventing interlink 1 from being used. Conductor SICHB2 will be grounded, assuring an idle path from interlink 2 to secondary B, but conductors SICHA1 and SICHA2, grounded or not, will, however, be opened at the contacts of relay SAA which is normal if there is no path available, as assumed, between primary B and secondary A. Conductors SICHB1 and SICHB2 will, however, extend through the Nos. 1 and 2 front contacts of relay SAB to the windings of relays IA1 and IA2. Since battery has been disconnected from the winding of relay IA1 by the the operation of relay LB1, relay IA1 will not operate. Relay IA2, however, will operate over a circuit which extends from battery on the No. 1 contact of relay LB2, conductor 16, upper winding of relay IA2, conductor 15, No. 2 contact of relay SAB, conductor 15', No. 8 front contacts of relay IN, chain conductor SICHB2 to ground on normal contacts of the hold magnets on interlink 2 for idle paths to secondary switch B. The operation of relay IA2 indicates to the marker that a path is available between interlink 2 and secondary switch B.

It may be that an interlink cannot be assigned to the call due to one of the above conditions not being satisfied and this requires that the marker be dismissed as being up against an impossible service situation. Since relay PrT is operated and relay PBSY was operated in consequence thereof, the fact that no interlink is available is known, of course by the unoperated conditions of relays IA1 and IA2. Therefore, a circuit is closed which extends from ground on conductor RTG, No. 12 contacts of relay IN, conductor 21, No. 4 back contacts of relay IA1, No. 4 back contacts of relay IA2, conductor 22, contacts of relay PBSY, conductor 23, No. 4 contacts of relay RTA, upper winding of relay MBSY to battery. Relay MBSY operates and causes the dismissal of the marker in the manner described. On the other hand, if a path is available, relay IA1 or IA2 will operate, the circuit to relay MBSY is not closed and the marker will not be dismissed. Under circumstances of an interlink being available, a circuit is then closed for relay IU which extends from ground on the No. 12 contacts of sender group assignment relays SGA1 or SGA2, conductor 24, No. 13 contacts of either relay SAA or SAB, whichever is operated, conductor 25, No. 1 contacts of either relay IA1 or IA2, whichever is operated, conductor 26, winding of relay IU to battery. Relay IU operates and thereby indicates to the marker that the call can be served.

When relay IU operates, one circuit is completed from ground on conductor RTG, contacts of relay IU, conductor 31, No. 5 contacts of relay IN1, conductor 38, winding of slow-operate relay ID, winding of relay IA to battery causing relay ID to operate and perform functions noted hereinafter while relay IA, being marginal, does not operate. A second branch of the circuit extends from the No. 3 contacts of relay IN1, No. 5 contacts of whichever order relay happens to be operated (assume that relay OR1 is operated), conductor 32, No. 1 contact of the sender group assignment relay which happens to be operated (assume that relay SGA1 is operated), start conductor 33 of sender 1 in sender group 1, Nos. 3 and 4 contacts of each operated relay SBSY designating a busy sender in the selected sender group 1, No. 3 normally made contacts of the first unoperated relay SBSY designating the first idle sender in the group immediately following the last busy sender, conductor 54, winding of relay MC to battery. Relay MC operates, extends a number of conductors from the marker and line group circuits to the sender, closes a circuit for relay BS from ground on its No. 5 contacts, conductor 55 to the left winding of said relay causing it to operate and, among other functions, to connect ground to the off-normal ground conductor SONG over its No. 5 contacts, to connect battery to the off-normal battery conductor ONB over its No. 6 contacts. Relay BS further connects ground via resistor R4, No. 4 contacts, No. 1 contacts of relay TBL, conductor 38, No. 4 back contacts of relay LT to conductor SL of the assigned link to perform functions noted hereinafter. The remaining functions subsequent to the operation of relay MC in the assigned sender will be described in the appropriate order.

As previously explained, a branch of the above traced circuit is completed to relay SD which operates to establish an operating path for relay RTB on signal by ground on conductor 34 that there is, in fact, no available sender in the assigned group, which assignment, as already explained, might have been due to a trouble condition.

From ground on conductor 31, another circuit is completed over the No. 5 contacts of relay IN1, No. 3 contacts of the order relay OR1 (which is the one assumed to be operated), conductor 35, No. 3 back contacts of relay IA1, No. 3 front contacts of relay IA2 (it having been assumed that interlink 2 is available and therefore, that relay IA2 has been operated), conductor 36, winding of relay II2 to battery. Relay II2 operates to close various circuits between the interlink 2, the secondary switch B, the links on said interlink and the marker, to test and control the available outlets through said circuit elements and to test and determine an available link that can be utilized for the connection.

Before proceeding with the operations of the marker subsequent to the operations of relay II2, it should be noted that if no interlink is assigned for the connection, relay II2 (or relay II1) will not operate. Since relay ID has already operated (it being sufficiently slow-operate to permit the full operation of relay II2 or relay II1 if the circuit of either relay is, in fact, closed), a circuit is completed for relay RTB extending from ground on conductor RTG, contacts of relay ID, conductor 30, winding of relay RTB to battery. Relay RTB operates to permit the marker to make a maximum of two retests with other interlinks as determined by the next count of the order relays. On the other hand, if relay II2 does operate, indicating thereby that interlink 2 has been assigned for the connection, a short-circuiting path is established for relay ID which extends from ground on the No. 42 contacts of relay II2, conductor 37, to the ungrounded side of relay ID (i. e. on side toward relay IA), causing this relay to remain unoperated and prevent the operation of relay RTB and thereby preclude the marker from making a retest. The same ground now operates relay IA, which is also slow-operate, and causes it to perform functions noted hereinafter, while a branch circuit, completed over conductor 37' to the winding of relay IA' causes the latter relay to operate and perform functions which are also noted hereinafter.

Returning, now, to relay II2, it will be assumed that the two interlinks 1 and 2 each have 2X vertical outlets, the X outlets on the left part of the interlinks being allocated for In (extending originating lines or trunks to a link) connections and the X on the right part being allocated for Out connections (extending originating lines or trunks through the link to a terminating line or outgoing trunk). Both In and Out outlets for the same horizontal path are, of course, controlled by the same select magnet. Under this assumption, the relays II1 and II2 both have four groups of contact pairs and two other contact pairs, the latter being designated contact set 41 and contact set 42. The first group of contacts on each relay, shown nearest to the core thereof, is designated 1-X and has its individual stationary contacts connected to the windings of the hold magnets IHOM1-IHOMX on the In portion of its associated interlink, the stationary contacts of relay II1 being connected to the hold magnets of interlink 1 and the stationary contacts of relay II2 being connected to the hold magnets of interlink 2. The associated armatures in this group of 1-X contact pairs are multipled and connected to the armatures of contact pairs 1-X of relay IA' for purposes hereinafter set forth.

The vertical connections common to all the horizontals controlled by each of these magnets extend as outlets to the In portions of secondary switches A and B, as already described, and each connection between each of said contacts on relays II1 and II2 and the winding of each hold magnet on the appropriate interlink 1 is extended to the winding of the hold magnet of the corresponding vertical connection in the secondary switch to which the outlet extends. As will be shown subsequently, a circuit is completed over that contact pair of the contact pairs 1-X of relay II1 or relay II2 which extends to the windings of the hold magnets of the selected outlet between the secondary to which the calling line has been extended and the In part of the chosen interlink.

The second group of contact pairs 1-X on each of the relays II1 and II2 is adjacent to the group of contact pairs 1-X above described. The stationary contacts thereof extend to punchings which may be cross-connected to the punchings of relay SAA or relay SAB or both, while corresponding armatures in each group are multipled and extended to the stationary springs of contact pairs 1-X on the right of relay IA'.

The third group of contact pairs on each of the relays II1 and II2 comprises 10 contact pairs designated 1-0 and follows in position those described in the preceding paragraph. Each stationary contact of this group of contact pairs is connected to one of the ten vertical select magnets ISEL1-ISEL0 on the corresponding interlink as well as to the select magnets of the corresponding sender link (sender link 1 not shown), while the corresponding armatures in each group are multipled and connected, on the one hand to the contacts of four link select relays La-Ld which are operated on Out calls according to the four point transfer code to designate a link designation and, on the other hand, to the stationary springs of the No. 1 contacts of the ten link available relays LA1-LA0. The fourth or last group of ten contact pairs immediately following those just described for each of the relays II1 and II2 also comprise 10 contact pairs. Each of the stationary contacts of this group on relay II1 is connected to a conductor LKB- which has the same designation as the contact pair and extends to the sleeve conductor SL of the correspondingly numbered link of the group accessible through interlink 1. In the same manner, each of the stationary contacts of this group of contact pairs on relay II2 is connected to a conductor LKB- having the same designation as the contact pair and extending to the sleeve conductor SL of the correspondingly numbered link of the group accessible through interlink 2. The corresponding armatures on each group are multipled together and each pair of multipled armatures, according to the numerical designation of the contact pair of which the multipled armatures form a part, are connected to the upper winding of a correspondingly numbered link test relay LT1-LT0. As will be shown, each conductor LKB- marks, by the absence or presence of ground thereon, the idle or busy condition of the link it designates and thereby causes the operation of the link test relay connected thereto.

It has been assumed that interlink 2 is available, as determined by the operation of relay IA2, and that relay II2 was operated in consequence thereof. Hence upon the operation of relay IA after the operation of relay II2, as above described, a path is completed from ground on conductor RTG, contacts of relay IA, conductor 39, No. 2 contacts of relay IN1, No. 6 contacts of order relay OR1, conductor 40, to the No. 1 back contacts of relay LT1, upper winding of relay LA1, No. 1 contacts of slow-operate relay LTC to battery. Relay LA1 will, of course, operate provided that its path is not interrupted at the No. 1 back contacts of relay LT1, and whether or not this latter relay will operate to interrupt the circuit depends upon whether link 1 on interlink 2 is free or busy.

The tens relays LT1-LT0 are link test relays and determine which of the ten links accessible through the chosen interlink 2 are available for service. Each armature of the No. 1 contact set of each relay is connected, in appropriate order, to the No. 6 stationary contacts of the ten order relays OR1-OR0 and each associated back contact is connected to the upper winding of a link available relay LA- in the group of ten relays LA1-LA0, while each associated front contact is connected to the armature of the No. 1 contact combination of the succeeding relay LT-. Now when relay II2 operates, each of the ten conductors LKB1-LKB0 of the links accessible through interlink 2 is extended, through the fourth group of ten contact pairs 1-0 of relay II2, to the upper winding of the correlated relay LT- in accordance with the numerical designation of the link (as indicated by the numerical designation of its associated conductor) and the corresponding relay LT- will then operate or not operate depending upon whether ground is or is not applied to the conductor LKB- to denote the busy or idle condition, respectively, of the associated link. For example, if link No. 0 on interlink 2 is busy, conductor LKB0 is grounded, and upon the operation of relay II2, a circuit is completed for relay LT0 extending from ground on said conductor, No. 0 contacts of the fourth group of ten contact pairs 1-0 of relay II2, conductor KB0, upper winding of relay LT0 to battery, causing said relay to operate and then lock over its lower winding and No. 2 contacts to ground on conductor RTG. Similarly, with each of the other relays in the group of ten relays LT1-LT0. Now when ground is applied to conductor 40, as above described, said ground will trace through the No. 1 front contacts of all the operated relays in the group of relays LT1-LT0 which mark busy links and through the No. 1 back contact of the first unoperated relay in said group which, by its unoperated condition, designates that its corresponding link is idle, to the upper winding of relay LA- in the group of ten relays LA1-LA0 and completing the circuit thereof. For instance, if all the links in the group accessible through interlink 2 are free, then none of the relays LT1-LT0 will be operated. Under this condition, the ground traced to conductor 40 will further be applied over the No. 1 back contacts of relay LT1 to the upper winding of the link available relay LA1, the circuit of which is completed to battery on the No. 1 contacts of slow-operate relay LTC. Relay LA1, upon operating, locks over its lower winding and contacts to ground on conductor RTG. In the same way, if link 1 happens to be busy and the next link or link 2 is free, ground on conductor 40 is extended over the No. 1 front contacts of relay LT1, the No. 1 back contacts of relay LT2 (not shown) to the upper winding of relay LA2 (not shown), causing said relay to be operated and to lock to ground on conductor RTG and thereby indicate that link 2 is available for connection.

Should it happen that all the links are busy, then all the relays LT1-LT0 will all be operated and locked in the manner described. Under such circumstances, a circuit will be completed from ground on conductor RTG, No. 2 contacts of relay LTC, serially through the No. 3 contacts of all the relays LT1-LT0, conductor 41, No. 7 front contacts of relay IN1; conductor 29, contacts of relay SGD (which is operated at this time as previously described), conductor 30 to the winding of relay RTB. The operation of relay RTB signals the marker that a retest is to be made because of the unavailability of one of the paths. On the other hand, if nine links are busy and only one link is available for service, it is not desirable under such circumstances to provide a retest, for which a signal will be given as soon as relay LT- corresponding to the chosen link operates since, in such an event, the above chain circuit will be operated to close the circuit to relay RTB. Hence, under the assumption that nine links are busy and the last one chosen, say link 0, then the operation of relay LA0 will complete an obvious circuit for relay LTC which, upon operating after an interval, opens the chain circuit and prevents the operation of relay RTB. Relay LTC also operates as soon as a link is assigned to the connection, over a circuit identical with the one just described, from the No. 2 contacts of whichever relay LA- corresponds to the link assigned and, when operated, not only opens the chain circuit to relay RTB, but also removes operating battery from the operate windings of all the link availabe relays LA1–LA0. However, relay LTC is made slow-to-operate so that the operated link available relay LA- has an opportunity to lock over its lower winding before operate battery is disconnected from its upper winding.

Figure 6:
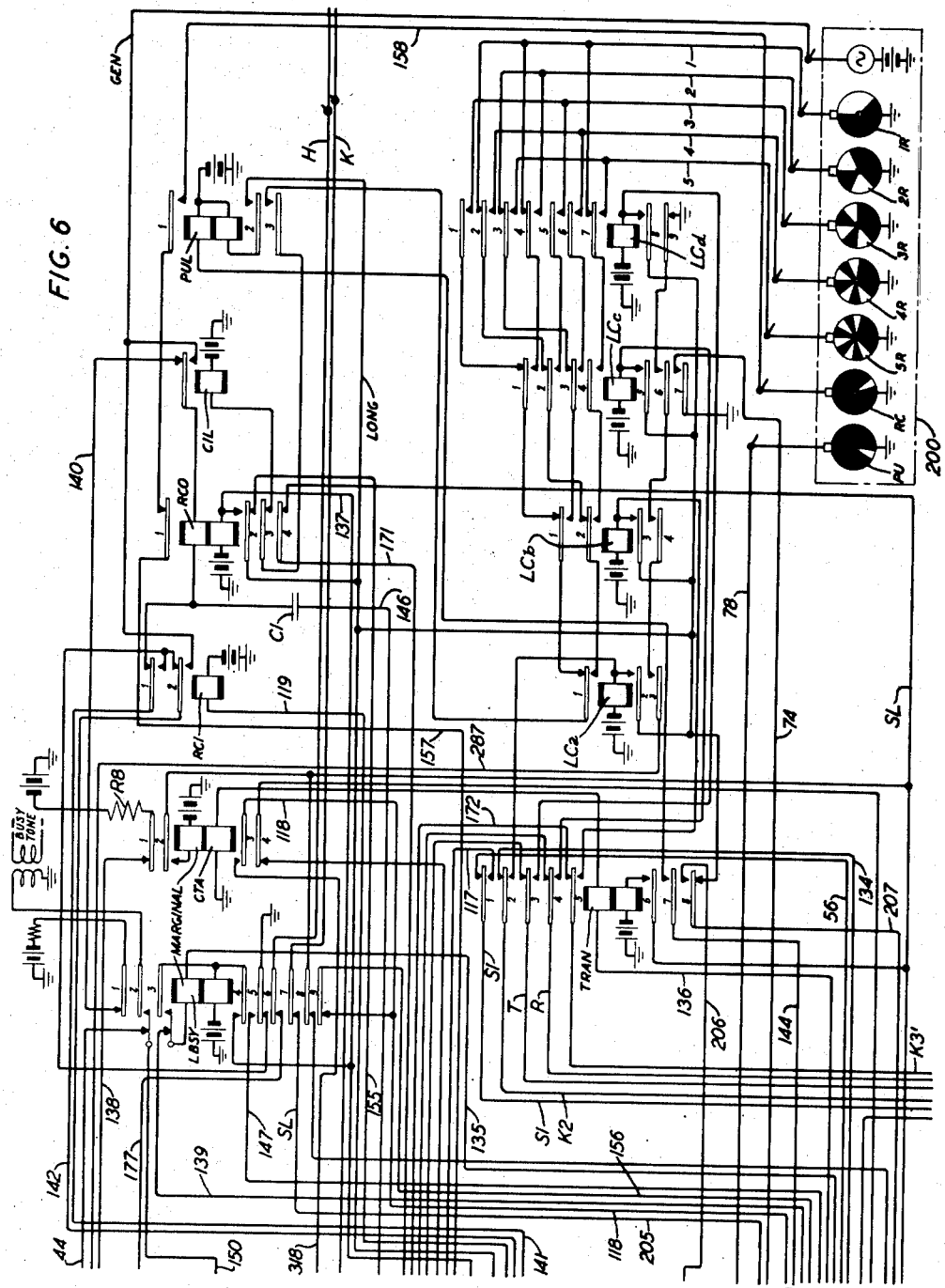

Each link available relay LA1–LA0 is also provided with contact pair No. 1 the armature of which is grounded. Upon the operation of one of these relays, say relay LA0 to indicate the availability of link 0 (the other nine being assumed to be busy), a circuit is completed from ground on the No. 1 contacts of relay LA0, conductor 121, No. 0 contact set of the third group of contact pairs of relay II2, conductor 122, winding of interlink select magnet ISEL0 of interlink 2, to battery, and, in parallel therewith, to the winding of corresponding select magnet SNL0 on the sender link 2. These select magnets operate and prepare the interlink and sender links for the closure of the respective cross-points on the respective horizontal 0 controlled by these magnets, to which horizontals link 0, shown in detail in Figs. 5 and 6, is connected, as is obvious from Figs. 4 and 20.

Each of the ten link available relays LA1–LA0 further has two groups of contacts designated No. 3 and No. 4 having grounded armatures which extend to the Nos. 3–6, front contacts, inclusive, of relay IN via conductors La, Lb, Lc and Ld and, over the armatures of these contacts, to connecting circuits in the sender as described hereinafter. The marker must, of course, advise the sender of the link taken into use, and this is done by the operated link available relay LA- whose No. 3 and No. 4 contact sets are provided with as many grounded conductors as are necessary to advise the sender according to the four point transfer code used throughout this invention and already given in connection with the point selector relay of Fig. 7, of the numerical designation of the link indicated by the operated link available relay LA-. The conductors, designated La, Lb, Lc and Ld are connected according to the four point code, to the Nos. 3 and 4 contacts of the link available relays LA-, the same being grounded upon the operation of any particular relay. These conductors, with correspondingly similar designations, extend to the relays of a link register in the sender, which operate to register thereon the number of the chosen link.

The sender must also be informed of the interlink on which the link appears, and since in the present embodiment of the invention, only two interlinks are provided, this information is conveyed by one conductor ILa for interlink 1, which conductor extends from the stationary spring of the No. 41 contacts of relay II1 to the No. 2 front contact of relay IN, and one conductor ILb for interlink 2 extending from the stationary spring of the No. 41 contact set of relay II2 to the No. 1 front contact of relay IN. Obviously, if more than two interlinks are provided, the number of code conductors may be expanded to four and utilized according to the four point code to indicate each of a maximum of ten interlinks. Hence, when relay II2 operates, indicating thereby the use of interlink 2, ground is applied through the No. 41 contact set of said relay, conductor ILb, No. 1 front contacts of relay IN to conductor ILb' extending into the sender, which closes a circuit therein, as described hereinafter, to indicate the use of interlink 2 for the connection.

As already noted, the particular link chosen on interlink 2 is determined by whichever relay La- is operated in response to the link test, and since it is assumed that link No. 0 is assigned for service and relay LA0 will be operated accordingly, conductors La, Lb, Lc and Ld, designating the numeral 0, will be grounded by said relay and applied over front contacts of relay IN to ground conductors La', Lb', Lc' and Ld', respectively, extending into the sender where appropriate circuits are closed thereover to mark the chosen link. Therefore, the designation given over conductor ILb' through the operation of relay II2 and the designation given over conductors La', Lb', Lc' and Ld' through the operation of relay LA0, tells the sender that link No. 0 on interlink No. 2 has been chosen for service. In the same way, if any other link is chosen for service, appropriate conductors or combination of conductors from a to d would be grounded and their extension into the sender via the appropriate front contacts of relay IN would inform the sender of the designation thereof.

Having determined upon an available link in the chosen interlink, and knowing the secondaries to which the calling line can be extended, it now becomes necessary to determine upon an available path between the chosen interlink and either of the two secondaries. This is done by the group of relays SIT1–SITX the number of which, in the group, being determined by the number of outlets. It will be remembered that when relay IA operated, relay IA' operated in parallel with it. However, prior to the operation of relay IA and, therefore, prior to the operation of relay IA', the upper windings of the relays SIT1–SITX are connected over the left back contacts of contact sets 1–X of relay IA', through the front contacts of the first set of contact pairs 1–X on relay II2 to the windings of the hold magnets on the In portion of interlink 2 and corresponding hold magnets on the secondary switches of the vertical outlets interconnecting said interlink with said secondaries. Should any of these outlets be busy, that is, should any of the corresponding hold magnets be operated, ground, of course, will be applied to their respective windings and this ground will then be applied over the operated contacts of relay II2 and the back contacts of relay IA' to the upper windings of the corresponding relays SIT– connected thereto and cause their operation to indicate to the marker that the vertical outlets between the interlink and the secondary switches marked by these operated relays are not available for use. For instance, if the vertical outlet 1 on the In portion of interlink 2 (extending back as vertical 1 on the In portion of secondary switch A) is busy, ground will have been connected to the windings of the two hold magnets of said path, that is, to the winding of hold magnet SIHOM1 on secondary switch A and the winding of hold magnet IHOM1 on interlink 2. Under these circumstances said ground will trace over conductor 47, No. 1 contact set of the first group of contact pairs 1–X on relay II2, conductor 43, No. 1 back contacts on relay IA', upper winding of relay SIT1 to battery. Relay SIT1 operates over this circuit and then locks over its lower winding and No. 2 contacts to ground on conductor RTG. Similarly, if the path on In portion of the interlink 2 which is shown as the last vertical, or outlet X extending back as vertical 1 on the In portion of secondary switch B is busy, ground will be present on the hold magnets at either end of said path and this ground will trace over conductor 44, No. X contact set of the first group of contact pairs on relay II2, conductor 45, No. X back contacts of relay IA', winding of relay SITX to battery. Relay SITX operates over its upper winding, locks over its lower winding and No. 2 contacts to ground on conductor RTG and indicates to the marker that the path between the interlink and the secondary switch B marked by the operation of relay SITX is not available for service.

It will be noted that all paths from the chosen interlink 2 and all secondaries are tested and the operation of a corresponding relay SIT– will indicate and block out from subsequent use any busy paths and, conversely, all idle paths between interlink 2 and both secondaries are indicated at this stage of the operation as being usable. If it be assumed that only secondary B has an idle path to the primary upon which the calling line appears, it follows that if a path should subsequently be assigned from interlink 2 to secondary A, connection of the calling line to the interlink could not result. It is necessary, therefore, to block the assignment of paths from the interlink to a secondary, or secondaries, which have no path to the primary serving the calling line.

It will be recalled that the operation of a select magnet on a secondary results in the operation of the corresponding secondary available relay SA– and, conversely, if there is no path from the primary upon which the calling line appears to a particular secondary, the corresponding relay SA– will not be operated. Let it be assumed that such a path exists from the primary to secondary B, resulting in relay SAB being operated and that one is not available to secondary A, resulting in relay SAA remaining unoperated.

Figure 18:
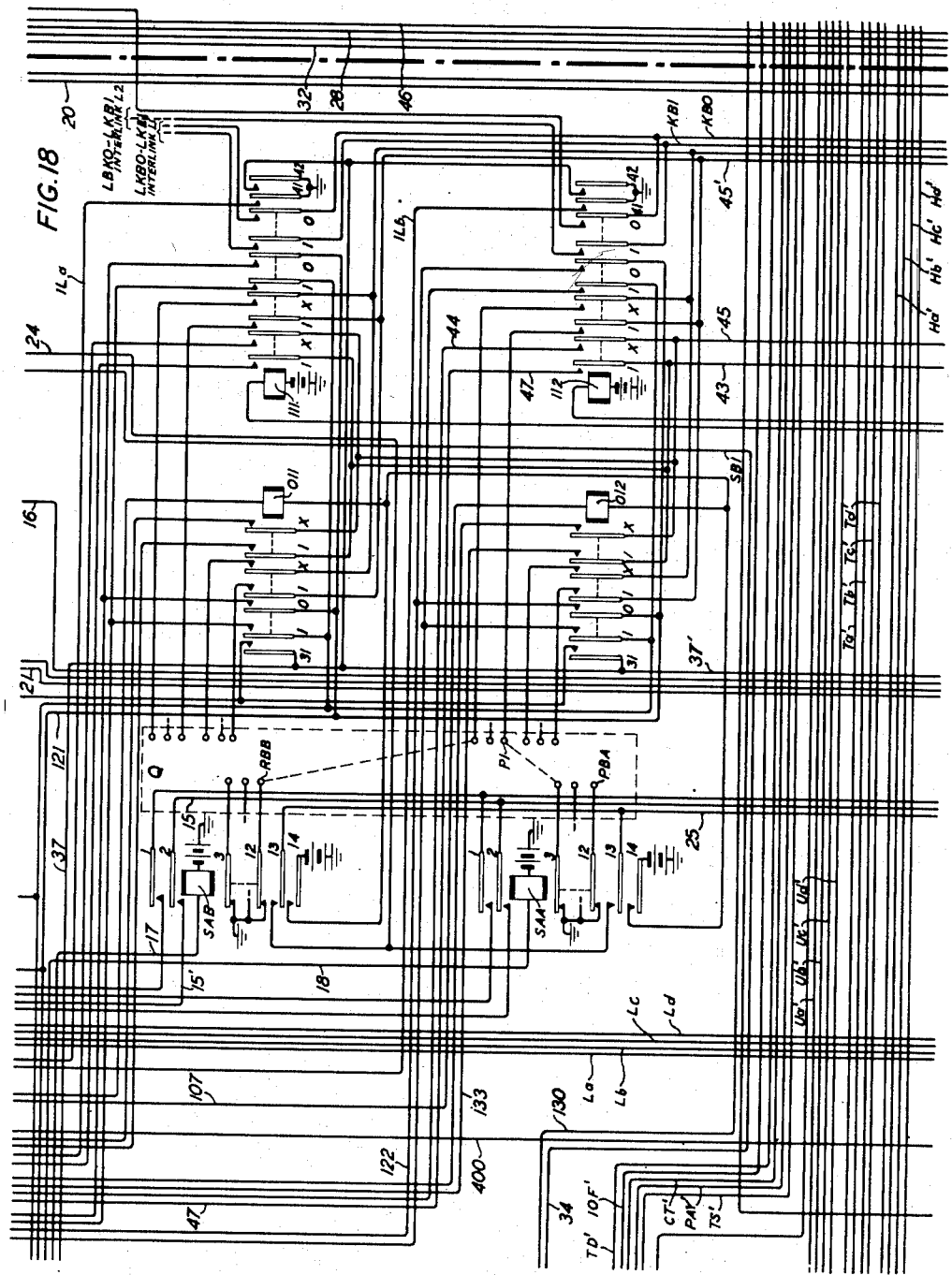
Figure 19:
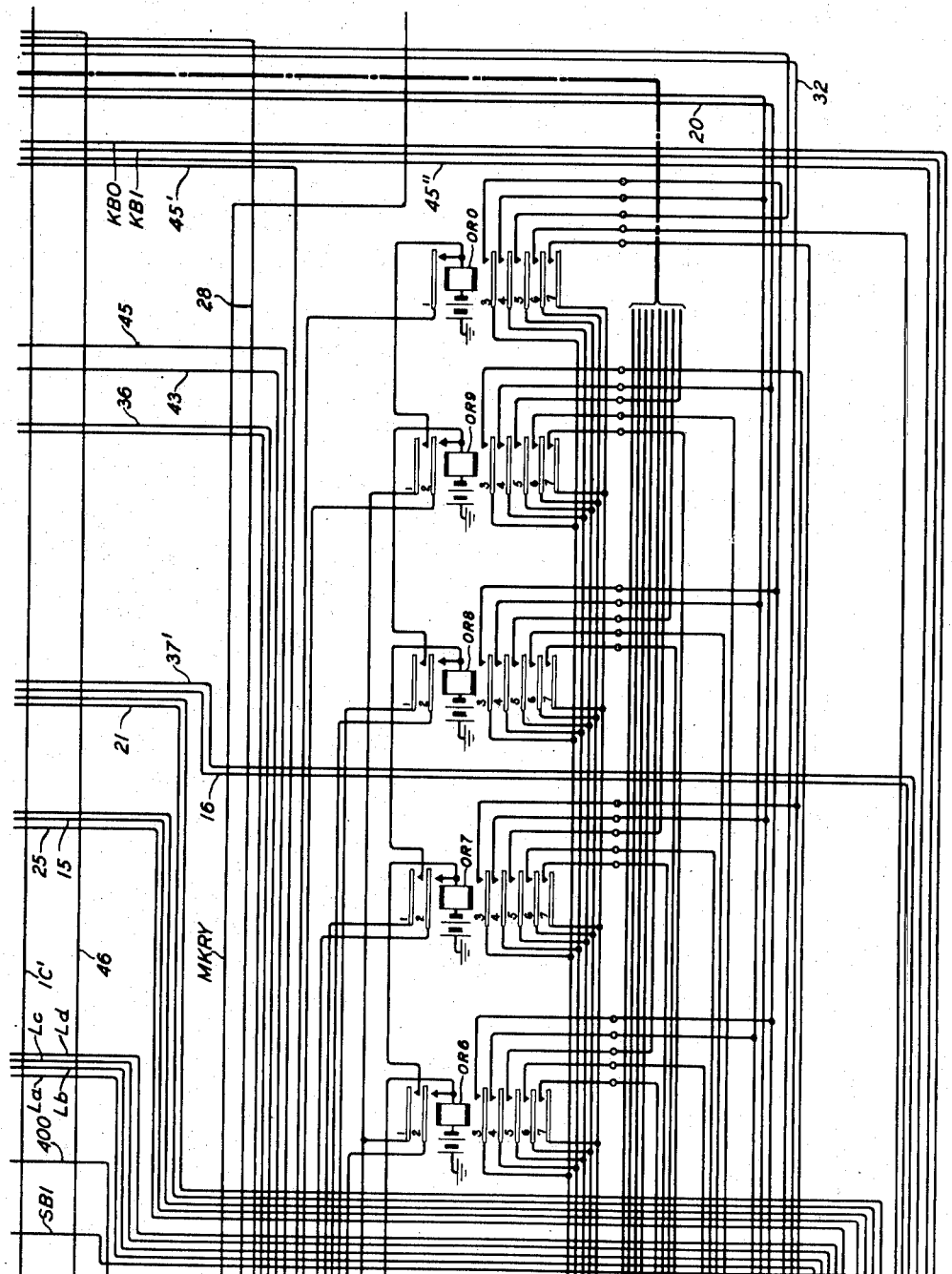

A cross connecting field Q [Fig. 18] is provided having a group of punchings PB– shown between the secondary available relays SA– and the relays II1 and II2. This cross connecting field enables any of the armatures in the groups of contacts 1–X of relays II1 and II2, to be cross connected to any punching or punchings PB–. If it be assumed that secondary A is not available to serve the call, relay SAA will be unoperated and the punchings PBA will be grounded by obvious circuits including armatures 3–12 of relay SAA. This indicates that a connection cannot be established between the calling line and the interlink via secondary A.

It will be noted that outlet 1 of interlink 2 is connected to outlet 1 of secondary A, and represents a path which cannot be used, even if idle, if secondary B is the only one employable. If this path should be idle, relay SIT1 will be normal from the busy test. A jumper, however, is provided between the punching PBA connected to armature 3 of relay SAA and punching P1. Upon operation of relay II2, ground is extended via this jumper, the No. 1 contacts of the second group of contacts on relay II2, conductor 45', No. 1 back contacts on the right of relay IA' to the middle winding of relay SIT1 to battery, thereby operating this relay, which locks up over its lower winding as described. The operation of relay SIT1 simulates a busy condition and prevents the use of outlet 1 from interlink 2. Likewise, cross connections are provided so that relay SIT– corresponding to all outlets between interlink 2 and secondary A are operated so that assignment of an outlet is restricted to those to secondary B. A similar arrangement is provided for each secondary available relay SA– to prevent the use of outlets between an interlink and the secondaries which do not have a path available to the primary upon which the calling line appears.

As in the case of the link group test, provision is made to insure a retest in the event that all the paths are busy between the secondary switch and the chosen interlink switch. This all-busy condition is, of course, shown by the operation of all the relays SIT1–SITX. In this event a chain circuit is completed extending from ground through the No. 3 contacts of relay SITX serially through the corresponding contacts on all other relays SIT–, conductor 41 and thence as previously traced to the winding of relay RTB which operates and causes the marker to make a retest.

In this connection, provision must be made to insure that unequipped outlets between secondary switches, and interlinks will also test busy. As previously described, the fact that an outlet is busy is indicated by the operated condition of the hold magnets at either end of the outlet. However, if a path is not equipped there may be no hold magnets or, if there are, they may not be wired for operation, in which event upon the test just described, the absence of ground on the winding of the hold magnet of an unequipped outlet will fail to cause the corresponding relay SIT– to operate, thereby giving the marker a false signal that the call may be completed over such an outlet.

To provide against the contingency of unequipped paths between an interlink and each of the secondaries, the stationary contacts of the second group of contact pairs 1–X on each of the relays II1 and II2 are brought out to punchings as set out above, while their associated armatures are connected to the stationary contacts of the contact sets 1–X on the right side of relay IA" the armatures of which are connected, respectively, to the middle windings of the relays SIT1–SITX. Consequently if there is an unequipped path between an interlink and a secondary, the punching which marks that path on the relay II– associated with that interlink will be grounded, and when the interlink-secondary path test is made by means of relays SIT-SITX as above described, the grounded punching designating the unequipped path will cause the corresponding relay SIT– which tests that path to operate over its middle winding and mark said path as unavailable. Thus if path No. 1 on interlink 2 is unequipped, the punching connected to the stationary contact of contact pair 1 of the second group of contact pairs 1-X on relay II2 would be grounded so that, upon the operation of relay II2 but before the operation of relay IA', a previously traced circuit would be closed from ground on said No. 1 contacts of relay II2, conductor 45', right No. 1 contacts of relay IA', middle winding of relay SIT1 to battery, causing said relay to operate and lock, indicating to the marker thereby that the corresponding outlet cannot be used. Any other unequipped outlet either on interlink 2 or interlink 1 may be similarly guarded against seizure. In the case of the latter, however, the punching grounded would be one connected to the appropriate contact in the second group of five contact pairs on relay II1.

Upon the operation of those relays SIT– which correspond to the busy or unavailable outlets between the interlink and the secondary frame, a circuit will be completed to close the circuit of the hold magnet of the chosen outlet marked by the first relay SIT– which is not operated toward the head of a circular chain as designated by the operated order relay OR– as described hereinafter.

It will be recalled that when the interlink vertical select magnet ISEL0 was operated, the sender select magnet SNL0 in parallel with it on the sender link 2 was also operated. The latter applies ground to conductor SSCH2 for operating relay SSON2 of which one is provided in the marker for each sender link frame. Now if we assume (as we have) that two sender links are used for two groups of senders, with each group of senders appearing on the vertical members of both sender links as shown in Figs. 20 and 49, then there will be a relay SSON1 for the sender link 1 and a relay SSON2 for sender link 2. Assuming, further, that the sender chosen is the first choice sender of sender group 2 on sender link 2 and that this sender has been selected by link 0 on interlink 2, the corresponding selector magnet SNL0 closes its contacts and applies ground over conductor SSCH2 to the winding of relay SSON2 to battery. If the chosen interlink had been interlink 1 instead of interlink 2 and accessibility to this sender (or any other sender) therefore had to be through sender link 1, then ground would have been applied on conductor SSCH1 by the vertical select magnet on this sender link and thereby cause the operation of relay SSON1. Relay SSON2 operates after an interval in order to permit the complete operation of the selector magnet finger and when it does operate, closes a path from ground on conductor RTG, No. 11 contact set of relay IN, No. 1 contacts of relay SSON2, conductor SS2, No. 3 contacts of relay MC, conductor 48, winding of hold magnet SHOM1 on the sender link 2 controlling the horizontal cross-points of the sender for link 0 on said frame, to battery. It is to be noted that relay MC partially closes a path from conductor SS1 over its No. 4 contacts to the corresponding hold magnet on sender-link 1 where the same sender is accessible to links appearing on interlink 1, which have accessibility to the senders on sender link 1 as first choice. The operation of the hold magnet SHOM1 connects the sender to the link for the performance of functions to be noted hereinafter.

Simultaneously with the operation of the hold magnet SHOM1 on sender link 2 whereby the sender is connected to the link, the marker proceeds to close through the assigned interlink path by the operation of the hold magnets controlling the cross-connections at either end of said path. It will be recalled that some or all of the relays SIT1-SITX were operated through their upper windings from ground provided on the sleeves of each of the busy paths at the time the test was made, or operated through secondary windings from ground at punchings associated with the back contacts 1-X of the second group of contact pairs of relay II– designating unequipped paths or those to secondaries unusable for the connection and which would not be available to the marker. When these tests were made, those relays SIT– which operated locked over their lower windings and No. 2 contacts to ground on conductor RTG. As previously described, these tests were made with relay IA' normal. However, relay IA' operates after an interval which is sufficient to permit the making of the above tests and when these tests are made, the test circuits are disconnected from the sleeves of the secondary interlink paths and from the punchings corresponding to those paths which are not available. Now, when relay SSON2 operates, a path is completed from ground on conductor RTG, No. 2 contacts of relay SSON2 (or No. 2 contacts of relay SSON1 if the sender connected to the link happens to appear on sender link 1), conductor 46, No. 1 front contacts of relay IN1, winding of relay SIC to battery and, through the back contacts thereof, through the No. 7 contacts of relay OR1, No. 1 front contacts of all of the relays SIT– which are operated to correspond with unavailable paths between the secondary and the interlink, back contacts of the first relay SIT– which is down to denote the availability of the corresponding interlink path, front contacts of the appropriate contact pair 1-X on the left side of the one of relay IA', to the winding of the appropriate hold magnet on the interlink and the corresponding hold magnet on the same outlet on the secondary switch. Thus, for example, if the interlink secondary path available is the last or No. X path on the In portion of interlink 2, which secondary path extends back as the No. 1 outlet on secondary switch B, then the particular circuit completed will extend from ground as traced to the No. 1 back contact of relay SITX, left No. X front contacts on relay IA', conductor 45, No. X contacts of the first group of contacts on relay II2, conductor 44, winding of hold magnet IHOMX on the interlink frame 2, conductor SL, to hold magnet SIHOM1 of the secondary switch frame B, thereby causing the operation of the hold magnets on both the secondary and the interlink of one of the paths between them.

Should it happen that no path between the chosen interlink and the secondary is available, then, of course, all of the relays SIT1-SITX will be operated and ground is then applied serially over their respective No. 3 contacts to conductor 41 which, as previously traced, connects with the winding of relay RTB to cause said relay RTB to operate and permit the marker to make a retest in the manner already described.

The operated select magnet SSEL0 of the secondary switch B connects through its inner contacts the sleeve SL, from the link to the companion select magnet PSEL0 on the primary switch B.

When the sender was assigned, ground through resistor R4 was connected to conductor S1 of the assigned link, as will be shortly described, and this ground now further traces through the No. 1 back contacts of relay TRAN in the link, conductor 56, No. 9 contacts of relay SC0, upper winding of relay LPAY, upper winding of relay BL to battery. Relay BL operates in this circuit but relay LPAY, being marginal, does not. The operation of relay BL connects ground over its No. 2 contacts to conductor SL which extends over the established interlink In cross-point back to the primary cross-point over the established sleeve conductor SL to operate the select magnet PSL0 on the primary switch and to furnish holding ground to the hold magnets of the interlink and secondary switches.

It will be recalled that at the time the circuit was closed for the hold magnets of the secondary-interlink path, a parallel circuit was closed for operating relay SIC. This relay is slow to operate in order to allow sufficient time for the select finger on the primary to be firmly seated. Upon its operation, however, ground on conductor RTG through the No. 1 front contacts of relay IN1 is passed through the front contacts of relay SIC to conductor HOP and thence over the front contacts of relay BT of the line group circuit, No. 1 back contacts of relay COMPT, No. 4 back contacts of relay IC, and thence as traced through the lower sets of contacts of the combination of operated and non-operated relays (for line No. 015) PU$a$–PU$d$ and the appropriate relay PT– and PH– to the punching NO15 individual to the line. Since this punching is cross-connected to the individual line conductor NO15, said ground traces over No. 1 normally made contacts of relay L0, winding of the primary hold magnet PHOM1 to battery. Since the primary select magnet PSEL0 has been operated by the closure of the inner contacts of its companion secondary select magnet SSEL0 through ground extended from the link over the sleeve conductor SL, the operation of the hold magnet PHOM1 closes cross-point 0 in the primary switch B, completing thereby a continuous four-conductor connection from the calling line to the sender.

The closure of the cross-points at the primary and the In connections of the secondary and interlink switches indicates that the line has been successfully extended to a link and a sender connected thereto. The closure of the cross-points, therefore, provides an opportunity for making a continuity test between the line and link by testing the integrity of lead C of the extended connection. The link has resistance ground normally applied to conductor C of the In cross-point of the interlink, said resistance ground tracing from ground through resistor R16, No. 1 back contacts of relay RC01, No. 1 contacts of relay LPAY, No. 1 contacts of relay LCT, conductor C and associated contacts in the various cross-points of the extended connection, No. 2 normally made contacts of relay L0 of the calling line, upper winding of said relay to battery. Relay L0 operates over this circuit to ground lead "N–" to indicate cross-point continuity. The line group circuit locks for ground on conductor "N–" of the calling line as evidence of the successful completion of the test and not necessarily the operated condition of relay L0 since, prior to the operation of the latter, ground will be extended to conductor "N–" via conductor "SL" when the primary hold magnet operates. After relay L0 operates, indicating the successful completion of the test, ground is applied to conductor N015 over the No. 1 front contacts of relay L0 to supply the line group with the required ground signal. The ground on conductor HOP is further extended to the winding of slow-operate relay COMPT, which is made slow to operate to permit the complete operation of the hold magnet PHOM1. When relay COMPT operates, however, it transfers conductor N015 tracing back over the operated and non-operated combination of relay PU$a$–PU$d$, to the winding of relay COMP. Since the cross-points are closed as evidenced by the continuity test, and since this will necessarily cause the application of sleeve holding ground from the link to appear upon the No. 1 normally made continuity contacts of relay L0, either sleeve ground or ground from the operated No. 1 contacts of said relay will be caused to be applied to the line hold magnet conductor N015 to operate relay COMP. This relay informs the line group circuit that continuity test has been satisfied and grounds conductor RLSE' to complete the circuit of relay RLSE of the marker, the operation of which, as hereinafter described, causes the marker to be dismissed.

Should it happen, however, that cross-point test is not satisfied and relay COMP does not operate because of the absence of ground on conductor N015, a circuit is completed for relay RTST extending from ground over the No. 2 contacts of relay COMPT, No. 1 contacts of relay COMPT, winding of relay RTST to battery. Relay RTST operates and grounds conductor 30 which is the retest conductor extending to the winding of relay RTB of the marker, causing said relay to operate and thereby signal the marker for, a retest as previously described.

Relay SIC, in operating, opens the operating circuit for the secondary and interlink hold magnets, which removes the ground from the sleeve conductor SL of that path at the secondary and interlink points. These magnets, however, remain operated over ground applied from sleeve conductor SL through the cross-points from the link as already described.

The application of ground to conductor RLSE' by the operation of relay COMP of the line group circuit completes an obvious circuit to the lower winding of relay RLSE of the marker. Relay RLSE, in operating, releases relay MST which, in turn, releases relay RDY, which releases relay RLSE and disconnects ground from conductors ONG and RTG to release all relays held to the latter two conductors, thus making the marker available for another call or, if the connection being established is to another line in the same office, making it available for establishing a secondary-primary outlet from the selected link back to the called line, or, in the case of a trunked call, from the link to an outgoing trunk, as will be described hereinafter.

The removal of ground from conductor ONG and the opening of conductor 3 cause the release of the line group circuit. The opening of conductor 3 opens the circuit of relay ST and, therefore, that of relay NRH, permitting the locked-up line number relays H0, T1 and H5 to release and, also, relay ILC to release, the latter causing the release of relays PH$a$–PH$d$, etc.

While the above operations have been taking place in the marker and line group circuits, certain other operations have been concurrently taking place in the sender which was connected to the marker. It will be remembered that the sender was assigned for the call by the operation of relay MC therein. Among other functions, relay MC completes a previously traced circuit for relay BS which, upon operating, applies ground to off-normal ground conductor SONG over its No. 5 contacts, applies battery to the off-normal battery conductor ONB over its No. 6 contacts and, over its No. 4 contacts, further applies ground through resistor R4 over a previously traced circuit including the sender-link crosspoints, and thence as traced to conductor 51 to cause operation of relay BL in the link and application thereby of ground to conductor SL over the successive cross-points to hold all the hold magnets thereof.

It will further be recalled that at the time the line group circuit operated to register the identity of the calling line number, the conductors over which such identity was registered had ground applied thereto. These conductors were H$a'$-H$d'$, T$a'$-T$d'$, and U$a'$-U$d'$. The line originating the call was assumed to have a numerical designation of 015 and that, in consequence, according to the code table furnished under the description of the operation of the line group circuit, the conductors grounded were H$a'$, H$b'$, H$c'$, H$d'$, T$a'$, U$a'$ and U$d'$. Conductors H$a'$-H$d'$, T$a'$-T$d'$ and U$a'$-U$d'$ terminate in contacts of relay MC of each sender. Consequently upon the operation of relay MC of the sender taken into use, the grounded conductors in these three groups are effective to close circuits in these three groups are effective to close circuits in the sender whereby the numerical designation of the line is registered therein. Thus the ground on conductor H$a'$ completes a circuit over the No. 27 contacts of relay MC, the No. 16 back contacts of relay OUT, conductor 57, winding of relay O$h_a$ to battery; the ground on conductor T$a'$ completes a circuit over the No. 23 contacts of relay MC, No. 12 back contacts of relay OUT, conductor 58, winding of relay O$t_a$ to battery; the ground on conductor U$a'$ completes a circuit over the No. 19 contacts of relay MC, No. 8 back contacts of relay OUT, conductor 59, winding of relay O$u_a$ to battery; while ground on conductor U$d'$ completes a circuit over the No. 22 contacts of relay MC, No. 11 back contacts of relay OUT, conductor 60, winding of relay O$u_d$ to battery. Likewise, similar circuits may be traced from ground on conductors H$b'$, H$c'$ and H$d'$ to windings of relays O$h_b$, O$h_c$ and O$h_d$. Relays O$h_a$, O$h_b$, O$h_c$, O$h_d$, O$t_a$, O$u_a$ and O$u_d$ operate over these circuits and lock to off-normal ground on conductor SONG. With the operation of these relays, "015" is registered in the sender and denotes the numerical designation of the calling line.

It will further be remembered that when the line group circuit operated, a class relay was operated serially with a primary designation relay and that the object of operating the class relay was to provide the sender with a signal indicative of the class of service to which the calling line was entitled. The conductors over which these separate signals are transmitted into the sender are TD', IOF', CT', PAY', TS' and FS'. Thus, for instance, if the calling line is a coin station located upon primary switch A, relay PAY in the line group circuit would be operated in series with the upper winding of relay PDA3 and ground would be applied to conductor PAY' which is connected to the armature of the No. 18 contacts of all MC relays. Now when relay MC of the assigned sender operates, a circuit is completed thereover, No. 7 contacts of relay OUT, conductor 66, left winding of relay SPAY to battery, causing said relay to operate on said winding and lock over its right winding and No. 1 contacts to off-normal ground on conductor SONG. The operation of relay SPAY informs the sender that the calling line is a coin line. In the same way and over similarly traceable paths when the appropriate class relays operate in the line group circuit on calls from lines entitled to corresponding classes of service, appropriate circuits will be closed over conductors CT', TS' and TD' to relays in the sender to operate the same and register thereby the class of the calling line. In the case of code ringing stations or other stations entitled to flat rate service, no class relay is operated in the sender inasmuch as the absence of a class relay in this type of call indicates to the sender the class of service required. But, as stated before, the sender may be easily arranged to operate a class relay upon the grounding of conductor CR (not shown), if so desired and as will be understood.

It will be further recalled that at the time interlink 2 and link 0 were assigned to the marker for the connection, the identity of the interlink and that of the link thereon are known to the marker through the operation therein of relay II2, for the interlink, and the relay LA0 for the link. The operation of II2, causes ground to be applied over its No. 41 contacts to conductor IL$b$ which traces over the No. 1 front contacts of relay IN, conductor IL$b'$ to the armature of the No. 10 contacts of all relays MC. Now when relay MC of the assigned sender is operated, this ground is further applied over the No. 10 contacts of said relay, conductor 61, winding of relay II$b$ to battery causing the operation of said relay and its locking to ground on conductor SONG. Had interlink frame 1 been assigned, then relay II1 would have been operated instead of relay II2 and ground would then have been applied over the No. 41 contacts of relay II1, No. 2 front contacts of relay IN, to conductor IL$a'$ connected to the No. 9 armature of relay MC whence that ground traces to the winding of relay II$a$ and battery causing the operation and locking thereof. It is obvious that if there are a maximum of ten interlinks in the office, the indication of each interlink (to the sender) could be given by operating the four relays II$a$-II$d$ of the sender interlink register according to the four point code, the circuits of said relays, singly or in appropriate combinations, being controlled, of course, by the marker interlink relay II- individual to the interlink. Inasmuch as the present embodiment of the invention is being illustrated with but two interlinks, only relays II$a$ and II$b$ of the sender interlink register are used.

The link assigned to the sender from interlink 2 was link 0, which was indicated by the operation of relay LA0 in the marker. This relay, it will be recalled, grounds conductors L$a$, L$b$, L$c$ and L$d$ at its Nos. 3 and 4 contacts, which conductors are multipled to contacts of the remaining nine link available relays LA1-LA9 in accordance with the four-point code to designate, for each relay, the numerical designation of the link indicated by the relay. For link 0, indicated by the operation of relay LA0, ground is applied to conductors L$a$, L$b$, L$c$ and L$d$ as already stated. Consequently when relay MC of the assigned sender operates, the sender is apprised of the numerical identity of the assigned link by one or more circuits closed over conductors La, Lb, Lc and Ld to operate relays SIa, SIb, SIc and SId in the link register of the sender. The circuit closed by ground on conductor La may be traced over the No. 3 front contacts of relay IN, thence as conductor La' to the No. 11 contacts of relay MC, conductor 62, winding of relay SIa to battery, causing said relay to operate and lock to ground on conductor SONG; the circuit closed by ground on conductor Lb may be traced over the No. 4 front contacts of relay IN, thence as conductor Lb' to the No. 12 contacts of relay MC, conductor 109, winding of relay SIb to battery, causing said relay to operate and lock to ground on conductor SONG; the ground on conductor Lc may be traced over the No. 5 front contacts of relay IN, thence as conductor Lc' to the No. 13 contacts of relay MC, conductor 63, winding of relay SIc to battery, causing said relay to operate and lock to ground on conductor SONG; the circuit closed by ground on conductor Ld may be traced over the No. 6 front contacts of relay IN, thence as conductor Ld' to the No. 14 contacts of relay MC, conductor 64, winding of relay SId to battery, causing said relay to operate and lock to ground on conductor SONG. Operated relays SIa, SIb, SIc and SId tell the sender that link 0 in the designated interlink has been assigned for the connection.

Having disposed of those sender operations which have taken place concurrently with the operations of the marker and the line group circuit, operations having to do with registering in the sender the calling line number, the class of the call, the interlink numerical designation and the number of the link thereon assigned for the connection, we may note that, with the closure of the cross-points at the primary, secondary, interlink and sender-link switches by the marker circuits as previously described, the calling loop is extended into the sender. The tip and ring conductors of the connection, designated T and R, respectively, in all the figures of the drawing extend over the boxed-in cross-points at the various switches (In cross-points of secondary B and interlink 2) to the No. 5 and No. 6 contacts, respectively, of relay LT in the sender and complete a circuit thereover for relay AS, tracing in part from battery through the left winding of said relay, No. 3 normal contacts of relay RBI, conductor 65, No. 6 back contacts of relay LT, tip conductor T and connection in boxed-in cross-point for link 0 on sender link 2 to conductor T of the link, No. 3 back contacts of relay TRAN, No. 2 normally made contacts of relay SC0, conductor T and connection and the boxed-in cross-point of outlet X in the In part of interlink 2, conductor T and connection at the boxed-in cross-point of outlet I in the In outlets of secondary B, conductor T, and connection at boxed-in cross-point on primary B, over the line loop, ring R of the connection through the above-described cross-points, No. 3 normally made contacts of relay SC0, No. 4 normally made contacts of relay TRAN, conductor R and connection at boxed-in cross-point connection in sender link 2, No. 5 back contacts of relay LT, conductor 108, No. 4 normal contacts of relay RBI, right winding of relay AS, No. 2 normal contacts of relay DT, primary winding (P) of the tone transformer TONE to ground. Relay AS operates over this circuit and closes a circuit from ground on the No. 2 contacts of relay SBSY (when operated as explained, below), conductor 401, front contacts of relay AS, right winding of slow-release relay BS to ground. Relay BS is already operated by a circuit through its left winding in consequence of the operation of relay MC as already explained and the object of the supplementary circuit over the right winding of relay BS is to make sure that the relay maintains ground at all times on the off-normal ground conductor SONG, maintains battery on the off-normal battery conductor ONB and thereby holds the sender circuits under control of relay AS when the marker and sender are disconnected from each other in consequence of the release of relay MC as described hereinafter.

The ground at the No. 5 contacts of relay MC also extends, via conductor 124, through the No. 5 back contacts of relay SBSY to battery through resistor R5 at the time said relay SBSY is unoperated and, also, through the left, or operate, winding of this relay to off-normal ground on conductor SONG. However, since ground on conductor SONG depends upon the operation of relay BS which follows the operation of relay MC, and since ground from the No. 5 contacts of relay MC is applied to relay SBSY before off-normal ground is applied to conductor SONG by the operation of relay BS, it follows that the operate winding of relay SBSY is shunted by the time ground is applied to conductor SONG. Now when the marker has finished serving the In functions of the call, it removes ground from the sender-start conductor 33 whereupon relay MC releases, disconnects the register conductors from the sender and, by opening its No. 5 contacts, opens the circuit to the left winding of relay BS, removes the shunt from the operate winding of relay SBSY, which now operates to ground on conductor SONG, and the latter relay closes the above-described circuit to the right winding of relay BS. Relay BS is made slow release in order that (among other functions) it may not release in the slight interval between the opening of the circuit through its left winding by the release of relay MC and the closure of the circuit through its right winding by the operation of relay SBSY.

The operation of relay SBSY extends the sender-start conductor 33 to the No. 3 normal contacts of relay SBSY of the next idle sender in the chain so that, upon the marker serving some other call, such a sender will be available to it in the event that the group to which the sender belongs is assigned. Conductor 33 is also connected, upon operation of relay SBSY of the sender assigned for the call under description to the right hand winding of said relay, so that if this particular sender is released while another sender beyond it in the chain is being assigned, relay SBSY of the first sender will not release until after the start ground is disconnected from conductor 33 by the marker. Over its No. 1 contacts, relay SBSY closes a point in the path of the chain SGCHI, and when all senders in the group are taken into use, the chain is closed and ground is applied to conductor SGCHI through the No. 1 contacts of relay SBSY, in series, of the senders of the group for operating relay SGBI in the marker whereby the marker is informed that no sender in the group is available. Over its No. 7 contacts, relay SBSY closes an obvious circuit for relay OUT which operates to reconnect certain conductors between the marker and the sender in connection with certain functions of the marker relating to the completion of the terminating part of the connection as described hereinafter. As previously explained, relay SBSY also closes ground over its No. 2 contacts to conductor 401 to complete a circuit to the right winding of relay BS. It should be noted, however, that this ground is withheld until relay SBSY is operated so as to obviate a false pulse incident to the operation of relay BS before relay AS.

With the closure of the circuit of relay AS over the established loop, dial tone is induced in said circuit over the secondary winding of transformer TONE, and the subscriber, upon hearing the tone, proceeds to dial the number of the wanted station. However, before describing those operations of the sender which follow the reception of dial pulses from the calling station, it will be advantageous for a better understanding of the functions of the sender to review the assumed network of the exchange system as a whole which was briefly outlined in the earlier part of this specification.

Referring to Fig. 48, a network is shown therein which comprises six telephone offices of which the circuits herein being considered are assumed to be for office Alpha (3). This office has direct trunks to two other offices, namely Beta (2) and Delta (4) with timing facilities at the latter and direct trunks also to Gamma (6) without timing facilities, and also direct lines to toll stations. Office Alpha (3) also serves as a tandem for routing calls to the "0" or toll operator, or to the switch train of the local multi-office exchange Epsilon (9) or to the distant office Zeta (5). This relatively complicated network and the particular office Alpha (3) herein being considered in detail have been selected to illustrate the adaptability of the arrangement to substantially all conditions which might reasonably be anticipated. The routing of calls and other information set out by Fig. 48 are for the purpose of facilitating the understanding of the operation of the sender located in Alpha (3).

Five-digit subscriber numbers are proposed of which the first is the digit for the office of the network, the next three are for the line number and last is for the ringing code. "Operator" and other offices are reached by a single digit code even if routed through tandem, the switching thereat being handled automatically (although two-digit office codes can be used for larger networks). Reverting calls are handled by a special code 8 which is followed by the subscriber dialing the last digit of the called number to set the ringing, while calls to a multioffice exchange in the network, as, for instance, Epsilon (9), are set up by the subscriber dialing a special code for access to that exchange and following it by the complete number including the office code. This, however, is not a controlling requirement since the equipment may easily be arranged to route calls to the terminating office upon receipt of the multioffice code therefor as the first or the first two digits.

Bearing in mind the operation of the entire exchange system as indicated by the network shown in Fig. 48 and by the proposed directory information given in the earlier part of this specification, we may return to the operation of the sender subsequent to the transmission of dial tone over the extended connection, and note that relay AS is operated over the loop, followed by relay BS which is slow in releasing. When the subscriber dials the first digit, relay AS follows the pulses and, upon its first release, completes a circuit for operating relay CS, which circuit extends from ground on the back contacts of relay AS (on conductor 401 from the No. 2 contacts of relay SBSY), No. 2 contacts of relay BS, No. 5 contacts of relay C1, winding of relay CS to battery. Relay CS, upon operating, completes a circuit for operating slow-release relay C1 over a path which may be traced from ground on the No. 5 contacts of relay BS, No. 2 front contacts of relay CS, left winding of relay C1 to battery. Relay C1, upon operating, closes an obvious circuit for relay DT which, upon operating, substitutes direct ground for tone ground to the right winding of relay AS and locks over a circuit to be traced hereinafter. Relays CS and C1 are now operated and since both have slow releasing characteristics they remain in an operated position between pulses. However, upon the completion of the series of pulses of a digit, relay CS releases and shortly thereafter relay C1 releases. But during the time that relay C1 is operated, which is to say, during the pulsing interval, it furnishes battery for register relays 1–0 of the digit register and relays SSQ1, SSQ2 and SSQ3, shown in Fig. 21, over its No. 4 contacts, No. 3 back contacts of relay TP, conductor 67, to the windings of said register relays.

During that interval in the first pulse when relay CS is being operated, that is, when relay AS is momentarily normal, the same ground pulse is extended over the No. 5 contacts of relay C1 and, after relay CS has operated, over the No. 3 contacts thereof, the No. 2 contacts of relay TP, conductor 68 to the winding of relay DN and, in parallel therewith, over the No. 2 back contacts of relay SSQ1, No. 2 back contacts of relay SSQ2, No. 2 back contacts of relay SSQ3, winding of relay 1, conductor 67 to battery, as previously traced thereon. Relay DN operates to disconnect ground from the No. 3 contacts of the digit register relays 1–0, while relay 1 operates to close a circuit to ground over its No. 2 contacts to the winding of relay SSQ3 which, however, remains short-circuited by pulse ground as long as relay AS is in a released condition. When relay AS operates at the termination of the pulse, relay DN releases, the short circuit around relay SSQ3 is removed and this latter relay now operates in series with digit-register relay 1 to ground on the No. 1 back contacts of relay SSQ2. The operation of relay SSQ3 transfers the pulsing circuit to the digit-register relay 2 over its No. 2 front contacts. When relay AS releases on the second pulse, relay DN reoperates and a circuit is further traced from ground on conductor 68, through the No. 2 back contacts of relay SSQ1, No. 2 back contacts of relay SSQ2, No. 2 front contacts of relay SSQ3, No. 1 contacts of register relay 1, winding of register relay 2 to battery on conductor 67. Register relay 2 operates in this circuit and completes a locking path over its No. 2 contacts to ground through the winding of relay SSQ2, the latter relay remaining short-circuited by pulse ground on the No. 2 contacts of digit-register relay 2 as long as relay AS remains released. Upon the termination of the second pulse and the consequent reoperation of relay AS, the short circuit around the winding of relay SSQ2 is removed and this relay operates serially in the locking circuit of digit-register 2 over a path which traces from ground on the No. 1 contacts of relay SSQ1, winding of relay SSQ2, No. 2 contacts of digit-register relay 2, winding of the latter relay to battery on conductor 67. The operation of relay SSQ2 opens the locking circuit of relay SSQ3 and digit-register relay 1 causing both of them to release. With relay SSQ2 and digit-register relay 2 operated, the pulsing circuit is transferred to digit-register relay 3 so that, when relay AS releases on the third pulse, a circuit is completed from ground upon conductor 68, thence as traced to the No. 2 armature of relay SSQ2, front contact making with said armature, No. 1 contacts of digit-register relay 2, winding of digit-register relay 3 to battery on conductor 67. Digit-register relay 3 operates and completes a locking circuit over its No. 2 contacts, winding of relay SSQ1, to ground on the No. 1 contacts of relay SSQ3. Relay SSQ1, however, remains short-circuited as long as pulse ground is present on the No. 2 contacts of register relay 3. Hence, when the pulse is terminated and relay AS operates, ground is removed from conductor 68 and relay SSQ1 operates in the locking circuit above traced, opening the locking circuit of relay SSQ2 and digit register relay 2, causing both of them to release, relay SSQ1 and digit-register 3 now advancing the pulsing circuit to digit-register relay 4 via the No. 1 contacts of digit-register relay No. 3 and the No. 2 front contacts of relay SSQ1. On the fourth pulse, therefore, ground being present on conductor 68, a circuit path for digit-register relay 4 is completed over the No. 2 front contacts of relay SSQ1, No. 1 contacts of digit-register relay 3, winding of digit-register relay 4 to battery on conductor 67. Relay 4 operates and closes a locking circuit over its No. 2 contacts and winding of relay SSQ3 to ground on the No. 1 contacts of relay SSQ2, said relay SSQ3, however, remaining short-circuited as long as pulse ground is present on the No. 2 contacts of digit-register relay 4. Upon the termination of the fourth pulse and the consequent removal of ground on conductor 68, relay SSQ3 operates serially in the locking circuit of digit-register relay 4 and opens the circuit of relay SSQ1 which, upon releasing, reconnects ground to one side of the winding of relay SSQ2 and again transfers the pulsing circuit over the No. 2 back contacts of relay SSQ1 and the No. 2 back contacts of relay SSQ2 to the No. 2 front contacts of relay SSQ3. On the fifth pulse, the circuit may be traced from ground on conductor 68, No. 2 back contacts of relay SSQ1, No. 2 back contacts of relay SSQ2, No. 2 front contacts of relay SSQ3, No. 1 contacts of digit-register relay 4, winding of digit-register relay 5 to battery on conductor 67. Relay 5 operates and closes a locking path over its No. 2 contacts, winding of relay SSQ2 to ground on the No. 1 contacts of relay SSQ1, relay SSQ2 remaining short-circuited for the duration of the pulse and operating in the locking circuit upon the termination of the pulse.

In the same manner, the remaining digit-register relays 6 to 0, inclusive, are each operated on succeeding pulses, each relay operating on the pulse, locking serially with one or the other of relays SSQ3, SSQ2 or SSQ1 at the end of the pulse, and then releasing in consequence of operations produced by the following pulse so that, when the series of pulses designating the digit is complete, one digit-register relay will be up and this relay will designate that digit.

At the conclusion of the last pulse of the first digit, relay CS releases since its circuit is opened and maintained open for the interdigital pause by the operated condition of relay AS, and the release of relay CS opens the circuit of relay C1. Since both of these relays have slow releasing characteristics and are operated in cascade, relay CS will release before relay C1 so that there is an interval during which relay CS is in a released condition and relay C1 is in an operated condition. During this interval, a circuit is completed for relay OE which may be traced from ground on conductor SONG, No. 2 back contacts of relay CS, No. 3 contacts of relay C1, No. 4 contacts of relay TP, conductor 69, No. 5 back contacts of relay OR, conductor 70, winding of relay OE, conductor 71, No. 2 normally make contacts of relay OR to battery on conductor ONB. Relay OE operates and, over its No. 1 contacts, extends ground via conductor 72 to the right winding of relay OR. But this winding of relay OR is shunted by the above traced ground on conductor 69 being applied to the other terminal of said winding through No. 5 back contacts of the relay. Relay OE, upon operating, further extends circuits from the armatures of the No. 3 contacts on each of the digit-register relays 1-0 via its own armatures 2 to 11, inclusive and, through the contacts making with said armatures, to the several office register relays. The release of relay DN upon termination of the pulse causes ground to be applied to the stationary springs of the No. 3 contacts of each of the digit-register relays.

Since the digit-register relay remaining operated after the pulses of the first digit dialed represents the called office, it follows that, with a particular digit-register relay operated and relay OE operated, the circuit for the called office relay will be completed.

Should the subscriber dial the digit 1 as the first digit in error and appearing, therefore, as a preliminary impulse, the same will be absorbed since, in this event and with relay OE operated, digit-register relay 1 will operate relay PI over a circuit which extends from ground on the contacts of relay DN, No. 3 contacts of register relay 1, No. 11 contacts of relay OE, winding of relay PI to battery. Relay PI, upon operating, removes ground from conductor 74 and opens thereby a locking circuit to be described through the left-hand winding of relay OR, preventing the latter from locking up. Since relay PI opens the locking circuit of relay OR, the same will, of course, release after operation, and require its reoperation after the next set of digits, meaning thereby that the first impulse is absorbed and the circuit made ready for the next digit. Relay PI is made slow release to permit relay OR to restore after relay OE releases.

In the sender, a relay is provided for each office in the Exchange system shown in Fig. 48, including a relay for calls from or to stations that require special handling, as follows:

| Office | Relay |
|---|---|
| Operator | 00 |
| Beta | 02 |
| Alpha | 03 |
| Delta | 04 |
| Zeta | 05 |
| Gamma | 06 |
| Toll Stations | 07 |
| Reverting calls | 08 |
| Epsilon | 09 |

Upon the operation of relay OE, therefore, the digit-register relay remaining operated will close a circuit to the office relay indicated by said digit relay. From this point on, the description of the operation of the invention will follow in the order in which calls to the various offices of the exchange system may be successfully established from the calling station 0154, it being assumed that the subscriber at said station will dial the wanted number in accordance with the Directory instructions suggested in the earlier part of this specification.

We assume that the subscriber 0154 first dials the digit three (3), the code of the Alpha office and that, in consequence thereof, digit-register relay 3 is operated. Upon the operation of relay OE, therefore, a circuit is completed for relay 03 which extends from ground on the contacts of relay DN, No. 3 contacts of register relay 3, No. 9 contacts of relay OE, conductor 110, No. 1 normally made contacts of relay 03 to battery. Relay 03 operates and locks over its No. 1 contacts, conductor 73, No. 1 normally made contacts of relay 00 to ground on conductor SONG.

An interval after the first digit is dialed, that is, an interval after relay AS is reoperated over the calling loop subsequent to its last pulse release, relay C1 releases and, upon doing so, opens the operating circuit for relay OE and thereby removes the shunt from the right winding of relay OR which now operates in series with relay OE and locks up over the left winding of relay OR and No. 2 front contacts, conductor 74 to ground on the contacts of relay P1. The normally made No. 2 contacts of OR are opened upon operation of the latter, thereby removing off-normal battery from conductor 71 and releasing relay OE. Relay C1 further disconnects battery from its No. 4 contacts and thereby from conductor 67 which supplies holding battery for the digit-register relays 1–0. Digit-register relay 3 and relay SSQ1 will now release.

The operation of relay OR transfers conductor 69 over its No. 5 front contacts to the No. 2 back contacts and right winding of relay RR, which is the steering relay immediately following relay OR.

When relay OR operated, a locking path was completed for relay DT, previously operated by relay C1, which may be traced from battery through its left winding and No. 1 contacts, conductor 75, No. 3 contacts of relay OR, conductor 76, No. 5 back contacts of relay TMR, conductor 77, No. 8 back contacts of class relay SIOF to ground. If a preliminary pulse is received, this circuit is, of course, opened by the release of relay OR and relay DT would release and reapply dial tone to the line, thereby instructing the subscriber to dial again.

Relay 03, indicating the called office Alpha, upon operating as a result of the first digit 3, locks, as said before, to off-normal ground on conductor SONG. It further completes a circuit to the winding of relay RR which extends from battery on conductor ONB, No. 1 contacts of relay OR, conductor 111, No. 10 contacts of relay 03, conductor 78, No. 5 contacts of relay STS, conductor 79, left winding of relay RR to ground. Relay RR, by operating, causes the ringing code registration to be skipped since it is not needed for this class of call and further causes conductor 69 to be joined to conductor 80 at its No. 2 contacts, the latter conductor completing a path to the winding of relay HE. This path traces as follows: ground on conductor 69, No. 5 front contacts of relay OR, No. 2 front contacts of relay RR, conductor 80, No. 1 contacts of relay 08, conductor 102, No. 3 back contacts of relay HR, winding of relay HE, No. 1 normally made contacts of relay HR to battery on off-normal conductor ONB. No ground is available on conductor 69 to operate relay HE at this time since it will be recalled that this conductor is grounded after a digit has been dialed and for the interval during which relay C1 is operated and CS released.

The sender is now ready to receive the registration of the hundreds digit which, when dialed, results in the successive operation of the relays of the digit-register relays 1–0 as previously described, the relay remaining operated after the release of relay CS indicating the digital value of the hundreds digit.

The No. 4 contacts of each of the first four digit-register relays 1–4 apply ground to four separate conductors 81–84, and the Nos. 4 and 5 contacts of the remaining six relays 5–0 apply ground to these four conductors in the combination called for by the four conductor transfer code which is set out below for each of the digits designated by the separate digit-register relays.

| Digit | Digit-Register Relay Operated | Conductors Grounded |
| --- | --- | --- |
| 1 | 1 | 81 |
| 2 | 2 | 82 |
| 3 | 3 | 83 |
| 4 | 4 | 84 |
| 5 | 5 | 81, 84 |
| 6 | 6 | 82, 84 |
| 7 | 7 | 83, 84 |
| 8 | 8 | 81, 83, 84 |
| 9 | 9 | 82, 83, 84 |
| 0 | 0 | 81, 82, 83, 84 |

When the hundreds digit has been dialed and during the interval between the release of relay CS and relay C1, relay HE operates through the application of ground to conductor 69. It applies ground over its No. 5 contacts to the lower terminal of the right hand winding of relay HR to keep it short circuited and, over its Nos. 1, 2, 3 and 4 contacts, extends conductors 81, 82, 83 and 84 to the windings, respectively, of relays Ha–Hd of the hundreds register so that whichever relay in the digit-register remains operated after the dialing of the hundreds digit, will cause the operation of as many relays in the hundreds register as there are conductors 81–84 grounded by said operated digit-register relay. Thus if digit-register relay 1 is operated, the ground is applied to conductor 81 which completes a circuit over the No. 4 contacts of relay HE, conductor 89, winding of relay Ha to battery, causing said relay to operate and lock to off-normal ground on conductor SONG; if digit-register relay 2 is operated ground is applied to conductor 82 which completes a circuit over the No. 3 contacts of relay HE, conductor 90, winding of relay Hb to battery, causing said relay to operate and lock to ground on conductor SONG; if digit-register relay 3 is operated, ground is applied to conductor 83 which completes a circuit over the No. 2 contacts of relay HE, conductor 91, winding of relay Hc to battery causing this relay to operate and lock to ground on conductor SONG, while if digit-register relay 4 operates, ground is applied to conductor 84 which completes a circuit over the No. 1 contacts of relay HE, conductor 92, to the winding of relay Hd, causing said relay to operate and lock to off-normal ground on conductor SONG. In the same manner, the circuits which are completed over the combination of conductors 81–84 grounded in response to the operation of any of the digit-register relays 5–0, may be traced through the contacts of relay HE to the windings of the corresponding relays Ha–Hd of the hundreds register in the combination called for by the operated digit-register relay.

The release of relay CI due to the termination of the hundreds digit dialing and the consequent removal of short-circuiting ground from conductor 102 will cause the operation of relay HR in series with relay HE and immediately open at normal No. 1 contacts the operating circuit for relay HE to result in the release thereof, relay HR locking over its left winding and No. 1 contacts to battery on conductor ONB. The operation of relay HR will transfer the operating path to the No. 2 back contacts of relay TR. A partial path is, therefore, closed for relay TE which extends from battery on conductor ONB, normal No. 1 contacts of relay TR, winding of relay TE, No. 2 back contacts of relay TR, No. 3 front contacts of relay HR to ground on conductor 102, applied thereto by the release of relay CS subsequent to the dialing of the tens digit.

The registration of the tens digit then takes place in the same manner as already described for the hundreds digit, except for the fact that the grounded conductors 81–84 are joined to conductors 93–96, respectively, over the Nos. 1–4 contacts of relay TE to cause the opertion of relays Ta, Tb, Tc and Td as called for by whichever digit-register relay 1–0 remains operated after the dialing of the tens digit. Since these circuits are similar to those already described for the hundreds registration and since the above-mentioned conductors 93–96 are clearly marked, said circuits are not traced.

During the interdigital pause after the dialing of the tens digit, relay TR is operated in the same manner as relay HR was operated before it, relay TE is released, and a circuit is closed for relay UE which extends from battery on conductor ONB, No. 1 normal contacts of relay UR, winding of relay UE, No. 3 back contacts of relay UR and thence serially through the No. 2 front contacts of relays TR and HR to ground on conductor 102 when relay CS releases as previously described.

The registration of the units digit now takes place in the same manner as the hundreds and tens digit except for the fact that, in this case, conductors 81–84, grounded by the digit register relay remaining operated after the last units digit impulse, are now joined to conductors 97–100, respectively, through the contacts of relay UE, which, in turn, connect, respectively, with the windings of the units register relays Ua, Ub, Uc and Ud to cause their operation and locking singly or in the appropriate combination called for by the operated digit-register relay.

Upon the completion of the units registration, relay UR operates and thereby causes the release of relay UE. It further closes a locking circuit for relay CI which extends from ground on the No. 2 contacts of said relay UR, conductor 101′, No. 1 contacts of relay OT, conductor 101, No. 1 back contacts of relay CS, No. 2 locking contacts of relay CI, right winding of relay CI to battery. When the called ringing code is dialed following the dialing of the units digit and relay CS releases with relay CI operated, the above circuit causes relay CI to lock up, thereby preventing the release of the digit register relay having the ringing code registered thereon due to the fact that battery is maintained by relay CI on conductor 67.

Upon the completion of the called ringing code registration in the digit-register, the locking circuit for relay CI above traced is now extended over conductor 103, No. 3 back contacts of relay TMR, conductor 123, No. 1 normally made contacts of relay 2MS, conductor 104, No. 4 back contacts of relay 08, conductor 105, to the winding of the sender marker start relay MS1 of the sender disclosed. If the marker is idle and no other sender is applying for it, the circuit of relay MS1 will be completed serially through the No. 2 contacts of relays MS2–MSn, conductor 1, No. 5 contacts of relay ST, conductor 3 and thence as traced to relay MST. The operation of relay MS1 breaks the chain circuit to any other sender, preventing the latter from seizing the marker while it is in use, and locks itself in series with relay MST of the marker, the No. 3 front contact of relay MS1 (as well as all other relays MS–) making before the No. 3 back contact breaks. In the event of the simultaneous application by one or more senders and the line group for an originating connection, the line group circuit will seize the marker first since its relay ST is at the head of the chain of relays ST, MS1–MSn and will, by its operation, lock out relays MS1–MSn which then await their turn in the proper sequence determined by the order in which the respective relays MS– appear in the chain circuit. Likewise, the sender toward the head of this chain will secure the marker first in the event of simultaneous applications of two or more senders for it.

As previously described, the operation of relay MST in the marker causes ground to be applied to conductor MKRY which extends ground through the No. 1 contacts of relays MS1 to conductor 54 and thence to the winding of relay MC. The operation of relay MC now reconnects the sender to the marker in consequence of which certain information is now transmitted back to the marker to enable it to complete the connection to the called line.

For purposes of illustration, it will be assumed that the called subscriber's number is 2473 and that, as previously described in connection with the operation of the marker for the call originating on the calling line 015, said line was extended to the interlink 2 and, through it, to link No. 0 on said interlink. In consequence of these assumptions it will be remembered that the marker caused interlink 2 and link 0 to be registered in the interlink and link registers, respectively, of the sender, the numerical designation of the chosen interlink 2 having been registered by the operation of relay Ilb (for interlink 2) in the interlink register and the numerical designation of the chosen link 0 having been registered by the operation of relays Sla, Slb, Slc and Sld (for link 0) in the link register. Also, since the called number is assumed to be 2473, the hundreds digit "2" will have been registered in the "called hundreds register" by the operation and locking of relay Hb therein; the tens digit "4" by the operation of relay Td in the "tens" register, the units digit "7" will be registered by the operation of relays Uc and Ud in the "units" register, while the ringing code digit 3 remains registered in the operated relay 3 of the digit register, all in the manner previously described. Consequently, upon the operation of relay MC, a number of circuits are closed by which the numerical designation of the interlink and link are transmitted back to the marker for completing the connection over the link already taken into use by the calling line, and the numerical designation of the called number is transmitted back to the line group circuit for completing the circuit to the individual hold magnet of said line.

Considering first the called number, which is to be transmitted to the line group circuit from the sender, the operated condition of relay Hb in the hundreds register of the sender causes a circuit to be completed from ground on conductor SONG through the contacts of relay Hb, conductor 96, No. 17 front contacts of relay OUT, No. 28 contacts of relay MC, conductor Hb', winding of relay PHb in the line group circuit, to battery causing said relay to operate and register in the line group circuit the fact that the hundreds digit of the called line number is 2. Another circuit is completed from ground on conductor SONG through the contacts of relay Td of the tens register, conductor 96, No. 15 front contacts of relay OUT, No. 26 contacts of relay MC, conductor Td', winding of relay PTd to battery, causing said relay to operate and register in the line group circuit the fact that the tens digit of the called line number is 4. In the same way circuits are closed through relays Uc and Ud of the units register of the sender to relays PUc and PUd of the line group circuit. The circuit of relay PUc may be traced from ground on conductor SONG, through the contacts of relay Uc of the units register, conductor 99, No. 10 contacts of relay OUT, No. 21 contacts of relay MC, conductor Uc', winding of relay PUc to battery; the circuit of relay PUd may be traced from ground on conductor SONG through the contacts of relay Ud, conductor 100, No. 11 front contacts of relay OUT, No. 22 contacts of relay MC, conductor Ud', winding of relay PUd to battery. Both relays operate and register thereby in the line group circuit the units digit 7 of the called number.

The operation of relays PHb, PTd, PUc, and PUd of the line group circuit causes the operation of relays PH2 and PT4 in the manner already described for the origination of the call and by means of which the upper No. 1 armature of relay PUd is extended to the N punching of line 2473 and the lower No. 1 armature is extended to the C punching of said line, the former punching (not shown) being cross-connected with conductor N247 of line 247 located upon primary switch frame A, while the latter punching (also not shown) is cross-connected to the appropriate primary designation relay PDA— which is in series with the class relay indicative of the service to which said line is entitled. The lower armature of relay PUd further traces back over the No. 4 back contacts of relay IC, No. 1 back contacts of relay COMPT, back contacts of relay BT to the upper winding of relay NBSY.

2. Called line busy

If the called line 247 is busy, its relay L0 will be operated and held to ground on the sleeve of its connection, and relay L0 then supplies ground to conductor N247 over its No. 2 front contacts to complete the circuit of relay NBSY, causing said relay to operate and lock up over its lower winding and No. 3 contacts to ground on conductor ONG. Over its No. 2 contacts, relay NBSY applies ground to conductor 163 which completes a circuit to the lower winding of relay MBSY of the marker. This latter relay, in operating, completes a circuit for relay BSY of the sender, said circuit being traced from ground over the No. 2 contacts of relay MBSY, conductor 130, No. 8 contacts of relay MC, conductor 131, right winding of relay BSY of the sender, to battery. This relay operates and locks over its left winding and No. 2 contacts to ground on conductor SONG, and further closes a circuit from ground either through the No. 2 back contacts of relay OT to conductor 145 or No. 9 back contacts of relay SIOF to conductor 132 and thence to conductor 145, No. 4 contacts of relay BSY, No. 1 back contacts of relay LT, conductor K2 at the sender-link cross-point, No. 2 back contacts of relay TRAN, conductor 134, No. 8 contacts of relay SC0, conductor 135, upper winding of link busy relay LBSY which is marginal, No. 3 normally made continuity contacts thereof, conductor 139, upper winding of relay LCT to battery. Relay LBSY is faster than relay LCT and operates first to open the circuit of relay LCT at the No. 3 contacts of relay LBSY, the latter then locking over its lower winding and No. 4 contacts to off-normal ground on conductor LONG. At its No. 5 front contacts, relay LBSY completes a circuit for relay SC0 which extends from ground through said contacts, conductor 147, No. 7 contacts of relay LCT, No. 6 normally made contacts of relay SC0, winding of relay SC0 to battery, causing said relay to operate. At its No. 2 front contacts, relay LBSY connects the grounded winding of transformer Busy Tone via conductor 150 to the lower winding of relay AL which, with its upper winding, is now connected across the calling loop over the following path: battery, upper winding of relay AL, No. 2 normally made contacts of relay D, No. 2 normally made contacts of relay LCT, No. 2 front contacts of relay SC0, tip conductor T extending through the interlink, secondary and primary cross-points as previously traced, over the calling loop, over the ring conductor R extending through said cross-points through the No. 3 front contacts of relay SC0, No. 3 normally made contacts of relay LCT, No. 1 normally made contacts of relay D, lower winding of relay AL, conductor 159, No. 3 contacts of relay LBSY, winding of transformer Busy Tone to ground. Over the above circuit, the calling subscriber is advised that the called line is busy.

The operation of relay SC0 disconnects the tip and ring conductors T and R from the sender, which causes the release of relay AS therein, in turn opening the circuit of relay BS which releases after an interval to permit, on calls in which the called line is not busy, the transfer of the ringing code to the link as will be described hereinafter. When relay BS releases, ground is disconnected from off-normal conductor SONG and battery is disconnected from off-normal conductor ONB causing all relays locked thereto to release, including the sender operated hold magnet SHOM1. The line group circuit "point" relays are, of course, released by the release of the sender since they were operated and held from the registers in the sender.

The release of relay SBSY, which is slow release to assure that all other relays of the sender are restored before the sender is again made available, opens the chain conductors SGCH1 and reconnects relay MC to the sender start conductor 33. The sender is now ready for assignment to another call, as are the line group circuit and the marker.

The connection is now held by relay AL of the link, said relay being held operated over the calling loop as above described. Relay AL closes an obvious circuit for the lower winding of relay BL which continues to supply ground to the sleeve conductor SL over the No. 2 contacts to hold operated the hold magnets at the various cross-points and to hold relay SC0 locked. When the calling line releases, relay AL releases followed, in turn, by relay BL which is slow-releasing, unlocking relay SC0 and releasing the hold magnets, thus restoring all the equipment to normal.

3. *Called line free*

If the called line is free, relay NBSY of the line group circuit will, of course, not operate since no ground will be applied to conductor N247. However, upon the operation of the primary designation relay PDA– and the oppropriate class relay in series therewith, ground is applied to conductor 13 which completes the circuit of relay BT, closing thereby conductor HOP over its front contacts and thence to conductor N247. It will be shown that when the marker is ready to operate the hold magnet of the called line, it will apply ground to conductor HOP for this purpose.

The operation of one of the PDA– relays (since the called line has been assumed to be located on primary switch A) grounds conductor PDA which thereby completes the circuit to the left winding of relay PA in the marker, the operation of which, like that of relay PB on the originating portion of the call, determines available horizontal outlets out of the primary switch A by testing them with relays PRT1–PRT0 and then preferentially selecting an idle one of them to each of the secondaries, if such idle paths exist, by the operation of their corresponding select magnets at the secondary switches A and B, or to one of the secondaries if there is no path available to the other. As a consequence either relay SAA or SAB, or both, operates to denote the availability of the outlet or outlets at the secondary switch or switches indicated. Since all of these operations have been already described in connection with the origin of the call they are not here repeated.

Assume that the available secondary outlet is 1 on secondary switch frame A. Secondary select magnet SSEL1 and thereupon relay SAA will be operated in the manner described. Now since relays IN and IN1 are normal, and since interlink 2 and link 0 thereon have been previously chosen for the connection incident to serving the originating portion of the call, the same having their numerical designation respectively registered in the interlink and link registers of the sender, then, upon the operation of relay SAA of the marker, the registration of the digit 2 in the interlink register (by the operation of relay I1b) will cause a circuit to be completed which extends from ground on SONG, contacts of relay I1b, conductor 61, No. 10 contacts of relay MC, conductor IL$b'$, No. 1 back contacts of relay IN, conductor 107, winding of relay O12, No. 14 contacts of relay SAA to battery. Relay O12 operates and informs the marker that interlink 2 has been chosen for the connection.

The link register relays S1a, S1b, S1c and S1d in the sender which are all operated to indicate the use of link 0, now complete four separate circuits to the marker as follows: (1) ground on conductor SONG, contacts of relay S1a, conductor 62, No. 11 contacts of relay MC, conductor L$a'$, No. 3 back contacts of relay IN, winding of relay La to battery; (2) ground on conductor SONG, contacts of relay S1b, conductor 109, No. 12 contacts of relay MC, conductor L$b'$, No. 4 back contacts of relay IN, winding of relay Lb to battery; (3) ground on conductor SONG, contacts of relay S1c, conductor 63, No. 13 contacts of relay MC, conductor L$c'$, No. 5 back contacts of relay IN, winding of relay Lc to battery; (4) ground on conductor SONG, contacts of relay S1d, conductor 64, No. 14 contacts of relay MC, No. 6 contacts of relay IN, winding of relay Ld to battery. The four relays La, Lb, Lc and Ld operate and inform the marker that link 0 is to be used for the connection. These relays are, of course, operated singly or in other combinations to decode any link number from 1 to 0 according to the four-point code which is used throughout the description of this invention, to indicate to the marker whatever other link may have been taken into use for the connection.

With the operation of relay O12, indicating to the marker the use of interlink 2, and the operation of relays La, Lb, Lc and Ld further indicating the use of link 0 thereon, the marker is ready to complete the circuit of the select magnet ISEL0 on interlink 2 preparatory to closing the crosspoint thereon by which the link is closed through a crosspoint on the Out portion of said interlink. The circuit of the magnet, which is that of select magnet ISEL0, may be traced from ground on the front contacts of relay Ld, No. 1 front contacts of relays La, Lb and Ld, respectively, conductor 121, No. 0 contacts of the group of ten contacts to the extreme left of relay O12, conductor 122, winding of magnet ISEL0 to battery and, in parallel with the winding of said magnet, the winding of sender link select magnet SNL0 to battery. Both magnets operate, the former awaiting the operation of a hold magnet of a free path to an available outlet on secondary A to connect the "out" part of the link to the interlink while the latter is of no effect since a sender is already connected to the link.

With the operation of relay O12, a circuit is completed for slow-operate relay IA' extending from battery through the winding of said relay, conductor 37', No. 31 contacts of relay O12 to ground on conductor RTG. In parallel with this circuit another circuit is completed for slow-operate relay IA extending from battery through the winding of said relay, conductor 37, No. 31 contacts of relay O12 to ground on conductor RTG. Before relay IA' operates, the windings of the hold magnets IHOM1–IHOMX of the Out portion of interlink 2 are connected to the primary (upper) windings of the test relays SIT1–SITX through the left back contacts of relay IA' (through conductors 43 and 45 for relays SIT1 and SITX, respectively, for example) front contacts of relay O12 to operate those connected to busy paths. Relay O12 further connects the middle windings of these relays (through conductors 45' and 45'' for relays SIT and SITX, respectively, for example) through to grounded punchings to block inaccessible paths between the interlink and the secondaries. The first unoperated relay of the test relays SIT1–SITX will then complete a circuit to the hold magnet of the corresponding selected path between the Out part of the interlink frame and the Out part of the secondary frame. Thus, assume that the first free path encountered is the one designated by hold magnet IHOM1 on the Out division of interlink 2, which extends back as the first outlet on the Out portion of secondary frame A and controlled by hold magnet SOHOM1. Assume also that the first order relay OR1 is operated in the marker. Since both relays IA and IA' are now operated, a circuit is completed for the winding of the latter hold magnet which extends from ground on conductor RTG, contacts of relay IA, conductor 39, No. 1 back contacts of relay IN1, back contacts of relay SIC, No. 7 contacts of relay OR1, No. 1 back contacts of relay SIT1, left No. 1 front contacts of relay IA', conductor 43, No. 1 contacts of the first group of contacts of relay 012, conductor 133, winding of hold magnet IHOM1 to battery and, in parallel with the winding of said magnet, the winding of hold magnet SOHOM1 to battery. Since select magnet SSEL1 has been operated on secondary A and select magnet ISEL has been operated on interlink 2, the operation of the hold magnets above designated will be effective to lock-in the boxed-in cross-points on the Out portion of both switches, extending the link thereby to the secondary A.

Ground on the sleeve conductor SL' (a branch of conductor SL) is now extended by the link back over the cross-points to the inner contacts of secondary select magnet SSEL1 wherethrough a circuit is completed to the winding of primary select magnet PSEL1 on primary frame A which operates to prepare the frame to lock-in the cross-point thereon marked by the line hold magnet PHOM7, the latter operating upon the operation of relay SIC in the marker over a circuit completed from ground already traced to the front contacts of said relay, conductor HOP, front contacts of relay BT and thence as traced to the winding of the hold magnet PHOM7 of the called line. The last cross-point is thus closed at primary switch A and, as will be shown, a talking and ringing loop has been established between calling station 0154 and called line 2473, the latter being an individual line.

There are only two normal conditions under which the marker cannot complete the connection to the called station. If a path is not available from the primary switch to the secondary switch, the series chain through the No. 3 contacts of relays PRT1-PRT0 will be closed to operate the busy relay MBSY as already described. Likewise, if there is no "out" path between an available secondary and an interlink, all of the relays SIT1-SITX will operate. This will normally call for a retest by completion of the chain through their No. 3 contacts. This retest circuit, however, is, on the Out portion of the call, diverted at the No. 7 back contacts of relay IN1 to operate the busy relay MBSY over a circuit completed from ground through the No. 3 contacts of relays SIT1-SITX, conductor 41, No. 7 back contacts of relay IN1, conductor 53, back contacts of relay OTRK, and thence as traced to the upper winding of relay MBSY. This latter relay, upon operating, grounds conductor 130 to complete a circuit for relay BSY of the sender in consequence of which busy tone is returned to the calling line and the sender is dismissed as already described.

The retest conditions previously described with respect to the origination or incoming portion of a call are largely inoperative on the outgoing portion of a call as there is no route or group selection and subsequent test of individual paths or circuits. The marker had previously selected the interlink and link and these are, of course, the ones that will be used in completing the call and which, in turn, determine the route. If the call is to an individual line, as in the present case, the operation of all relays PRT1-PRT0 indicates that a path is not available between the primary switch and the secondary switch and busy tone is returned to the line as already described, while the operation of all the relays SIT-SITX indicates that there is no path from an available secondary to the interlink which may be employed and busy is also returned to the line.

When the marker has completed its function, relay MS1 releases causing thereby the release of relay MC. This informs the sender that the call can proceed, and this is effected as follows:

When relay MC operated on the second marker seizure, it completed a circuit for relay TDL which extends from ground on the No. 5 contacts of relay MC, conductor 124, No. 5 front contacts of relay SBSY, conductor 125, winding of relay TDL to battery. Relay TDL, upon operating, closes its No. 2 contacts and extends ground over conductor 126 and No. 2 normally made continuity contacts of relay 2MS to one side of primary winding (P) of said relay which, however, does not operate due to the presence of ground on the other side of its primary winding through off-normal conductor SONG. Now when relay MC releases the original operating ground for relay TDL is removed, ground on conductor SONG is maintained, and relay 2MS is caused to operate from battery extended through the winding and No. 2 contacts of relay TDL and its own No. 2 continuity contacts. Since the circuit of relay TDL is opened at the No. 2 contacts of relay 2MS when the latter operates, relay TDL releases, it having been made slow to release in order to insure the locking of relay 2MS over a circuit which extends from battery through its secondary (S), its No. 2 front contacts, primary winding (P) to ground on conductor SONG. With relay 2MS operated, a circuit may be traced from ground on the No. 1 back contact of relay TMR, No. 7 back contacts of relay OT, No. 3 contacts of relay 2MS, conductor 127, No. 1 contacts of relay BSY serially through the "low" and "high" windings of relay LS, No. 2 back contacts of relay LT, next to the lowermost contact of the sender link cross-point, conductor K1, No. 6 normally made continuity contacts of relay SC0 in the link to battery. In this circuit, relay LS alone operates, the current not being sufficient to operate relay SC0, and, in turn completes an obvious circuit for relay SL1 which, upon operating, locks through its No. 3 contacts to off-normal ground on conductor SONG. Through its No. 2 contacts, relay LS1 short-circuits the "high" winding of relay LS and the current in the circuit is thereby increased sufficiently to allow relay SC0 to operate, LS remaining operated on its "low" winding.

When relay SC0 operates, it locks over its No. 6 contacts to ground on the sleeve conductor SL and, over its No. 7 contacts, establishes a serial connection between the upper winding of relay TRAN, lower winding of relay CTA via conductor 136, and the "low" resistance winding of relay LS. Since ground is connected to both ends of the circuit, neither relay TRAN nor CTA operates but relay LS releases and completes a circuit for relay LT extending from ground through the back contacts of relay LS, No. 1 contacts of relay LS1, winding of relay LT to battery. Relay TRAN is now operated over a circuit which can be traced from battery through resistors R6 and R7, No. 10 back contacts of relay SIOF, conductor 128, No. 3 contacts of relay BS, conductor 129, No. 2 front contacts of relay LT, next to lowermost contact of the closed cross-point at the sender link, conductor K1, No. 7 contacts of relay SC0, conductor 136 and thence as traced through the upper winding of relay TRAN and lower winding of relay CTA to ground. Relay TRAN operates in this circuit but relay CTA, being marginal, does not, the former locking to ground on conductor SL over its lower winding and No. 6 contacts. Relay TRAN, in operating, connects the ringing code relays LCa, LCb, LCc and LCd of the link to the conductors T, R, K2 and K3, while the operation of relay LT applies to these conductors the ringing code locked up in operated relay 3 of the digit register.

It will be remembered that the ringing code was left registered in the digit register as the last of the series of impulses dialed by the subscriber. The number of possible ringing codes, the conductors grounded by the digit registers to designate said codes, and the relays in the link which are responsive to the grounds applied to said conductors for registering said codes in the link are as follows:

| Code | Relay Combination | Conductors Grounded | Tip or Ring | Interrupter Code No. |
|---|---|---|---|---|
| 1 | LCa | 81 | T | 1 |
| 2 | LCb | 82 | T | 2 |
| 3 | LCc | 83 | R | 1 |
| 4 | LCd | 84 | T | 3 |
| 5 | LCa+LCd | 81, 84 | T | 4 |
| 6 | LCb+LCd | 82, 84 | T | 5 |
| 7 | LCc+LCd | 83, 84 | R | 2 |
| 8 | LCa+LCc+LCd | 81, 83, 84 | R | 3 |
| 9 | LCb+LCc+LCd | 82, 83, 84 | R | 4 |
| 0 | LCa+LCb+LCc+LCd | 81, 82, 83, 84 | R | 5 |
| F. S. | LCa+LCb+LCc | 81, 82, 83 | R | 1 |

Thus the ringing code that will be registered on the link ringing code register relays will depend, of course, upon the ringing code registered in the sender digit register. If, for instance, a digit 1 has been registered for the ringing code, relay 1 of the digit register will be operated, and ground will be applied to conductor 81 which may be further traced through the No. 4 back contacts of relay SFS, No. 1 front contacts of relay LT, lowermost contact of the sender link crosspoint, conductor K2, No. 2 front contacts of relay TRAN, winding of relay LCa to battery, causing said relay to operate and then lock over its No. 2 contacts to ground on the link off-normal ground conductor LONG. In the same manner and by similarly traceable paths, circuits are completed respectively for relay LCb from ground applied to conductor 82 by relay 2 operated in response to a ring-2 code; for relay LCc from ground applied to conductor 83 by relay 3 operated in response to a ring-3 code (that of the called number 2473) and for relay LCd from ground applied to conductor 84 by relay 4 operated in response to a ring-4 code. The operation of the relays 5-0 in response to corresponding "ring" codes will, of course, cause ground to be applied to conductors 81-84 in the combination individual to the relay operated, and these grounded conductors then cause circuits to be completed to the several relays LCa-LCd in corresponding combinations to register, by their operation, the ring code of the called line. Called line 2473 has the ring code 3. Hence relay LCc will be operated and locked in response to the operation of the digit register 3, which grounds conductor 83 and completes the circuit of relay LCc as above described.

When relay LT operated, it opened conductors T and R to relay AS of the sender which, upon releasing, opens the circuit of relay BS which, being slow to release, remains up long enough to permit the complete transfer of the ringing code from the sender to the link before relay BS disconnects off-normal ground and battery from the circuits of the sender. When the latter occurs all relays locked or held to the off-normal ground conductor SONG or the off-normal battery conductor ONB are released and the sender restores to normal as previously described. Hold magnet SHOMI which is locked to conductor SONG also releases.

Returning now to the link circuit, the operation of relay SC0 causes the line conductors T and R to be disconnected from the sender and connected to the windings of relay AL of the link, the path being traceable from battery through the upper winding of relay AL, No. 2 normally made contacts of relay D, No. 2 normally made contacts of relay LCT, No. 2 front contacts of relay SC0, conductor T, thence as traced from the In cross-point of interlink 2 over the calling loop, back on conductor R to a contact on the In cross-point of said interlink, conductor R continued to the No. 3 front contacts of relay SC0, No. 3 normally made contacts of relay LCT, No. 1 normally made contacts of relay D, lower winding of relay AL, conductor 150, No. 2 normally made contacts of relay LBSY, conductor 44, to ground on the No. 2 normally made contacts of relay RC01. Relay AL operates over the calling loop and supplies ground for holding relay BL which (among other functions not necessary to the present description) maintains off-normal ground on conductor LONG.

The operation of relay SC0 further extends conductors T' and R' of the called line 247 from the Out cross-point of interlink 2, through the No. 4 and No. 5 front contacts, respectively, of relay SC0, the No. 4 and No. 5 normally made continuity contacts, respectively, of relay LCT, the No. 8 and No. 7 back contacts, respectively, of relay RC01, the No. 1 and No. 2 back contacts, respectively, of relay RRL, to conductors 142 and 141. Conductor 142 further traces to the No. 1 back contacts of relay RCI, upper winding of relay RC0, back contacts of relay CIL, conductor 140, No. 1 contacts of relay LBSY through a series resistance to battery. Conductor 141, on the other hand, extends through the No. 2 back contacts of relay RCI, No. 5 back contacts of relay LBSY to ground.

Relay RRL, which determines whether ringing current is to be applied to the tip conductor T' or to the ring conductor R' of the called line, is operated for five of the code ringing combinations under the control of the ringing code relay LCc, which latter relay operates on the appropriate ringing codes and completes a circuit for relay RRL which extends from ground on the No. 7 contacts of relay LCc, conductor 74, winding of relay RRL to battery. Relay CIL is operated by a circuit from the apex of the pyramid group of code ringing relays LCa-LCd, the circuit passing through the No. 3 back contacts of the ring cut-off relay RC0 and the No. 3 front contacts of the pick-up relay PUL. Relay PUL, on the other hand, operates on the first ground closure applied to conductor 78 by the interrupter PU after relay TRAN operates, said circuit extending from ground on conductor 78 applied thereto by the interrupter PU mounted on the generator and ringing interrupter machine 200, No. 10 back contacts of relay RC, conductor 144, No. 7 contacts of relay TRAN, upper winding of relay PUL to battery, causing said relay to operate on said winding and then lock over its lower winding and No. 2 contacts to ground on off-normal conductor LONG. Therefore, as soon as relay PUL operates, a circuit is completed for relay CIL which extends from battery through the winding of said relay, No. 3 contacts of relay RC0, No. 3 contacts of relay PUL, to the No. 1 armature of relay LCa, wherefrom the circuit is completed to one of the code ringing conductors 1-5 extending to the interrupter IR-5R, respectively, mounted on the generating and ringing interrupter machine 200 in accordance with the ringing code registered. The number of pulses applied to the conductor which completes the circuit of relay CIL depends upon the code as above given and relay CIL will be pulsed in accordance therewith. Thus the ringing code of the called line has been assumed to be 3, and relay LCc has been operated accordingly. By the above code, the operation of relay LCc signifies that ringing current must be applied to the ring conductor R and that "one ring" will be transmitted for station 2473. Accordingly, after relay PUL has operated, a circuit is completed for relay CIL to conductor "1" of the ringing machine 200, extending from battery through the winding of said relay as already traced to the No. 1 back contacts of relay LCa, No. 1 back contacts of relay LCb, No. 1 front contacts of relay LCc, No. 4 back contacts of relay Cd conductor "1" to interrupter ground. Relay CIL operates once every cycle of the interrupter IR.

The pulsing of relay CIL places ringing current superimposed upon battery over the tip conductor T or the ring conductor R of the called line depending upon whether relay RRL is or is not operated, followed by resistance battery during the silent intervals. The ringing circuit is traced as follows: ringing source applied to conductor GEN from the ringing generator, front contacts of relay CIL, upper winding of relay RC0, No. 1 back contacts of relay RCI, conductor 142, No. 1 back contacts of relay RRL (if it is released) No. 8 back contacts of relay RC01, No. 4 normally made continuity contacts of relay LCT, No. 4 front contacts of relay SC0, conductor T', thence as traced through the called loop back to conductor R', No. 5 front contacts of relay SC0, No. 5 normally made continuity contacts of relay LCT, No. 7 back contacts of relay RC01, No. 2 back contacts of relay RRL, conductor 141, No. 2 back contacts of relay RCI, to ground on the No. 5 back contacts of relay LBSY. If ringing current is to be applied to the ring R' of the called line as it is on the present call, then relay RRL is operated by relay LCc and the above loop is reversed. During the "silent period" when ringing current is not applied to the line, direct current is caused to flow thereover from battery and resistance through the No. 1 back contacts of relay LBSY, conductor 140, back contacts of relay CIL and thence as traced through the called loop to ground in the No. 5 back contacts of relay LBSY. Ringing current is thus transmitted to the called subscriber and audible ringing is returned to the calling station through condenser C1 which is connected to the ring conductor R of the calling loop by conductor 146.

When the called party answers and the ringer at the called station is shorted, relay RC0 operates over the called loop and then locks over its lower winding and No. 2 contacts to ground on conductor LONG, and further closes a circuit for relay RC01 which extends from ground on conductor LONG as traced through the No. 2 locking contacts of relay RC0, conductor 137, upper winding of relay RC01 to battery, causing said relay to operate and perform certain functions noted below. Relay RC0, upon operating, further opens the circuit of relay CIL which releases.

The operation of relay RC01 transfers conductors T' and R' of the called line from the ringing relays to the windings of relay D over the No. 7 and No. 8 front contacts thereof. Relay D operates over the called loop and furnishes talking battery to the called station. Upon operating, it reverses the battery and ground supply to the calling loop from relay AL through its No. 1 and No. 2 front contacts and the No. 1 and No. 2 contacts of relay FSL. The two subscribers are now connected together with relay AL furnishing talking battery to the calling station and relay D furnishing battery to the called station, the two lines being connected together through the condensers $C_2$ and $C_3$, and through the No. 3 and No. 4 contacts of relay RC01, respectively.

When the calling party restores the receiver, relay AL releases, in turn, releasing relay BL after an interval. The latter disconnects ground from the off-normal ground conductor LONG, releasing thereby relays locked thereto and, at its No. 2 contacts, disconnects ground from the sleeve conductor SL whereby the hold magnets at each of the cross-points of the In and Out connection train are released, causing said crosspoints to open. Should the called party not restore the receiver after the calling party has released, the called line will be held since relay L0 thereof, being slow release, will hold until the hold magnet PHOM1 of the primary switch releases. Relay L of the called subscriber's circuit (assumed to be 247) will then operate and complete a locking circuit for said relay L0 which extends from battery through the upper winding of said relay L0, No. 5 front contacts thereof, No. 2 contacts of relay L, lower winding of relay L0 to ground. In thus maintaining relay L0 locked, it will be impossible for the called subscriber to seize the line group circuit, thereby preventing its false start and the possible seizure of a marker and sender. Likewise, with the release of relay BL, ground is removed from conductor LKB-, the chain circuit ILBCH- is opened and the link is made available for another call.

4. *Message rate line call*

If the calling line happens to be a message-rate line, as, for instance, line 247 located on primary switch A, the connection with the called line is established in the manner already described. When, however, ground appears on the sleeve conductor SL, an obvious circuit is completed to the secondary winding (P) of the message register MR, the latter not operating upon the quantity of current flowing therethrough. Upon the answer of the called party, battery is extended through resistor R8, No. 1 contacts of relay CTA, conductor 139, No. 4 contacts of relay FSL, No. 1 front contacts of relay RC01, No. 1 contacts of relay LPAY, No. 1 contacts of relay LCT, conductor C, through the cross-point connections of the switches, conductor C therethrough, to the secondary winding (S) of the message register MR to ground. The register now operates, sufficient magnetization being supplied by the primary winding to hold the pawl if the secondary winding should be pulsed due to a trouble in the link or other equipment. Consequently when the call is completed, removal of sleeve ground results in the register being advanced to effect a registration of the call.

5. *Flat rate line call*

If the call originates in a flat rate line, as for instance, the assumed calling line 015, battery through resistor R8 applied to conductor C is opened at the No. 2 continuity contacts of relay L0, and this resistance battery, therefore, has no effect.

6. *Untimed local station reverting call*

In the operation of the system for untimed local reverting calls, that is, for connections in which a calling station upon one line calls another station upon the same line, the calling station dials a particular code indicating this type of a call, dials the ringing code of the calling subscriber and then restores his receiver. If the ringers of the two stations happen to be upon the same side of the line, the calling subscriber is notified of the fact that the called subscriber is being rung by the operation of his own ringer on the ringing code transmitted to the called station. On the other hand, should the calling and called station ringers be on different conductors, then the calling subscriber will be apprised of the fact that the called subscriber is being rung by short impulses of ringing current transmitted over his particular line conductor between each cycle of the ringing code transmitted to the called station. In both cases, of course, cessation of ringing indicates to the calling station that the called station has answered, whereupon he, too, removes his receiver from the hook and both parties converse.

Let it be assumed, therefore, by way of illustration that a call is to be established between station 0154 the ringer of which is connected to the ring conductor R of the line and station 0157 the ringer of which is connected to the tip conductor T of the line. It will be further assumed (as suggested in the proposed directory information given in the earlier part of this description) that the code digit "8" designates a reverting call and, therefore, that when the subscriber at the calling station 0154 seeks to establish a connection with the subscriber at the called station 0157, he, the calling subscriber, dials the digit 8 followed by the digit 7, the ringing code of the called station. He then restores his receiver and waits for ringing.

The removal of the receiver at station 0154 will, of course, cause the line group and marker circuits to operate to select a route through a secondary and an interlink, to select a link and to select a sender in which will be registered the interlink and link selection. Since the call will be established back over the established route through the In portion of the interlink, the marker, will not be called upon to perform the service of seeking an outlet through the Out portion of the link and interlink. Hence, when the calling subscriber dials the digit 8 and the same is registered in the sender by the operation and locking therein of relay 8 of the digit register and the consequent operation in response thereto of relay OE, a circuit is completed for relay 08 of the sender which may be traced from battery through the winding of said relay, conductor 149, No. 4 contacts of relay OE, No. 3 contacts of relay 8 to ground on the contacts of relay DN. Relay 08 operates and locks over its No. 2 contacts to ground on conductor SONG over the No. 10 contacts of relay 08 in the same manner as relay 03 did for a call for another line in the same office, at its No. 9 contacts, extends ground from the No. 4 contacts of relay OR (which operated in series with relay OE), via conductor 116, No. 9 contacts of relay 08, conductor 151, No. 4 back contacts of relay STS, conductor 101', No. 1 back contacts of relay OT, conductor 101, No. 1 back contacts of relay CS, the No. 2 contacts of relay C1, right winding of relay C1 to battery. This ground will cause relay C1 to remain operated after the dialing of the ringing code.

It will be recalled from the previous description relating to the establishment of a connection from one line to another line in the same office, that after the units digit of the called line number is dialed, ground from the No. 2 contacts of relay UR is applied to the right winding of relay C1 in order to prevent said relay from releasing so that, when the ringing code digit is dialed subsequent to the dialing of the units digit, said relay will provide battery to the windings of the relays of the digit register in order to hold whichever relay of the register responds to the last pulse of the ringing code. Since, in a reverting call, the above ground is not available because no units digit is dialed, the above traced ground through the No. 4 contacts of relay 08 is used instead to cause relay C1 to remain operated after the dialing of the special code "8" in order to hold whichever relay in the digit register responds to the ringing code that follows. Therefore when, in a reverting call in which the calling subscriber dials the special code "8" and the ringing code of the wanted station thereafter, the subscriber dials a 7 as a second digit, the same causes relay 7 of the sender digit register to operate and the same is held to battery on the No. 4 contacts of relay C1 over a path previously described.

As previously mentioned in regard to a connection between two stations on the same line in the same office, no Out connection is required from the interlink, and the marker will not be called upon to perform the function of selecting an Out path. Normally the reseizure of the marker to select an Out path is effected by the closure of a circuit between the start relay MST of the marker and the marker start relay MS– of the sender connected to the marker, which circuit, it will be remembered, is controlled through the No. 4 back contacts of relay 08. Since relay 08 is operated for a reverting call, the above circuit is open and the marker, therefore, will skip its Out selecting function. In this case, the sender merely receives a signal which simulates this second unperformed operation of the marker through the operation of relay 2MS over a circuit completed by the same ground which holds relay C1 operated. This circuit may be traced from ground on the No. 2 contacts of relay C1, conductor 103, No. 3 back contacts of relay TMR, conductor 123, No. 1 normally made continuity contacts of relay 2MS, conductor 104, No. 4 front contacts of relay 08, conductor 159, tertiary winding (T) of relay 2MS to battery. Relay 2MS operates and locks as before through its secondary (S) and primary (P) windings in series to ground on conductor SONG.

The call is now ready for transference to the link, which is effected by a circuit extending from ground on the No. 1 back contacts of relay TMR, No. 7 back contacts of relay OT, No. 3 contacts of relay 2MS, conductor 127, No. 1 contacts of relay BSY, serially through the "high" and "low" windings of relay LS, No. 2 back contacts of relay LT, next-to-the-lowest contact of the cross-point on the sender link, conductor K1, No. 6 normally made continuity contacts of relay SC0 in the link, winding of said relay SC0 to battery. As before, the operation of relay LS results in the operation of relay LS1 and the short-circuiting of the high resistance winding of relay LS in consequence of which relay SC0 is operated and the circuit, including conductor K1, is transferred through the upper winding of relay TRAN and the lower winding of relay CTA whereupon relay LS and LT are released. Conductors T and R of the calling line are switched over the front contacts of relay SC0 to relay AL of the link which, in operating, operates relay BL to perform functions, including the provision of a holding circuit for the link and the switches ahead, previously described.

It is necesary, however, that the link be advised that the call being established is a reverting one so that, upon the operation of relay LT, ground is extended over the No. 3 contacts of relay 00, conductor 153, No. 4 front contacts of relays LT, contact on the operated cross-point on the sender link, conductor S1, No. 1 front contacts of relay TRAN, conductor 117, winding of relay RC to battery. Relay RC operates and locks over its No. 7 contacts to conductor 155, No. 2 back contacts of relay RC0 to ground on conductor LONG. In thus operating, relay RC maintains off-normal ground on conductor LONG over its No. 1 contacts and advises the link that the call is a reverting call, to the end that certain connections may be held when the calling station restores the receiver to permit ringing as described hereinafter. During the time that relay RC is being operated, the ringing code of the called subscriber is being set up on relays LCa, LCb, LCc and LCd over the front contacts of relay LT and back contacts of relay FS, as previously described. In view of the fact that the called subscriber's ringing code is assumed to be a 7, and, therefore, that the same was registered in the digit register of the sender by the operation and locking of relay 7 therein, relay LCc and LCd were operated in consequence thereof and locked to conductor LONG, applying "two rings" to the line conductor as determined by the condition of relay RRL which, being up in this case, causes ringing current to be applied to the RING conductor R.

Relay RC, when operated, besides maintaining off-normal ground on conductor LONG through its No. 1 contacts, further applies ground to the conductor SL over its No. 2 contacts to cause the hold magnets of the connection train to be held subsequent to the release of relay BL, which will result from the calling subscriber restoring the receiver to permit ringing on his line. At its No. 9 contacts it closes a bridge for the ILBCH- conductor as an indication to the interlink that the link is busy (replacing the bridge at the No. 5 contacts of relay BL upon the release of the latter).

For a reverting call, it is necessary, as mentioned, for the calling subscriber to restore his receiver after he has dialed. Hence when, after the calling subscriber has dialed the ringing code, he restores his receiver, relay AL releases followed in turn by relay BL. Since relay RC is now operated, a circuit is completed for relay LCT which extends from battery through the lower winding of said relay, conductor 118, No. 8 contacts of relay RC to ground on the No. 3 back contacts of relay BL. Relay LCT, upon operating, locks up over a circuit through its lower winding, conductor 118, No. 9 contacts of relay LBSY, conductor 156, No. 6 contacts of relay LCT, to sleeve (SL) ground on No. 2 contacts of relay RC, and conductor SL connects conductors T and R with conductors T' and R', respectively (although without effect on a reverting call since the calling and called stations are both on conductors T and R). Relay RC, through the No. 6 back contacts of relay BL and its own No. 10 front contacts, completes the following path between the upper winding of relay PUL and the pick-up interrupter PU so that, on the next application of ground to conductor 76 by said interrupter, relay PUL will operate. The path is as follows: battery through the upper winding of relay PUL, No. 7 contacts of relay TRAN, conductor 144, No. 10 front contacts of relay RC, No. 6 contacts of relay BL, conductor 76 to ground on the pick-up interrupter PU. Relay PUL operates, locks to ground on conductor LONG over a circuit completed through its No. 2 contacts and lower winding and causes the ringing code impulses to be applied to relay CIL in the manner already described. Since relay RRL is operated over an obvious circuit from ground on the No. 7 contacts of relay LCc through conductor 74, ringing current is applied to the ring conductor R of the line. Once between each ringing cycle, a circuit is completed for relay RCI which extends from battery, winding of said relay, conductor 119, No. 3 contacts of relay RC, conductor 157, No. 1 contacts of relay RC0, No. 1 contacts of relay PUL, conductor 158 to ground applied thereto by interrupter RC of the ringing generator mechanism. This interrupter applies ground to conductor 158 momentarily during the silent period when the circuits through the other interrupters are open so that relay RCI, in operating between each ringing cycle, applies through its No. 2 front contact, conductor 141 and No. 2 front contact of relay RRL, a short impulse of ringing current to the tip conductor T of the line so as to permit the calling party thereon to tell by the suspension of this ringing impulse when the called party answers. Had ringing been applied to the T conductor, relay RRL would have been released to result in the short ringing impulses between cycles being applied to the R conductor. On the other hand, if the calling and called stations both have their ringers connected to the same line conductor, both stations would be advised, in this case, by the hearing of the ringing code that ringing was being applied to the called station and by the suspension of ringing that the called station had answered.

When the called party answers (the calling station, of course, having been instructed not to remove the receiver from the hook until there is complete suspension of ringing), relay RC0 operates causing thereby the release of relay RC by opening the locking circuit therefor at No. 2 back contacts of relay RC0. However, since relay LCT is operated and conductors T and R were disconnected thereby from relay AL which released, in turn releasing relay BL, the release of relay RC disconnects ground from the sleeve conductor SL causing thereby the release of the hold magnets of the connection and the disconnection of ground from the link off-normal conductor LONG, permitting relays of the link holding thereto to restore to normal. The release of the primary hold magnet PHOM1 opens the hold circuit of relay L0, and reconnects relay L over the line loop, causing the reoperation of the latter to provide a holding circuit for relay L0 which, being slow release, now holds with both windings in series over a path previously described. Relay L furnishes talking battery to both subscribers, and when both restore their receiver, cause the release of relay L and the unlocking of relay L0, thus restoring the line circuit to normal.

7. Call to operator

According to the exchange network shown in Fig. 48, calls to the operator from the Alpha office are reached by way of tandem and, according to the directory instructions, such calls may be established by dialing the digit 0. These calls, that is, calls to the operator and exchanges reached through tandem (office Alpha functioning as tandem) are established over a particular trunk group which, for purposes of illustration, may be assumed to be given a numerical designation of 114, and the sender is so arranged that the relay 00 therein designating calls to the operator supplies the units digit designation of the trunk group number while relay OT1 supplies the hundreds and tens designations.

Let it be assumed, therefore, that the subscriber at station 0154 desires to establish a connection to the operator's position. Upon removing the receiver from the hook, the line group circuit operates in the manner described to seize the marker which, in turn, establishes a route from the line to an interlink outlet and to a link and sender connected thereto as previously described. The calling subscriber then receives dial tone in response to which the digit "0" is dialed, resulting thereby in the operation of relay 0 of the digit-register of the sender, which relay locks in series with relay SSQ3 to ground on the No. 1 contacts of relay SSQ2 and battery on the No. 4 contacts of relay C1.

The operation of relay 0 of the digit register causes the operation of relay 00 reserved for operator calls, the circuit for operating the latter relay being traced from battery through the primary winding (P) of said relay, conductor 161, No. 2 contacts of relay OE, No. 3 contacts of relay 0 to ground on the back contacts of relay DN. Relay 00 operates over this circuit and locks to ground on conductor SONG over its No. 1 front contacts and, over its No. 9 front contacts, completes a circuit for relay OT which extends from ground on conductor SONG, No. 9 front contacts of relay 00, conductor 162, winding of relay OT to battery, causing said relay to operate. Ground on conductor 162 also completes a circuit to the winding of relay OT1 which also operates and, among other things, opens certain conductors to the timer circuit in order to prevent, on timed interoffice calls as will be explained hereinafter, the registration therein of the trunk number instead of the called number. The operation of relay 00 also causes the sender to be connected to the line group and marker by a circuit which may be traced from ground, No. 7 contacts of relay 00, conductor 123, No. 1 normally made contacts of relay 2MS, conductor 104, No. 4 back contacts of relay 08, conductor 105 to the winding of relay MS1 to effect operations for this and other purposes previously described.

When relay 00 operates, it furthermore applies ground over its No. 8 contacts to conductor 100 which, as before noted, extends to the No. 11 front contacts of relay OUT (when it operates), thence to the No. 22 contacts of relay MC (when it operates) to conductor U*d'*, completing thereby the circuit of relay PU*d* in the line group circuit and causing it to operate and register the units digit "4" in the line group circuit. It should be noted, however, that in different office networks the trunks to operator may be routed over other trunk groups so if the units designation of the tandem trunk group should be other than "4," circuits may be extended from the front contacts Nos. 8, 9, 10 or 11 to relay 00 and these may be cross-connected to extend ground to conductors U*a'*–U*d'* to mark the units designation. Should the units designation of the trunk group be "5" or greater, in which event more than one conductor is necessary to identify the digit according to the four point code, then other grounded contacts can be added to relay 00 and connected to appropriate conductors U*a'*–U*d'* via contacts of relays OUT and MC for the operation of the corresponding point relays PU*a*–PU*d* in the line group circuit to register the digit.

Similarly, the operation of relay OT1 causes ground to be applied to conductor H*a'* through its No. 1 contacts and to conductor T*a'* through its No. 5 contacts, the former completing the circuit of relay PH*a* in the line group circuit over a previously traced path, causing it to operate and register the hundreds digit "1," while the latter completes the circuit of relay PT*a* in said circuit over a previously traced path, causing said relay to operate and register the tens digit "1." Thus by the operation of relays 00 and OT1 in response to the dialing of the digit 0, the numerical designation of the tandem trunk group is caused to be registered in the line group circuit. The pyramid conductor traced over the upper contacts of relays PU*a*–PU*d*, relays PT1–PT0 and relays PH1–PH0 as a consequence of the operation of relays PH*a*, PT*a* and PU*d*, terminates in conductor C114 at the punching block C whence it is cross-connected to punching C1 and thence to the winding of relay TRK–T of which there is one in the line group circuit for each trunk group in the office (only one being shown in the drawing); that is, trunk relay TRK–T reserved for the group of trunks outgoing to tandem. Since off-normal ground on marker conductor ONG is present on the pyramid conductor C114, as previously described for the similar conductor CO15 of line 015 the circuit for relay TRK–T is completed over conductor 136, causing said relay to operate.

It is the purpose of the trunk relay TRK–T (or the trunk relay individual to any other group of trunks) to extend the "C" and "N" conductors of the trunks in the group to a group of relays whereby, on an originating call, the particular calling trunk is operatively associated with the marker and line group circuit. On "out" calls (as in the present instance), this relay also has the function of extending the "C" and "N" conductors of the trunks to a group of hunting relays so that the group can be searched for an idle trunk.

The trunk relay TRK–T has connected to its upper front contacts 1C–NC conductors which extend to the punching block C whence, in turn, they are cross-connected to appropriate windings of the primary designation relays (PD–) of the several primaries upon which the individual trunks are located. To its front contacts 1X–NX, conductors are connected which extend to the punching block N from which they are cross-connected to the hold magnets of the trunks in the group.

Hence by the registration of the code number 114 of the tandem trunk group in the line group circuit, relay TRK–T individual to this group is operated. Relay T1 will be normal inasmuch as the sender, when it seizes the marker on outgoing calls, operates relay MS- and causes conductor 300 to remain open at the No. 3 contacts of relay ST of the line group circuit incident to the non-operation of this latter relay even if an originating trunk call should appear thereafter, so that the operating circuit of relay TI is open.

The operation of relay TRK-T will result in the "C" and "N" punchings of the tandem group of trunks being extended through the back contacts of relay TI, with the "C" punching conductors being connected to the No. 1 back contacts of the several relays OT1-OTX (depending upon the number of trunks in the group) and the "N" punching conductors being connected through the back contacts IX-DX of relay OTT to the middle windings, respectively, of the corresponding relay OT-. In consequence of this, ground on any of the N trunk conductors, indicating that these trunks are busy, will complete circuits to the corresponding relays in the group of relays OT1-OTX, and these relays will lock up over their respective lower windings and No. 4 contacts to ground on conductor ONG to indicate that their corresponding trunks are busy.

Relay OTT gets an operating circuit upon the operation of any trunk group relay, such as relay TRK-T, for example, provided relay TI is not operated, the circuit of said relay OTT tracing from ground on the "b" contacts of relay TRK-T, "a" contacts of relay TI, winding of relay OTT to battery. Relay OTT is slow operating to permit completion of the busy test above described before transferring the "N" conductors of the trunks in the group to the stationary springs of the No. 2 contacts of relays OT1-OTX. Now if the trunk tested by relay OT1 is idle, this relay will be down and the conductor connected to punching "NI" from the lower pyramid conductor (not shown) of the point relays in Fig. 7 will be extended to conductor "N" of the first trunk in the group via conductor 54 and thence to the hold magnet thereof. If the first trunk is busy, relay OT1 will have operated during the test thereof and the conductor connected to punching "NI" will be extended over the No. 2 front contacts of relay OT1 to relay OT2, etc. until an idle trunk is found whereupon the lower pyramid conductor will be extended over punching "NI," the No. 2 front contacts of the several relays OT- corresponding to the busy trunks to the conductor N- of the idle trunk, and causing the hold magnet PHOM114 thereof to be operated by the marker by extending ground over the trunk conductor N-, cross-point continuity immediately thereafter testing for cross-point continuity in the manner similar to that already described for the hold magnet of a called line in the Alpha office.

The trunk hunting arrangement interposes a slight additional time interval in the line group circuit operation, so the lower winding of relay ICDI is extended over the "a" back contacts of relay OTT. To offset the additional testing time as will be explained hereafter in connection with intercept test, this results in the start of the intercept test being delayed until relay OTT releases.

There will be various numbers of trunks in the several groups, the number of relays OT1-OTX and the corresponding relays OT1'-OTX' provided being equal, if desired, to the maximum number of trunks in the largest trunk group.

With any particular trunk group it is necessary, therefore, to operate the busy relay LBSY when all the trunks in that group test busy. Punching "BT" is provided for each trunk relay TRK- and a punching "NB-" is extended to the No. 5 front contact of each relay OT-. Punching "BT," which is individual to the trunk group relay, is cross-connected to the punching "NB-" of the relay OT- which corresponds to the number of trunks in the group designated by the trunk group relay. That is, if there are, for example, two trunks in the group of operator trunks, punchings "BT" and "NB2" will be connected together so that if both trunks are busy, off-normal ground on conductor ONG will be extended to punching "BT" and thence via the "N" punching, to the upper winding of relay NBSY of the line group circuit, the circuit path in this case being as follows: Battery through the upper winding of relay NBSY, back contacts of relay BT, No. 1 back contacts of relay COMPT, No. 4 back contacts of relay IC, lower pyramid conductor extending to punching N114 cross-connected to punching NI, conductor 54, contacts "c" and "d" of relay TRK-T, punchings BT and NB2, No. 5 contacts of relays OT2 and OT1, respectively, to off-normal ground. Relay NBSY operates over this circuit with results already described.

It may be that all or certain trunks in a group are idle. Yet when the marker attempts to complete the call to a particular trunk it will find all paths busy from the interlink to the secondary switches, or between the secondary switches and the primary upon which the trunk appears, or a combination of these two conditions, which prevents the call from being served.

Now the marker recognizes a trunk call by the fact that when relay TRK-T operates, ground is applied to conductor 85 which completes the circuit of relay OTRK in the marker. Under any of the assumed blocking conditions, the marker calls for a retest since the operation of relay OTRK applies ground from any of the all-busy path chains (of which there will be at least one completed under this condition) to the winding of relay RTB of the marker, causing said relay to operate and re-engage the marker to retest the paths. Upon the operation of relay OTT, retest ground on conductor RTG is extended from the marker by way of the "b" contacts of relay OTT to the armature of the No. 3 contact set of relay OT1. If the first trunk is idle, a circuit is completed via the No. 3 back contacts of relay OT1, winding of relay OT1' to battery, causing the latter to operate. In the event of a retest, retest ground on conductor RTG is opened at the contacts of relay RTA of the marker, permitting relay OT1 to operate in series with relay OT1' (through the upper winding of the former), locking through the contacts of relay OT1' to ground on conductor ONG and transferring the operating circuits to the next idle trunk as indicated by a normal relay OT-. If no retest is made, the presence of ground on conductor RTG will, of course, prevent relay OT1 from operating. If there are no more idle trunks, then relay NBSY is operated by the previously traced circuit including the No. 5 contacts of relay OT-. In this manner, the marker will repeatedly attempt to complete a trunk call up to the limit of its retests or until all the trunks have been exhausted.

It may not be found desirable to provide as many relays OT- and OT-' as there are trunks in the larger group or groups. It would be feasible to have, say, ten sets of relays OT- and OT-' and, in the event of more than ten trunks in a group, and all of the first ten test busy, to have the tenth release the operated relay TRK- and relay OTT, and open the circuit for the locked-up relays OT-. Upon their release, a relay TRK- for the next ten trunks could be operated to effect test over the supplemental trunks in the group. This would require the maintenance of relay ICDI operated to prevent a false intercept condition while the transfer is occurring. This modification is believed to be obvious in view of the above description.

Returning, now, to the further effects that follow the operation of relay TRK-T, the "C" punching of the selected trunk is grounded over a path extending from ground on the "b" contacts of relay TRK-T, "a" contacts of relays TI, "a" front contacts of relay OTT, thence over the No. 1 front contacts of the operated relays OT-, No. 1 back contacts of the first unoperated relay OT- corresponding to the selected idle trunk, the corresponding set of back contacts in the upper group of contacts IC-NC of relay TI, similar set of front contacts in the upper group of contacts IC-NC of relay TRK-T to the individual conductor extending to the "C" punching individual to the trunk. This punching is cross-connected to the primary designation relay PDA (assume the selected trunk to be located in primary switch A). Since the selected trunk in the trunk group numerically designated 114 is an "inter-office" trunk, and the call to be established thereover is an interoffice call, the "C" punching cross-connection is made to the upper winding of relay PDA2 in series with which is the winding of relay IOF. Both relays operate. However, while the operation of the former relay results in the performance of functions already described in connection with the operation of relay PDBI, and the grounding of conductor 13 by relay IOF also results in the performance of functions already noted, ground on the class conductor IOF', applied thereto over the upper contacts of relay IOF, has no effect since, upon the re-seizure of the marker to establish an Out connection to the outgoing trunk, relay Out in the sender is operated and this conductor (as well as other class conductors) is opened.

Returning now to operations which have occurred or are concurrently taking place in the sender, relay 00 applies ground through its No. 7 contacts to conductor 123 which, over the No. 1 normally made continuity contacts of relay 2MS, conductor 104, No. 4 back contacts of relay 08, conductor 105, completes a circuit to the winding of relay MSI of the sender and thence, as previously traced, through the start relay MST of the marker, causing thereby the reseizure of the latter to select an "out" path from the chosen interlink to the available outgoing trunk to which the marker then applies ground to the private conductor N- thereof for operating its hold magnets and thereafter test for cross-point continuity. The continuous extension of conductor T' from the selected trunk to the sender causes a circuit to be completed thereover for relay A of the selected trunk in the group of trunks designated 114, which circuit extends from battery through the upper winding of said relay, winding of relay FL, No. 2 normally made continuity contacts of relay RB, left lower winding of repeating coil RPCI, conductor T' of the connection extending through the various cross-points, No. 4 normally made contacts of relay SC0, conductor 172, No. 5 back contacts of relay TRAN, conductor K3 extending to a contact of the sender link cross-point, No. 3 back contacts of relay LT, conductor 173, contacts of relay PR, secondary winding (S) of relay OTA, to ground on the contacts of relay FLA. Relays A, FL and OTA operate, relay A closing an obvious circuit for relay B which is slow-release, while relay FL shunts resistor R9. Relay A also closes the trunk loop to tandem through the windings of the repeating coil RPCI and the polarized supervisory relay SUP, the latter not operating under normal direction of current flow in the trunk. The circuit traces as follows: Tip conductor T (from tandem), No. 1 contacts of relay A, right lower winding of repeating coil RPCI, winding of relay SUP, contacts of relay FL, right upper winding of repeat coil RPCI, ring conductor R to tandem. In the sender, relay OTA completes a circuit for relay OTB extending from ground on the No. 5 contacts of relay BS, No. 2 front contacts of relay OTA, winding of relay OTB, to battery. When the sender at tandem is ready to serve the call, the current through the trunk conductors T and R between tandem and the outgoing trunk is momentarily reversed to cause relay SUP to operate and then release. Relay SUP, in turn, completes an obvious circuit for relay RB which, for the period that it is up, transfers conductor T' from the battery winding of relay A to the grounded winding of relay A, in consequence of which relay OTA is momentarily shunted down. But since relay OTB is slow in releasing, the latter will hold up on this impulse. The impulse, however, is repeated over a circuit completed from ground to the No. 5 contacts of relay BS, No. 2 back contacts of relay OTA, No. 2 contacts of relay OTB, No. 3 contacts of relay TDL, right winding of relay DR, to battery, causing said relay to operate on its right winding and then lock over a circuit from battery, resistance R10, left winding and No. 1 contacts of said relay, to off-normal ground on conductor SONG. Relay TDL, which operated on the second marker seizure as previously described, maintains this circuit open momentarily to insure proper extension of the circuit to the distant sender at tandem without a false impulse, but it may be that this part of its function may be omitted.

When relay OTA reoperates after the impulse has terminated, and relays SUP and RB of the trunk have released in consequence thereof, it (relay OTA) extends ground on conductor SONG through its No. 1 contacts, No. 2 contacts of relay DR, conductor 86, No. 4 back contacts of relay SI, conductor 87, No. 2 back contacts of relay DI', winding of relay DI, No. 3 normally made contacts of relay DI', to battery on conductor ONB. Relay DI operates and extends battery through its No. 1 contacts, conductor 88, No. 2 back contacts of relay STP, winding of relay PU, No. 1 normally made contacts of relay PU to the pick-up interrupter PU', causing relay PU to operate when the grounded segment of said interrupter is made. Relay PU locks up to ground on conductor SONG but under the control of the No. 2 back contacts of relay STP.

The operation of relay PU extends the impulse commutator DP to conductor DPd via the No. 1 contacts of relay STP and the No. 2 contacts of relay PU, and this conductor further extends through the No. 2 front contacts of relay TP, conductor 68, to the winding of relay DN, and through the No. 2 back contacts of relays SSQ1, SSQ2 and SSQ3, respectively, to the windings of relay 1 of the digit register. Conductor DPd further extends to the winding of relay PR as well as to the primary winding (P) of relay OTA and, while the operation of relay PU causes the connection of impulse commutator DP to conductor DPd and thereby pulse relay PR on the one hand and the digit register on the other, the operation and release of relay PR opens and closes conductor 173 which, it will be recalled, traces back to the upper winding of relay A of the out trunk, causing said relay A to release on every pulse. Relay OTA will not release during pulsing since relays PR and OTA are operated in parallel when conductor 173 is opened, causing the latter relay to hold to the circuit of relay A of the out trunk when the conductor is closed by the release of the relay PR at the end of the pulse. Relay A, in following the pulses caused by the opening and closing of conductor 173, transmits the same to the sender at tandem by opening and closing the trunk loop thereto at its No. 1 contacts. On the first release of relay A, a circuit is closed for slow-release relay C of the trunk, which extends from battery through the winding of said relay, No. 2 contacts of relay B, which is slow-release, to ground on the No. 2 back contacts of relay A. Relay C operates and shunts the trunk side of the repeating coil RPC and relay SUP to improve pulsing conditions, remains operated during the pulsing operations of relay A and releases when the latter reoperates upon the termination of pulsing.

In the sender, each pulse transmitted over the tip conductor T of the trunk via conductor 173 in consequence of the operation of relay PR is also applied to conductor 68 over the No. 2 front contacts of relay TP to operate the relays of the digit register in the manner already described. Since the subscriber has dialed the digit 0, ten such impulses will be transmitted over the trunk and the entire group of relays 1–0 in the digit register will be operated (relay 0 which was locked in response to the tenth dial pulse having meanwhile released upon the operation of relay TP due to battery from relay C1 being cut off by the opening of the No. 2 back contacts of relay TP). Now when relay 0 operates and relay DN releases after ten impulses have been transmitted to the sender at tandem a circuit is completed from ground on the contacts of relay DN, No. 3 contacts of relay 0, conductor 166, No. 2 contacts of relay 00, conductor 167, No. 2 contacts of relay D1, winding of relay STP, to battery. Relay STP operates, opens pulsing conductor DPd to prevent any more pulses from being transmitted to tandem, releases relay PU, and locks in a circuit completed from ground on conductor SONG, right winding and No. 2 front contacts, conductor 88, to battery on the No. 1 contacts of relay D1. Over its No. 3 contacts, it applies ground to conductor 168 thereby shunting battery through resistor R10 and causing the release of relay DR which, upon releasing, opens the operating circuit for relay D1 and removes the shunt around the winding of relay D1' which now operates in a circuit completed from ground on the No. 3 contacts of relay D1, right winding of relay D1', winding of relay D1, No. 3 normally made continuity contacts of relay D1' to battery on conductor ONB. Relay D1' then locks up over its left winding and No. 3 front contacts to battery on conductor ONB and releases relay D1. At its No. 2 front contacts, relay D1' transfers the start circuit over conductor 87 to relay D2 for subsequent digits, if any, while through its No. 1 contacts it completes a circuit for relay SI which extends from ground on said contacts, conductor 169, No. 5 contacts of relay 00, conductor 170, right winding of relay SI, to battery. Inasmuch as only one digit is required to reach the operator, the circuit is arranged to operate relay SI after the transmission of one digit, which relay operates over the circuit above traced and then locks up over its left winding and No. 2 contacts to ground on conductor SONG. Relay SI indicates the completion of the digits to be pulsed by the sender.

It is the purpose of relay DN to disconnect ground from the No. 3 contacts of the digit register relays while each pulse is being transmitted, and to restore it upon completion of each pulse. This prevents the operation of relay STP when the register relay operates at the beginning of the last pulse to be transmitted and thereby prevents the shortening of that pulse. Relay DN is fast to operate in comparison with the register relays and breaks its back contact before No. 3 contacts of the register relays make.

In connection with the operation of the stop-impulse relay SI, it should be noted that as many pairs of out-digit control relays D1, D1' ... D3, D3' may be provided as there are tandem centers through which the connection must be routed to reach the wanted office or for other out-pulsing purposes which may be provided within the scope of this invention. In the present embodiment of the invention and according to the assumed network shown in Fig. 48, the operator, Epsilon and Zeta center are reached through a single tandem (from Alpha) while the three other offices Delta, Beta and Gamma are connected to Alpha by direct trunks. Since Epsilon, Zeta and the operator are reached over a single tandem, only their respective single office digits need be transmitted to the tandem office so that, when the pulses corresponding to their respective digits have been transmitted, impulsing is terminated, which is provided for by cross-connecting the No. 1 contacts of relay D1' with the No. 5 contacts of the Epsilon, Zeta and operator office relays 09, 05 and 00, respectively, with conductor 169 to complete the operating circuit of relay SI.

In the case of the Delta, Beta and Gamma offices, these are reached from Alpha by direct trunks and no office digit need be transmitted since the office digit is, in each of these cases, only of value in causing the marker and line group circuits to select the required out trunk group. However, there may be other networks in which offices may be reached only through a plurality of tandem centers, and the called office code will then comprise as many digits as there are tandems to be traversed, with a digit to be transmitted to each tandem. To provide for this contingency, the sender is provided with a plurality of pairs of out-digit control relays D1, D1' ... D3, D3' (a maximum of three pairs being shown on the assumption that three tandems will be the maximum that will be encountered), with the No. 1 contact of the prime designated one of the pair terminating at a punching for cross-connection to the stationary contact of the No. 5 contact set of each of the office relays in accordance with the number of digits called for by that relay. That is, if one digit only is necessary to reach the office, as will be the case when that office can be reached through a single tandem, then the stationary contact of the No. 5 contact set of the office relay is cross-connected to the stationary contact of the No. 1 contact set of relay D1'. This is the case illustrated in the present embodiment of the invention in which office relays 09, 05 and 00, designating offices that can be reached from Alpha through a single tandem and, therefore, by a single digit, the stationary contacts of the No. 5 contact sets of said relays are connected to the stationary contact of the No. 1 contact set of relay D1' by conductor 169.

On the other hand, if some of the office relays designate offices which are to be reached through two tandem centers requiring thereby the transmission of the first digit for the first tandem and the second digit for the second tandem, the stationary springs of the No. 5 contacts of such office relays would be cross-connected to the stationary spring of the No. 1 contacts of relay D2' and the circuit of relay SI would then be completed after the transmission of the second digit. In the same way, if the office relays designate offices to be reached by way of three tandem centers, the cross-connection of the stationary spring of the No. 5 contacts would be made to the stationary spring of the No. 1 contacts of relay D3'.

Each office relay necessarily determines the number of digits in the office code. The Nos. 2, 3 and 4 contact sets of said relays are provided for the purpose, the No. 2 for the first digit, the No. 3 for the second digit and the No. 4 for the third digit, the stationary springs being extended to terminal punchings which may be cross-connected in accordance with the number of pulses for each digit, to the terminal punchings of the No. 3 contacts of the counting relays of the digit register, and the moving springs are connected in order to the No. 2 contacts of relays D1, D2 and D3 to result in relay STP being operated after the proper number of pulses for each of the required digits has been transmitted. That is, relays D1, D2 and D3 operate as steering relays to control the number of pulses for each of the successive digits and their companion prime designated relays provide for stopping the pulses after the proper number of digits have been transmitted.

Before the release of relay DR and subsequent to the operation of relay SI, the link association circuit is partially closed by completing a path for relay SC0 in the link, said circuit extending from ground on the No. 1 contacts of relay OTA (when operated), No. 2 contacts of relay DR, conductor 86, No. 4 front contacts of relay SI, conductor 188, No. 6 contacts of relay TMR, No. 7 front contacts of relay OT, No. 3 contacts of relay 2MS, conductor 127, and thence as traced through the two windings of relay LS and the winding of relay SC0. Consequently, when the out trunk is momentarily reversed as is contemplated upon the operator answering, relay OTA reoperates over a previously described circuit to battery through relay A of the out trunk, completing thereby the above-traced circuit for relay SC0 in the link relay LT, causing the operation of relay LT and the subsequent operation of relay SC0 after relay LS1 is operated to short-circuit the high resistance winding of relay LS, as previously described. Relay SC0 locks up to ground on conductor SL and the release of relay LS then operates relay LT.

When relay OT operated it extended ground from the No. 8 contacts, conductor 170 winding of relay STD to battery, and in parallel therewith through resistor R2, No. 1 back contacts of relay LT, through the cross-points, conductor K2 for the link, No. 2 back contacts of relay TRAN, conductor 135, upper winding of relay LBSY, No. 3 normal contacts thereof, conductor 139, upper winding of relay LCT to battery. Relay STD operates and locks but performs no function in this type of call. Relay LCT operates over the last traced circuit but relay LBSY, being marginal, does not in view of the limited current flowing in this circuit due to resistor R2 therein. Relay LCT locks up to conductor SL' (which is grounded as will be described) by a circuit which can be traced from ground on conductor SL', No. 8 normal contacts of relay LBSY, conductor SL, No. 6 front contacts of relay LCT, conductor 156, No. 9 normal contacts of relay LBSY, conductor 118, the lower winding of relay LCT to battery. It is noted at this time that ground through the locking circuit of relay STD is also applied to conductor 170 to complete the circuit of relay LCT on test desk calls as explained hereinafter.

The operation of relay SC0 with relay LCT operated as described causes conductors T, T' and R, R' to be connected together free of other apparatus, the integrity of the loop being maintained during cut through operations by the Nos. 2, 3, 4 and 5 continuity contacts of relay SC0. For transmission reasons, it is desirable to cut through the link without any bridged equipment as indicated on all calls which require the operation of relay OT which, as before described, causes the operation of relay LCT in the link; said relay with relay SC0 being maintained operated by sleeve ground returned on conductor SL' from the No. 1 contacts of relay B of the out trunk. At its back No. 9 contacts, relay SC0 opens the operating circuit of relay BL which releases to disconnect ground from conductor LONG and, at its No. 10 contacts, closes a bridge on conductors ILBCH– for purposes previously set forth.

8. Non-coin timed interoffice call

When a local station other than a pay or toll station, calls a distant office, the first digit dialed registers that office, and the relay in the sender designating that office and responsive to the digit dialed causes ground to be applied to conductor 162 for the purpose of operating relay OT. Thus, on a call for a station in Beta from a station in Alpha, the first digit dialed is a 2 (the digit designating Beta) and when the digit relay 2 of the digit register is operated and relay OE operates thereafter, a circuit is completed for relay 02 extending from battery through the winding of relay 02, conductor 143, No. 10 contacts of relay OE, No. 3 contacts of relay 2 to ground on the contacts of relay DN. Relay 02 operates and locks over its No. 1 contacts and No. 10 contacts of relay 00, to ground on conductor SONG. Similarly, a call for Delta which requires a 4 for the first digit and, therefore, the operation of digit relay 4 upon the fourth pulse of the digit, causes said relay to complete a circuit for relay 04 which extends from battery through the winding of said relay, conductor 148, No. 8 contacts of relay OE, No. 3 contacts of digit relay 4 to ground on the contacts of relay DN. A call for Gamma, which requires a 6 for the first digit and, therefore, the operation of digit relay 6, causes said relay to complete a circuit for relay 06 which extends from battery through the winding of said relay, conductor 152, No. 6 contacts of relay OE, No. 3 contacts of relay 6 to ground on conductor DN. A call for Zeta, requiring the first digit 5, results in the operation of digit relay 5 and the completion of a circuit for relay 05 which extends from battery through the winding of said relay, conductor 154, No. 7 contacts of relay OE, No. 3 contacts of relay 5 to ground on the contacts of relay DN. A call for Epsilon, requiring a first digit 9, results in the operation of digit relay 9 and said relay then completes a circuit for office relay 09 over a circuit closed from battery through the winding of said relay, conductor 158, No. 3 contacts of relay OE, No. 3 contacts of digit relay 9, to ground on the contacts of relay DN. In all of the above cases, it will be observed that the operation of an office relay (02, 04, 05, 06, 09) causes ground to be applied to conductor 162 at their No. 8 contacts for operating relay OT.

The second digit dialed is the calling subscriber's own last digit, which is his ringing code, and it is registered in the sender ringing code register (relays Ca–Cd) to complete the registration therein of the calling number, the hundreds, tens and units thereof having been supplied to the sender by the line group circuit on the original seizure of the marker as previously described. It will be recalled that in establishing local calls between different lines in the Alpha office, relay RR was operated in a circuit completed over the No. 10 contacts of relay 03 in order to skip the ringing code register. Since, for an interoffice call, relay 03 is normal, the circuit of relay RR will not be closed, relay RE will be operated and, therefore, the second digit dialed on interoffice calls (which will be the ringing code digit of the calling station) will be registered on relay Ca–Cd. Upon completions of the registration, relay RR will then operate over a circuit similar to any one of the circuits already described for relays OR, HR, TR and UR.

The dialing plan requires that on a mechanically timed call the calling party dial the called office code and his own last digit, and then await dial tone, which is supplied by the distant office before dialing the called number. If the subscriber dials without waiting for the second dial tone, the call is lost and the originating sender causes busy tone to be returned. The circuit for effecting this can be traced from ground on the No. 2 contacts of relay SBSY, conductor 401, back contacts of relay AS (which is being pulsed), No. 2 contacts of relay BS, conductor 266, No. 5 contacts of relay 2MS, conductor 131, right winding of relay BSY to battery. Relay BSY operates to result in the call being transferred to the link, with the latter set for returning busy tone in the manner already described.

On the other hand, it may be that a call will encounter an all-busy condition at an intermediate office or at the terminating office which the originating sender is still serving. In this case the trunk back to the originating sender is held reversed (rather than momentarily reversed as described from a start signal), which results in the release of relay OTA and shortly thereafter relay OTB. A circuit for relay BSY is now prepared from ground on the No. 4 contacts of relay 2MS, conductor 165, No. 3 contacts of relay OT, conductor 267, No. 1 contacts of relay TDL, No. 1 contacts of relay OTB, conductor 131, right winding of relay BSY to battery. The operation of relay BSY effects operations heretofore described to transfer the call to the link for busy tone return, to release the out trunk and the equipment of the office or offices beyond and to dismiss the sender.

If the distant called line is busy, the link thereat will return busy tone to the called party via the local link, the local sender having been previously disconnected from the connection.

Returning now, to relay RR, its operation completes a circuit for the timer-required relay TMR, said circuit extending from ground on the No. 3 front contacts of relay RR, conductor 160, No. 6 front contacts of relay OT, left winding of relay TMR, to battery. The operation of relay TMR extends ground on conductor 160 over its No. 2 contacts to the No. 1 contacts of the all-timers-busy relay TBSY which, as will be shown, is operated by ground on conductor 153 extended thereto by the busy chain circuit through all the timers. If all the timers are busy, relay TBSY will be operated and ground can be traced from conductor SONG, No. 3 back contacts of relay TMC, conductor 175, No. 2 contacts of relay TBSY, No. 4 contacts of relay TMR, conductor 131, right winding of the sender-busy relay BSY to battery, the operation of which results in previously described functions. If it should be considered more desirable, this circuit, instead of operating relay BSY as described, could be connected to the primary winding of relay OO, thereby routing the call to the operator as described for manual ticketing and timing.

On the other hand, if a timer is available and therefore, relay TBSY is normal, ground on conductor 160 is further extended over the No. 1 contacts of said relay, conductor 164, No. 11 contacts of relay SIOF, conductor 168, No. 1 contacts of relay TMC, winding of timer-start relay TST, No. 1 back contacts thereof (the front contact of this combination making with the armature before the back contact breaks upon the operation of said relay), similar normal contacts of relay TST of other senders, start conductor 171, No. 1 contacts of relay TDIS, winding of relay TIST of the timer allotter to battery, causing both relays TST and TIST to operate, the former locking over its No. 1 front contacts to operating battery.

Figure 35:

The timer allotter, shown in Fig. 35, is common to all timers of which, for the purpose of illustration, it is assumed there are ten in the office, and is for the purpose of assigning one of them to a call and connecting it with the sender handling the call. The operation of relay TIST closes an obvious circuit for slow-operate relay TMRY which, before it operates, completes a circuit for slow-release relay DL1 over its No. 1 contacts and, after it operates, applies ground to conductor 172 completing thereby the circuit of the timer connector relay TC of the sender over the No. 3 contacts of relay TST and conductor 186. Relay TC operates to extend to the allotter various leads, among which is one of a plurality of conductors such as ALOT1 as a means of distributing the traffic to the various timers, as will be shown hereinafter, by the assignment of timer No. 1 as first preference to the sender disclosed. The operation of relay TST in the sender blocks out other senders from the timers and, in the event of simultaneous application for a timer, gives preference to the lowest numbered sender in the order. Conductor ALOT1, grounded at the No. 43 contacts of relay TC, extends through the No. 1 contacts of relay ALD to a spring of the No. 2 contact set of timer No. 1 busy relay TBSY1 which, as before stated is assumed to be of the first choice timer for the sender under consideration. If relay TBSY1 is normal, indicating that the corresponding timer is idle, this ground is extended to the upper winding of the timer-connect relay TC1 of the No. 1 timer. If the first choice timer is busy, as indicated by the operated condition of relay TBSY1, conductor ALOT1 is extended through the No. 2 upper front contacts of relay TBSY1 via a circuit chain to the first idle timer beyond, whereupon relay TC– thereof will be operated. Ground on conductor ALOT1 locks up the intervening relays TBSY– to prevent associated timers which become idle from interfering with the establishment of an assignment. Relay TC1, upon operating, locks up in a circuit completed over its lower winding and No. 0 contacts to ground on the No. 2 contacts of relay TMRY and extends various leads from the sender into the timer. Relay TC1 also closes a circuit from ground on its No. 46 contacts to the winding of relay ALD which, upon operating, disconnects all conductors ALOT– from the allotter to prevent a second timer assignment when the timer is later busied by the link circuit as explained hereinafter.

As before stated, the operation of relay TC extends certain leads of the sender to the allotted timer through the latter's relay TC–1. On interoffice calls and certain types of local calls for which timing is necessary as will be explained hereinafter, it is the purpose of the timer to obtain from the sender the called office code and the calling subscriber's number including the ringing code thereof before the sender will be permitted to reseize the marker to establish the path to an out trunk in the wanted direction. It is also the purpose of the timer, in the event of incomplete registration or a trouble condition, to signal the sender to route the call to the operator. All of these functions are carried out through circuits completed over the conductors interconnecting the contacts of relay TC of the sender and relay TC–1 of the allotted timer.

The conductors shown extending between relays TC and TC–1 form a link to which any sender has access on the one hand by operation of its relay TC and to which any timer may be connected and on the other, by the operation of its relay similar to relay TC–1 whereby any sender and any timer may be connected. The use of these link conductors is to transfer information from a sender to a timer and the holding time will be very short, as will be understood.

On a timed call to be established from a line in office Alpha, say station 0154, to a line in an office in the dialing area shown in Fig. 48, the subscriber is required to dial the called office code and his own last digit and then await dial tone to forthcome from the sender in the distant office before dialing the called number. Under these circumstances, the line group and marker circuits function as before to extend the connection to a link and sender, the former of which may be assumed to be the same as before; that is, link 0 of the link group 2 accessible through interlink 2, the numerical designation of the interlink being registered in the interlink register of the sender by the operation and locking of relay I1b thereof and the numerical designation of the link being registered in the link register by operation and locking of relays S1a, S1b, S1c and S1d thereof. Also, the line group circuit transmits the calling line number into the sender wherein it is registered on the originating hundreds, tens and units registers by the operation and locking, respectively, of relays $Oh_a$, $Oh_b$, $Oh_c$, $Oh_d$, $Ot_a$, $Ou_a$ and $Ou_d$ in the manner previously described. The calling subscriber having dialed a 4 for his ringing code the same will, this time, be registered in the ringing code register by the operation and locking therein of relay $Cd$. The called office code, which is dialed ahead of the calling subscriber's ringing code, will be registered, of course, through the operation and locking of the particular office relay individual to said office as, for instance, relay 05 if the call should be for a line in the Zeta office.

As soon, therefore, as relays TC and TC–1 operate, circuit operations are initiated by which the link group, the link, the called office code and the calling line number are registered in the timer. It should be noted, however, that with the operation of relay TMR, the circuit for seizing the marker to complete the Out portion of the call is opened at the No. 3 back contacts of said relay, said contacts, it will be recalled, controlling the operating path of relay MS1 upon which the seizure of the marker depends. Relay TC, at its No. 0 contacts, completes an obvious circuit for TC–1 of the sender over conductor 185 to connect the winding of the timer-complete relay TMC in series with itself, but the latter does not operate due to the shunt ground at the contacts of relay TC. It will be shown that when registration is completed in the timer relay TC is released, causing thereby the removal of the shunt and the operation of relay TMC in series with relay TC, both remaining locked over the contacts of relay TC–1 to ground on conductor SONG. With relay TMC operated, ground on conductor SONG is extended over the No. 3 front contacts of relay TMC, conductor 187, conductor 123, No. 1 continuity contacts of relay 2MS and thence as traced through the winding of relay MS1 and the marker start relay MST to seize the marker. This arrangement, therefore, prevents the marker from being seized to complete the Out portion of the connection until the timer has registered the called office code and calling line number as will be described. The operation of relay TMC opens at its No. 3 back contacts the circuit through the No. 2 contacts of relay TBSY of the sender so that if the last available timer was seized, the operation of relay TBSY upon the release of relay TC will not operate the busy relay BSY.

Returning, now, to the operations in the timer, the locked conditions of relay I1b of the interlink register causes a circuit to be completed from ground on conductor SONG, contacts of relay I1b, No. 37 contacts of relay TC, No. 37 contacts of relay TC–1, conductor 212, left winding of relay LG2, to battery. Relay LG2 operates and closes a locking circuit over its right winding and "a" contacts to a ground which will be applied to conductor TONG before the operating circuit is removed, as will be explained hereinafter.

Now each timer is provided with as many relays LG– as there are link groups, each group being identified by the interlink through which access is had to the individual links in the group. Since the present embodiment of the invention includes but two link groups of ten links each, namely link groups 1 and 2 available, respectively, through interlinks 1 and 2, the timers are provided with but two link group relays, namely relays LG1 and LG2, the former for the purpose of establishing a connection between the timer and the links of group 1 and the latter for establishing a connection between the timer and the links of group 2.

Obviously if more than 20 links are provided in the office, an additional link group relay would be necessary for each additional group of links and a group of pyramid interposing relays responsive to the four-point transfer code combination of operated relays in the interlink register would be needed to effect the selection of the separate link groups relays LG–.

Simultaneously with the registration of the link group in the timer, the numerical designation of the link in the group used for the connection is also registered therein. It has been assumed that link 0 in group 2 is used and that, in consequence, relays $Sl_a$–$Sl_d$ of the sender link register are operated and locked. Hence four circuits are completed for registering the link designation in the timer. The first circuit extends from ground on conductor SONG, contacts of relay $Sl_a$, No. 36 contacts of relay TC, No. 36 contacts of relay TC–I, conductor 201, upper winding of relay $TLa$ to battery; the second circuit is completed from ground on conductor SONG, locking contacts of relay $Sl_b$, No. 35 contacts of relay TC, No. 35 contacts of relay TC–I, conductor 202, upper winding of relay $TLb$ to battery; the third circuit is completed from ground on conductor SONG, locking contacts of relay $Sl_c$, No. 34 contacts of relay TC, No. 34 contacts of relay TC–I, conductor 203, upper winding of relay $TLc$, to battery; the fourth circuit is completed from ground on conductor SONG, contacts of relay $Sl_d$, No. 33 contacts of relay TC, No. 33 contacts of relay TC–I, conductor 204, upper winding of relay $Tld$, to battery. Relays $TLa$, $TLb$, $TLc$ and $TLd$ operate to register the numerical designation 0 of the link in group 2 used for the connection and lock over their respective lower windings and respective Nos. 6, 5, 3 and 6 contacts to ground on conductor TONG applied in consequence of the operation of relay LH subsequent to the operation of relay LG2 as hereinafter set forth.

Relay LG2 (as well as relay LG1) is a "cut-in" relay provided with a locking set of contacts "a" and two pairs of contacts for each of the ten links in the group served by the particular relay LG–. The stationary contacts of the ten pairs shown to the right of the relay extend severally to conductors H in each of the links of the group, said conductors being multipled to corresponding contacts of relays LG– in other timers, while the stationary contacts to the left of the relay extend severally to conductors K in each of the links of the group, said conductors, like conductors H, being multipled to corresponding contacts of corresponding relays LG– in other timers. Hence when relay LG2 operates, conductors H and K of the links of group 2 are extended to the timer, and link 0 thereof, having ground applied to its conductor H from ground on conductor SL as previously traced thereto, No. 4 contacts of relay RCO, and conductor 171, No. 5 contacts of relay FSL, conductor 177, No. 6 contacts of relay LBSY, to conductor H, the same is completed into a circuit for relay LH over the right No. 0 contacts of relay LG2, No. 3 contacts of relay $TLd$, No. 2 contacts of relay $TLa$, No. 3 contacts of relay $TLb$, No. 2 contacts of relay $TLc$, conductor 176, winding of relay LH to battery. Relay LH operates. Over its No. 2 front contacts it applies ground to conductor TONG while over its No. 1 front contacts it applies ground to conductor 178 to complete a circuit to the lower winding of relay TBSY1.

Conductor K from the link is extended over the 0 contacts on the left side of relay LG2 to establish a path over the No. 9 contacts of relay $TLd$, No. 10 front contacts of relay $TLa$, No. 7 front contacts of relay $TLb$, No. 4 front contacts of relay $TLc$, conductor 179, winding of relay TIL, winding of marginal relay TMST to battery. This path, however, is not completed into a circuit at this stage of the operation unless a busy link is seized through fault, in which event, as will be shown hereinafter, relay TIL will operate to cause the call to be routed to the operator.

Figure 37:
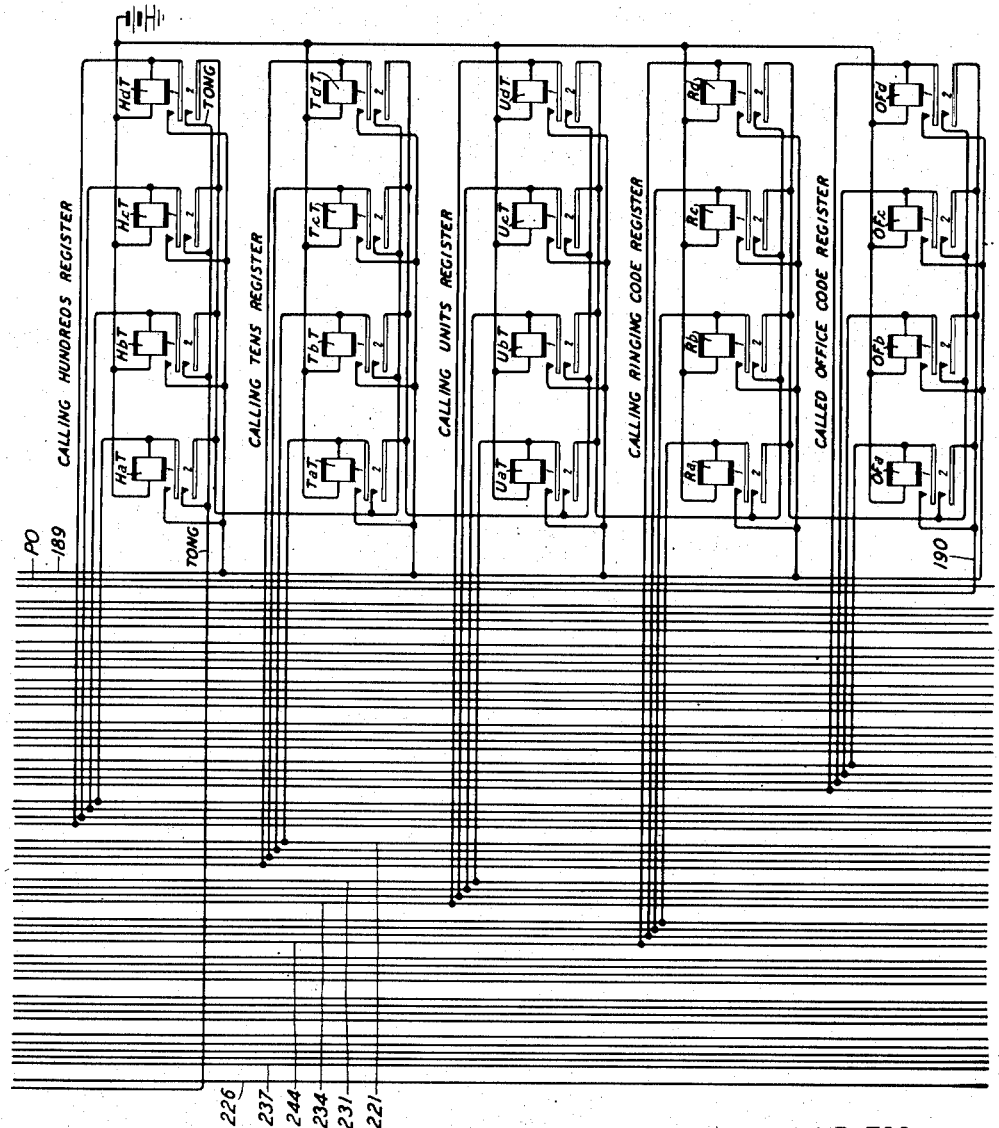
Figure 38:
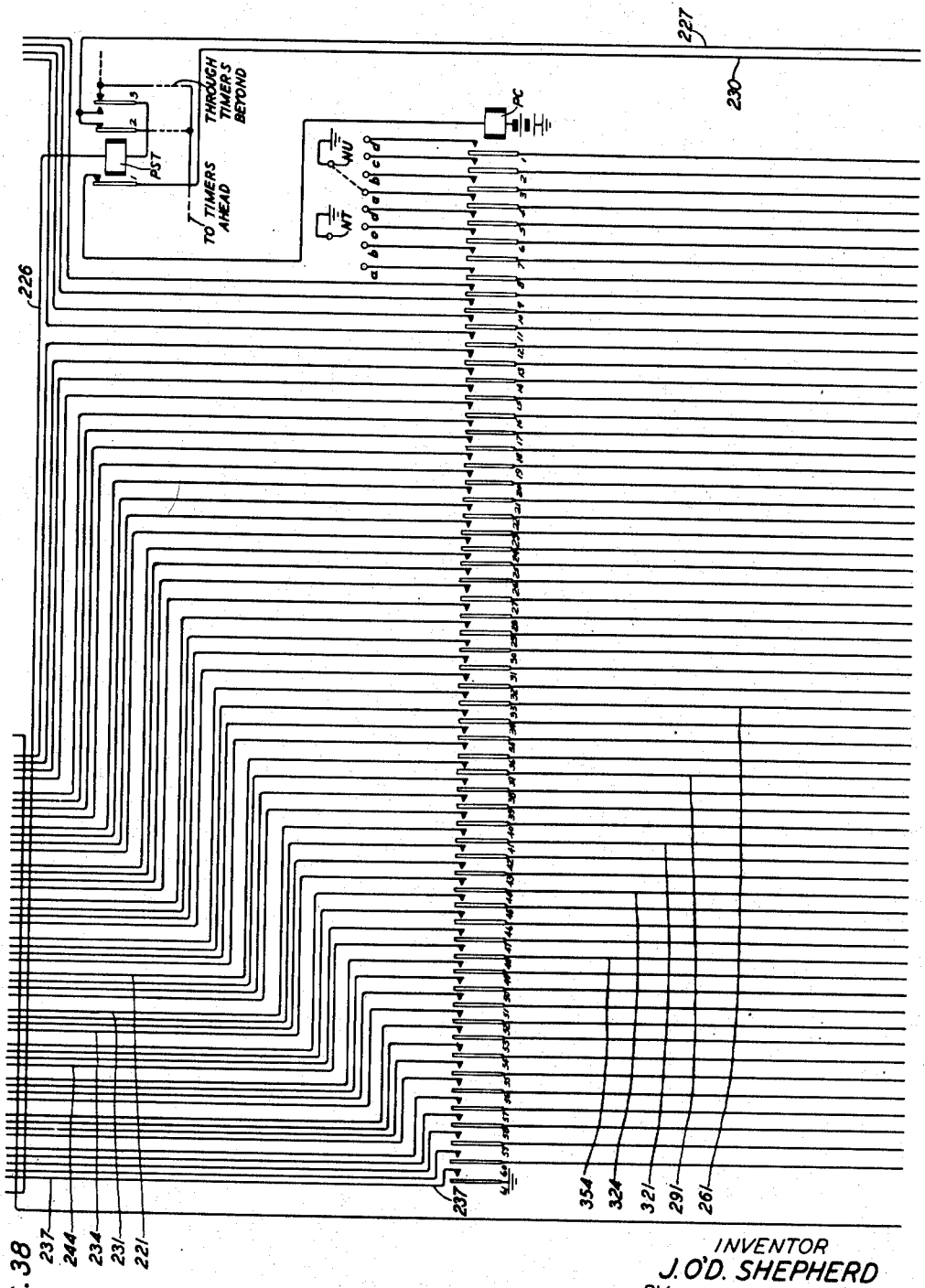

The calling number and called office code are similarly registered in the timer on the correspondingly designated registers shown in Fig. 37. We may, for the purposes of description, assume that the calling line number is 0154, previously used in describing the operation of the invention for the establishment of a local connection, and that said number, therefore, is registered in the numerical registers of the sender as previously described, including the ringing code thereof which is registered by the operation of relay $Cd$ of the ringing code register, while the called office code is registered on the appropriate office relay, which may be assumed to be relay 05 for a connection to office Zeta. Therefore, during the time that the previously described circuits were being closed in the timer for registering the link group and the link in that group used for the connection, other circuits are simultaneously closed to register the calling line number and called office code. The hundreds digit 0 is registered over a circuit completed from ground on conductor SONG, contacts of relay $Oh_a$, No. 32 contacts of relay TC, No. 32 contacts of relay TC–I, conductor 181, winding of relay $HaT$, to battery. Relays $HbT$, $HcT$ and $HdT$ of the calling line register in the timer are similarly operated. The tens digit 1 is registered over a circuit completed from ground on conductor SONG, contacts of relay $Ot_a$, No. 28 contacts of relay TC, No. 28 contacts of relay TC–I, conductor 221, winding of relay $TaT$, to battery. The units digit is registered over two circuits, one circuit from ground on conductor SONG, contacts of relay $Ou_a$, No. 24 contacts of relay TC, No. 24 contacts of relay TC–I, conductor 231, winding of relay $UaT$, to battery, and other circuit from ground on conductor SONG, contacts of relay $Ou_d$, No 21 contacts of relay TC, No. 21 contacts of relay TC–I, conductor 234, winding of relay $UdT$ to battery. The ringing code digit 4 is registered over a circuit completed ground on conductor SONG, contacts of relay $Cd$, No. 17 contacts of relay TC, No. 17 contacts of relay TC–I, conductor 244, winding of relay $Rd$, to battery. The called office code is registered in the sender by the office relay responsive to the called office digit. There is a group of four conductors 191–194 which are connected according to the four-point code to contacts of the various office relays and other relays designating timed connections, and these conductors are further connected to the stationary springs of the Nos. 42–39 contact sets of relay TC, the armatures of which are connected to the stationary springs of corresponding contact pairs on relay TC–I, the armatures of the latter extending through conductors 251–254, respectively, to the windings of the four relays $OFa$–$OFd$ of the called office code register of the timer. Consequently, when an office relay operates and a timer is connected to the sender, the called office code indicated by said relay grounds one or more conductors 191–194 according to the four-point code to cause the registration of the called office code in the timer by the selective operation of relays $OFa$–$OFd$.

It has been assumed that the call is to be completed to a line in office Zeta and, therefore, that relay 05 designating this office has been operated. Therefore, relay 05 upon operating grounds conductors 191 and 194 at its No. 6 and No. 7 contacts, respectively, completing thereby the circuits of relays OFa and OFd over the following circuit paths: ground on the No. 6 contacts of relay 05, conductor 191, No. 42 contacts of relay TC, No. 42 contacts of relay TC-1, conductor 251, winding of relay OFa to battery; ground on conductor 194, No. 39 contacts of relay TC, No. 39 contacts of relay TC-1, conductor 254, winding of relay OFd to battery.

All of the relays in the calling number and called office code registers which have been operated as above described lock through their respective No. 1 contacts to ground on conductor 189 applied thereto from the No. 2 front contacts of relay LH, normally made No. 3 continuity contacts of relay PRQ and No. 1 contacts of relay RES.

The No. 2 contacts of the operated relays of the above registers complete a chain circuit which is in multiple with respect to the relays of each register but in series with respect to the several registers, for the operation of the timer dismiss relay TDIS, said circuit, for the calling number 0154 and called office 05 assumed, tracing from ground on conductor TONG, No. 2 contacts of relays HaT, TaT, UaT, UdT, Rd and OFa (or OFd), conductor 190, No. 1 contacts of relay TBSY1, No. 43 contacts of relay TC-1, secondary winding (S) of relay TDIS to battery. Relay TDIS operates after an interval and opens the start conductor 171 causing thereby the release of relay TIST in the timer and TST in the sender. The release of relay TST opens the circuit of relay TC thereby opening the connecting leads between the sender and the timer, revolving the shunt around the circuit of relay TMC causing the latter to operate to indicate completion of transfer of information from the sender to the timer and to close the previously described circuit of relay MS1 in the sender and relay MST in the marker for seizing the marker to establish an outlet to an out trunk in the group of trunks reserved for the Zeta office.

It will be recalled that when the timer circuit was seized, a circuit was completed for relay DL1. Relay DL1 causes the successive operation of relays DL2 and DL3, all of which are slow-releasing. On the operation of relay TMRY, these "delay" relays release in sequence, but by the time relay TDIS operates upon the completion of registration, relay DL3 will still be up so that relay TDIS locks over its primary winding (P) and No. 3 contacts to ground on the No. 3 contacts of relay DL3. The release of relay DL3 opens the locking circuit of relay TDIS, the circuit through secondary winding (S) of this relay having been opened by the release of relay TC-1 consequent to the release of relay TMRY following the release of relay ST.

If a digit is not registered by each of the calling number and distant exchange registers, the previously described circuit through the secondary winding (S) of relay TDIS will not be completed. Relay TDIS, therefore, will not be operated by the time relay DL2 is released and relay DL3 is operated. Under these circumstances, the call is routed to the operator and, therefore, when the condition occurs in which relay DL2 is down, DL3 is up and TDIS is down, a circuit is completed for relay 00 in the sender which extends from ground on the No. 4 contacts of relay TDIS, No. 2 contacts of relay DL2, No. 1 contacts of relay DL3, conductor P0, No. 44 contacts of relay TC, conductor 195 conductor 161, primary winding (P) of relay 00 to battery. Relay 00 operates, at its No. 10 contacts opens the locking circuit of relay 05 which releases and, through its other contacts, controls circuits to perform previously described functions for extending the connection to the operator.

The call is likewise routed to the operator in the event that both the primary and spare printers are in trouble or in the event that, due to improper operations, an idle link or a link handling another call is seized. It will be shown that, in case the printers are unavailable, conductor P0, which extends to the No. 44 contacts of relay TC-1 and, therefore, joins conductor 195 on the No. 44 contacts of relay TC, will be grounded to complete the above-described circuit of relay 00 to cause the call to be routed to the operator.

In the latter case, if the timer becomes connected to an idle link, conductor H therefor will not be grounded failing thereby to operate relay LH and to operate relay TBSY1 thereafter. Consequently, in the interval between the release of relays DL2 and DL3, conductor 195 will be grounded from the No. 4 contacts of relay TDIS over a previously described path to operate relay 00 and cause the call to be routed to the operator over the link actually assigned for the connection.

If the timer becomes falsely connected to a link handling another call, conductor K will be grounded immediately or practically so upon the seizure of the link and a circuit is then completed from ground on said conductor K through the operated combination of relays TLa-TLd, conductor 179, winding of relay TIL, winding of relay TMST to battery. Relay TIL, upon operating, grounds conductor 196 via its No. 1 front contacts, No. 44 contacts of relays TC-1 and TC, conductor 195, and thence as previously traced to relay 00 which operates to cause the call to be routed to the operator.

In all of the above cases, if it is desired not to route the call to the operator, an alternative arrangement would be to connect conductor 195 to conductor 131 and cause thereby the operation of relay BSY to return busy tone to the subscriber.

The second seizure of the marker upon the complete registration of the called number and called exchange in the timer will cause the marker, in conjunction with the line group circuit, to establish an outlet to an idle out trunk in the group 114 as described for operator calls, Zeta and operator being reached via tandem. In the case of other offices reached by direct trunks, the office relays involved are each provided with a set of contacts for applying ground to the appropriate conductor in the groups Ua'-Ud' for registering the numerical designation of the trunk group in the line group circuit. The hundreds and tens leads for registering digits "11" are grounded by relay OT1 as before described in connection with operator calls.

The operation of relay 2MS after the marker, upon second seizure, has established the link outlet to the selected out trunk, completes a previously described circuit for relay TP to cause dial impulses to be made available for routing the call to the distant called office. As previously described, when the distant or tandem sender is ready, the momentary reversal of battery over the trunk operates relay DR to cause the transmission of the digit determined by the cross-connection between the operated office relay and the counting relays of the digit register. When this is completed, relay DR is shunted down and the digit control is shifted to relays D2 and D2'. The reversal of battery from the next sender (if one is assumed) will cause the digit to be transmitted to be controlled by other contacts of the office relay. This shifts the digit control circuit to relays D3 and D3' for the third digit which is then transmitted.

When the sender is satisfied depending on the cross-connection between the office relay and relay SI, the latter is operated, which indicates that the call has been routed through the final tandem or the office code has been transmitted to the sender in the tandem office if the call is to be terminated therein. This, as previously described, conditions the local sender for the trunk reversal which will dismiss it.

With relay SI operated, reversal of battery from beyond the outgoing trunk will release relay OTA to reoperate relay DR and, upon subsequent operation of relay OTA, ground is applied to both windings of relay LS over the following path: ground on the No. 1 contacts of relay OTA, No. 2 contacts of relay DR, conductor 86, No. 4 front contacts of relay SI, conductor 188, No. 2 front contacts of relay TMC, conductor 198, No. 7 front contacts of relay OT, No. 3 contacts of 2MS, conductor 127, No. 1 contacts of relay BSY to the low resistance winding of relay LS and thence as previously traced for an operator's call, to the winding of relay SC0 causing said relay to lock up to ground on conductor SL. Relay LS releases to operate relay LT. Since relay LCT was previously operated by relay OT in the sender, when the sender has completed its switching functions and relay SSC0 and TRAN of the link are operated, the release of relay BL of the link (following the release of relay AL upon the operation of relay LCT) causes conductor K of the link to be connected to conductor C' of the out trunk over the following path: conductor K, No. 7 contacts of relay LBSY, conductor 205, No. 4 back contacts of relay BL, conductor 206, No. 8 front contacts of relay TRAN, conductor 207, conductor C' through the cross-points of the outward connection, resistor R11 of the out trunk, No. 3 contacts of relay B, No. 2 contacts of relay A to ground. Conductor K in the timer completes a circuit as previously described through relays TIL and TMST thereof causing the operation of the former but not the latter. The operation of relay TIL causes the operation of relay BT over a circuit extending from ground on the No. 3 back contacts of relay PRQ, No. 2 front contacts of relay TIL, winding of relay BT to battery. The timer is now ready to receive the digits of the called number.

When the sender at the distant office is ready to receive these digits, it puts forth dial tone over the connection, the circuit of said dial tone being completed through the right windings of repeating coil RPC1 and the No. 1 contacts of relay A thereof and repeated over the left windings of said repeating coil, conductors T', R' and T, R joined together by operated relays SC0 and LCT of the link back to the calling loop. Since relay A of the out trunk is held over the calling subscriber's loop, the dialing of the called number will result in corresponding interruptions of the circuit of relay A. When the loop is opened due to a dial pulse interruption, relay A releases, on the one hand to cause the pulse to be repeated to the distant office by a break in the interoffice loop at the No. 1 contacts of said relay and, on the other, to cause the pulse to be repeated back to the timer by the opening of the No. 2 contacts of said relay and producing thereby a break in the continuity of conductors C', and K which causes TIL in the timer to release on each pulse. The pulsing of relay TIL results in the counting chain being operated, said chain comprising ten numerical relays T1–T0 and their three sequence companion relays Q1, Q2 and Q3. On the first release of relay TIL, relay C1 operates over a circuit completed from ground on the No. 3 back contacts of relay PRQ, No. 2 back contacts of relay TIL, contacts of relay BT which remains up between pulses, winding of relay C1 to battery. Relay C1 closes an obvious circuit for relay C2 which, upon operating, furnishes holding battery for the counting chain of numerical relays, said battery being furnished through the No. 2 back contacts of relay PRQ, No. 2 front contacts of relay C2, to conductor 208 which extends to the winding of each of the numerical relays T1–T0, while at the same time, an operating circuit is completed for digit relay T1 that extends from ground as traced to the winding of relay C1, conductor 209, No. 1 back contacts of sequence relays Q1, Q2 and Q3, winding of relay T1, to aforetraced battery on conductor 208. Relay T1 operates, locks over its No. 1 contacts in series with relay Q1 to ground on the No. 2 contacts of relay Q2, causing said relay Q1 to operate at the end of the pulse and transfer the pulsing circuit to relay T2 over the No. 2 contacts of relay T1 and the No. 1 front contacts of relay Q1. The next pulse completes this circuit through the winding of relay T2 to aforetraced battery on conductor 208 causing it to operate and lock over its No. 2 contacts in series with the winding of relay Q2 to ground on the No. 2 contacts of relay Q3. Relay Q2 operates in this circuit at the end of the pulse, advances the pulsing circuit through its No. 1 contacts and No. 2 contacts of relay T2 to the winding of relay T3 and opens the locking circuit of relays T1 and Q1, thereby causing them to release. The third pulse completes the circuit of relay T3 which operates and then locks over its No. 1 contacts, winding of relay Q3 to ground on the No. 2 contacts of relay Q1, opens the locking circuit of relays T2 and Q2, and advances the pulsing circuit via its No. 1 front contacts, No. 2 contacts of relay T3 to the winding of relay T4. The fourth pulse completes the circuit of relay T4 which now locks over its No. 1 contacts in series with the winding of relay Q1 to ground on the No. 2 contacts of relay Q2, relay Q1 operating in this locking circuit to release both relays Q3 and T3.

Succeeding pulses cause the sequence relays to repeat the operating cycle through digit relays T5–T0, and when the train of pulses constituting the first digit is completed, relay C1 releases and extends ground through its back contacts, No. 1 contacts of relay C2 (which remains in its operated position momentarily), conductor 210, No. 3, No. 4 and No. 5 contacts of whichever digit relay remains operated on the last pulse, to one or more leads through the Nos. 2, 3, 4 and 5 back contacts of relays DD, DC, DB and DA to the register relays TOF– causing the latter to selectively operate and lock up with the digit thereon.

The number registers provided for the Called Number Register will depend upon the maximum number of digits in the largest multioffice exchange of the network. Five registers are shown in Fig. 36 for a maximum of five digits to provide, for example, for calls to Epsilon which may be considered a large step-by-step office requiring five digits to selectively position its selectors to the terminals of the wanted line.

In reference to the registration of the wanted number, if the first digit of the called number is "1," ground on conductor 210 completes a circuit for relay TOF$_a$ over the No. 3 contacts of relay T1, No. 5 back contacts of relays DD, DC, DB and DA, conductor 213, winding of relay TOF$_a$ to battery, causing said relay to operate and lock over its No. 1 contacts to ground on conductor 189. If the first digit is a "2," digit relay T2 will remain operated at the end of the second pulse to complete a circuit for relay TOF$_b$ extending from ground on conductor 210, No. 3 contacts of relay T2, No. 4 back contacts of relays DD, DC, DB and DA, conductor 214, winding of relay TOF$_b$ to battery, causing said relay to operate and lock over its No. 1 contacts to ground on conductor 189. The circuit for the digit 3 is completed from ground on conductor 210, No. 3 contacts of relay T3, No. 3 back contacts of relays DD, DC, DB and DA, conductor 215, winding of relay TOF$_c$ to battery. If the digit is "4," relay T4 will be operated and a circuit is completed for relay TOF$_d$, said circuit extending from ground on conductor 210, No. 3 contacts of relay 4, No. 2 back contacts of relays DD, DC, DB and DA, conductor 216, winding of relay TOF$_d$ to battery, causing said relay to operate and lock over its No. 1 contacts to ground on conductor 189. In the same way, if the digit comprises a 5 and digit relay T5 is operated in consequence thereof, then two circuits will be completed over its Nos. 3 and 4 contacts for relays TOF$_a$ and TOF$_d$ over paths easily traceable from those already given, while similar circuits to register any of the remaining digits 6–0, inclusive, according to the four-point code will similarly be completed.

After the first digit is transmitted to the out trunk and registered in the relays of register TOF– of the timer circuit, relay C2 thereof releases the registration circuit, holding battery for the counting registers is opened and relay DA is operated over a circuit which is completed from ground on the No. 2 contacts of any one of the operated relays of register TOF–, conductor 217, winding of relay DA, conductor 218, No. 2 back contacts of relay C2, No. 2 contacts of relay PRQ to battery. Relay DA locks over a circuit completed from battery through its upper winding and No. 1 contacts to ground on conductor 189, and transfers the register leads to the relays of the register TTH– in which is registered the pulse of the second digit in a manner similar to the registration of the first digit on the relays of register TOF–. Subsequent to the registration of the second digit on the relays of register TTH–, a circuit is completed for relay DB from ground on the No. 2 contacts of any one of the operated relays in register TTH–, conductor 219, lower winding of relay DB to previously traced battery on conductor 218 causing the operation of said relay which then locks over a circuit completed from battery through its upper winding and No. 1 contacts to aforetraced ground on conductor 189 and transfers the register leads to the relays of register TH– wherein are registered the pulses of the third digit, subsequent to which a circuit is completed for relay DC which extends from ground on the No. 2 contacts of any one of the operated relays in register TH–, conductor 220, lower winding of relay DC to aforetraced battery on conductor 218. Relay DC operates, locks over a circuit completed from battery through its upper winding and No. 1 contacts to ground on conductor 189 and transfers the register leads to the relays of register TT– upon which are registered the pulses of the fourth digit, subsequent to which a circuit is completed for relay DD which may be traced from ground on the No. 2 contacts of the operated relays of register TT–, conductor 225, lower winding of relay DD to aforetraced battery on conductor 218. Relay DD operates, locks over a circuit completed from battery through its upper winding and No. 1 contacts to ground on conductor 189 and transfers the register leads to the relays of register TU– wherein are registered the pulses of the last or fifth digit. If it is desired to omit the last register TU–, the same may be done by locking the last digit on the counting register relays T1–T0 of the timer circuit in the same manner as the ringing code of a local wanted station is locked on the counting register relays of the sender circuit.

Thus as the wanted number is pulses out to the distant sender, the same is registered in the timer at the home office, and when the called party answers, the trunk is reversed to operate polarized relay SUP in the out trunk which, in turn, operates relay RB. At its No. 4 contacts, relay RB short-circuits resistor R11 to increase the current in the circuit over conductors C' and K, which circuit includes relays TIL and TMST of the timer, the former having been operated continuously through the operations above described, while the latter, being marginal, operates now for the first time due to the increase of current in the circuit. Relay TMST operates relays TMST' which locks over its left winding and No. 2 contacts to ground on conductor TONG. A circuit is then extended from ground through the 30-I. P. M. interrupter, No. 1 contacts of relay TMST, No. 3 contacts of relay TMST', No. 8 contacts of relay RES, winding of magnet SF to battery. Magnet SF which controls cam F operates to advance one position to accumulate time against the call.

Figure 33:
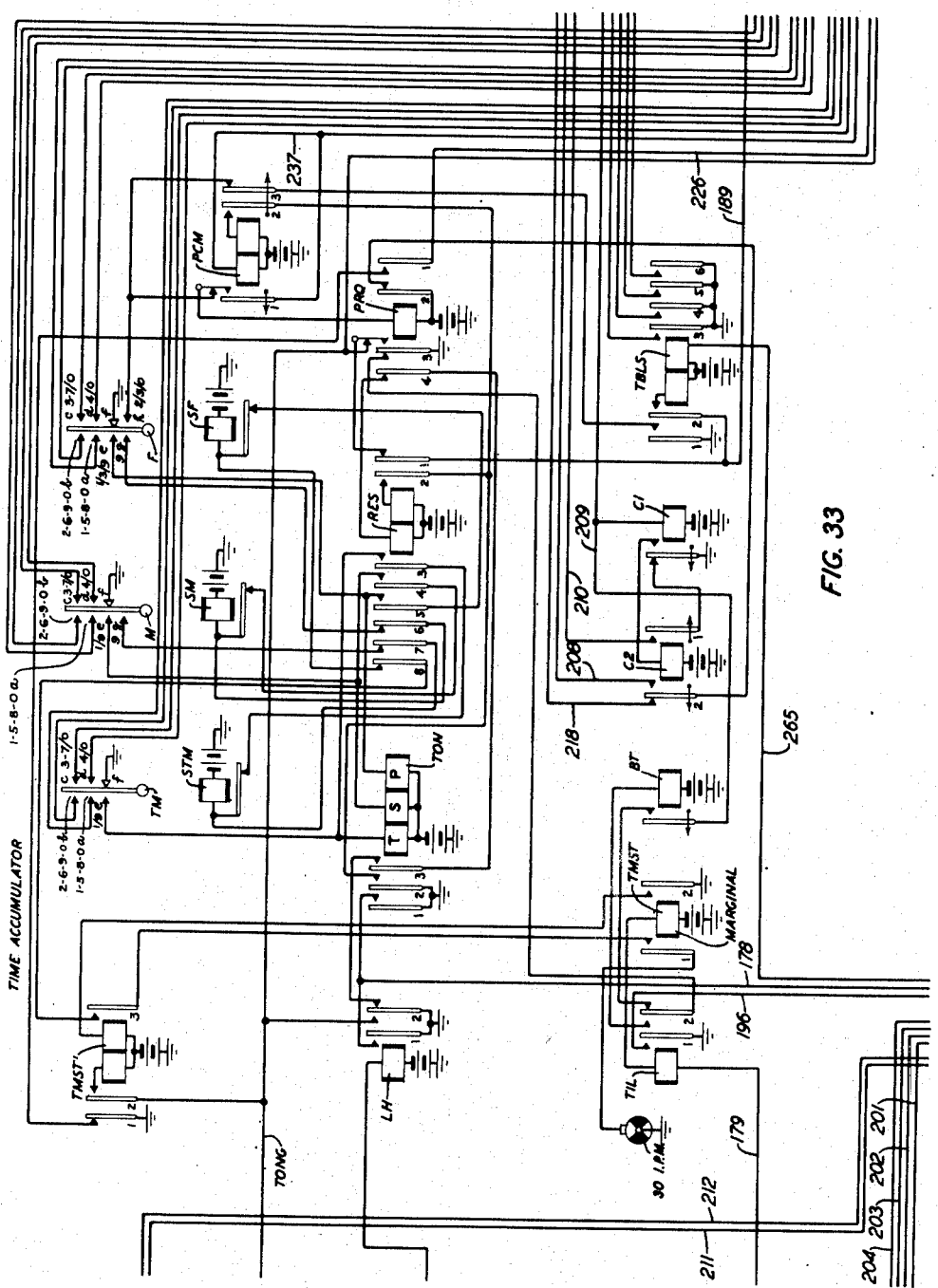
Figure 34:
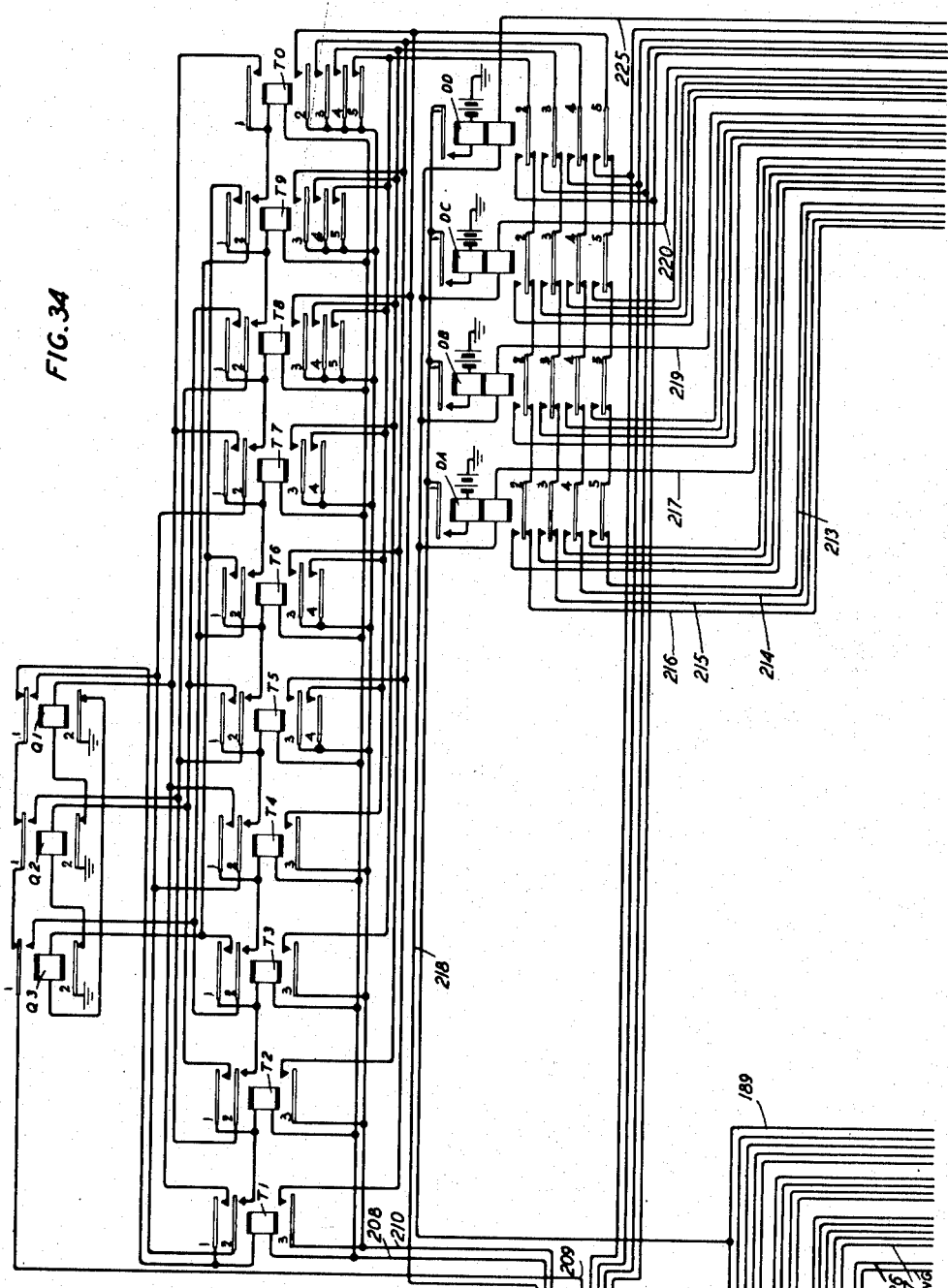

The "time accumulator" shown in Fig. 33, comprises three cams, F, M and TM of general design similar to enlarged sequence switch cams. Each cam has 10 positions except cam F which has 30, although the cuttings of the latter is on the basis of 10 positions. The first or fraction-minute cam F has eight brushes "a"–"h," inclusive, while the minute cam M has seven, and the tens-of-minutes cam TM has six. Brush "f" on each is used as a ground feed, while brush "e" is utilized for restoration. The "e" cutting on cam F is from ⅓ through 9.0 and on cams M and TM from 1.0 through 9.0. The "h" cutting on cam F is from ⅔ through 0.0 and is for the purpose of printer association if between 2 and 4 seconds are registered, as will be explained hereinafter. Brushes "a," "b," "c" and "d" correspond to the number of transfer leads and the cuttings therefor are in accordance with the four-point transfer code while "carry-over" is effected by brush "g" on cams F and M.

Each cam is driven independently by a stepping magnet associated with it, stepping magnet SF for cam F being actuated by the 30-I. P. M. interrupter, the circuit for which magnet is closed, as already stated, at the beginning and opened at the conclusion of timing. The other two cams M and TM are stepped once each revolution of the preceding cam by circuits closed through brush "g" thereof to their respective magnets SM and STM. The cutting for this brush is for position 9 so that when cam F, for example, reaches this position, magnet SM is operated to position its pawl, and when cam F is advanced to position 0, magnet SM releases to advance cam M one position. Hence when stepping magnet SF operates over the above-described circuit and cam F moves off-normal, a circuit for relay TON is completed from ground through brushes "f" and "e" of cam F, primary winding (P) of relay TON to battery. Relay TON (which is provided with a winding for brush "e" of each cam) operates and, at its No. 1 contacts, applies ground to conductor 178 to hold relay TBSY1 operated in order to make the timer unavailable for another call until all three time accumulating cams are restored to normal, as evidenced by the release of relay TON.

As long as the two subscribers hold the connection, interrupter 30-I. P. M. continues to advance cam F one position for each two seconds, 30 steps constituting a full revolution of the cam or one minute of conversation time. Each time cam F makes one revolution, cam M is advanced one position by virtue of the circuit completed for magnet SM of cam M through brushes "f" and "g" of cam F and the No. 6 contacts of relay RES, and every time cam M makes a revolution, cam TM is advanced one position by virtue of the circuit completed for magnet STM through the "f" and "g" brushes of cam F and No. 7 contacts of relay RES. Consequently, time is accumulated at two second intervals for the duration of the call and brush "h" of cam F, which is closed in position ⅔, completes the circuit of the printer-required relay PRQ through the No. 1 normally made contacts of slow-release relay PCM. Relay PRQ operates and performs functions noted hereinafter. At this point, however, it may be noted that relay PRQ, at its No. 3 front contacts, substitutes direct ground for controlled ground on conductor TONG to hold the operated register relays. The release of relay LH which removes ground from conductor TONG therefore will not affect the registration. It is further to be noted that the circuit to the counting relays T1–T0 is opened at the No. 3 back contacts of relay PRQ to prevent the registration of an additional digit upon completion of timing due to the release of relay TIL.

When the call is completed, the opening of the calling loop releases relay A of the out trunk, in turn releasing relay B, and when the called loop is opened, relay SUP releases to in turn release relay RB. The release of both relays B and RB opens conductor C' to remove ground on conductor K and thereby cause the release of relays TIL and TMST in the timer. The release of relay B also removes sleeve ground from conductor SL' and thereby causes the disconnection of said ground from conductor H, in consequence of which relay LH releases. The release of relay TMST indicates that timing is completed.

The release of relay LH upon the release of the link removes hold ground from the operated link-group relay LG2 and from the link-selector relays TLa–TLb permitting them to release thereby to effect disconnection from the link and make it immediately available for reassignment irrespective of how long the timer must wait for the printer.

It has already been noted that relay PRQ operates as soon as cam F is in position ⅔ and that relay TMST releases upon the completion of timing. The release of relay TMST releases relay TMST' since the supplementary holding circuit of the latter is opened by the operation of relay PRQ. If a printer is available, a circuit is completed for the printer-start relay PST of that printer, which circuit extends from ground on the No. 1 contacts of relay TMST', No. 1 contacts of relay PRQ, conductor 226, winding of relay PST, No. 3 back contacts of said relay (the front contact of the No. 3 contact-set making before the No. 2 contacts break), through the No. 3 contacts of relays PST of other timers, No. 2 back contacts of said relays, including that of the timer illustrated, start conductor 227, No. 2 normally made continuity contacts of relay TR, conductor 228, No. 9 normally made contacts of transfer key PTRAN, conductor 229, No. 1 contacts of slow-release relay DIS, winding of relay PRST to battery. Relays PST and PRST operate, the former locking over its No. 3 front contacts in series with relay PRST, thus breaking the battery lead to other printers in order to lock them out. Relay PRST closes an obvious circuit for printer-ready relay PRY which, upon operation, grounds conductor 230 to operate relay PC over the following path: ground on the No. 2 contacts of relay SG, No. 1 contacts of relay PRY, No. 2 contacts of relay DIS, conductor 235, No. 7 normally made contacts of transfer key PTRAN, conductor 236, No. 1 normally made continuity contacts of relay TR, conductor 230, No. 1 contacts of relay PST, winding of relay PC to battery.

9. Mechanism of the printer

Relay PC, upon operating, extends various conductors from the timer to the printer. As will be shown hereinafter, the printer will take from these conductors the details of the call including the elapsed time and timer number and print them. At its No. 61 contacts relay PC causes ground to be applied to conductor 237 to complete the circuit to the left winding of relay PCM which operates and then locks over a circuit through its right winding and No. 2 contacts to ground on the No. 2 contacts of relay TON. Relay PCM substitutes ground on conductor 237 at its No. 1 front contacts for that from brush "h" of cam F to hold relay PRQ operated.

Before considering the further operations of the printer circuit which is shown on Figs. 38 to 44 inclusive disposed as shown in Fig. 47, attention is directed to one form of the printer mechanism, schematically indicated in Figs. 50A, B, C and D, which could be used with the circuits of the telephone system covered by the present invention. In this mechanism, the tickets are supplied from an appropriate paper roll which is at the top. Its bearings have a slight drag to prevent the roll unwinding as the ticket is advanced during the printing operations. The paper passes through two tension rollers and down in front of a type wheel of which there are a plurality mounted on a common shaft. From there it passes around an idler 18 which maintains it tight against the paper feed roller. A second idler 19 maintains it tight on the other side of the roller and delivers it into an appropriate ticket receptacle. The paper feed roll is stepped by the paper feed magnet PF, which has contacts that provide a self-interrupting circuit for one stage of the operations. If the paper roll gives out, the paper test contacts are closed which causes the printer to be removed from service and the spare printer substituted for it.

The type wheel of each digit is revolved by an associated gear sector each of which, in turn, has a spring SP which tends to make it revolve clockwise. The type wheels of the several digits which are printed simultaneously and their associated gear sectors are free to revolve around their respective common shafts. Pin 14 rests against arm 15 of the positioning frame which results in the gear sectors and type wheels normally being held as shown. For each digit there is provided four arc-shaped code bars with notches cut in their concave side and each with one trigger projection 10 on the convex side. The bars are normally held as shown by projection 11, which is an extension of the gear sector. Should the gear sector be revolved clockwise, the code bars would be pulled down by their springs 5 but would be stopped by their trigger projections striking their respective triggers. These triggers can be withdrawn by their respective digit selector magnets, which are operated in combinations depending upon the digit to be printed, to permit the corresponding code bars to complete their movement.

Each gear sector has a finger 13 on its projection which moves along the concave surface of its code bars when it is revolved clockwise. The notches of the code bars are cut in accordance with the transfer code used throughout the circuits of the invention. If, for example, it is desired to print a "5" for the first digit, selector magnets 1a and 1d are operated. When the operating solenoid SOL pulls down its positioning frame and permits the first digit gear-sector to revolve, finger 13 slides along the code bars, but at each position one or more of the bars will present a sliding surface for it until it reaches the position for digit "5," where notches in the four bars will be aligned. At this point, the finger 13 will be caught, stepping the sector. The type wheel will present, in this position, a "5" which will be printed on the ticket by the associated hammer striking it. If a digit is not to be printed, none of the code bars will move, and the finger will stop the gear section in position B, resulting in a blank instead of a printed digit.

The armature of the operating solenoid SOL continues to travel down permitting the gear sectors of the several digits to be stopped independently and the type wheels positioned correspondingly thereto. When it reaches the bottom of its travel, it closes contacts 2 which complete a circuit to operate the print magnet PRINT, to result in the several digits being printed simultaneously. The operating circuit for the solenoid SOL will then be opened after printing operation and the positioning frame will be drawn up, gathering the several gear sectors as it travels until all are held in the position shown.

The print magnet has a separate hammer for each type wheel, said hammers being separately sprung. When it operates its armature, pins 12 impart a sharp forward motion to the several hammers. When the armature completes its movement the hammers continue due to inertia, strike the paper and fall away therefrom. Two contacts are closed by the print magnet armature to indicate the digit has been printed and to close the circuit to the paper feed magnet PF.

The shaft of the paper feed roller carries a cam CM of the sequence switch type which cooperates with contacts PON to control the paper feed and printer circuit. If desired, a magnet-operated knife blade could be provided at the ticket receptacle, so that each ticket could be cut off before being deposited in the receptacle. This would require some change in the design of the feed roller and associated mechanism so as to reduce the amount of paper for each ticket.

10. *Printer operations*

Figure 44:
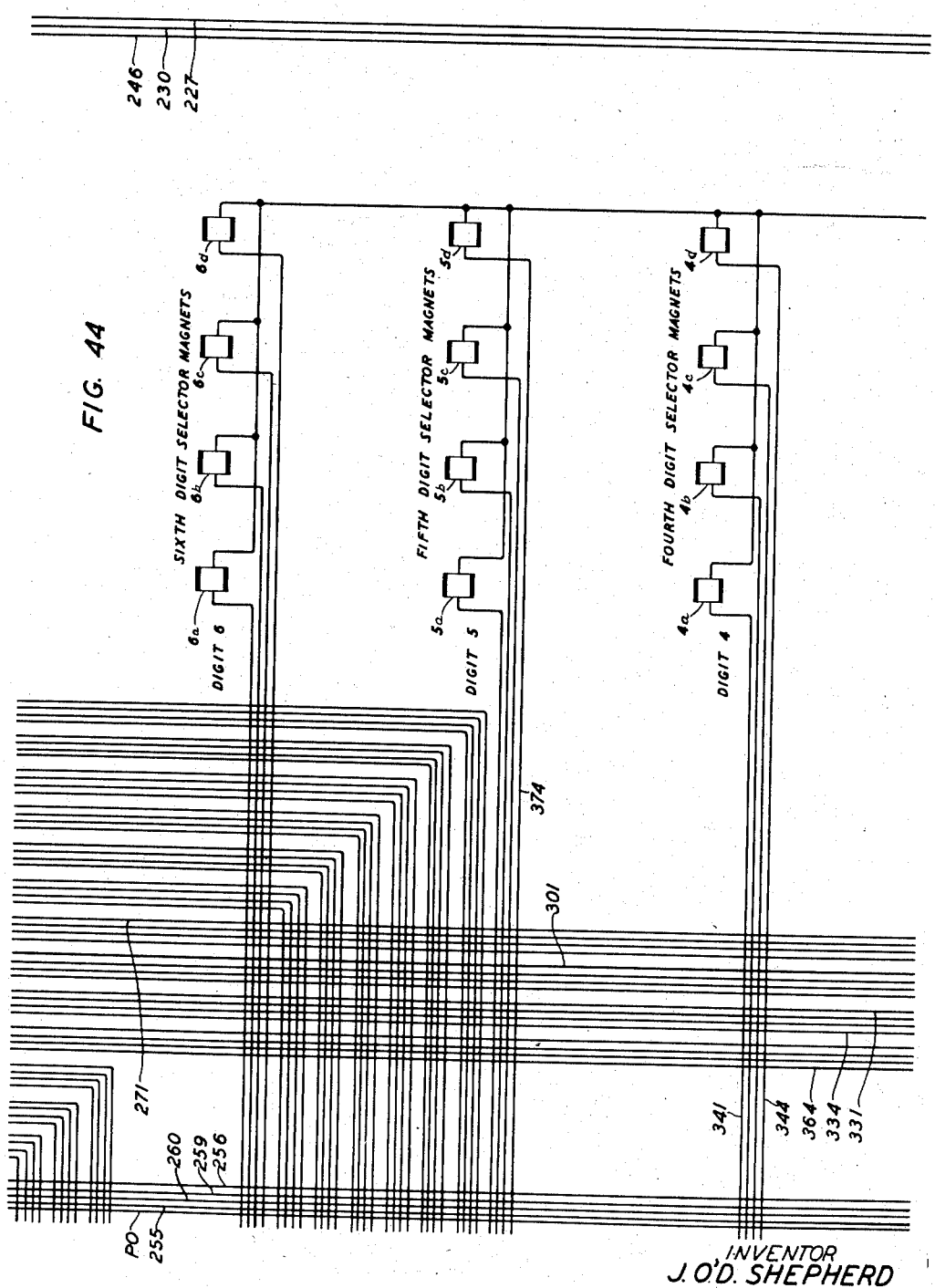
Figure 45:
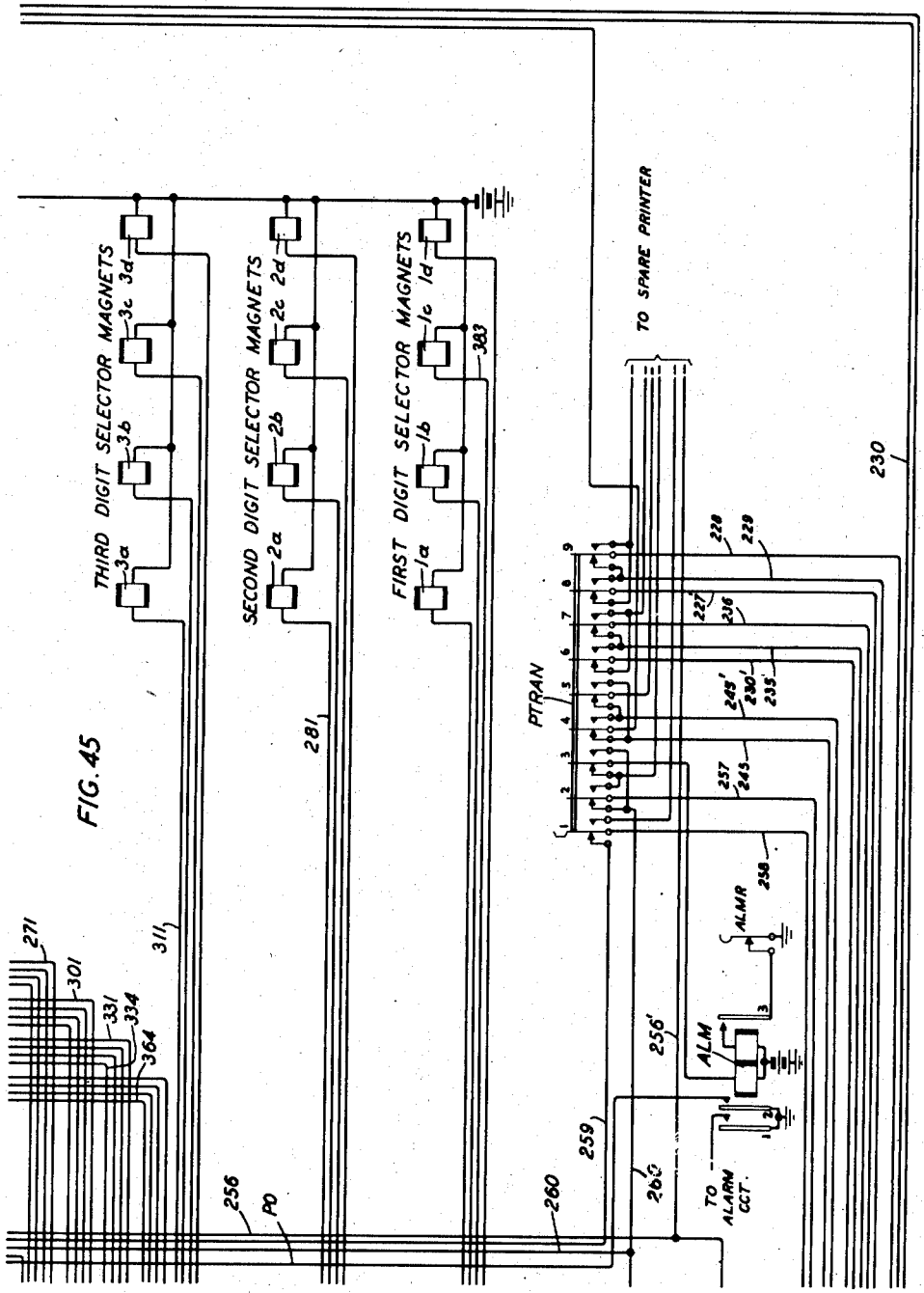

Returning, now, to the circuit of the printer, there is shown in Figs. 44 and 45 six groups of selector magnets –a, –b, –c and –d, one for each digit, while in Figs. 39, 40, 41 and 42, there is shown (among other things) a pair of sequence control relays for each of the data to be printed, and by means of which the separate groups of selector magnets are connected, in progression, to the various registers of the timer, to the "time accumulator" thereof and to the chronological time mechanism of the printer. Each pair of sequence relays is provided with sufficient contact pairs for associating the selector magnets with the appropriate leads for each printing operation, and the relays are connected in the counting relay manner so as to advance the magnets to the next group of registers after each digit is printed.

Figure 39:
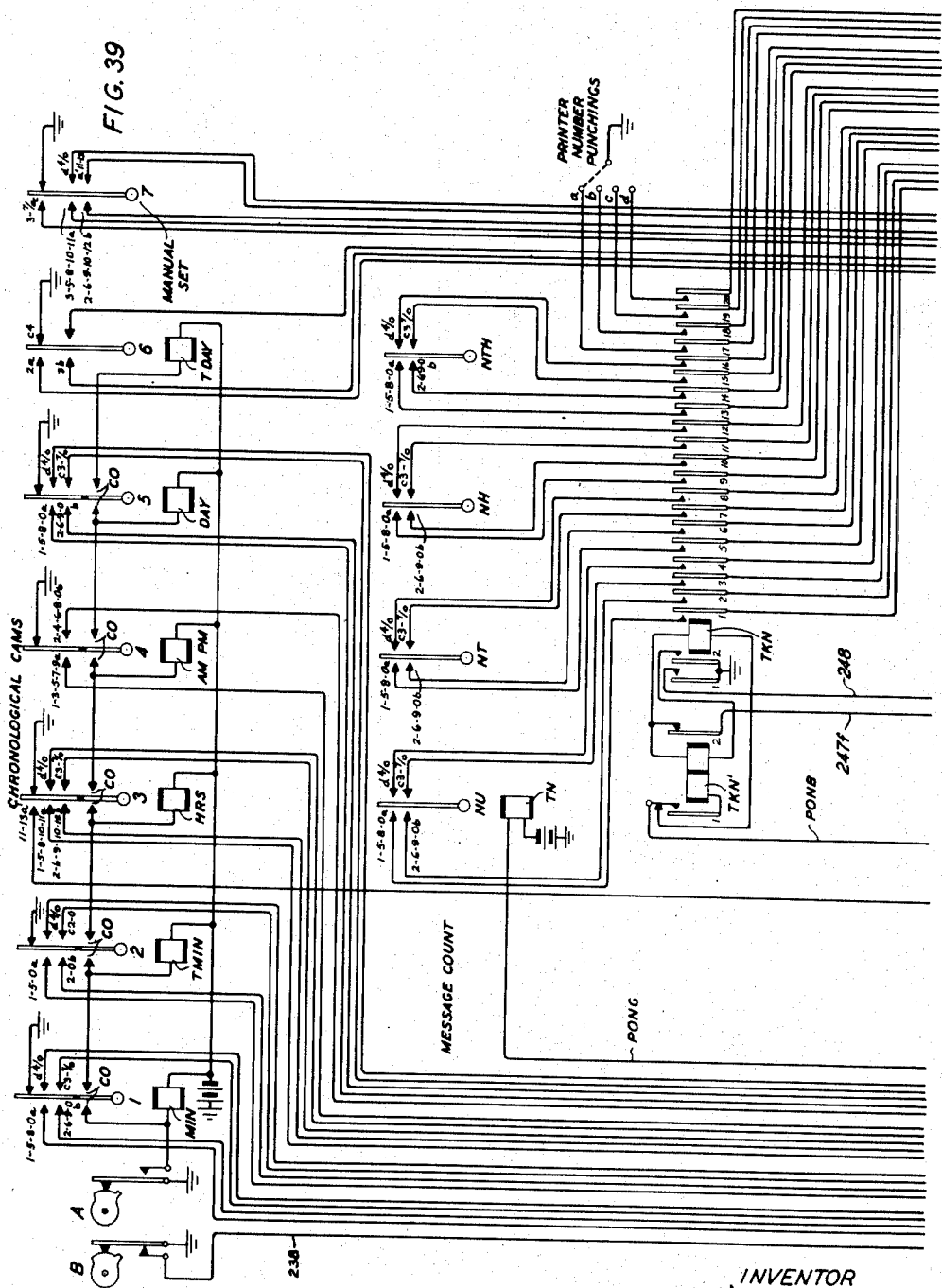
Figure 40:
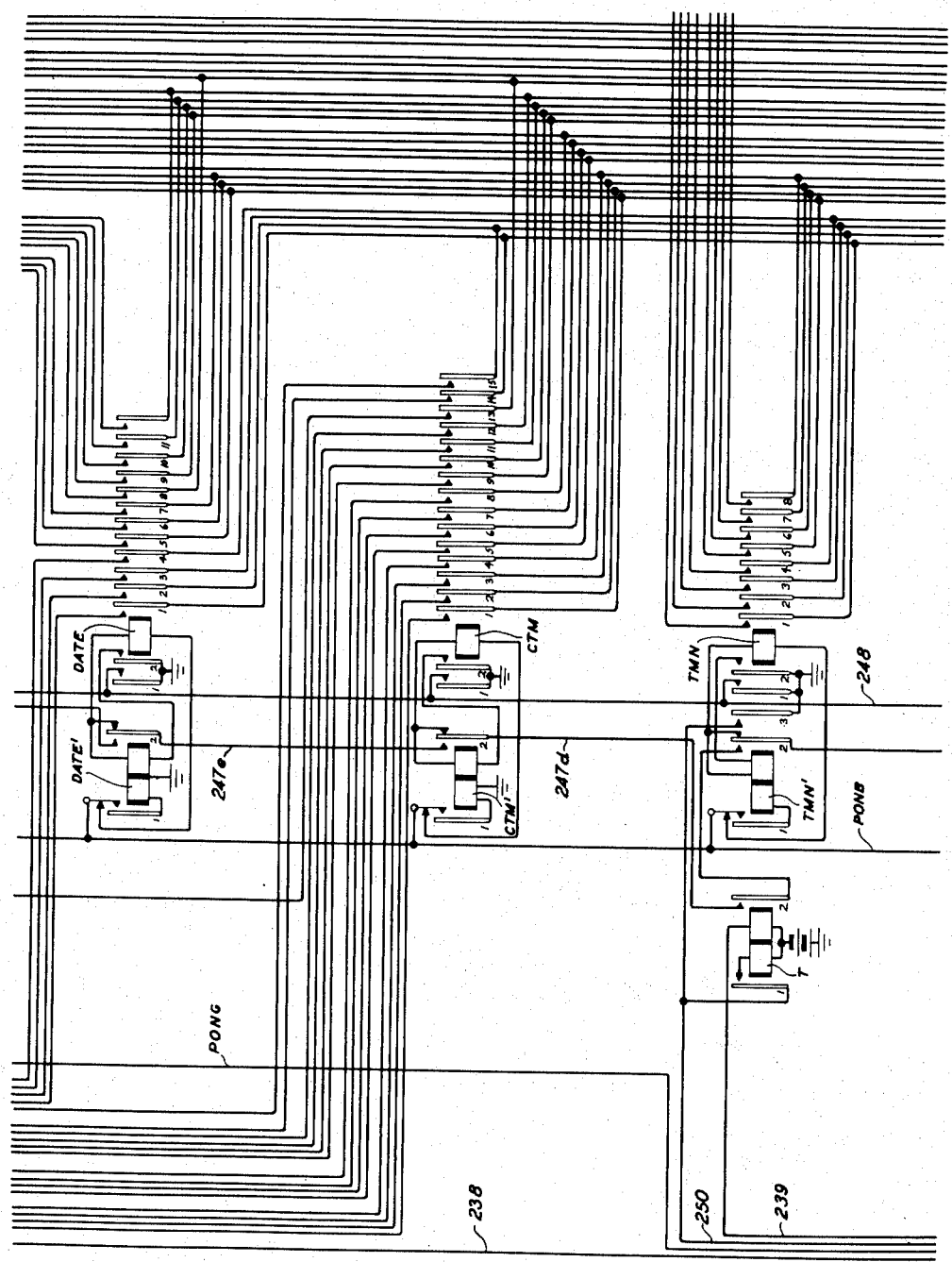
Figure 41:
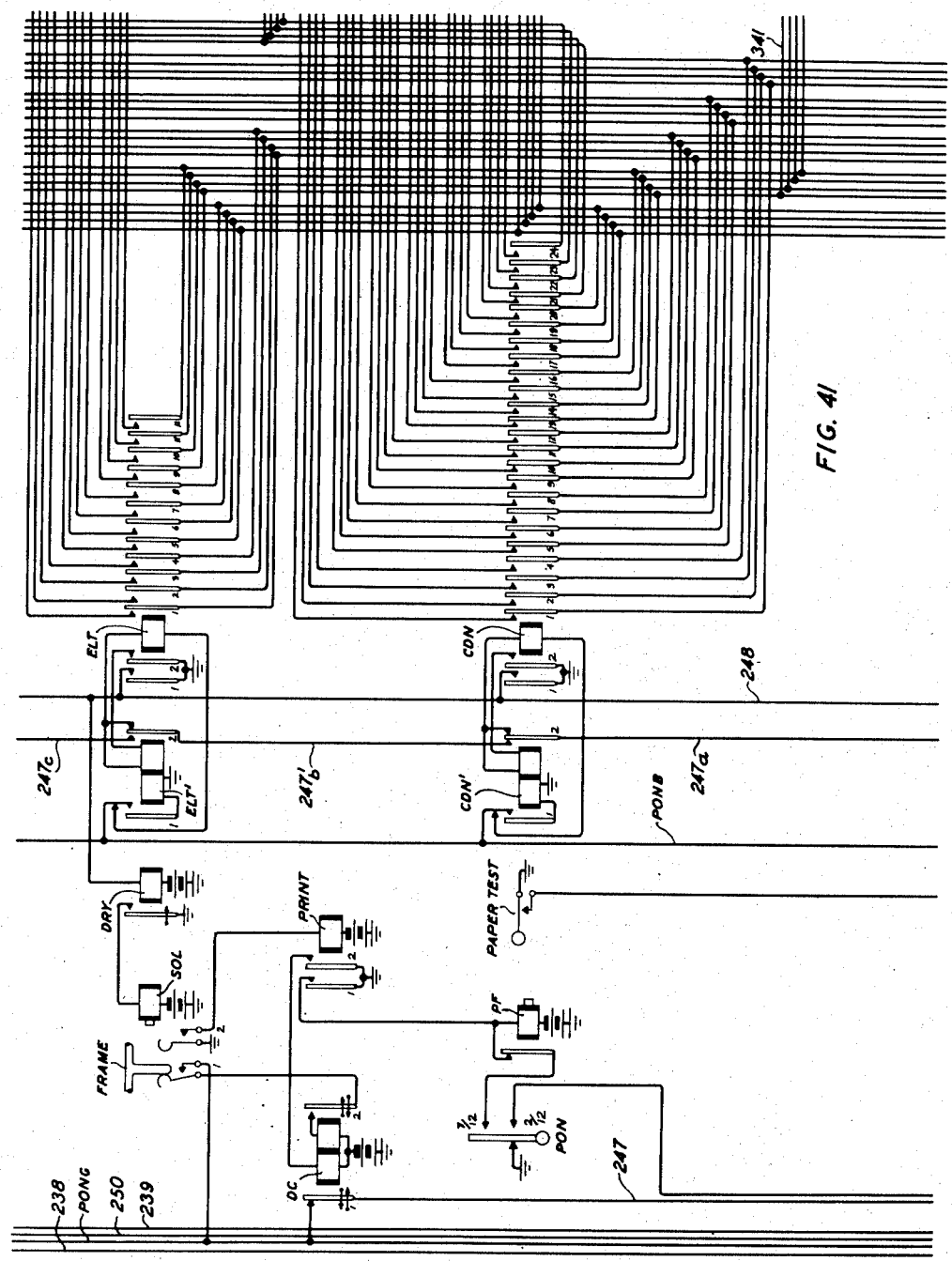
Figure 42:
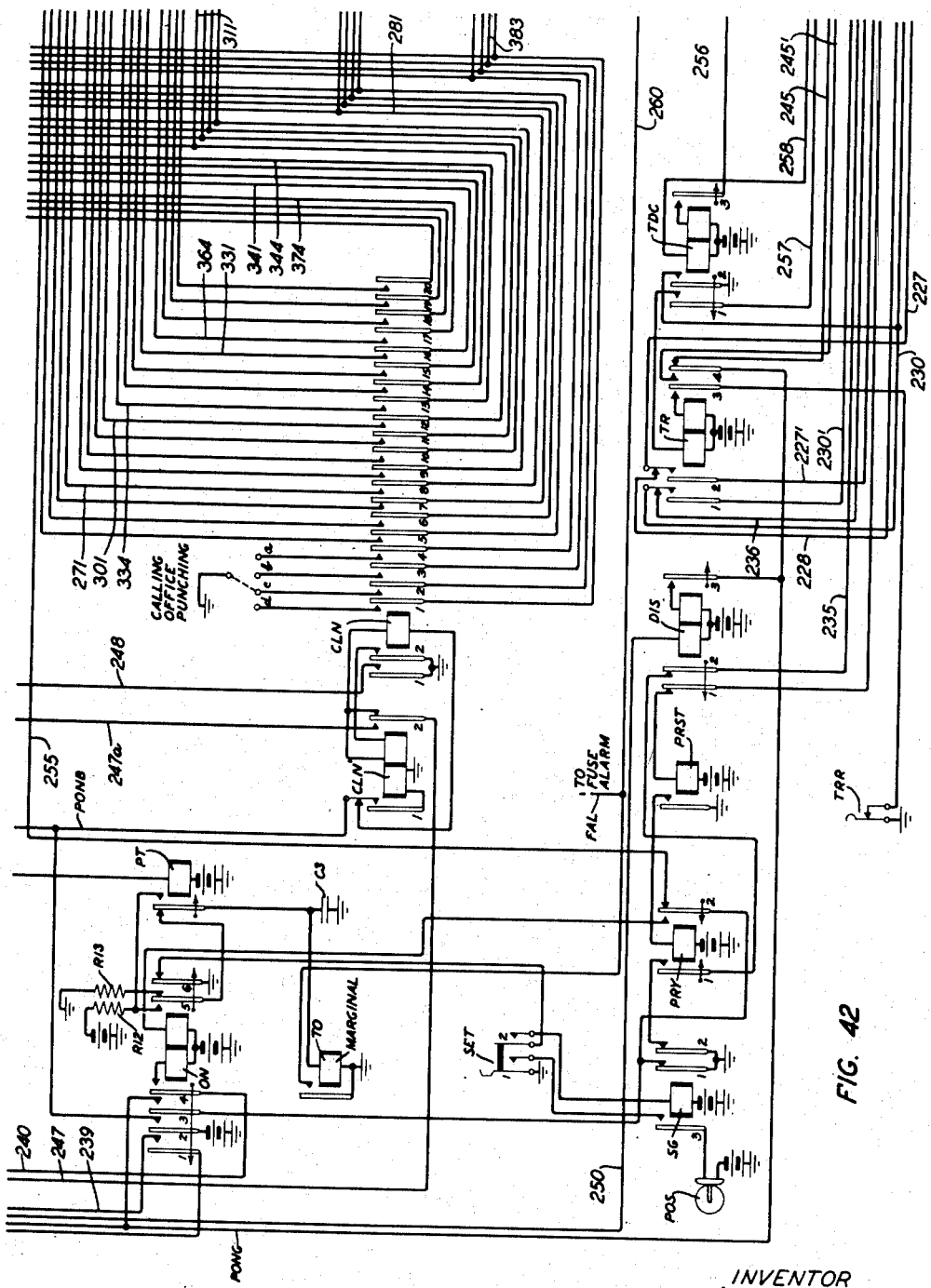
Figure 43:
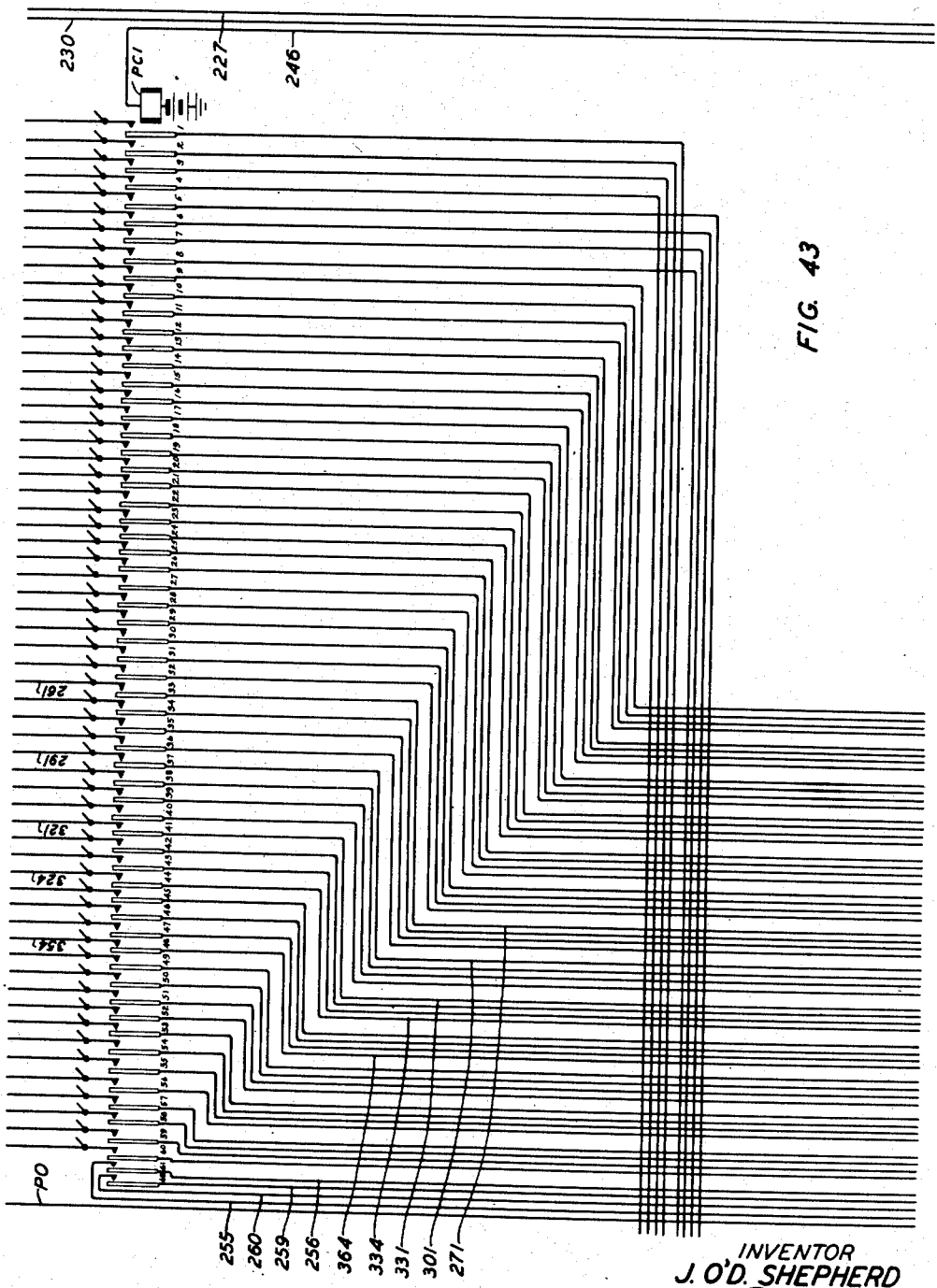

The circuit elements of the printer mechanism are located to the left of Fig. 41, the cams which control the chronological time together with their stepping magnets are shown at the top of Fig. 39, the ticket numbering cams are shown below the chronological cams, while the control and transfer elements of the printer circuit are shown in Fig. 42 and the bottom portion of Fig. 45.

The chronological cams shown at the top of Fig. 39 comprise seven cams of general design similar to those used with sequence switches, and are provided for use in connection with printing the corresponding data as follows:

| Cam | | Registration Purpose | Positions per Rev. |
| --- | --- | --- | --- |
| 1 | Min | Minutes | 10. |
| 2 | TMIN | Tens Minutes | 6 (or 12 with 2 cycles). |
| 3 | HRS | Hours | 12. |
| 4 | AM-PM | AM-PM | 10 (5 cycles). |
| 5 | DAY | Day of date | 10. |
| 6 | TDAY | Tens of days | 12 (3 cycles). |
| 7 | MON | Month | 12. |

In connection with cam 4, this cam can have any desired even number of positions since it operates every 12 hours to change from A. M. to P. M. to A. M., etc.

The several cams are cut as indicated on the drawing to result in the control of the digit selector magnets when they are connected therewith as shown.

A clock or synchronous motor arrangement or other appropriate means, closes interrupter A for approximately one-half second at the beginning of each minute and completes the circuit of stepping magnet MIN which controls cam 1. When the magnet releases it advances its cam one position. Each of the chronological cams except 6 and 7 has separate cuttings insulated from the code cuttings for carry-over purposes. These are shown schematically on the lowest pair of brushes of the cam convention, the carry-over position being indicated by "CO." Thus when the minute cam 1 reaches position 9, carry-over brush "CO" closes, so when the stepping impulse is received for the next minute, two circuits are completed, one for magnet MIN to step cam 1 and the other for magnet TMIN to step cam 2 so that cams 1 and 2 are advanced simultaneously. Hence when the minute cam 1 changes its code to "0" the tens of minutes cam 2 advances its count one digit. Likewise, when the tens of minutes cam 2 reaches position 5, it extends a circuit to the magnet HRS controlling cam 3 so that when 59 minutes are indicated, the next impulse will advance the hours cam one count and change the minutes and tens of minutes cams 1 and 2 to "0." In a similar manner, cam 4 is advanced each time the hours cam 3 moves from "11" to "12"; cam 5, controlled by magnet DAY, is advanced each time cam 4 moves to change its code from P. M. to A. M.; and cam 6, controlled my magnet TDAY, is advanced each time cam 5 (the day cam) moves to "0."

Cam 7 is settable to denote the month and may be manually advanced at the end of the month. Inasmuch as it would not be practicable to have an attendant in the office at midnight on the last day of every month, it would mean that tickets made before an attendant reaches the office would carry an impossible date, such as September 31st. This, however, cannot lead to an erroneous record, for the accounting department would recognize this as October 1st and so bill it. It would seem that no error would result if an attendant did not set the month cam (cam 7) for several days, for a date of September 35th on a ticket, for instance, would represent October 5th.

The above is considered preferable in lieu of complication of facilities for automatically advancing the month cam as appropriate for various lengths of months. If it is thought desirable for the month cam to be advanced mechanically, probably the easiest means would be to provide additional brushes on the carry-over portion of the day cam (cam 5) and brushes on the tens of days one (cam 6). Four locking keys could be provided, designated "28," "29," "30" and "31." Any time during the month the attendant would operate the key corresponding to the number of days in the current month. When the day cam (cam 5) and the tens of days cam (cam 6) reach that date, the time impulse at midnight would advance the month cam (cam 7). This would make necessary self-interrupting contacts on magnets DAY and TDAY co-operating through the keys with contacts on their cams so that when the month cam is advanced, these will move respectively to "1" and "0." For reasons brought out below, it probably would be necessary in this case to maintain open lead 238 from interrupter B somewhat longer than usual while this resetting is occurring.

The detailed circuit operations of the printer will now be considered. It will be remembered that the timer is locked to the printer through a circuit including relay PST in the former and relay PRST in the latter and that the operation of relay PRST caused the operation of relay PRY which resulted in the application of ground to conductor 230 to operate relay PC, whereby a number of conductors from the timer are extended to the printer, said conductors extending in multiple to the stationary contacts of relay PCI of each printer. Relay PRY completes a circuit for printer off-normal relay ON, said circuit extending from ground on the No. 1 contacts of relay SG, No. 2 contacts of relay PRY, right winding of relay ON to battery. Relay ON operates, causes ground on the No. 1 contacts of relay SG to be applied over its No. 3 contacts to off-normal ground conductor PONG, causes battery to be applied over its No. 2 contacts to off-normal battery conductor PONB, extends conductor 238 from interrupter B, which is closed from 1 to 57 seconds of each minute interval, via conductors 239 and thence to the right winding of relay T, prepares at its No. 4 contacts a locking circuit over its left winding to ground at the printer off-normal cam PON via conductor 240, and closes a circuit from battery through resistor R12, No. 5 front contacts, back contacts of slow-operate relay PT, condenser C3 to ground and, in parallel therewith, winding of marginal relay T0 to ground.

The application of ground to off-normal conductor PONG completes the circuit of printer connector relay PCI over the following path: battery through the winding of relay PCI, conductor 246, No. 4 normally made contacts of key PTRAN, conductor 245, No. 4 back contacts of relay TR to ground on conductor PONG. Relay PCI operates and completes the connection between the timer and the printer.

When off-normal ground is applied to conductor PONG a circuit is completed for relay CLN over the following path: ground on conductor PONG, No. 1 contacts of relay DC, conductor 247, No. 2 back contacts of relay CLN', winding of relay CLN, No. 1 normally made continuity contacts of relay CLN' to battery on conductor PONB. Relay CLN operates, applies short-circuiting ground over its No. 2 contacts to the operate winding of relay CLN' and connects the digit selector magnets of the printer to the various conductors for the completion of certain circuits thereover, as follows:

DIGIT 1

As shown by the sheet of drawings covering sample tickets including Figs. 51A–F, the first digit in the first line of the call ticket is reserved for the office of origin where the printer is located. For the designation of this office, four conductors are extended to punchings and to the stationary contacts of the Nos. 1–4 contact sets of relay CLN. Ground is then cross-connected to these punchings according to the transfer code. Since the calling office is assumed to be Alpha, having the digit code "3," ground is cross-connected to the "c" punching through which a circuit is then completed for magnet 1c of the first digit selector magnets, said circuit extending from ground on punching "c," No. 2 contacts of relay CLN, conductor 383, winding of magnet 1c to battery. Magnet 1c operates and causes its associated trigger to be withdrawn from the corresponding code bar whereby the type wheel reserved for the calling office digit may be rotated to the "3" position incident to the printing operation.

DIGIT 2

The second digit is reserved for the hundreds digit of the calling line number, which is registered on the relays HaT–HdT of the calling hundreds register of the timer. The selector magnets 2a–2d of the second digit are wired to the armatures of the Nos. 5–8 contact sets, inclusive, of relay CLN, and the corresponding stationary springs thereof extend to the armatures of the Nos. 36–33 contact sets, inclusive and respectively, of relay PCI. The stationary springs of these contact sets extend to armatures of corresponding contact sets 36-33 of relay PC of the timer, the stationary contacts of which, in turn, are multiplied to the No. 1 contacts of relays HaT-HdT of the calling hundreds register.

Consequently, when relay CLN operates, circuits are completed between the operated relays of the register and the corresponding magnets of the second digit 2a-2d to cause the latter to take a setting which corresponds to that of the hundreds digit register. It has been assumed that the hundreds digit of the calling line number is "0" and, therefore, is registered by the operation of relays HaT, HbT, HcT and HdT. Hence upon the operation of relay CLN, a circuit is completed from ground on conductor 189, No. 1 contacts of relay HaT, No. 33 contacts of relay PC, conductor 261, No. 33 contacts of relay PC1, conductor 271, No. 8 contacts of relay CLN, conductor 281, winding of selector magnet 2a to battery. Similarly traced circuits are completed for operation of magnets 2b, 2c and 2d. These four selector magnets 2a-2d operate to trip the triggers from their code bars to subsequently permit the rotation of the type wheel reserved for the second digit to the "0" position and print said digit.

DIGIT 3

The third digit is reserved for the tens digit of the calling line number, which is registered on relays TaT-TdT of the calling tens register of the timer. The selector magnets 3a-3d of the third digit are multipled to the armatures of the Nos. 9-12 contact sets of relay CLN and the corresponding stationary springs thereof extend to the armatures of the Nos. 40-37 contact sets of relay PC1 the stationary springs of which extend, in turn, to the armatures of corresponding contact sets on relay PC, the stationary springs of which, in turn, extend to the No. 1 contacts of relay TaT-TdT of the calling tens register.

It has been assumed that the tens digit of the calling line number is "1" and, therefore, registered by the operation of relay TaT. Consequently upon the operation of relay CLN, a circuit is completed from ground on conductor 189, No. 1 contacts of relay TaT, conductor 221, No. 37 contacts of relay PC, conductor 291, No. 37 contacts of relay PC1, conductor 301, No. 12 contacts of relay CLN, conductor 311, winding of selector magnet 3a to battery. Selector magnet 3a operates and causes the gear sector of the printer subsequently to rotate the type wheel of the third digit to the "1" position.

DIGIT 4

The fourth digit is reserved for the units digit of the calling line number, which is registered on relays UaT-UdT of the calling units register. The selector magnets 4a-4d of the fourth digit are multipled to the armatures of the Nos. 16-13 contact sets of relay CLN and the corresponding stationary springs thereof extend to the armatures of the Nos. 41-44 contact sets of relay PC1 the stationary springs of which, in turn, extend to the armatures of the corresponding contact sets of relay PC with the stationary contacts thereof extending to the No. 1 contacts of relays Ua-Ud.

It has been assumed that the units digit of the calling line number is a "5" and, therefore, registered by the operation of relays UaT-UdT. Consequently, upon the operation of relay CLN, two circuits are completed as follows: ground on conductor 189, No. 1 contacts of relay UaT, conductor 231, No. 41 contacts of relay PC1, conductor 321, No. 41 contacts of relay PC1, conductor 331, No. 16 contacts of relay CLN, conductor 341, winding of relay 4a to battery; ground on conductor 189, No. 1 contacts of relay UdT, conductor 234, No. 44 contacts of relay PC, conductor 324, No. 44 contacts of relay PC1, conductor 334, No. 13 contacts of relay CLN, conductor 344, winding of magnet 4d to battery. Both magnets 4a and 4d operate to trip their respective code bars and cause the gear sector of the printer controlled thereby to rotate the type wheel reserved for the fourth digit to the "5" position incident to the printing operation.

DIGIT 5

The fifth digit is reserved for the ringing code of the calling line number, which is registered on the relays Ra-Rd of the calling ringing code register of the timer. The selector magnets 5a-5d of the fifth digit are multipled to the armatures of the Nos. 20-17 contact sets of relay CLN with the stationary springs thereof extending to the armatures of the Nos. 48-45 contact sets of relay PC1, the stationary springs of which extend to the armatures of corresponding contact sets on relay PC with the stationary contacts thereof extending to the No. 1 contacts of relays Ra-Rd of the ringing code register. Consequently upon the operation of relay CLN, circuits are completed between ground on the No. 1 contacts of the operated relays in the ringing code register to the winding of appropriate selector magnets of the fifth digit to cause said magnets to take a setting that corresponds to the operation of said relays. It has been assumed that the calling number ringing code is "4" which is registered by the operation of relay Rd. Consequently, when relay CLN is operated, a circuit is completed from ground previously traced to conductor 189, No. 1 contacts of relay Rd, conductor 244, No. 48 contacts of relay PC, conductor 354, No. 48 contacts of relay PC1, conductor 364, No. 17 contacts of relay CLN', conductor 374, winding of relay 5d to battery. Selector magnet 5d operates to trip its code bar to select the position to which the gear sector reserved for the fifth digit is to be rotated for printing a "4."

The operation of relay CLN causes ground to be applied to conductor 248 to complete the circuit of the digit-ready relay DRY, which is slow operating in order to assure the complete functioning of the selector magnets, and when it operates, it closes an obvious circuit to solenoid SOL of the printer thereby causing it to operate and set the type wheels for the calling number as determined by the combinations of the operated selector magnets for each digit thereof, as previously described.

The positioning of the frame of the solenoid SOL closes contacts 1 and 2 thereof as it completes its travel, the No. 1 contacts applying off-normal ground to the No. 2 contacts of relay DC while the No. 2 contacts complete an obvious circuit for the printing magnet PRINT which operates to print the digits set up on the type wheels of the digits 1, 2, 3, 4 and 5. As the printer magnet PRINT completes its operation, it closes two pairs of contacts, contact pair No. 1 completing an obvious circuit for the paper feed step magnet PF which operates to advance cam PON, to supply a supplementary off-normal ground on conductor 240 which thereby holds relay ON locked thereto over its left winding; contact pair No. 2 completing an obvious circuit

107 for the digit-completion relay DC. The latter is slow operating to insure the complete functioning of printing, but when it operates it locks to off-normal ground under the control of the No. 1 contacts of the solenoid SOL, and opens the circuit of relay CLN which results in relay CLN' operating in series with relay CLN through a circuit completed from battery on conductor PONB, No. 1 continuity contacts of relay CLN', winding of relay CLN, right winding of relay CLN' to ground on the No. 2 contacts of relay CLN. Relay CLN' locks over its left winding to battery over its No. 1 front contacts and conductor PONB, and releases relay CLN. Relay DC is slow-release as well as slow-operate to insure that relay CLN' has fully operated before ground is again applied to conductor 247 and, therefore, to the No. 2 armature of relay CLN', and to insure that various mechanical parts of the printer come to rest subsequent to the release of the solenoid SOL.

The release of relay CLN opens the circuit of relay DRY which opens the circuit of the solenoid SOL. As the solenoid restores to its normal position, it opens its No. 1 contacts to open the locking circuit of relay DC which, however, will still remain operated under the control of the print magnet PRINT. It opens its No. 2 contacts to open the circuit of the print magnet PRINT which releases to open the circuit of relay DC and open the circuit of magnet PF. With relay CLN' operated, ground, which is again placed on the start conductor 247 is extended to conductor 247a and the circuit of relay CDN is completed thereby over the No. 2 back contacts of relay CDN', winding of relay CDN, No. 1 normally made contacts of relay CDN' to battery on conductor PONB. Relay CDN operates and connects the digit selector magnets to the following registers of the timer via the indicated contact sets of relays CDN, PCI and PC:

| Selector Magnets | Contacts on Relay CDN | Contacts on Relays PC1 and PC | Register in Timer |
|---|---|---|---|
| Digit 1 | 1-4 | 32-29 | OF- |
| Digit 2 | 5-8 | 28-25 | TOF- |
| Digit 3 | 9-12 | 24-21 | TTH- |
| Digit 4 | 13-16 | 20-17 | TH- |
| Digit 5 | 17-20 | 16-13 | TT- |
| Digit 6 | 21-24 | 12-9 | TU- |

Circuits completed over easily traceable paths between the operated relays of the registers indicated and the selector magnets of the various digits result in the selector magnets being set for the called number as registered in the above-indicated registers of the timer. In view of the fact that typical circuits have already been traced between said selector magnets and various relays of the registers reserved for the calling number and the called office code, it is not thought necessary, in view of the above table, to trace similar circuits between the selector magnets and the operated relays of the called number register.

The printing mechanism will now function as previously described to print the called number and office code. Thereafter, relay CDN' operates in the same manner that relay CLN' did before it, causing thereby the release of relay CDN and the advance of the start conductor to conductor 247b for operating relay ELT in a circuit traceable over the No. 2 back contacts of relay ELT', winding of relay ELT, No. 1 normal-

108 ly made contacts of relay ELT' to battery on conductor PONB. Relay ELT connects the following digit selector magnet groups to cams TM, M and F of the time accumulator in the timer over the indicated contact sets of relays ELT, PCI and PC:

| Selector Magnets | Contacts on Relay ELT | Contacts on Relays PC1 and PC | Cam |
|---|---|---|---|
| Digit 3 | 1-4 | 60-57 | TM |
| Digit 4 | 9-12 | 52-49 | M |
| Digit 5 | 5-8 | 56-53 | F |

The conductors extending from the above cams to the selector magnets of the indicated digits will be grounded according to the code of the elapsed time as recorded by the cams, the various settings of which, for one revolution of cam TM and the correlated multiple revolutions of the companion cams M and F, provide for a maximum elapsed time of 99.9 minutes, which probably is adequate although the provision of a "hundreds of minutes" register will permit 999.9 minutes to be registered. This would, of course, require an additional group of four contact sets on each of the relays ELT, PCI and PC with corresponding conductors to interconnect them.

When, upon the completion of printing, relay ELT' operates, relay ELT is released and conductor 247b is joined to conductor 247c, thereby advancing the digit start ground to the winding of relay TMN via the No. 2 back contacts of relay TMN', the circuit of said relay TMN being completed through the No. 1 normally made continuity contacts of relay TMN' to battery on conductor PONB. Relay TMN operates and connects the selector magnets of the fourth digit over the Nos. 8-5 contacts of relays TMN, PCI and PC to punchings "NT" in the timer, which are grounded according to the four-point code to indicate the tens digit of the timer number. Relay TMN further connects the selector magnets of the fifth digit over its Nos. 1-4 contacts, through the Nos. 4-1 contact sets of relays TMN, PCI and PC to punchings "NU" of the timer to indicate the units digit of the timer number. The operation of the appropriate selector magnets then causes the timer number to be printed in the manner described, said timer number, for purposes of illustration, being assumed to be "1" as indicated by the cross-connections at punchings "NU."

It will be noted that the paper upon which the ticket is printed must be wide enough to permit printing of six digits thereacross. This being the case, there is adequate space on the third line thereof to print both elapsed time and the timer number, the former to be placed in positions 1, 2 and 3, and the latter in either positions 4 and 5 or 5 and 6, thereby reducing the number of printing operations from seven to six.

When the timer number has been printed, the timer can be dismissed and made available for another call. Upon the operation of relay TMN' following the removal of ground from conductor 247c, relay TMN releases and a circuit is closed for operating the disconnect relay DIS, said circuit tracing from battery to the left winding of relay DIS, conductor 250, No. 3 contacts of relay TMN' to ground. Relay DIS locks over its right winding and No. 3 contacts to ground on conductor PONG and opens the start conductors 229 and 235, thereby causing the release of relays PST and PC of the timer. Since conductors 229 and 235 remain open because relay DIS is locked, they prevent another timer awaiting service from seizing the printer before the printer has restored to normal. Relay PRST also releases, followed by the release of relay PRY.

The release of relay PC causes the release of relay PRQ, and the latter completes a circuit for relay RES, said circuit extending from battery through the left winding of relay RES, No. 4 contacts of relay PRQ, No. 3 contacts of relay TON, No. 2 contacts of relay LH to ground. Relay RES locks over its right winding and No. 2 contacts to ground on the No. 2 contacts of relay TON, opens conductor 189, thereby causing the register relays to restore to normal and establishes self-interrupting circuits over its Nos. 6, 7 and 8 contacts for stepping magnets STM, SM and SF, respectively, from ground through brush "e" of their respective cams TM, M and F, causing said cams to restore to normal, in which position the driving circuits are opened. When the last cam reaches normal, relay TON releases to open the holding circuit of relays RES, PCM and relay TBSY6, causing said relays to release and thereby making the timer available for another call.

The next printing operation after printing the timer number is that of printing the chronological time and thereafter the date. It may be that this operation will be attempted at the instant of advance of the minute cam (I) of the chronological cams. This would result in a probably unobjectionable error of one minute. But if it occurs at the instant of carry-over, the error would be ten minutes, and if it occurs at the advance from one hour to the next, the error would be in the order of one hour, etc. This is guarded by interrupter B which opens for two seconds just before the minute cam (I) is advanced by interrupter A. If printing is occurring at any time except this critical one, a circuit is completed for relay T which extends from ground on interrupter B, conductor 238, No. 1 contacts of relay ON, conductor 239, right winding of relay T to battery. This relay operates, locks over its left winding and No. 1 contacts to ground on the No. 3 contacts relay TMN', and, over its No. 2 contacts and those of relay TMN', advances start conductor 247c to 247d which extends to the No. 2 back contacts of relay CTM' and thence to the winding of relay CTM. However, if the time is about to change, relay T will release because of the opening of the contacts of interrupter B, thereby opening the path of relay CTM while the change is taking place and thereby preventing the next printing function from taking place. When the setting of the time cams has occurred and the contacts of interrupter B have reclosed, the above-described circuit for relay T is closed and conductor 247c is extended to conductor 247d as already described.

It may be, of course, that interrupter B will open during the printing of the chronological time, which might spoil the record. This is prevented by locking relay T to the No. 3 contacts of relay TMN'. Consequently, if relay TMN' is operated when relay T operates, the latter will not release and the printing will continue. Inasmuch as interrupter B opens the circuit of relay T two seconds before the change, this gives adequate time for printing the chronological time plus the date before the change actually occurs. That is, if there is enough time for the printer to complete these two printing operations before the change, the printer is permitted to go ahead but if not, it is held up until after the change.

The extension of conductor 247c to conductor 247d completes the circuit of relay CTM from ground on conductor 247d as applied thereto by conductor 247c, No. 2 back contacts of relay CTM', winding of relay CTM, No. 1 normally made continuity contacts of relay CTM' to battery on conductor PONB. Relay CTM operates and causes circuits to be completed from the chronological cams designated below to certain digit selector magnets via the indicated contact pairs of relay CTM as follows:

| Selector Magnets | Cams | Brushes | Time Indicated | Contacts on Relay CTM |
|---|---|---|---|---|
| Digit 1 | 3 | a' | T HRS | 13 |
| Digit 2 | 3 | a, b, c, d | HRS | 9–12 |
| Digit 3 | 2 | a, b, c, d | T MIN | 5–8 |
| Digit 4 | 1 | a, b, c, d | MIN | 1–4 |
| Digit 5 | 4 | a, b | AM–PM | 14–15 |

The chronological time is, therefore, printed over circuits completed from the indicated grounded brushes of the various chronological cams to the magnets of the corresponding selector magnet groups over the indicated contact pairs of relay CTM and conductors extending thereto between said cams and said magnets.

It is apparent that by minor modification of the arrangements, the chronological time may be printed on the basis of a 24-hour clock rather than with A. M. and P. M. designations.

Subsequent to the printing of the chronological time, relay CTM' operates over a circuit extending from ground on the No. 2 contacts of relay CTM, winding of relay CTM', winding of relay CTM, No. 1 normally made continuity contacts of relay CTM' to battery on conductor PONB. With the operation of relay CTM', relay CTM releases and the operation of the former relay causes the start conductor 247d to be extended over its No. 2 front contacts to conductor 247e and, over the No. 2 back contacts of relay DATE', to, the winding of relay DATE which operates over a circuit that may be traced from said ground, winding of relay DATE, No. 1 normally made continuity contacts of relay DATE' to battery on conductor PONB. Relay DATE operates to complete circuits between the selector magnets of the indicated digits and the designated date cams, via the indicated contacts of relay DATE.

| Selector Magnets | Cams | Brushes | Time Indicated | Contacts on Relay "DATE" |
|---|---|---|---|---|
| Digit 1 | 7 | a' | T MONTH | 8 |
| Digit 2 | 7 | a, b, c, d | MONTH | 9–12 |
| Digit 4 | 6 | a, b, c | T DAY | 5–7 |
| Digit 5 | 5 | a, b, c, d | DAY | 1–4 |

Upon the operation of relay DATE, easily traceable circuits are completed over the above-indicated connections which result in printing the date and, upon the operation of relay DATE' subsequent thereto over a circuit which extends from ground on the No. 2 contacts of relay DATE, winding of relay DATE', winding of relay DATE, No. 1 normally made continuity contacts of relay DATE' to battery on conductor PONB, relay DATE is released and start conductor 247e is extended to conductor 247f which thereby completes a circuit for relay TKN from ground on said conductor, No. 2 contacts of relay TKN', winding of relay TKN, No. 1 normally made contacts of relay TKN' to battery on conductor TONB.

The last two items of information to be printed upon the ticket are the message number, which will occupy the first four digit positions and the printer number, which will occupy the fifth.

The message count mechanism is not shown in detail, but the circuit arrangement thereof, shown in the middle of Fig. 39, indicates its structure. That is to say, for counting as many as 9,999 messages or ticket numbers four cams NU, NT, NH, NTH are provided, numerically cut with a stepping magnet TN to drive the units cam NU and mechanically carry-over arrangements (not shown) to advance the other cams NT, NH, and NTH. Each time the printer off-normal ground PONG is closed, the stepping magnet TN positions its pawl and each time off-normal ground is removed from conductor PONG, which occurs at the completion of a ticket count, the stepping magnet releases to advance the count. An alternative arrangement would be to have a position on the printer off-normal cam PON so that it would complete a circuit in the twelfth position to effect the count advance. The arrangement shown provides for a separate count for each printer, but a single counting arrangement could be provided for the office with the advance circuit controlled through the printer transfer mechanism so that either printer in service would operate the counting cams to give a uniform message count.

The printer number facilities comprise four transfer code conductors, which are grounded according to the code indication of the printer number. Both the message count and the printer number are printed as a result of circuits completed upon the operation of relay TKN, which connects the selector magnets of the digits indicated below to the ticket number cams NU, NT, NH and NTH, and to the printer number punchings, as follows:

| Selector Magnets | Ticket Number Cams | Contacts on Relay TKN |
| --- | --- | --- |
| Digit 1 | NTH | 13-16 |
| Digit 2 | NH | 9-12 |
| Digit 3 | NT | 5-8 |
| Digit 4 | NU | 1-4 |
| Digit 6 | Printer Number Punchings | 17-20 |

Upon the operation of relay TKN, easily traceable circuits are completed over the above-indicated connections which result in the printing of the message number and the printer number. The four message cams provide for 9,999 ticket numbers and the punchings for 10 printer numbers. If a larger number of either is considered, they obviously can be provided. When the ticket number is printed, the release of the paper feed magnet PF will cause cam PON to be advanced to position "7." In this position a self-interrupting circuit for magnet PF is established over the right brushes of cam PON whereby both the paper feed and cam PON are advanced. When the latter reaches position "1," this circuit as well as the holding circuit of relay ON is opened, said relay releasing after a slight interval to disconnect ground from conductor PONG and battery from conductor PONB. The removal of ground from conductor PONG opens the locking circuit of relay DIS which releases after a slight interval to restore the printer to condition for seizure.

It is desirable to guard against the exhaustion of the paper ticket roll. A paper test is provided, comprising a roller resting against a section of the paper from the roll, which is maintained under tension. This roller is arranged so that if the paper should become exhausted, the roller will fall and ground the "paper test" contacts shown on Fig. 41, thereby closing an obvious circuit for slow-operating relay PT which connects the time-out relay TO to battery through its front contacts and resistance R12. If the paper should become exhausted during a printing operation, the closure of the paper test contacts will not affect the operation of the printer transfer circuits which is described below, for the operation of relay T0 will not be hastened. For this reason, the paper test roller is sufficiently distant from the type wheel for sufficient paper to be available for a complete ticket. After this ticket is printed, the eventual operation of relay T0 will cause the spare printer to be brought into service as explained hereinafter.

It will be necessary from time to time to set the chronological cams, and once each month manually to adjust the MONTH, DAY and TDAY cams (7), (5) and (6), respectively. If two groups of timing, etc., cams are provided one for each printer, the change obviously can be made by setting the idle one and transferring service to it and then setting the other. If one group is employed, it is necessary to provide means for removing the active printer from service with guard facilities to prevent a call from being lost if the printer has been seized just prior to attempting its removal. Key SET is provided which, when operated, completes a circuit for relay SG from ground on the No. 6 contacts of relay ON, No. 2 contacts of key SET, winding of relay SG to battery. Relay SG closes a circuit for lamp POS to ground on the No. 1 contacts of key SET and, at its No. 2 contacts, opens the ground supply to the No. 1 contacts of relay PRY to prevent a timer connecting itself with the printer. At its No. 1 contacts, relay SG further opens the ground by which relay ON is operated so that, if a timer applies ground to operate relay PRST, and relay PRY is operated in consequence thereof, the printer will not function but the timer will be held. The various cams now can be set and when this is completed and key SET is restored, the printer will be immediately enabled to start serving any awaiting calls.

If the printer has been seized by a timer, the operation of key SET will have no effect since relay ON will have operated and opened the operating ground for relay SG. However, as soon as the call has been served and relay ON has released, relay SG will operate as described. The printer-out-of-service lamp POS is provided for the double purpose of enabling the attendant to know when the printer is idle and to guard against its being left out of service.

The printer circuit which is being described has been designed on the basis of each office having a regular printer and a spare printer. In the event of a trouble occurring in the printer that is serving a call, it would be desirable to place the spare printer automatically into service without losing the record of the call when the trouble occurs. Such facilities are provided, the trouble being detected by time-out arrangements, although other trouble-detecting means could be provided as an alternative or to supplement the time-out arrangements. A key PTRAN is provided having two positions depending upon which printer is to be used primarily. The time-out relay TO is of high resistance and marginal. Each time relay ON operates, it starts charging condenser C3 over a charging circuit extending from battery through resistor R12, No. 5 front contacts of relay ON, back contacts of relay PT, condenser C3 to ground. When relay ON releases, condenser C3 is discharged over a circuit through the back contacts of relay PT, the No. 5 back contacts of relay ON, resistor R13 to ground. During normal operation, insufficient charge will be accumulated upon condenser C3 to permit relay TO to operate, and when operation is abnormal in the sense that the printer takes longer to function than the time required to accumulate sufficient charge on the condenser, relay TO then operates over a circuit completed from ground, back contacts of relay PT, No. 5 front contacts of relay ON, resistor R12 to battery. Relay TO, upon operating, performs functions noted below.

Key PTRAN is shown in its normal position which results in the No. 1 printer, which is the one shown, being arranged for primary service. Conductor 230 from the timers passes through the No. 1 normally made continuity contacts of relay TR at which it joins conductor 226 extending to the No. 7 contacts of said key, at which it joins conductor 235 extending to the No. 2 contacts of relay DIS and thence, as previously traced, to ground on the No. 2 contacts of relay SG. In the event that the printer is timed out by the operation of relay TO and ground is applied to conductor 260 either through contacts of said relay or a blown printer fuse grounding conductor FAL, said ground is extended over the No. 62 contacts of relay PC1, conductor 259, No. 1 contacts of key PTRAN, conductor 258, left winding of relay TDC to battery. With relay TDC operated, ground can be traced from conductor 260, No. 2 contacts of key PTRAN, conductor 257, No. 1 contacts of relay TDC, left winding of relay TR to battery, causing said relay to operate and then lock over its right winding and No. 3 contacts to ground on the release key TRR. The operation of relay TR results in relay PC1 being released and the operating conductors from printer No. 1 being opened, relay PC2 (not shown) of the spare printer being operated over ground on conductor 245' supplied thereto over the No. 4 front contacts of relay TR and applied thereover to the winding of said relay via the No. 5 contacts of key PTRAN. At the same time, start conductor 227 is joined to start conductor 227' of the spare printer at the No. 2 contacts of relay TR, extending to battery through the No. 8 contacts of key PTRAN to the winding of relay PST of the spare printer. The continuity contacts on relay TR maintain conductor 227 to the timer with battery thereon, but conductor 230 (the "printer-ready" conductor) would be momentarily opened since it is grounded in the spare printer after a short delay due to the slow operation of relay PRY therein. To prevent the release of the timer under these circumstances, therefore, ground is applied to conductor 230 through the No. 2 contacts of relay TDC. This relay locks up through its No. 3 contacts over conductor 256' from ground on the No. 2 contacts of relay PRY in the other printer. Relay TDC is slow releasing so that, when its operating circuit is opened by the release of relay PC1, it holds up long enough to get locking ground resulting from the operation of relay PC2 and, consequently, maintains conductor 230 grounded for a short interval after relay PRY of the new printer operates. The latter grounds conductor 230' at its No. 1 contacts (through conductor 235, etc.) so that conductor 230 to the timers is maintained grounded during the transfer, causing the associated timer to remain connected and prevent loss of its registrations.

It will be seen that had key PTRAN been operated to have made the spare printer the primary one, the above operations would have been duplicated to transfer the operating circuits to printer No. 1. Before key PTRAN is operated, however, key SET of the printer in service should be operated to prevent possible loss of a call, as described above.

Should the transfer facilities result in the spare printer being placed in service, and it should then become inoperative, it would represent a major trouble. This would result, in the illustrative circuits, in ground being returned over conductor TO2 which would pass through the No. 3 contacts of key PTRAN to operate alarm relay ALM which locks up to its release key ALMR and results in grounding the "alarm circuit" conductor over its No. 1 contacts and conductor P0 over its No. 2 contacts. Conductor P0 joins conductor 0 extending to the winding of relay OO in the sender to cause the operation of said relay for routing the call to the operator.

Fig. 51A shows a sample ticket of a call made from calling line No. 0154 in the Alpha office to called No. 5678 in the Zeta office. Other sample tickets shown in Figs. 51B to F, inclusive, will be discussed in their proper order. The ticket is shown to comprise seven printed lines, as follows:

a. Calling number,
b. Called number,
c. Elapsed time of the call—6.3 minutes
d. Timer number,
e. Chronological time,
   (the last "1" indicates A.M. and a "2" would have indicated P.M.)
f. Date—"Oct. 15"
g. Message number as the first four digits and the printer number as the sixth.

It is apparent that lines c and d can be combined, if desired, to reduce the printer and timer holding times, which would result in six instead of five lines being printed.

11. *Sender time-out*

If for any reason a sender is timed out by the operation of the sender alarm circuit through the persistence of sender off-normal ground connected thereto, a short impulse is received from said sender alarm circuit (the details of which are not shown since a conventional arrangement may be employed for this purpose) to operate relay TBL which locks up over its No. 2 contacts to battery through resistor R14. At its No. 1 contacts it opens conductor 38 which joins conductor S1 of the link, thereby releasing the latter; at its No. 3 contacts it grounds off-normal conductor SONG so that, upon the release of relays AS and BS of the sender when the link releases, the sender is held until relay TBL releases; at its No. 5 contacts it grounds conductor 164 which joins conductor 168 at the No. 11 contacts of relay SIOF to complete the path of the timer seizure circuit (relay TST in the sender and ST of the timer) which results in the sender being associated with the timer and the details of the call registered therein.

Let it be assumed that the complete called number has been dialed, including the ringing code, when the sender is timed out. The details of the called number will be transferred to the timer in the same manner as the details of the originating number were transferred and which have been described. The called number will be registered in the called hundreds, called tens and called units registers, with the called ringing code (or last digit of the number) locked up in the digit register. The office code will be supplied at contacts of the called office relay as set out. The circuits for the transfer of this information may be followed readily from the table set out below:

|  | Sender Relays Operated | Back Contacts on Relay OT1 | Contacts on Relays TC and TC1 | Timer Relays Operated |
|---|---|---|---|---|
| Called hundreds | H$a$–H$d$ | 1–4 | 5–8 | TOF$a$–TOF$d$ |
| Called tens | T$a$–T$d$ | 5–8 | 9–12 | TTH$a$–TTH$d$ |
| Called units | U$a$–U$d$ | 9–12 | 13–16 | TH$a$–TH$d$ |
| Called ringing code |  | 1–0 |  | 1–4 | TT$a$–TT$d$ |

It will be noted that the digits of the called number have been stepped up in the order of registers. For example, the called units is registered in the timer on relays TH$a$–TH$d$ (TH-indicating terminating hundreds). This results in the called number, including the office designation, occupying the columns in the left of the ticket.

The timer knows that it is to perform a trouble service by the fact that, at its No. 4 contacts, relay TBL grounds conductor 249 over the No. 45 contacts of relays TC and TC-1 joining conductor 265 to complete the circuit of relay TBLS in the timer which, after operation, locks over its No. 2 contacts to ground on conductor 189. At its No. 1 contacts, relay TBLS completes a circuit for the printer-required relay PRQ which extends from ground over said contacts, No. 3 contacts of relay PCM, No. 1 normally made continuity contacts of said relay, winding of relay PRQ to battery. Relay PRQ operates to furnish holding ground for various of the register relays and summons the printer in the manner described. At its Nos. 3, 4, 5 and 6 contacts, relay TBLS completes obvious circuits to relays TU$a$–TU$d$ of the called number register registering the "0" code therein. The printer now serves the call, operates relay PCM and releases relay PRQ which, in turn, releases relay TBLS to remove off-normal ground and restore the timer to normal.

When the timer has completed the above function, relay TMC of the sender will have operated as already described and applies ground back to conductor 137, No. 1 contacts of relay B to resistor R14 shunting the battery connected to said resistor and releasing relay TBL which, by disconnecting ground from conductor SONG, releases the sender.

Fig. 51F shows a sample trouble ticket resulting from a "permanent signal" on line "015," it being assumed that the subscriber has done no dialing. The "0" in the sixth digit place of line $b$ designates this to be a trouble ticket. Had the call been to a local or toll station which had been either partially or completely dialed, the called number or part thereof would appear in its proper location as set out. Likewise, had a distant exchange code been dialed, this would appear. It further might be that an interoffice call had been transferred to the timer and the sender then timed out. In this case, no regular ticket would result inasmuch as the call would not be completed. The sender will seize another timer, however, and file a trouble ticket on the call.

The trouble ticket arrangement is susceptive of consideable further treatment. Various types of sender troubles could be made to report themselves by causing a corresponding digit to be printed in the sixth place of line $b$ of the ticket rather than "0." This could be done by extending the conductors of the relays TU$a$–TU$d$ of the timer to the senders so that, in the event of trouble, the particular nature thereof and/or the part of the call in which the trouble occurred, could be indicated in the sender.

Other types of trouble could be indicated. Among these are (a) troubles occurring after the timer seizure indicating that the "out" pulsing facilities have failed and how far the call had progressed; (b) inability to get second marker service.

It readily would be feasible for the line group circuit to be provided with access to a timer so that, in the event of failure to find a calling line, the line number would be reported.

It might be desirable for accounting reasons to restrict the ticket count to those tickets representing timed calls and eliminate from the count those which represent troubles. This readily could be effected. An alternative would be to have a separate printer for trouble tickets, said printer being seized under the control of relay TBLS. These modifications are believed to come well within the ability of the skilled in the art in view of the teachings herein.

It is apparent that the general timing and printer arrangement, of which one embodiment has been described above by way of example, lends itself well to punched card accounting. Instead of the digit selector magnets positioning type wheels, they could actuate a punching mechanism that would punch details of the call on an appropriate card. If desired, interposing relays could convert the transfer code into decimal conditions to effect corresponding rather than code punchings. It follows that the calling line number could also be printed as well as punched on the card. The cards could be sorted by numbers for billing, and an accounting machine could automatically list the toll charges on the monthly statement. This would be particularly applicable with automatic pricing arrangements either in the printer-timer or the accounting machine.

12. *Timed calls to toll stations*

If the local station, say station 0154, calls a toll station in the same office, the call will be timed. Toll stations are stations bridged across a line at various distances apart depending upon localities, and the line itself terminates in the office as a regular line.

Toll stations have an office code digit of "7" and the calling subscriber will dial the wanted station exactly as he would dial that of a regular station in another office; that is, he would dial the code "7" and the last digit of his own number—in the assumed case "4"—and then wait for dial tone again upon the receipt of which he would dial the toll station number which, for purposes of illustration, may be assumed to be 9876.

Hence, when the receiver is removed at the calling station and dial tone is transmitted thereto after a link and sender are connected to the line in the manner already described for previous connections, the dialing of the code digit "7" will cause the operation of digit relay 7 of the sender digit register and the consequent operation of the toll station code relay OT over a circuit which may be traced from battery through the winding of relay OT, conductor 268, No. 5 contacts of relay OE, No. 3 contacts of relay 7, to ground on the contacts of relay DN. Relay OT locks over its No. 1 contacts, No. 10 contacts of relay OO to ground on conductor SONG, and completes a circuit for the timer required relay TMR which may be traced from ground on the No. 3 front contacts of relay OT, conductor 269, right winding of relay TMR to battery. Upon the subscriber dialing the last digit of his own number, the same is registered in the ringing code register of the sender. Now in order to make the operations requiring timers consistent from the subscriber's viewpoint, it is appropriate for dial tone to be returned to him at this point, which tone, of course, will come from the local sender connected to his line and not from a distant sender as previously described for calls established to a station in another office.

It will be recalled that the dial tone removal relay DT was operated on the first dial pulse. However, with relay TMR operated, relay DT is locked over a circuit completed from battery through its left winding and No. 1 contacts, conductor 75, No. 3 contacts of relay OR, conductor 76, No. 5 front contacts of relay TMR, conductor 270, No. 1 back contacts of relay RR to ground. Consequently, when the subscriber dials his last digit and relay RR operates, relay DT is released to restore dial tone. The subscriber then dials the remaining digits of the called number, and when relay CI operates upon the dialing of the hundreds digit, dial tone is permanently removed by relay HR which closes the following locking circuit for relay DT, No. 1 contacts thereof, conductor 75, to ground on the No. 2 contacts of relay HR.

When the units digit has been dialed, ground is extended to the No. 2 contacts of relay UR, conductor 66, No. 1 back contacts of relay OT, conductor 101, No. 1 back contacts of relay CS, to the No. 2 contacts of relay CI, locking said relay CI to provide holding battery for the digit relay of the digit register when the ringing code digit is dialed. When this occurs, this ground is extended over conductor 103, No. 3 front contacts of relay TMR, No. 1 contacts of relay TBSY (if a timer is available) and thence as traced to timer start relay TST. If all timers are busy, relay TBSY will be operated and a previously described circuit over its No. 2 contacts will operate the sender busy relay BSY with results already noted.

When a timer becomes connected to the sender, the details of the call will be passed to the timer, including both the called and calling number, in the manner already described for preceding calls. The operated relay TMC, on completion of timer registrations, causes the call to be transferred to the link as heretofore described.

Fig. 51C shows a sample ticket made by the printer from the timer registrations for a call between station 0154 in the Alpha office to the toll station 9876 in the same office.

The toll station line numbers will be regular four-digit numbers of the office, and if a local subscriber, in seeking to establish a connection to a toll station, attempts to avoid a timer by dialing the digit "3" (for the Alpha office) and the four digits of the toll station number, the sender and marker will attempt to serve the call as though it were a local number. But when the line group circuit completes the circuit of the primary designation relay PD- for the outward extension of the connection to the called station, the particular PD- relay operated will be in series with the class relay TS, which operates to extend ground over conductor TS', No. 16 contacts of relay MC, No. 5 front contacts of relay OUT, conductor 275, right winding of out toll station class relay OTS to battery, causing said relay to operate and lock over its left winding and No. 2 contacts to ground on conductor SONG. The circuit for the sender busy relay BSY is now completed from ground on the No. 3 back contacts of relay OT, conductor 276, No. 1 contacts of relay SIOF, conductor 277, No. 1 contacts of relay OTS, conductor 131 and thence as traced to the right winding of relay BSY. The operation of relay BSY results in access being denied the call. It is to be noted that the above circuit of relay BSY is not completed if the toll station code relay OT has been operated or if the call to it is from another office as indicated by relay SIOF being operated as will be described later. This permits toll station numbers to be assigned in the regular subscriber's series and be available on interoffice calls.

13. *Coin box calls*

Coin box calls are handled in a generally similar manner to other local station calls with the exception of means to set the link for coin operation and denial of access to a timer if a timed call is dialed, routing such a call to the operator.

Coin line circuit, identified as 3483 in Fig. 2, is identical with the flat rate type of line circuit such as that of station 0154, for example, except for the provision of compensating ground resistance to make all of the coin lines look alike to the links. It is further assumed that the coin box used on the line is of the "nickel after" type. The numerical conductors of the coin line 3483 extend to the line group circuit to appropriate punchings on the line identification punching block thereof, with the class conductor C343 (not shown) cross-connected to the upper winding of relay PDA3 (or PDB3) which is in series with the class relay PAY. If a call to a local station is made, say to station 0154, the extension of the connection to the sender by the marker causes relay PAY to operate which, in turn, applies ground over its upper contacts to conductor PAY' to complete the circuit of relay SPAY in the sender over the No. 18 contacts of relay MC, No. 7 contacts of relay OUT, conductor 66, left winding of relay SPAY to battery. Relay SPAY operates over this circuit and locks over its right winding and No. 1 contacts to ground on conductor SONG. The subscriber dials the called number and the marker serves the call in a manner identical with a non-coin line. The sender, however, sets the link for coin operation. It will be recalled that when the sender was seized, it extended ground over resistor R4 and conductor 38 to conductor S1 of the link to complete the circuit of relays BL and LPAY therein, which results in the operation of the former but not of the latter. Now when the sender is released by the marker after the initial seizure, relay SBSY operates, and since relays SPAY and 03 are operated therein, resistor R4 is short-circuited by ground on the No. 6 contacts of relay SBSY, conductor 278, No. 4 contacts of relay SPAY, No. 9 contacts of relay 03, conductor 279, to the ungrounded side of resistance R4. The increase in current causes relay LPAY in the link to operate. The operation of relay LPAY is delayed to assure ground being maintained over conductor C to the called line during initial marker service to operate relay L0 therein.

Coin lines have an adjustable resistor R15 in the line circuit thereof connected to conductor C over the No. 3 contacts of relay L0 when the latter operates, to compensate for variation in coin line loops. When relay LPAY operates, a circuit can be traced from ground through resistor R15, No. 3 contacts of relay L0, conductor C and the involved crosspoints in the switch train, No. 1 contacts of relay SC0, upper winding of slow release relay PTL, No. 2 front contacts of relay LPAY, No. 2 back contacts of relay RC01, lower winding of relay PTL, to battery. Relay PTL operates and extends ground on conductor SL over the No. 3 back contacts of relay FSL to lock up relay LPAY. The subsequent service of the call is now the same as with a local station up to the point of the called party answering when the operation of relay RC01 in response to this extends conductor 150 from the lower winding of relay AL, No. 2 normally made continuity contacts of relay LBSY, conductor 44, No. 2 front contacts of relay RC01, No. 2 front contacts of LPAY, thence as traced over the C conductor of the connection, resistor R15 of the line circuit to ground. As before stated, resistor R15 makes all coin lines look substantially alike to the test relay PTL. With relay LPAY and RC01 operated, it will be seen that the "In" and "Out" talking paths are split at the No. 4 and No. 5 contacts of relay LPAY, thereby preventing conversation. At the No. 4 contacts of said relay LPAY, an appropriate tone ground is applied to complete a circuit over the No. 5 contacts of relay RC01, condenser C2, No. 2 normally made contacts of relay D, upper winding of relay AL to battery, while ringing tone (GEN) may be applied through a condenser to the No. 4 front contacts of relay LPAY which extends to conductor T' of the called line. The tone to the calling station indicates the requirement that a coin be deposited, while ringing tone to the called station indicates that the connection is awaiting the depositing of the coin, upon the occurrence of which a "coin" resistance is inserted momentarily in the calling loop. This resistance is of such a magnitude that it will result in the release of relay PTL but not relay AL which is in series with it. The release of relay PTL releases relay LPAY which removes the tone and restores the link to the same condition as it would be a non-coin call.

The customer might attempt to avoid the coin deposit by operating his dial or switchhook. This would, of course, result in the release of relay AL as well as relay PTL. The release of relay AL would extend ground through the No. 1 contacts of relay BL to maintain relay LPAY operated. Relay PTL is sluggish with respect to relay AL so that this holding circuit is completed before relay PTL breaks its contacts. Inasmuch as relay LPAY remains operated, the connection will continue to be split until a coin is deposited. The sluggishness of relay PTL permitted the previous transfer of the No. 2 contact set of relay RC01 without it (relay PTL) releasing.

Calls to the operator from a coin box station are handled identically with a non-coin station except that coin test and line-splitting functions are eliminated in the link by the operation of the cut-through relay CT therein, and the sender, while waiting for the operator to answer, flashes the out trunk on a high-low basis. The latter is effected through the No. 3 contacts of relay SPAY which completes a circuit for flash relay FLA extending from ground through the 60 I. P. M. interrupter, No. 3 contacts of relay SPAY, conductor 174, No. 6 contacts of relay 00, conductor 180, No. 1 contacts of relay SI, conductor 280, winding of relay FLA to battery. Relay FLA follows the pulses of the 60 I. P. M. interrupter to open the shunt, upon operating, around the tertiary winding (T) of relay OTA which results in the resistance of this winding being introduced into and removed from the out trunk circuit via conductor 173 and conductor T' of the outward connection which extends, as previously traced, to the upper winding of relay A of the trunk in series with relay FL thereof which is marginal. Relay FL, therefore, operates and releases at the appropriate frequency. This results in the corresponding removal and reconnnection of the shunt around resistor R11 to increase and decrease the current through the connection extending through the intermediate offices, if any, to flash the trunk lamp at the "0" operator's switchboard to inform her that a coin box station is calling.

If a subscriber at a coin box station attempts to call a distant office or a toll station to which he does not have access or to a station on the same line which is impossible since the coin station is individual to the line, the call is routed to the operator. If any office relay is operated other than relay 03 of the Alpha office at which the call is assumed to originate, relay OT is operated by the application of ground to conductor 162 by a pair of contacts on said operated office relay. Since relay SPAY is operated, ground on conductor 162 completes a circuit for relay 00 via the No. 2 contacts of relay SPAY, conductor 112, the left winding of relay 00 to battery. Relay 00 locks over its right winding and No. 1 front contacts to ground on conductor SONG and disconnects holding ground for the operated office relay at its No. 10 contacts causing it to release. If the toll station relay 07 is dialed and the pay stations are not allowed access to them for the local charge, the circuit of relay 00 is shown completed therefor from ground on the No. 2 contacts of relay 07, conductor 282, No. 5 contacts of relay PAY and thence as traced to the right winding of relay 00 which then operates to perform the functions already indicated. Likewise the reverting call relay 08, if dialed, applies ground to conductor 282 through its No. 8 contacts with results already noted.

14. *Official or free calls*

The system of my invention provides arrangements whereby all calls from official or other free telephones are not charged for calls throughout the switching network, and calls originating within the office from message register stations are routed to such official stations without message register operation, without timing if from a toll station or without coin requirements if from a pay station. Likewise, calls from stations in other exchanges to such official stations are not timed, and calls from distant pay stations for official stations are routed through to the operator.

Official stations have their "C—" conductor in the line group connected to the lower winding of a primary designation relay PDA3 (or PDB3) which is in series with relay FS. Consequently, when an official station calls, relay FS is operated to ground conductor FS' so that, upon the original seizure of the marker, relay TCI of the sender is operated over the following circuit: ground on the upper contacts of relay FS, conductor FS', No. 1 contacts of relay MC, No. 1 back contacts of relay OUT, conductor 185, winding of relay TCI to battery. It will be recalled that on a non-official call requiring timing, the operation of relay TCI indicates that the call has been registered in the timer. Hence on official calls, the operation of relay TCI simulates this condition although no timer has been connected to the sender. When relay MC releases upon the release of the marker, the operation of relay TCI immediately completes the circuit of relay TMC to satisfy the timer connected condition for the sender, which will then proceed to handle the call without a timer actually being connected, resulting in the call not being timed and ticketed.

It is to be noted that, by having a separate relay operated and locked up by the ground condition on conductor FS' on original marker seizure, the omission of timing can be restricted to certain offices by extending a ground circuit from this auxiliary relay through front contacts of those particular office relays to operate relay TCI. It will be seen, also, that this principle is applicable to exchanges with a dual tariff, whereby subscribers paying a high rate are not charged for certain interexchange calls.

On a call to an official station in the Alpha exchange, conductor FS' is similarly grounded and made available, on second marker seizure, to operate relay SFS in the sender over the following path: ground on conductor FS', No. 1 contacts of relay MC, No. 1 front contacts of relay OUT, conductor 286, left winding of relay SFS to battery. Relay SFS locks up over its right winding and No. 5 contact to ground on conductor SONG, disconnects the digit register leads of the sender from the ringing code relays LCa, LCb, LCc and LCd of the link and grounds the Nos. 2, 3 and 4 front contacts to cause the operation of relays LCa, LCb and LCc. These relays, upon operating, complete the circuit of relay FSL, said circuit extending from ground on the No. 9 contacts of relay LCd, No. 6 contacts of relay LCc, No. 4 contacts of relay LCb, No. 3 contacts of relay LCa, conductor 287, winding of relay FSL to battery, causing said relay to operate and lock to ground on conductor SL over its No. 3 contact. Relays LCa, LCb, LCc are operated in the combination stated on the assumption that official lines in the office are individual lines which are rung on the ring side of the line. Hence with the operation of relay LCc, an obvious circuit via conductor 74 is closed for relay RRL which, as previously described, causes ringing current (GEN) to be applied to the ring R' of the line when relay CI operates on each closure of the code (1) interrupter IR.

Relay FSL, upon operating, reverses the connection at its No. 1 and No. 2 contacts between the windings of relay AL and the contacts of relay D so that, when relay D operates in response to the official station answering, the operating loop will not be reversed; at its No. 3 back contacts opens the previously traced holding circuit for relay LPAY so a coin will not be required if the call is from a pay station; at its No. 4 contacts opens the message register battery conductor 138 to prevent a charge on message rate lines; at its No. 5 contacts it opens conductor 177 (H) to the timer, dismissing it if the call is from a toll station, while at its No. 6 contacts it short-circuits resistor R16 to substitute solid for resistance ground over conductor C of the outward connection to the incoming trunk, setting it so that reversed battery will not be returned to the calling office to operate the timer therein, as will be subsequently shown.

It is assumed that all official and free service stations will be on individual lines, but the principle can be extended to include two-party service by having two SFS relays in the sender and two FS class relays in the line group circuit, the second of these relays controlling the extension to the link of one of the several other available codes, say $a+b$, to operate relay FSL therein corresponding to this code and also set up tip party ringing.

15. *Toll station calls*

Toll station calls are handled almost identically with local non-coin calls except reverting calls, local terminating calls and calls to the operator. A toll station line has its class conductor "C—" in line group connected to the middle winding of the primary designation relay PDA3 (or PDB3) which is in series with class relay TS the operation of which, on original marker seizure, causes ground to be applied to conductor TS' and the completion of the circuit of relay STS in the sender over the following path: ground through the upper contacts of relay TS, conductor TS', No. 16 contacts of relay MC, No. 5 back contacts of relay OUT, conductor 288, left winding of relay STS to battery. Relay STS operates and locks over its right winding and No. 3 contacts to ground on conductor SONG. Since all toll station calls normally require a timer, relay STS completes a circuit for the timer required relay TMR from battery through the middle winding of relay TMR, conductor 289, No. 1 contacts of relay STS, conductor 290, No. 9 back contacts of relay 00, to ground on conductor SONG. Relay TMR, operating, conditions the sender to associate a timer with it and the link at the proper point in the call and in the manner described. In this type of connection, that is, on a timed call in the same office, both the calling and called numbers are registered in the sender, the latter being set upon the appropriate called office relays and the called registers of the sender. If a toll station is calling a local number, thereby requiring the calling station to dial "3" (for office Alpha) and the last digit, relay 03 will ground on conductor 193 to cause the operation of relay OFc in the called exchange register of the timer. On the other hand, if a toll station is being called, thereby requiring the calling station to dial a "7" as the first digit, the operation of relay 07 will ground conductors 193 and 194 to operate relays OFc and OFd.

In the link circuit, it will be noted that the winding of relay TM is connected between the sleeve conductor SL and the No. 5 contacts of relay FSL with its winding normally shunted by the No. 4 contacts of relay RC0. The call proceeds up to the point of called party answer as with a call between local stations. When this occurs and relay RC0 operates, the bridge around relay TM is opened and the latter operates in series with relay LH of the timer. It is to be noted that this test is made on all local calls, but the non-timed calls find conductor H to the timer opened. The operation of relay TM grounds conductor K over a previously established path to cause timing to start. When the call has been completed, conductor H is opened and the timer then proceeds to complete its functions. Fig. 51D shows a sample ticket for a timed call from a toll station.

If a toll station calls the operator, the operation of relay 00 releases relay TMR, while at its No. 2 contacts relay STS connects 120 I. P. M. interrupter ground to conductor 174 intermittently to operate relay FL which, as previously described for coin station operator calls, causes the trunk to be flashed on a high-low basis and thereby flash the operator's lamp at 120 I. P. M. rate to indicate that a toll station is calling, as distinguished from the 60 I. P. M. flash of the lamp to indicate that a coin station is calling.

16. *Reverting calls between toll stations*

Reverting calls from one toll station to another on the same line require timing. Consequently relay TMR is operated on the original marker seizure as just described. The subscriber dials the code digit "8" and his own last digit. The code digit causes the operation of relay 8 of the digit register and the consequent operation of the reverting call code relay 08 over the following path: ground through the contacts of relay DN, No. 3 contacts of relay 8, No. 4 contacts of relay OE, conductor 149, winding of relay 08 to battery. Relay 08 locks up over its No. 2 contacts and the No. 10 contacts of relay 00 to ground on conductor SONG, grounds conductors 191, 193 and 194 over its Nos. 5, 6 and 7 contacts, respectively, subsequently to operate relays OFa, OFc and OFd of timer calling office register and opens the circuit to the winding of relay HR at its No. 1 contacts to prevent the registration in the register relays of digits beyond the originating ringing code digit, the latter being registered in the ringing code register relays Ca, Cb, Cc, and Cd. Relay RR operates in response to the ringing code, causes the release of relay DT to again return dial tone to the subscriber and passes ground to the No. 2 contacts of relay CI to lock it up to supply battery to the digit register for retaining therein the called ringing code when it is dialed as the next step.

Timer access and registrations therein are the same as before subject, however, to the following exceptions: the calling exchange digit will be the reverting code digit "8" and the ringing code digit will be registered upon register TT– of the timer. Fig. 51E shows a sample ticket made for a call between two toll stations upon the same line.

Relay TMC, upon operating when the timer has functioned, closes the following circuit for operating relay 2MS to simulate second marker seizure: ground as traced through the No. 3 front contacts of relay TMC, conductor 187, conductor 123, No. 1 normally made contacts of relay 2MS, conductor 104, No. 4 front contacts of relay 08, conductor 159, tertiary winding (T) of relay 2MS to battery. The call is then transferred to the link as with a local reverting call and the link operations previously described with respect to reverting calls will be repeated up to the point of called party answering. When relay RC0 operates under this condition its opens the bridge to relay TM which operates. It is to be recalled that relay LCT operates on reverting calls. Consequently the operation of relay TM extends conductors "T–T'" and "R–R'" over its No. 2 and No. 3 contacts, respectively, to relay AL which operates over the loop in turn operating relay BL. Relay RC releases to disconnect the ringing relays, but is sufficiently slow to permit relay BL to operate before it, thus resulting in the link being held rather than dismissed as on a regular reverting call. As before, conductor K is grounded by relay TM to start timing. Restoration of both receivers will result in the completion of timing.

SECTION III.—TRUNK CALLS

1. *For office serving as tandem*

An incoming call for or "through" the office Alpha from any office in the network is defined as a call established over a trunk intermediate the two offices, such a trunk having an outgoing circuit, shown in Fig. 2 and designated "outgoing trunk" located in the office of origin, an incoming circuit, shown in Fig. 1 and designated "incoming trunk" located in the terminating or "through" office, and a pair of conductors "T" and "R" interconnecting the outgoing and incoming ends of the trunk. The outgoing trunk in Fig. 2 is indicated as having its cable pair capable of connection to the incoming trunks (not shown) at the various offices of the network indicated in Fig. 46, while the incoming trunk in Fig. 1 is indicated as having its cable pair capable of connection to outgoing trunks at the various offices of said network.

The incoming trunk comprises a group of relays to furnish the trunk group and trunk number designation to the line group circuit, to open the number leads therefor when the trunk is found, and to clear conductors "T" and "R" of all apparatus except when the called party answers on a terminating call, in which case it supplies talking battery for the called party and for supervision. On a call to an official or free station which is not to be timed or charged for at the originating office, reversed battery is withheld from the trunk. On tandem calls, the incoming trunk equipment is maintained disconnected from conductors "T" and "R" and supervision is furnished from the outgoing trunk circuit.

An incoming trunk call is handled in the same general manner as described for an originating local line except for means to assign the particular incoming trunk upon which the call arises. It is necessary, however, first to consider the specific arrangements for transmitting the trunk number.

As stated before in connection with outgoing trunk calls, at which time the outgoing trunk circuit shown in Fig. 2 was described, there is a trunk group relay TRK– in the line group circuit for each trunk group in the office, said group including both outgoing trunks to and incoming trunks from a particular office. All incoming trunks, like local lines, have three number leads, "H–," "T–" and "U–," an "N–" lead for connection to the winding of its hold magnet, and a "C–" class lead for connection to some primary designation relay which includes in series therewith the class relay IOF to indicate an interoffice call. The designations of "N–" and "C–" leads are, as with local lines, derived from the numerical designation of the trunk. It is the purpose of the trunk group relay TRK– to extend the individual "C–" and "N–" leads of the incoming trunks in the group to a group of relays whereby the particular calling trunk is operatively associated with the marker and line group. On outgoing calls, and as already described, the trunk group relay TRK- also has the purpose of extending the "C-" and "N-" leads of the outgoing trunks to a group of hunting relays so that the group can be searched for an idle trunk.

Considering the incoming trunk shown in Fig. 1, its tens and units numerical conductors "T-" and "U-," respectively, extend from the No. 2 and No. 1 contacts of relay LO of the trunk to punchings in the line identification punching block, from which they are cross-connected to a group of trunk identifying relays, the tens leads "T-" each being cross-connected to the winding of one of a group of ten relays TRT1-TRT0 via similarly designated punchings in the block, and the units leads "U-" each being cross-connected via punchings TRU1-TRU0 to an appropriate contact of a tens relay TRT- whose mate contact extends to the winding of the one of a group of ten units relays TRU1-TRU0 which is indicated by the designation units leads, such that the operation of the involved tens relay and the controlled units relay provides the trunk group number. Inasmuch as ten "tens" relays and ten "units" relays are provided, there can be 100 trunk groups in the office, the outgoing trunks to an office comprising a part of the trunk group that includes the incoming trunks from that office. Although trunk groups are thus limited to 100, this is probably several times the number which would be expected in a 1000-line office. It also follows that the last two digits of each trunk group designation must be different for each of the trunk groups. The "H-" or hundreds lead of each trunk is cross-connected to one of the several "P-" punchings associated with the trunk group relay TRK- individual to the particular trunk group, and designates the particular trunk in the group which is calling, there being one such "P-" punching for each incoming trunk in the group. It follows that the "T-" and "U-" conductors of all trunks in a group will be connected in multiple to the windings and contacts, respectively, of the same TRT- relays.

It is contemplated that the incoming interexchange trunks will be restricted to one series of ten numbers which, therefore, gives a capacity of ten trunk groups. More could be provided with minor circuit changes. As will be explained below, if an interexchange call is offered, relay TRT1 will operate on the assumption that the last two digits of the trunk group number will be "IX." This will open, at the No. 6 back contacts of said relay, the previously described circuit for locking out a calling line if a sender is not available. Such a call will be held until a sender is released, which will cause relay SB to restore and permit the line group circuit to seize the marker as soon as it becomes available to serve the call. Had some other sequence of trunk group numbers been assigned to incoming trunks as, for example, "CX," the previously described circuit for locking out a calling line would extend through back contacts of that relay.

The net effect of this particular arrangement is that, in the event of a sender not being available, lines other than interexchange trunks will be locked out should they attempt to place a call, but an interexchange call will be held waiting until a sender is released, at which time it will be served. Other calls which might follow before a sender becomes available will be held waiting instead of being locked out. This results in interexchange calls, which normally carry with them a toll charge, being given precedence over local calls.

We may now assume that a call is incoming from an office served through tandem, indicated in Fig. 46 (office Alpha serving as the tandem) and that, in consequence of the loop closure through the outgoing trunk thereof at the originating office relay L of the incoming trunk at this office operates, the circuit of said relay L tracing from battery through the upper winding of said relay, No. 2 normally made contacts of relay RB, left upper winding of repeating coil RPC, No. 3 normally made continuity contacts of relay C, tip conductor "T" of the calling loop, No. 1 contacts of relay A of the outgoing trunk in originating office (not shown at said office but identical with the outgoing trunk shown in Fig. 2 of the Alpha office), right lower winding of repeating coil RPC1, winding of polarized relay SUP, resistor R9, right upper winding of repeating coil RPC1, conductor "R" of the calling loop, No. 4 normally made continuity contacts of relay C of the incoming trunk, left lower winding of repeating coil RPC, No. 2 contacts of relay D, No. 1 normally made contacts of relay RB, lower winding of relay L to ground. Relay L operates. We may further assume that there are five incoming trunks in the tandem trunk group and that, as previously noted in connection with outgoing trunk service, relay TRK-T is individual to this group. Since the trunk group number is "114," the "T-" lead of the trunk is cross-connected to the winding of relay TRT1 causing thereby a circuit to be completed to this relay from ground through the lower winding of relay L0 of the trunk, No. 2 contacts of relay L, No. 2 contacts of of relay L0, conductor "T-1" cross-connected to punching TRT1, lower winding of relay TRT1, No. 4 back contacts of said relay, No. 3 back contacts of relay TRT0, serially through No. 3 back contacts of intervening relays TRT2-TRT9 (not shown), No. 3 contacts of relay TRT1 to resistance battery. Relay TRT1, in operating, makes its No. 4 front contact before breaking its No. 4 back contact and, in so doing, connects operating battery to the lower winding of the relay to hold it temporarily through the operating circuit, and disconnects this battery from other relays of the group to prevent their operation on an awaiting call. Also, since the specific designation of the calling trunk group is "14," the units numerical lead "U14" of each trunk in the group is connected to No. 14 contacts on relay TRT1 over which the circuit of relay TRU4 (not shown) is completed, said circuit tracing, in part, from ground through the lower winding of relay L0, No. 3 contacts of relays L and L0, numerical conductor U-14 cross-connected to punching TRU4 (not shown), No. 14 contacts of relay TRT1 (not shown), lower winding of relay TRU4 (not shown), No. 4 back contacts thereof, No. 3 back contacts of relay TRU0, serially through the No. 3 back contact of relays TRU-TRU1, No. 3 contacts of TRU1, conductor 295, lower winding of relay SUP to battery, causing said relay to operate. Relay TRU4 operates, makes its No. 4 front contacts before breaking its No. 3 back contacts to connect operating battery to its lower winding and to disconnect it from the lower winding of the other relays in the units group. Ground on the No. 5 contacts of relay TRT1 or TRU4 (or some other operated relay in each of the two groups) completes a circuit for relay HT, extending through the lower winding and No. 3 back contacts of said relay, conductor 296, serially through the No. 3 back contacts of relays H1–H0, conductor 8, No. 2 contacts of relay HT to resistance battery. Relay HT operates and connects operating battery to its lower winding and disconnects it from relays H1–H0 to exclude calls from lines other than the trunk which is being served. At its No. 5 contacts, relay HT completes a circuit for relay TS extending from ground at its No. 5 contacts, No. 7 contacts of relay TRT1, conductor 297, lower winding of relay TS to battery. Likewise, ground on the No. 5 contacts of relay HT is also extended through the No. 7 contacts of relay TRU4, conductor 298, lower winding of relay US to battery. Relay HT also completes a previously described circuit for relay HS which operates, and, as in a local line calling, the operated relays HS, TS, and US cause the start relay ST to be energized if the marker is available. Should it be and relay ST operates, the marker applies ground to conductor MKRY, and since relay ST is operated, a circuit is completed for relays ITC and TI in parallel, said circuit being traced from ground on said conductor MKRY, No. 6 front contacts of relay HT, conductor 299, No. 3 contacts of relay ST, conductor 300, winding of relay ITC to battery and, in parallel therewith, winding of relay TI to battery. Relay ITC operates to extend the trunk code group designation to the sender as indicated by ground applied to the transfer conductors $Ta'-Tc'$, $Ua'-Ud'$ and $Ha'-Hd'$ by the operated relays TRT1 and TRU4 to the first two groups of conductors, respectively, and by relay TRK–T to the third group.

The combination of TRT– and TRU– relays operated by the individual trunk leads "T–" and "U–" grounds a conductor which is connected to the winding of the trunk group relay TRK– individual to the trunk group containing the calling trunk, there being, of course, a different conductor grounded by each of the 100 possible combinations of operated relays in the two groups of relays TRT1–TRT0 and TRU1–TRU0. The ground for the desired energizing lead is obtained from the "X" contacts of relay ITC and the two relays TRT– and TRU– which have been operated to complete a path to the winding of the trunk group relay TRK–T.

Thus, to illustrate the above general arangement by the instant example supplied by the tandem trunk group the number of which is "114," the operation of relays TRT1 and TRU4 completes a circuit from ground on the "X" contacts of relay ITC, conductor 305, winding of relay LODL1, to battery and, in parallel therewith over the No. 2 back contacts of said relay, conductor 306, No. 8 contacts of relay TRU4 (not shown), No. 8 contacts of relay TRT1, conductor 307, winding of TRK–T to battery. Other combinations of relays TRT– and TRU– would, of course, cause ground on contacts "X," of relay ITC to be applied to some other conductor individual to that combination for operating trunk group relay TRK– designated by the combination.

Each trunk group relay, like relay TRK–T, is provided with a pair of contacts "a" which is reserved for the hundreds designation of the trunk group number. Since we have assumed that all trunk groups will be numerically designated "11X" the hundreds digit for each group will be "1" to indicate which, according to the four point transfer code, ground must be applied on conductor $Ha'$ to cause operation of relay PHa of the point relays PHa–PHd in Fig. 7. Accordingly, one spring of the "a" contacts on each relay TRK– is grounded and the other is multiplied to conductor 339 which extends to the armature of the No. 12 contacts of relay ITC the mate of which is connected to conductor $Ha'$ so that, when relays ITC and TRK– are operated, ground is applied to said conductor to cause the operation of relay PHa.

Should it be desirable to use trunk group designations having different hundreds numerical designation, the ungrounded spring of contacts "a" on each relay TRK– can be extended to one of ten different punchings and then cross-connected to one of ten different relays each equipped with the appropriate number of grounded springs to denote one of ten different digits according to the transfer code. The mates of these springs would extend ground to contacts 9–12 of relay ITC so that the operation of the relay will ground said contacts to ground, upon the operation of relay ITC, the corresponding conductors in the group $Ha'-Hd'$ for the operation of the appropriate hundreds point relays.

Contact sets 1 to 4 of relay ITC are reserved for the units digit of the trunk group and, on the one side are extended, in combinations indicated by the four point transfer code, to the No. 6 contacts of relays TRU1–TRU4 and the No. 6 and No. 7 contacts of relays TRU5–TRU0 to ground, and, upon the other, to conductors $Ua'-Ud'$. Upon the operation of relay ITC, conductors $Ua'-Ud'$ are grounded in the combination wired to the No. 6, or No. 6 and No. 7 contacts of the particular relay TRU– operated and cause corresponding point relays PUa–PUd to operate over paths previously described. Similarly, contact sets 5 to 8 of said relay ITC are reserved for the tens digit of the trunk group and are extended, on the one side, to the No. 6, or No. 6 and No. 7 contacts of relays TRT1–TRT0 and, on the other, to conductors $Ta'-Td'$ for completing circuits to the tens point relays PTa–PTd.

Each trunk group will have as many trunks therein as will be required by the needs of the traffic between the office of origin and the terminating or cut-through office (in this case the Alpha office), and each trunk group relay TRK– is normally provided with (a) as many contact pairs 1X–NX having conductors extending to the "N" punchings as will be necessary to interconnect the "N–" conductors of the trunks in the group to provide the necessary operate paths for the primary hold magnets of the trunks (both outgoing and incoming); (b) with a corresponding number of contact pairs 1C–NC having conductors extending to the "C" punchings for cross-connection to appropriate primary designation and class relays; and (c) with a number of contact pairs 1Y–NY extending to the "P–" punchings in the identification punching block for cross-connection to the "H–" numerical leads of the incoming trunks in the trunk group. It will be recalled that the "T–" and "U–" numerical leads of the individual incoming trunks are used to identify the trunk group number. The "H–" lead is not used for any hundreds numerical designation of such trunk groups since such designations are supplied by operated relays TRK–T individual to the groups. Said conductor "H–" is used to identify the particular incoming trunk in the group on which an incoming call is offered.

With relay ITC operated, the code of the calling trunk group as indicated by the grounding of conductors $Ha'-Hd'$, $Ta'-Td'$ and $Ua-Ud'$ according to the transfer code by contact "a" of the trunk group relay TRK–T, and by the No. 6 and No. 7 contacts of the operated tens and units relays TRT1 and TRU4, will cause the operation of the point selector relays PHa–PHd, PTa–PTd in the manner already described for a local call, to select the "N–" and "C–" conductors of the calling trunk group. The particular conductor N114 of the tandem trunk group is cross-connected to punching N1 of the trunk relay TRK–T while the conductor C114 is cross-connected to punching C1 individual to the trunk relay, said punching having a conductor 136 connected to the winding of relay TRK–T.

It will be recalled that, at the time relay TRK–T is operated from ground over the "X" contacts of relay ITC over the No. 2 contacts of relay LODL1, the circuit of the latter as well as that of relay LODL2 are also closed. Since relay LODL1 is slow operating, relay LODL2 operates first, relay LODL1 being made slow to operate in order to permit the complete operation of the point relays before opening the circuit of relay TRK–T. In the normal operation of the circuit, ground is returned to the winding of relay TRK–T from the operated point relays via the conductor C114 and punching C1, to hold relay TRK–T operated by the time relay LODL1 operates, and this ground, tracing back via conductor 307 through the original operating path of relay TRK–T established by the operated relays TRT1 and TRU4, is applied to conductor 306 to supply a holding circuit for relay LODL2 via the No. 2 front contacts of relay LODL1, lower winding of relay LODL2 to battery. If, however, the wrong point is selected, the ground on the selected conductor "C–" will not be applied to punching C1 of the desired trunk group relay TRK–T, and the latter will release to prevent relay LODL2 being held, which will then release upon the operation of relay LODL1. In the latter case, a circuit is completed for relay L01 extending from ground on the No. 3 contacts of relay LODL1, contacts of relay LODL2, lower winding of relay L01 to battery. This relay operates, locks to ground on the No. 2 contacts of relay NRH if the marker is connected or (via conductor 303) to ground on the No. 2 contacts of relay LOT if not, and completes a circuit for relay LOT from ground on the No. 1 contacts of relay L01, conductor 49, winding of relay LOT, No. 7 contacts of relay HT to resistance battery. Relay LOT operates and performs the same function of locking out the trunk by completing circuits to relay L0 thereof and to release the marker and line group circuits as was performed by relay LOL for a local line. Since the circuits for accomplishing the former function are similar to those completed for performing the latter, said circuits are not traved, the same being easily followed on the drawing. It is to be noted that relay LOT provides means for locking out a trunk in the event of a mutilated trunk number which are similar to those already described in connection with the operation of relay LOL for locking a line in the event of a mutilated line number.

As already mentioned, the trunk relay TRK–T has a group of contact pairs 1C–NC which extend to the C punchings, from which they are cross-connected to appropriate windings of the primary designation relays PD– of the several primaries upon which the individual trunks are located. Contacts 1X–NX extend to the "N" punchings from which they are cross-connected to the hold magnets of the trunks in the group. It is now to be recalled that the hundreds numerical conductors "H–" of the incoming trunks in the group are connected, via punchings "P," to contacts 1y–ny of relay TRK–T. Hence when a call originates over a trunk and relay L thereof operates (assume that the call originates over a tandem incoming trunk), ground through the lower winding of relay L0 and the No. 3 contacts of relays L and L0 is applied to the numerical conductor "H–" extending to contacts 1y of trunk group relay TRK–T. Now when relay HT operates as above described, indicating that a trunk is originating a call, and relay ST of the line group circuit operates in consequence of its connection with the marker, the circuit of relays ITC and TI is completed, causing the operation of said relays. Relay TI is for the purpose of transferring the trunk selecting facilities from the "out" group of hunting relays OT1–OTX to the "in" group IT1–ITX. Since the circuit of the trunk group relay TRK–T is closed by relay ITC when operated, and the latter operates in parallel with relay TI, it follows that when relay TRK–T operates, it finds relay TI already up so that the hundreds numerical conductors "H–" of the incoming trunks of the group are extended to the lower windings of relays IT1–ITX via contacts 1y–ny of relays TRK–T and TI, the particular one of said conductors which is individual to the calling trunk, and therefore, grounded, completing the circuit of the corresponding relay IT–. Thus, if the calling trunk happens to be the second in the group, its hundreds numerical lead "H–" will be connected to contacts 2y of relay TRK–T from which said contacts are extended to contacts 2y of relay TI from which they are further extended to the lower winding of relay IT2 the circuit of which is completed over its No. 4 back contacts, serially through No. 5 back contacts of relay ITx–IT1 to resistance battery. Relay IT2 operates, closes its No. 4 front contact before breaking its Nos. 4 and 5 back contacts to connect battery to its operating winding, but subsequently locking up over its upper winding and No. 1 contacts to ground on marker off-normal ground conductor ONG and disconnects operating battery from other IT– relays to give precedence to the trunk designated by the operated relay IT2 in the event of a simultaneous call being offered over a trunk higher in the order. Over its No. 2 contacts, relay IT2 applies ground to the No. 2C front contacts of relays TI and TRK–T and thence to the individual conductor "C–" of the trunk, said conductor being extended to a winding of the appropriate primary designation relay PDA2 (or PDB2) which indicates the primary switch upon which the trunk appears, in series with the interoffice class relay IOF. Ground applied to punching "N1" by the point relays extends over conductor 54, "d" contacts of relays TRK–T, the No. 3 contacts of relay IT2, 2x front contacts of relay TI and TRK–T to the N punching, which is cross-connected to conductor "N–" of the trunk, extending to the hold magnet thereof in the primary switch. Under this condition the call appears to the line group and marker for subsequent operations as an individual line and both circuits proceed with the remainder of their respective functions as described.

On initial connection of the marker with the sender, the incoming trunk call is classed in the latter by the operation of relay SIOF therein over a circuit extending from ground on the upper contacts of relay IOF of the line group circuit, conductor IOF', No. 15 contacts of relay MC, No. 4 contacts of relay OUT, conductor 29, right winding of relay SIOF to battery.

It is to be noted that the stationary springs of the No. 3 and No. 4 contacts of relay SIOF extend to terminal punchings. In an office which is both local and tandem, these punchings are not cross-connected to conductors 325 and 326, respectively, whereas if the office does not operate as a tandem, the relays SIOF of the senders therein have the punchings cross-connected to said conductors 325 and 326. Since we are now considering office Alpha to be a local as well as a tandem office, the stationary springs of the No. 3 and No. 4 contacts of relay SIOF are not cross-connected and, with this in mind, relay SIOF locks up over its left winding and No. 2 contacts to ground on conductor SONG. Over its No. 7 contacts it extends ground to conductor 310 which completes the circuit to the right winding of relay RB over the No. 3 contacts of relay OUT and conductor 315, causing said relay to operate and lock over its left winding and No. 1 contacts to ground on conductor SONG under the control of relay RB1. When the path is set up to the sender, the individual conductor "N–" of the trunk is grounded to operate the hold magnet thereof in the manner already described for a line, and when the path is properly completed through the crosspoints to the link, resistance ground is returned by the link over conductor C to operate relay C of the incoming trunk in series with relay TFS thereof, which does not operate, said circuit tracing in part from resistance ground from the link, previously traced through the crosspoints over conductor C, upper winding of relay TFS, winding of relay C to battery. Relay C, upon operating, cuts conductors T and R over its No. 3 and No. 4 front contacts, respectively, direct to the crosspoints and thence to the sender, releasing the trunk relay L. Relay C also closes a circuit for relay T extending from sleeve ground, No. 5 contacts of relay C, upper winding of relay T to battery, said relay operating over said circuit and then locking to sleeve ground over its lower winding and No. 3 contacts. Relay L0 is also operated by relay C over a circuit extending from sleeve ground through the No. 6 contacts of relay C, upper winding of relay L0 to battery, causing said relay to operate and remain operated for the duration of the call, it being held either by its operating circuit or by ground on the No. 4 contacts of relay L and its own No. 6 contacts on those parts of the connection when relay L is operated but conductor C is open.

In the meanwhile, when relay SBSY operates upon disconnection of the marker, ground is extended to conductor 401 by the No. 2 contacts of said relay, completing thereby a circuit to the left winding of relay RB1 via the No. 2 contacts of relay RB. Relay RB1 operates and reverses the loop to the distant sender, the incoming trunk having been connected to the link over selected switch crosspoints. Relay RB1 also opens the locking circuit of relay RB the operating circuit of which is broken by the operation of relay OUT which, as already shown, follows the operation of relay SBSY. The period of reversed battery impulse is determined by the releasing time of relay RB and advises the distant sender that the call can be handled, the short battery impulse serving, in the distant sender, to cause the momentary release of relay OTA therein, as already described for the sender in the illustrative Alpha office when receiving such a signal from tandem on a connection from Alpha via tandem to reach the operator.

The distant sender, upon receiving the reversed battery impulse, transmits the terminating office code (digit 3 for the Alpha office) to cause the operation of relay 3 of the digit register and, in response thereto, of the office code relay 03, all in the manner already described for a local call originating and terminating in Alpha. When relay OR operates at the completion of this digit, it extends off-normal battery ONB through its No. 1 contacts over a previously traced path to operate relay RR, to result in the originating ringing code registration being skipped. The distant sender is satisfied as to the number of out digits dialed and then awaits a reversed battery impulse from the sender at Alpha (now operating as a terminating sender) which is supplied as follows: The momentarily established ground on conductor 110 which operated relay 03 is extended via the No. 16 contacts thereof, conductor 316, No. 5 contacts of relay SIOF, conductor 317, No. 3 front contacts of relay OUT, conductor 315, right winding of relay RB to battery, causing said relay to operate and, as before, to lock under the control of relay RB1. The latter now operates over a previously described circuit to reverse the battery supply over the tip and ring conductors T and R of the trunk and to release relay RB. The operating impulse of relay RB is short and the relay will release after a moment to restore the normal battery condition on the trunk, which will cause the distant sender to cut through in the manner previously described for the sender under consideration when operating as an originating sender. The dial tone removal relay DT which operated upon the operation of relay C1 and locked to ground on the No. 8 back contacts of relay SIOF over a previously described path, now has its locking circuit opened by the operation of said relay SIOF so that it restores upon the release of relay C1 to return dial tone to the calling subscriber at the distant office, who then dials the called number. The sender then seizes the marker to establish an "out" connection to the desired called line (or out trunk if the connection is a tandem connection) and further transfers the call to the link in the described manner.

For transmission reasons it is necessary that cut-through operations in the link be deferred until after the called party answers. In this connection it will be recalled that the circuit from the sender for relays TRAN and CTA in the link includes resistors R6 and R7, connected to the circuit via the No. 10 back contacts of relay SIOF, and that the current through said circuit is sufficient to operate relay TRAN but not relay CTA. Now on an incoming trunk call to a local or toll station in Alpha, the operation of relay SIOF causes the circuit to be completed over the No. 10 front contacts instead of the No. 10 back contacts of said relay, removing thereby resistor R7 from the circuit and causing sufficient current to flow therethrough to operate both relays TRAN and CTA, the latter locking to sleeve ground over its No. 2 front contacts. The setting of ringing, ringing the called party and the initial stages of the answer condition are the same as previously described for a local call. The operation of relay RC01 in response to the called party answering, completes a circuit for relay LCT which extends from ground on its No. 6 contacts, conductor 318, No. 3 contacts of relay CTA, conductor 118, lower winding of relay LCT to battery, causing said relay to operate, the same locking to sleeve ground via the No. 9 contacts of relay LBSY, conductor 156 and its own No. 6 contacts. Relay LCT opens ground on conductor C, connects conductors "T," "T'" and "R," "R'" together and disconnects relay AL which results in the subsequent release of relay BL, and the removal of off-normal ground from conductor LONG and sleeve ground supply from the link.

The removal of ground from conductor "C" permits relay C of the incoming trunk to release, thereby placing the connection under the control of the trunk relay L which now reoperates over the calling trunk loop to maintain holding ground for relay L0. The secondary of the repeating coil RPC is connected via the front contacts 1 and 2 of relay T and back contacts 1 and 2 of relay C to the crosspoints. Since the release of relay C arises from the answer of the called party, relay D operates over the called loop and completes a circuit for relay RB which extends from battery through the winding of said relay, No. 1 contacts of relay D, No. 1 back contacts of relay TFS, No. 4 front contacts of relay L0 to ground on the No. 4 front contacts of relay T. Relay RB operates to reverse the battery supply to the incoming trunk for the purpose of returning supervision to the equipment in the calling office or switchboard. The purpose of relay T is to maintain the circuit open to relay D upon seizure and to prevent a false impulse of reverse battery to be returned to the calling office. Battery is supplied the called party through the windings of relay D.

On an incoming trunk call for an official station, relay FS in the link will be operated as previously described, and solidly grounds conductor "C" the effect of which, in the incoming trunk, is to cause the operation of relay TFS in series with relay C which, it will be remembered, was operated on the original extension of the connection to the sender. Relay TFS locks up over its No. 1 front contacts to sleeve ground and, at its No. 1 back contacts, opens the previously described path to relay RB to prevent the operation of the latter and, therefore, the return of a charge condition in the form of a battery reversal to the calling office. Supervision to the operator on such calls is on a "high-low" basis, and is effected by relays D and FS opening a bridge around resistor R17, said resistor, therefore, being inserted in the calling trunk loop. This resistance insertion will be repeated in the "out" trunk circuit at an intervening office, if any. It is understood that the switchboard trunk circuit will be responsive for supervision to both reversed battery and high-low resistance conditions.

Release of the connection occurs in the manner already described. Release, however, may occur with the trunk in a cut-through condition with relay C thereof operated or with the trunk furnishing battery and supervision. If release takes place in the former condition, relay C releases to change the circuit condition to that of the latter when the link opens conductor "C." The release of relay C opens the operating circuit of relay L0 and, if relay L is down, relay L0 will release to remove ground from sleeve conductor "SL," permitting the crosspoint hold magnets to release and restore the connection to normal. Relay T will also release on the opening of the No. 4 front contacts of relay L0.

2. For office not serving as tandem

If the terminating office is one which does not serve as a tandem; that is, if the incoming calls are actually to terminate at lines in the office, the stationary springs of the No. 3 and No. 4 contacts of relay SIOF of the sender therein are cross-connected to conductors 325 and 326, respectively. For this type of "terminating" office, it will be unnecessary for the sender at the originating office to transmit the code of the terminating office. Hence when relay SIOF operates in the sender of the terminating office, a circuit is closed over conductor 325 to complete the circuit of relay 03, and another circuit is completed over conductor 326 for relay OR to cause the office code to be skipped. Relay OR, upon operating, completes the circuit of relay RR via battery on conductor ONB, No. 1 contacts of relay OR, conductor 111, No. 10 contacts of relay 03, conductor 78, No. 5 contacts of relay STS, conductor 79, left winding of relay RR to ground. Relay RR, by operating, causes the originating ringing code to be skipped. Since the originating sender has been satisfied as to the number of digits required of it by the time the call has reached this stage. It cuts through upon receipt of the reversed battery impulse when relay SBSY operates. Dial tone will, of course, be transmitted back to the calling subscriber, but relay DT, when it operates on the first operation of relay CI, will lock up to ground on the No. 2 contacts of relay HR via conductor 75.

3. Cut-through office calls

An outlying dial office without an operator or automatic ticketing facilities does not have access directly to local numbers in the Alpha office, and any call offered this office can go only to the "0" operator, that is, with respect to such outlying offices (Gamma being one), Alpha can only serve as a tandem. Consequently, incoming trunks from such outlying offices have their class "C-" conductors wired to the middle winding of primary designation relay PDA2 (or PDB2) which is in series with class relay CT. Hence when the line group circuit originally classes the call, the operation of the class relay CT causes ground to be applied to conductor CT' over the upper contacts of said relay, No. 17 contacts of relay MC, No. 6 contacts of relay OUT, conductor 319, left winding of relay CTS to battery, causing said relay to operate, which then locks over its right winding and No. 1 contacts to ground on conductor SONG, applies ground over its No. 3 contacts to conductor 112 to complete thereover the circuit to the left winding of relay 00, causing said latter relay to operate, and further applying ground over its No. 4 contacts to conductor 320 to complete the circuit of the dial tone relay DT. The operation of relay 00 results in the call proceeding exactly as though a local station had dialed "0" except that relay CTS, at its No. 2 contacts, completes a flashing circuit for relay FL by applying 240-I. P. M. or other suitably interrupted ground to conductor 174. As before explained, relay FL causes the trunk to be flashed on a high-low basis at the rate of 240 interruptions per minute or in some other distinguishable manner to indicate to the operator the class of the called office.

The same general operation as described for a cut-through call takes place at any office operating as a tandem switching point with minor differences which may be noted. The receipt by the sender thereat of the office code operates that office relay which, in turn, operates relay OT. Since relay SIOF is operated on the original classification of the call, a circuit is now completed for relay 2MS which operates to seize the marker to establish the out connection to the trunk, said circuit being traced in part from ground on the No. 8 front contacts of relay SIOF, conductor 327, No. 5 contacts of relay OT, conductor 123, No. 2 normally made continuity contacts of relay 2MS and thence as previously traced through the start circuit of the marker. When relay 2MS operates, ground on the No. 6 contacts of relay SIOF is applied to conductor 101, the No. 3 contacts of relay 2MS and thence to conductor 127 to cause the call to be transferred to the link on a cut-through basis, the latter being controlled by ground on the No. 8 contacts of relay OT being extended through resistance R2 to operate relay LCT in the link.

If a busy trunk or busy paths condition is encountered when the sender is at an intermediate office serving as a tandem, it must transmit this information to the originating sender which is still associated with the connection to control switching. The marker at the intermediate office, in serving such a call, grounds conductor 130 to operate relay BSY of the sender. The operation of the latter completes a circuit for relay RB1 which extends from ground on the No. 9 front contacts of relay SIOF, conductor 328, No. 4 contacts of relay OT, conductor 329, No. 3 contacts of relay BSY, conductor 330, right winding of relay RB1 to battery. Relay RB1 operates and reverses battery to the incoming trunk. The originating sender, upon receiving the reversal, transfers the call to its link with relay LBSY therein operated as previously noted, which results in the release of the out trunk circuit thereat and all equipment beyond, including the sender here under consideration since the circuit of its relay AS will be opened.

It is to be noted that the sender differentiates between classes of calls and progress thereof requiring reversed battery to a distant sender or transfer of the call to the link with busy to be returned therefrom. The above-described circuit for return of reversed battery to a sender passes through front contacts of relays SIOF and OT, which indicates a tandem connection. The circuit for transference of the call to the link with busy set therein is produced by applying direct ground on conductor K2 via the No. 4 contacts of relay BSY of the sender as previously described. Ground on said contacts is applied either over conductor 145 from the No. 2 back contacts of relay OT or over conductor 132 from the No. 9 back contacts of relay SIOF. Hence if either of these relays is down, the link returns busy and the sender is dismissed. On the other hand, if both relays are up, as with a tandem connection, the reversed battery is supplied and link transference (at the "tandem" office) is withheld. A "cut-through" office such as Gamma is assumed not to have a sender, so any call therefrom which encounters busy in the office presently considered has tone returned to it by the link since, for a call from a cutthrough office, relay SIOF will be down.

SECTION IV.—MISCELLANEOUS

1. *Calling line lock-out*

If the line group circuit, in operating to find the calling line, finds said line busy as indicated by the presence of ground on conductor "N–" thereof, it indicates an equipment trouble since the calling line is, of course, not busy. In this case, the point selector relays of Fig. 7, having been set by the line numerical conductors "H–," "T–" and "U–," the ground on conductor "N–" will trace back to the lower No. 1 armature of relay PU$d$, whence it is extended through the No. 4 back contacts of relay IC, No. 1 back contacts of relay COMPT, back contacts of relay BT to the upper winding of relay NBSY, causing the operation of said relay. Relay NBSY grounds conductor 163 to complete the circuit of the marker-busy relay MBSY which operates to dismiss the marker and further grounds conductor 335 via the No. 2 contacts of relay ST to complete the circuit of relay LO1 which operates to place the line in a lock-out condition. Relay LO1 closes a previously described circuit for relay LOL which, upon operation, opens the start circuit between relay ST of the line group circuit and relay MST of the marker. Ground on conductor 163 and the opening of the start circuit will result in the dismissal of the marker.

Another manifestation of trouble is the inability of the line group circuit to find the calling line even though it does not test busy. As previously described, when, on an originating call, the marker is seized by the line group circuit, ground is returned thereto over the retest ground conductor RTG to energize the two intercept relays ICD and ICD1 of which the latter operates first. After a short interval relay ICD operates to open the operating circuit for relay ICD1 which starts to release. This interval is sufficient for the point relays in Fig. 7 to operate and apply ground to the class conductor "C–" of the calling line which, being cross-connected to the appropriate primary designation relay and class relay, should cause the operation of both. Should this occur, then ground will be applied to conductor 13 over the lower contacts of the operated class relay, which completes a circuit to the middle winding of relay ICD1 to prevent its release. Should this not occur, that is, should a class relay not be operated, relay ICD1 will release, indicating that an occupied line has not been found. This is indicative of a trouble inasmuch as the calling line is, of course, occupied, i. e., in service; otherwise its class numerical conductor "C–" would not have been connected to a class relay. Therefore, with relay ICD1 released and relay ICD operated, ground is applied over their lower contacts to conductor 335 which completes the previously described circuit for relay LO1 the operation of which results in completing a circuit for relay LO in the line circuit to remove it from service.

2. *Intercept service*

Calls to vacant lines are characterized by the absence of a connection between the class conductor "C–" of such lines and their respective primary designation and class relays. Stations calling such vacant lines will be routed to the intercept operator.

When the marker is seized the second time to establish connection to the called (vacant) line, the failure to return a ground on conductor 13 because a class relay has not operated, causes relay ICD1 to release as above described. A circuit is now completed from ground on conductor RTG, upper front contacts of relay ICD, upper contacts of relay ICD1, "C" back contacts of relay OTT, conductor 336, lower winding of relay IC to battery. Relay IC operates, locks over its upper winding and No. 3 contacts to off-normal ground on conductor ONG, grounds conductor IC' over its No. 1 contacts to complete the circuit of relay SNIC in the sender via the No. 7 contacts of relay MC and conductor 337, and transfers the No. 2 and No. 4 armatures from their respective back contacts (the former supplying ground to the "C–" conductor and the latter completing the circuit of relay COMP in crosspoint continuity test) to their respective front contacts. The stationary front spring of the No. 2 contact is extended to a punching ICC which is cross-connected to the intercept trunk group relay "TRK–" of the intercept trunk group (not shown), while the stationary front spring of the No. 4 contacts is extended to a punching IGN which is cross-connected to the "NI" (not shown) of punching of said trunk group relay "TRK–." If an interoffice group of trunks is employed for routing intercept traffic, punchings ICC and ICN will be extended to the trunk relay TRK– of that trunk group.

In the meanwhile, the operation of relay SNIC in the sender causes the operation of relay OT through ground being applied to conductor 162 from the No. 4 contacts of the former relay. Now, if it is assumed that intercept traffic is routed through tandem, the trunk group number of which is 114, punchings ICC and ICN will be cross-connected to the tandem trunk group relay TRK–T to cause thereby the automatic selection of a tandem trunk. It may be further assumed that one digit will be needed to satisfy the distant sender to reach the intercept desk. Hence the No. 2 contacts of relay SNIC are connected to conductors 167 and 338, the latter conductor extending to the No. 3 contacts of relay 1 of the digit register to obtain ground therefrom to operate relay STP for one pulse via conductor 161 and the No. 2 contacts of relay DI, the circuit of the stop impulse relay SI being completed thereafter from ground on the No. 1 contacts of relay DI′, conductor 169, No. 3 contacts of relay SNIC, winding of relay SI to battery. The cross-connections at relay SNIC with respect to the digit register and the out digit control circuit may be varied, of course, to suit the number of digits required to reach the intercept desk, the above having been supplied only by way of illustration.

If intercept service is not to be provided but busy is to be returned to the calling subscriber when dialing a vacant line, relay IC of the line group and relay SNIC of the sender may be dispensed with and the operating circuit of the latter can be extended to operate the busy relay NBSY of the line group circuit. The operating circuit for relay IC is routed via a back contact of relay OTT to call for a retest rather than intercept on calls to a trunk group.

3. *Test desk calls*

Test desk trunks have their class "C–" conductor wired to the lower winding of primary designation relay PDA1 (or PDB1) which is in series with the class relay TD. Consequently, when the test desk calls to test some line, relay TD is operated on original marker seizure in consequence of which ground is applied to conductor TD′ over the upper contacts of relay TD, causing thereby a circuit to be completed for relay STD in the sender from ground on said conductor, No. 6 contacts of relay MC, No. 2 back contacts of relay OUT, conductor 170, winding of relay STD to battery, causing the operation of said relay, which locks over its No. 2 contacts to off-normal ground on conductor SONG. The same ground, however, is extended to resistance R2 and thence over a previously described circuit to complete the circuit of relay CT in the link. As a result of this, when the call is transferred to the link, the latter immediately cuts through leaving the connection held by the test desk trunk. The desk can then make tests over clear "T" and "R" conductors.

In the event a connector type switch is used to test particular trunks in any of the trunk groups, this switch would be given a special line number and could be operated over the "T" and "R" loop by the test desk dial via the test desk. In the event a subscriber should inadvertently dial the test desk trunk number, the classification from conductor TD′ on second marker seizure would be extended through the No. 1 contacts of relay STD to route the call to intercept, if such service is provided, or cause busy to be returned as previously described. The special terminal for the trunk connector mentioned above would also cause the call to it (there would be no originating ones) to be classed as TD on second marker seizure, which would cause the intercept or busy operation, unless relay STD had been operated on original marker seizure as would occur if the desk had called. This precludes subscribers routing calls to this terminal. An additional pair of contacts could be provided on relay STD to simulate a ringing code being dialed to satisfy the sender for a second marker seizure and thereby obviating this requirement from the desk.

4. *Night numbers*

It is desirable to make provisions for night numbers in the office. By night numbers are meant particular lines within a group of P. B. X trunks or consecutive lines to a subscriber whereby at night or on holidays and Sundays particular telephones may be reached. This is accomplished by assigning particular lines in the group of trunks or lines a night number in addition to the listed number for the group. When this number is dialed, the call will be completed to it or busy returned, if it is in use, in contradistinction to the hunting operation which will result if the listed number of the group is dialed. This is effected by providing two "C" and two "N" cross-connections, the first "C" and "N" leads being provided in accordance with the above description for a particular trunk in a group of trunks and will be employed for originating calls and incoming calls when the number of the group is dialed. The second "C" and "N" leads will be cross-connected for the night number of the lines and will be used for incoming traffic only to that line. When the latter number is dialed, the call will be completed exactly as though it were to an individual line inasmuch as the night number will look to the marker and line group circuit as such a line. The trunk hunting facilities will not be involved, so busy will be returned if the line is in use rather than having the equipment test additional lines in the group.

5. *Alarm checking*

It may be desirable to check certain conditions in the office without going to it, to determine if any alarm conditions prevail. This may be accomplished by having one or more lines set aside for alarm checking. Each of these lines will be so connected with the alarm facilities that alarm conditions will result in certain conditions as, for example, tones to be applied to that line. When that line is dialed, the connection to it may be completed in the usual manner and, upon ringing being transmitted, the line equipment, not shown, will trip the ringing and apply the proper tones for an appropriate interval before releasing itself. Detail circuit arrangements for the latter are not shown since they are familiar to the art and it is the instant purpose merely to show how such arrangements may be applied to this invention.

SECTION V.—MODIFICATIONS

Having described the fundamental features of my invention, including suitable equipment and appropriate circuit networks for carrying out its operation according to the disclosed embodiment thereof, I will now indicate briefly certain modifications of portions of the invention which are implicit in or easily derived from the disclosure as above set forth.

1. *Finding line from sender registration*

The method of finding a calling line as set out above provides for registering the number of such a line in the line group circuit and from this registration effecting the selection of conductors "N–" and "C–" corresponding to it. This registration in the line group circuit is transferred to the sender to register the number of the calling line. In practicing this invention I may, as an alternative of the above procedure, arrange for an idle sender to be preselected and, upon an originating call being offered, relay MC of that sender will be immediately operated. The number of the calling line will be registered in this sender by the operation of relays H–, T– and U– of the line group circuit corresponding to said line. After a moment the connections of these relays to the sender will be opened, leaving on the proper number leads ground from the operated originating number register relays of the sender. The latter will then be employed to operate the point and other relays to effect the finding of the line. This will assure proper registration of the calling line numbers in the sender. It is believed that the circuit modifications to effect this will be understood by those skilled in the art.

2. *Skip of originating ringing code on 1-, 2- and 4-party lines*

This invention as set out above contemplates that the originating ringing code be dialed for all calls requiring automatic timing and ticketing so that the particular station calling may be identified. Means are familiar to the art whereby stations on two-party and four-party lines may be automatically identified. Where two-party lines are involved, Patent No. 1,823,688 issued to H. Hovland on September 15, 1931, is illustrative, and Patent No. 2,306,173, issued to M. A. Logan on December 22, 1942, illustrates an arrangement for identifying a particular calling station of a four-party line. One of these, or other known arrangements to this end, may be employed in the instant invention to eliminate the requirement that the calling subscriber on such lines dial his own last digit. Should the maximum number of stations per line be not greater than can be so identified, the dialing of the originating code need not be used at all. It will be understood that particular arrangements are required at the stations for use with these identifying circuits, as shown by the patents covering them.

Fig. 52 shows a modification of this invention whereby those subscribers on four or less party lines privileged to have their ticketed calls automatically handled will be relieved of the necessity of dialing their own ringing code.

An additional class relay in the line group to be operated in the usual way by cross-connections for 1-, 2- and 4-party lines, is provided for "No ringing code" lines and is designated NRC. In the sender a relay PT is provided, together with a station identification circuit of a familiar type.

When a call is originated from a line of the class considered in this feature, the operation of class relay NRC, indicating the originating ringing code may be skipped, in the line group grounds conductor NRC'. When a sender is connected and relay MC thereof operates, this ground is extended through the added No. 31 front contacts of relay MC, added No. 20 back contacts of relay OUT, the right-hand winding of party test relay PT to battery, causing this relay to operate and lock up to ground on conductor SONG reached through the added No. 21 back contact of relay OUT. The operation of relay PT places battery by its No. 5 contacts on conductor 79 to operate relay RR, which locks up to battery on conductor ONB. It will be recalled that the operation of relay RR results in the requirement for dialing the ringing code being eliminated. Relay PT also connects conductors T and R of the calling line, when they are extended over conductors 108 and 65 from the link, to the station identification circuit. This enables the latter circuit to test the line to identify the calling station. As a result of this test it grounds, by obvious minor modifications thereof, the appropriate lead to one or more of relays Ca to Cd, causing that relay or relays to operate to designate, thereby, the calling station. When the sender is released by the marker, it will be recalled that relay MC is released and relay OUT is operated, thereby releasing relay PT. The latter connects conductors T and R of the calling line to relay AS, which operates to perform functions previously described.

In order to assure adequate testing time of the calling line, relay PT may be made slow to release. In order to assure that the sender will be held, the No. 1 front contact of relay PT extends ground to the right-hand winding of relay BS, as shown by Fig. 22, to hold it operated during the added testing interval.

Lines with more than two or four stations per line, depending on the type of station identifying circuit employed, will not cause class relay NRC to be operated and, therefore, the calling ringing code will have to be dialed for station identification. Where there are no such lines served by the office, relay PT may be made to operate on all calls offered from lines having access to automatic ticketing facilities, and those circuit elements required for recording the originating ringing code from dial pulses may be omitted.

Where the service of the office is limited to the maximum number of stations which may be automatically identified, the use of a separate digit for the ringing code may be eliminated at a sacrifice of office capacity for a given number of digits. In this invention as described, a three digit code is used to select the called line, and the fourth to select ringing. This may be modified so that the third, which will be the last digit under this arrangement, will select the line and also set the ringing code. This may require that additional contact be provided on called units register relays to set ringing.

3. Separate automatic ticketing network

This invention may be used to provide automatic ticketing in large exchanges for selected subscribers having a large amount of toll business. Such subscribers would take a special service connected to a switching unit as set out herein. This arrangement preferably would be employed in conjunction with intertoll dialing facilities which, as normally employed, enables the toll operators at the originating point to select the called exchanges and dial or otherwise select over a toll line, or a suitable dial path, the called number directly, without an intervening incoming toll operator. In multi-office areas this requires the use of a tandem or the equivalent to select and establish a connection from the toll line to the desired office in the exchange.

It is contemplated in this embodiment of my invention that a code would be dialed by the calling subscriber to designate the called exchange. Upon dial tone being received therefrom he would dial the listed number, said number being repeated via intertoll facilities. The outgoing intertoll trunks could be separate for this service or multiplied with some or all of those appearing before the toll operator, with appropriate facilities for indicating a busy condition to the line group of the dial unit when a trunk is being used by an operator, and the converse.

By minor changes in the circuit shown herein, the complete called number may be registered as well as a one- or two-digit exchange code. With this arrangement, the subscriber would not be required to interrupt dialing but could dial the exchange code and called number as one continuous operation, the sender transmitting the called number after effecting the selection, through a tandem or two, if necessary, of the distant exchange.

It is further contemplated that appropriate arrangements may be employed to conform to the type of intertoll dialing arrangements used. For example, voice frequency impulses or tone signals may be used for transmitting information to the distant exchange and supervisory signals therefrom, or telegraph channels may be used for this purpose, all of which are understood by those versed in this particular art.

Where hotels take this service, it will be necessary to pass information promptly to the operator thereat as to charges for calls so that they may be entered against the room ledger. Trunks from hotels may be classed as such by classing arrangements described herein. This may be registered in the sender and transferred to the timer. A separate printer could be located in the toll operating room or other point having operators. When the timer is ready to print the ticket it will effect connection to the separate printer by means similar to those shown herein for substituting a spare printer. This printer would print the details of the call and an operator could pass them to the P. B. X operator over a telephone circuit or teletypewriter.

In this connection, my invention is well suited for employment with a ticket price announcing system such as the one set out in Patent No. 2,298,453 issued to H. M. Bascom et al., on October 13, 1942. The employment of this arrangement with my invention within the ability of those skilled in the art could arrange for the timer to hold the link and originating portion of the connection until a special ready signal is received from the P. B. X operator, whereupon the announcing facilities would inform her of the pricing information. A ticket would, of course, be made in addition.

4. Intercept on multi-party lines

Intercepting arrangements can readily be provided to cover vacant parties on lines up to ten parties per line with divided ringing. Figure 53 shows one arrangement for effecting this, said figure being a modification of the out portion of the line group circuit (Figs. 7–12, inclusive), while Fig. 53A shows the punching numbering for the various cross-connections.

The principle involved is that of matching the called station ringing code with the occupancy of the line. Divided ringing is assumed with a limit of five parties to each side of the line. There are, of course, 31 different possible combinations of parties in service on each side.

With reference to Fig. 53, when the sender seizes the marker and line group, it operates the intercept ringing code relay Ia–Id in the combination for the called party code. This energizes one of 5 numerical terminals corresponding thereto. The detail connections for these relays is the same as for the ringing code relays LCa–LCd of the link (Fig. 6), in which circuit, it will be recalled, the code relay LCc operates to designate parties on the ring side of the line. Now when relay Ic of Fig. 53 is operated, it operates relay IRR over an obvious circuit for the ring parties.

It is further proposed that multi-party lines be segregated to particular hundreds, and each of said hundreds will have a relay PH'– operated at the same time as its companion relay PH–. Circuits extend through auxiliary contacts of relays PT– and PU– so that two intercept punchings "IT–" and "IR–" are energized corresponding to the punchings "C–" and "N–" of that line. Two jumpers are extended from these punchings for intercept purposes, one corresponding to tip and the other to ring parties.

As shown by Fig. 53A, there are 31 pairs of punchings, one set for tip and the other for ring parties. For example, the pair of punchings marked 134 are for the first, third and fourth parties working. The punchings "TT–" are cross-connected to punching for the combination of working parties on the tip side and punchings "IR–" by a separate connection to the combination on the ring side. If there are tip parties but no ring ones, the ring jumper is omitted, and conversely. The frame portion of each service order will carry the working parties on the side of the line to which a party is added or subtracted, and the jumper of that side is moved to the correspondingly designated punching. The jumper for the other side need not be changed. The designation employed makes obvious the intercept jumper locations from the service order information.

Referring again to Fig. 53, there are 31 occupancy combination relays 1–5 as shown, each with from one to five sets of springs. These are designated to correspond to combinations of parties working and are associated with correspondingly designated intercept punchings. If relay IRR is normal, each of the occupancy combination relays will be connected to its punching "TT" but if relay IRR is operated, punching "RT" will be effective. As previously stated, relay IRR is operated for ring party stations.

Assume, now, that a call is directed to a number in the PH– group shown. The operation of relay PH'− opens lead C at point C0 preventing the operation of a class relay. Assume that the ring side of the line has parties #3, #4 and #5 working and that party #4 is being called. The ring party jumper will extend from punching "IR−" to "RT345." The ringing code for ring party #4 is $b+c+d$ and relays $Ia-Id$ are operated in this combination to energize lead 4. Relay Ic operates relay IRR which causes the occupancy combination relays to be connected to the punching "RT" whereby relay 345 is operated. Inasmuch as party #4 is called, ground is extended from the apex of the ring code relays $Ia-Id$, contacts of relay 345 to operate occupied relay OC. The latter closes lead "C" to "C0" to cause the class relay to operate and thereby serve the call. If ring party #4 had not been working, the operated occupancy combination relay would not have had a "4" in its designation and corresponding connections, so relay OC would not have operated and relay ICDI in Fig. 9 would release to route the call to intercept.

If service in the office is restricted to two or four parties on a line, it probably would be simpler to provide additional windings on primary designation relays and have class relays for each combination of working parties, said class relays functioning in conjunction with a set of ringing code relays to test occupancy against the called code. It is thought that this arrangement is obvious and a circuit therefor has not been included. It would be feasible, of course, to have both of these arrangements in the same office.

While I have described my invention and the means for utilizing the same in connection with its application to a particular kind of a community dial telephone system, it is to be understood that various other applications and embodiments may be made by those skilled in the art without departing from the spirit of the invention as defined within the scope of the appended claims.

What is claimed is:

1. In a telephone system, the combination of a plurality of links arranged in groups and a plurality of senders arranged in groups, of a marker comprising means for connecting with each of said link groups, means for connecting with each of said sender groups, and means responsive to each operation of said marker for operating sequentially a different one of said link connecting and sender connecting means, thereby to connect said marker on each operation thereof to a different one of said link groups and a different one of said sender groups.

2. In a telephone system, the combination with a plurality of link groups and a plurality of sender groups, each link and sender in said respective groups being of use in establishing automatic telephone connections, of a marker for allotting a link and a sender for the establishment of a telephone connection, said marker comprising a relay for each of said link groups and a relay for each of said sender groups, means for operating said relays, one of said relays individual to a link group effecting when operated a connection between said marker and said link group, and one of said relays individual to a sender group effecting when operated a connection between said marker and said sender group, a plurality of order relays, means responsive to each operation of said marker for operating one of said order relays, and paths between said order relays and said link group and sender group relays, those of said paths through said last operated order relay being completed into circuits on the next operation of said marker for operating one of said link group relays and one of said sender group relays, thereby to give said marker on said next operation access to the link group and the sender group respectively indicated by said operated link group relay and said operated sender group relay.

3. In a telephone system, the combination with a plurality of link groups and a plurality of sender groups, of a marker for allotting a link and a sender for a telephone connection from one of said respective link and sender groups, said marker comprising a relay for each of said link groups and a relay for each of said sender groups, a plurality of order relays, paths between said order relays and said link group and sender group relays, impulse means responsive to each operation of said marker for operating said order relays in circular sequence, and means effective on each succeeding operation of said marker for completing into circuits the paths through the order relay operated on the preceding operation, for operating a certain one of said link group relays and a certain one of said sender group relays, thereby to enable said marker in said succeeding operation to allot a link and a sender from the link and sender groups respectively indicated by the relays operated over said last operated order relay.

4. In a telephone system, the combination with calling lines, groups of outlets, groups of links and groups of senders, of a marker comprising means responsive to one of said calling lines for extending said line to an outlet, means for assigning a link and a sender from one of said groups of links and one of said groups of senders, respectively, to said calling line, and means responsive to an operation of said marker for advancing said marker's order of choice on the next operation to other groups of links and senders for assigning therefrom an available link and sender, respectively, when servicing another of said calling lines on said next operation.

5. In a telephone system, the combination of groups of switching outlets over which telephone connections may be extended, a plurality of groups of senders, and a marker for assigning an idle sender from one of said groups of senders to an outlet in one of said groups of outlets, said marker comprising an access means for each of said groups of senders, a plurality of order means each operative in succession upon each use of said marker for operating each one of said access means, and means rendered effective in the event that an access means fails to operate in response to the operation of one of said order means for operating the next one of said order means, thereby to operate the access means of another group of senders to enable said marker to assign a sender to an outlet from said other group of senders.

6. In a telephone system, a calling line, groups of outlets, links and senders for setting up automatic telephone connections, and a marker for assigning an outlet, a link and sender to said calling line from respective groups thereof accessible thereto, said marker comprising access means operative upon the seizure of said marker to render an outlet group, a link group and a sender group accessible to said marker, timing means also operative upon each seizure of said marker to measure a predetermined interval within which said access means are operated to enable said marker to selectively assign an outlet, link and sender from respective groups thereof rendered accessible thereto by said operated access means, and means for extending the operation of said timing means beyond said predetermined interval upon failure to operate one or more of said access means, thereby to enable the operation of other of said access means and render another group of each of said groups of outlets, links and senders accessible to said marker.

7. In a telephone system, groups of outlets, links and senders for establishing telephone connections between calling and called lines, and a marker for selectively assigning an outlet, a link and a sender from respective groups thereof for establishing one of said connections, said marker comprising means operative to render each of said groups of outlets, links and senders accessible to said marker, and means effective upon failure to operate said access means for a group of outlets, or links, or senders for operating access means for other corresponding groups of outlets, links and senders, thereby to enable said marker to attempt selective assignment of an outlet, link and sender in said corresponding groups.

8. In a telephone system, groups of outlets, links and senders for establishing connections between calling and called lines, and a marker for selectively assigning an outlet, a link and a sender from respective groups thereof for establishing one of said connections, said marker comprising access means for each of said groups of outlets, links and senders, one of said access means for each of said groups being operative upon a use of the marker to render said group accessible thereto, means effective upon failure to operate concurrently an access means for a group of outlets, a group of links and a group of senders for operating concurrently an access means for another group of outlets, another group of links and another group of senders, thereby to enable said marker to attempt selective assignment of an outlet, link and sender in said last-mentioned groups, and means for dismissing said marker after a predetermined number of attempts to operate concurrently one of said access means for a group of outlets, a group of links and a group of senders.

JUDSON O'D. SHEPHERD.

References Cited in the file of this patent
UNITED STATES PATENTS

| Number | Name | Date |
| --- | --- | --- |
| 1,760,851 | Richardson | May 27, 1930 |
| 1,874,684 | Wright | Aug. 30, 1932 |
| 2,184,844 | Newsom | Dec. 26, 1939 |
| 2,201,986 | Collis | May 28, 1940 |
| 2,235,803 | Carpenter | Mar. 18, 1941 |
| 2,286,142 | Lamberty | June 9, 1942 |
| 2,392,089 | Hersey | Jan. 1, 1946 |